US012656592B2

(12) United States Patent
Horstmeyer et al.

(10) Patent No.: US 12,656,592 B2
(45) Date of Patent: Jun. 16, 2026

(54) IMAGING SYSTEMS WITH PERISCOPE WELL PLATES

(71) Applicant: Ramona Optics Inc., Durham, NC (US)

(72) Inventors: Gregor Horstmeyer, Durham, NC (US); Robert Horstmeyer, Palo Alto, CA (US); Paul Reamey, Durham, NC (US)

( * ) Notice: Subject to any disclaimer, the term of this patent is extended or adjusted under 35 U.S.C. 154(b) by 0 days.

(21) Appl. No.: 18/600,728

(22) Filed: Mar. 10, 2024

(65) Prior Publication Data

US 2024/0302640 A1 Sep. 12, 2024

Related U.S. Application Data

(60) Provisional application No. 63/451,485, filed on Mar. 10, 2023.

(51) Int. Cl.
| | |
|---|---|
| *H04N 23/11* | (2023.01) |
| *G02B 21/00* | (2006.01) |
| *G02B 21/18* | (2006.01) |
| *H04N 23/56* | (2023.01) |
| *H04N 23/74* | (2023.01) |
| *H04N 23/90* | (2023.01) |

(52) U.S. Cl.
CPC ......... *G02B 21/18* (2013.01); *G02B 21/0028* (2013.01); *G02B 21/0032* (2013.01); *G02B 21/0076* (2013.01); *H04N 23/11* (2023.01);

*H04N 23/56* (2023.01); *H04N 23/74* (2023.01); *H04N 23/90* (2023.01)

(58) Field of Classification Search
CPC ........ H04N 23/74; H04N 23/56; H04N 23/90; H04N 23/11; G02B 21/18; G02B 21/0028; G02B 21/0032; G02B 21/0076
See application file for complete search history.

(56) References Cited

U.S. PATENT DOCUMENTS

| | | | | |
|---|---|---|---|---|
| 2013/0252237 A1* | 9/2013 | Wagner | .............. | G01N 15/1434 |
| | | | | 435/6.1 |
| 2016/0327779 A1* | 11/2016 | Hillman | ............. | G02B 21/0032 |
| 2018/0376048 A1* | 12/2018 | Schürf | ................... | H04N 23/69 |
| 2023/0000330 A1* | 1/2023 | Igarashi | ........... | A61B 1/000095 |

* cited by examiner

*Primary Examiner* — Jonathan R Messmore
(74) *Attorney, Agent, or Firm* — Edward Ergenzinger

(57) ABSTRACT

An imaging system having multiple cameras can be used for simultaneously imaging the top and side of samples in wells of a wellplate under multiple illumination sources, with each well in the wellplate adjacent to a set of two angled optical elements configured for viewing the two opposite side of the well. The cameras, the wells, and the illumination sources are configured to match each other to provide a high throughput imaging system, which can be used for a wide range of applications including pharmaceutical drug discovery, toxicology and a patient specific oncology.

18 Claims, 53 Drawing Sheets

Well 121

Well plate 120

Well camera field width 115A

Top mirror 122A

Bottom mirror 122B

Camera field 110A

Camera field 110A*

Light 111*

Camera 110*

Camera 110**

Side camera field width 115B

Light 111**

Top mirror 122A

Bottom mirror 122B

Well 121

Light 112*

Light 112**

Mirror width 122C

Side camera field width 115B

Well width 121B

Top mirror 122A

Camera field width 115A*

Observation area 128

Well camera field width 115A

Well 121

Well width 121A

Mirror 122*

Well 121*

Well plate
120A
Well
121
Prism
123
Camera
field
110A
Camera field
110A*

(a)

Camera
110***
Camera field
110A*
Sample
124
Prism
123

(b)

Well plate
120B
Well
121

(a)

Mirror
122
Well
121

Mirror
122

Mirror   Well   Mirror
122     121    122

Well plate
120

Top view
114A

Transparent
124A        (a)

Transparent
124A

Side view
114B        (b)

Top view
114A

Opaque
124B        (a)

Opaque
124B        FIG. 5B

Side view
114B        (b)

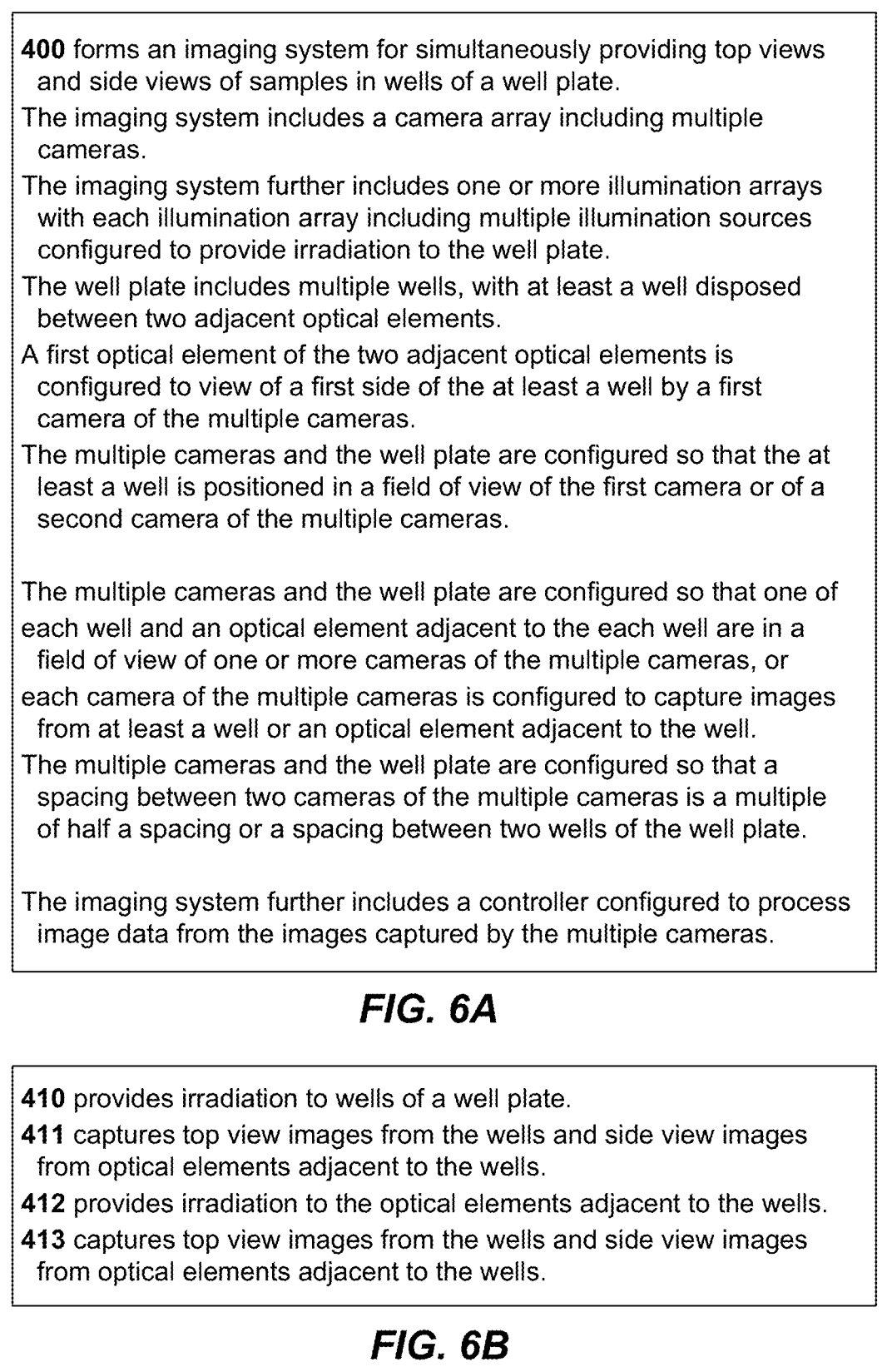

400 forms an imaging system for simultaneously providing top views and side views of samples in wells of a well plate.

The imaging system includes a camera array including multiple cameras.

The imaging system further includes one or more illumination arrays with each illumination array including multiple illumination sources configured to provide irradiation to the well plate.

The well plate includes multiple wells, with at least a well disposed between two adjacent optical elements.

A first optical element of the two adjacent optical elements is configured to view of a first side of the at least a well by a first camera of the multiple cameras.

The multiple cameras and the well plate are configured so that the at least a well is positioned in a field of view of the first camera or of a second camera of the multiple cameras.

The multiple cameras and the well plate are configured so that one of each well and an optical element adjacent to the each well are in a field of view of one or more cameras of the multiple cameras, or each camera of the multiple cameras is configured to capture images from at least a well or an optical element adjacent to the well.

The multiple cameras and the well plate are configured so that a spacing between two cameras of the multiple cameras is a multiple of half a spacing or a spacing between two wells of the well plate.

The imaging system further includes a controller configured to process image data from the images captured by the multiple cameras.

FIG. 6A

410 provides irradiation to wells of a well plate.
411 captures top view images from the wells and side view images from optical elements adjacent to the wells.
412 provides irradiation to the optical elements adjacent to the wells.
413 captures top view images from the wells and side view images from optical elements adjacent to the wells.

FIG. 6B

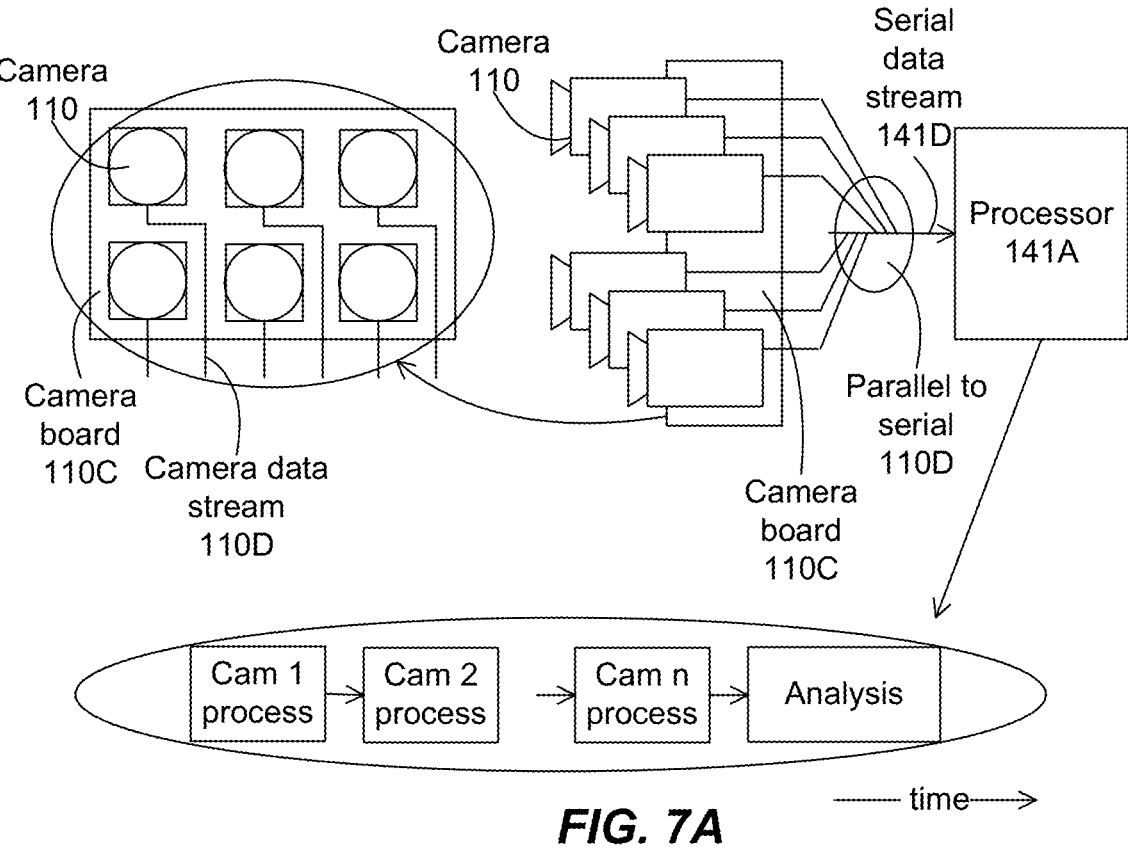

FIG. 7A

420 forms an imaging system for simultaneously providing top views and side views of samples in wells of a well plate.

The imaging system includes a camera array including multiple cameras configured to capture images of the samples.

The camera array includes the multiple cameras disposed on a PCB board.

The imaging system further includes one or more illumination arrays with each illumination array including multiple illumination sources configured to provide irradiation to the well plate.

The imaging system further includes a controller configured to control the multiple illumination sources for illuminating the samples.

The controller is configured to control the multiple cameras on the PCB board to capture images of the sample under illumination provided by the one or more illumination arrays.

The controller is configured to process image data from the images captured by the multiple cameras

FIG. 7B

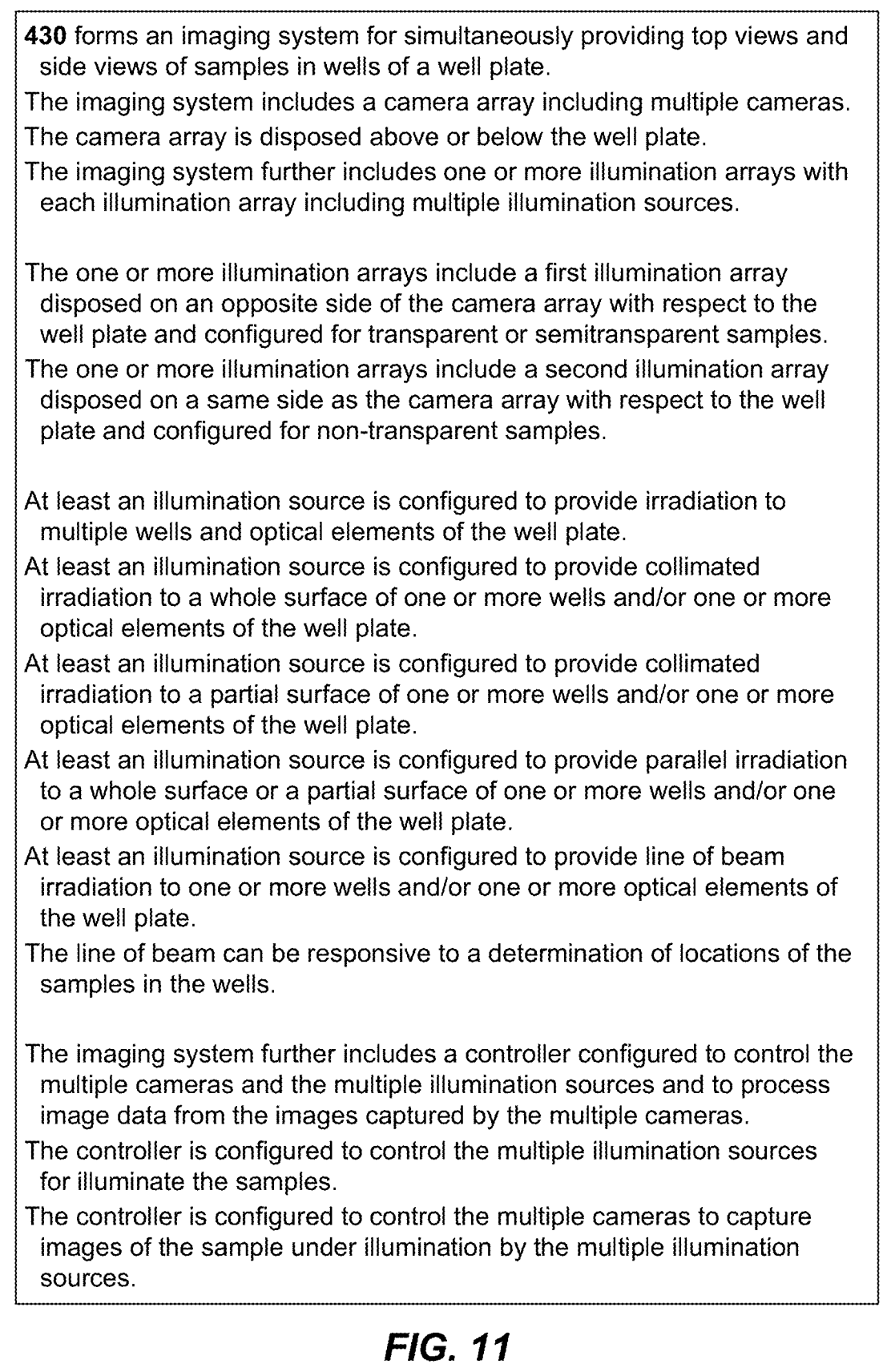

430 forms an imaging system for simultaneously providing top views and side views of samples in wells of a well plate.

The imaging system includes a camera array including multiple cameras.

The camera array is disposed above or below the well plate.

The imaging system further includes one or more illumination arrays with each illumination array including multiple illumination sources.

The one or more illumination arrays include a first illumination array disposed on an opposite side of the camera array with respect to the well plate and configured for transparent or semitransparent samples.

The one or more illumination arrays include a second illumination array disposed on a same side as the camera array with respect to the well plate and configured for non-transparent samples.

At least an illumination source is configured to provide irradiation to multiple wells and optical elements of the well plate.

At least an illumination source is configured to provide collimated irradiation to a whole surface of one or more wells and/or one or more optical elements of the well plate.

At least an illumination source is configured to provide collimated irradiation to a partial surface of one or more wells and/or one or more optical elements of the well plate.

At least an illumination source is configured to provide parallel irradiation to a whole surface or a partial surface of one or more wells and/or one or more optical elements of the well plate.

At least an illumination source is configured to provide line of beam irradiation to one or more wells and/or one or more optical elements of the well plate.

The line of beam can be responsive to a determination of locations of the samples in the wells.

The imaging system further includes a controller configured to control the multiple cameras and the multiple illumination sources and to process image data from the images captured by the multiple cameras.

The controller is configured to control the multiple illumination sources for illuminate the samples.

The controller is configured to control the multiple cameras to capture images of the sample under illumination by the multiple illumination sources.

*FIG. 11*

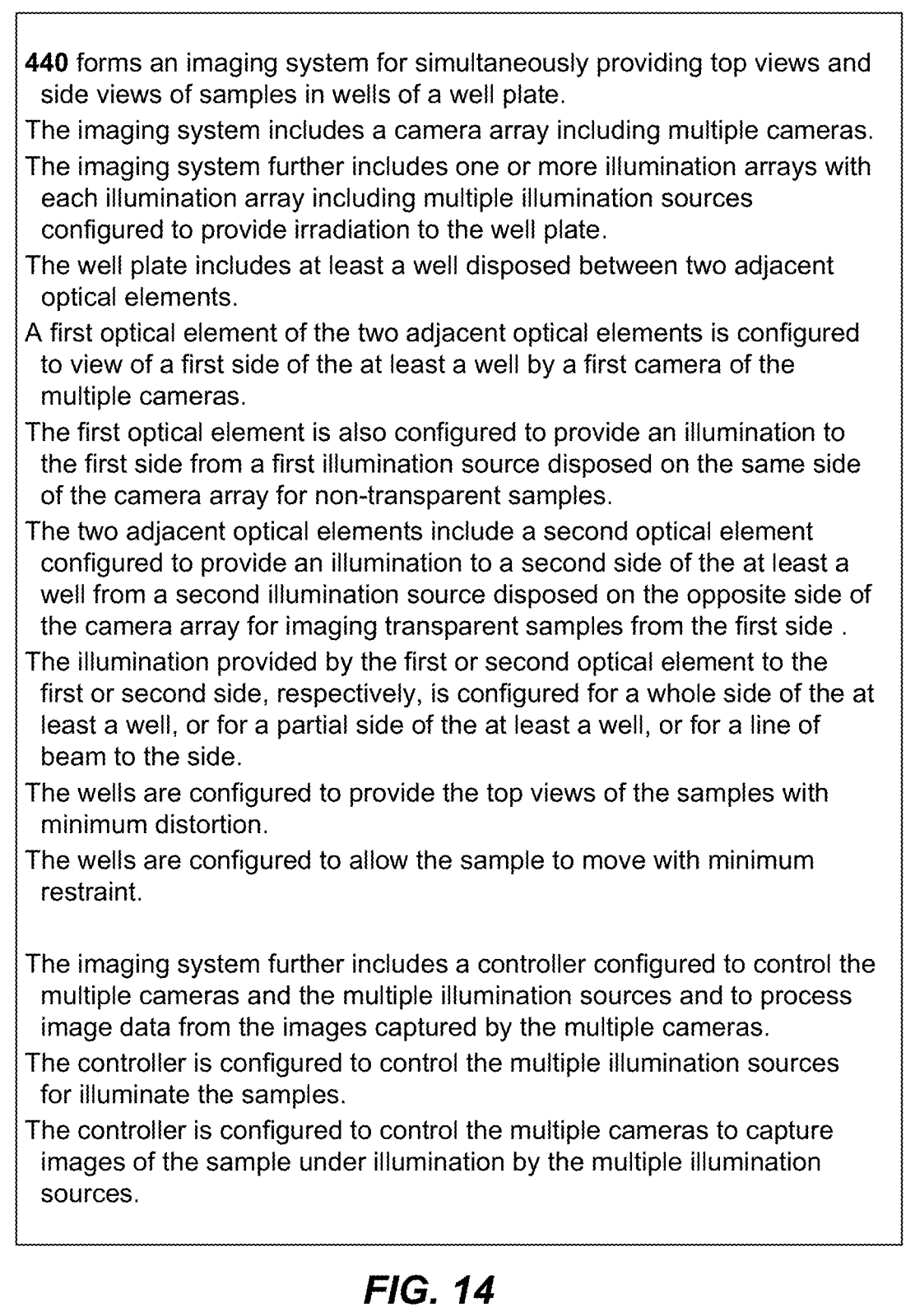

440 forms an imaging system for simultaneously providing top views and side views of samples in wells of a well plate.

The imaging system includes a camera array including multiple cameras.

The imaging system further includes one or more illumination arrays with each illumination array including multiple illumination sources configured to provide irradiation to the well plate.

The well plate includes at least a well disposed between two adjacent optical elements.

A first optical element of the two adjacent optical elements is configured to view of a first side of the at least a well by a first camera of the multiple cameras.

The first optical element is also configured to provide an illumination to the first side from a first illumination source disposed on the same side of the camera array for non-transparent samples.

The two adjacent optical elements include a second optical element configured to provide an illumination to a second side of the at least a well from a second illumination source disposed on the opposite side of the camera array for imaging transparent samples from the first side .

The illumination provided by the first or second optical element to the first or second side, respectively, is configured for a whole side of the at least a well, or for a partial side of the at least a well, or for a line of beam to the side.

The wells are configured to provide the top views of the samples with minimum distortion.

The wells are configured to allow the sample to move with minimum restraint.

The imaging system further includes a controller configured to control the multiple cameras and the multiple illumination sources and to process image data from the images captured by the multiple cameras.

The controller is configured to control the multiple illumination sources for illuminate the samples.

The controller is configured to control the multiple cameras to capture images of the sample under illumination by the multiple illumination sources.

*FIG. 14*

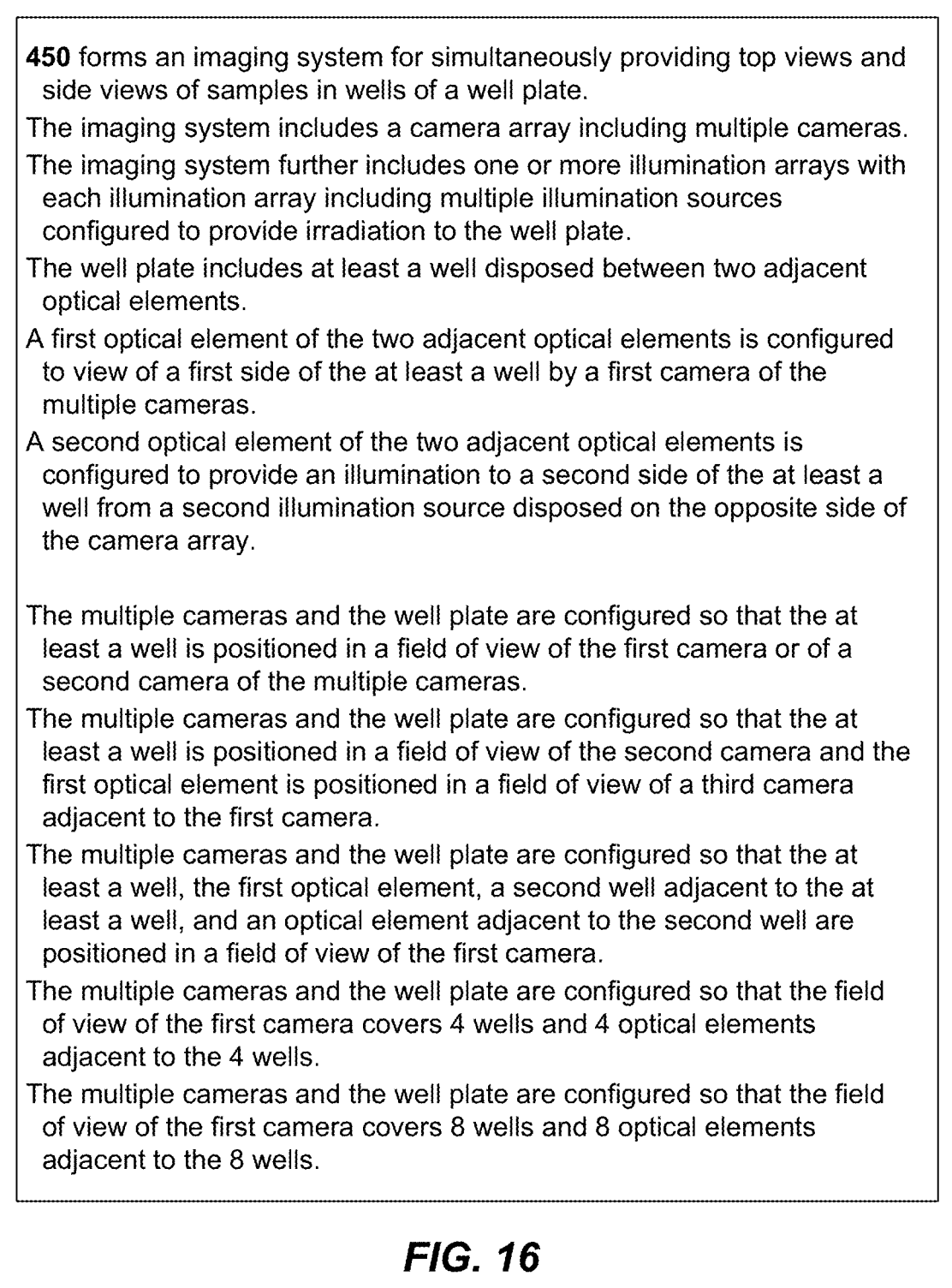

450 forms an imaging system for simultaneously providing top views and side views of samples in wells of a well plate.

The imaging system includes a camera array including multiple cameras.

The imaging system further includes one or more illumination arrays with each illumination array including multiple illumination sources configured to provide irradiation to the well plate.

The well plate includes at least a well disposed between two adjacent optical elements.

A first optical element of the two adjacent optical elements is configured to view of a first side of the at least a well by a first camera of the multiple cameras.

A second optical element of the two adjacent optical elements is configured to provide an illumination to a second side of the at least a well from a second illumination source disposed on the opposite side of the camera array.

The multiple cameras and the well plate are configured so that the at least a well is positioned in a field of view of the first camera or of a second camera of the multiple cameras.

The multiple cameras and the well plate are configured so that the at least a well is positioned in a field of view of the second camera and the first optical element is positioned in a field of view of a third camera adjacent to the first camera.

The multiple cameras and the well plate are configured so that the at least a well, the first optical element, a second well adjacent to the at least a well, and an optical element adjacent to the second well are positioned in a field of view of the first camera.

The multiple cameras and the well plate are configured so that the field of view of the first camera covers 4 wells and 4 optical elements adjacent to the 4 wells.

The multiple cameras and the well plate are configured so that the field of view of the first camera covers 8 wells and 8 optical elements adjacent to the 8 wells.

*FIG. 16*

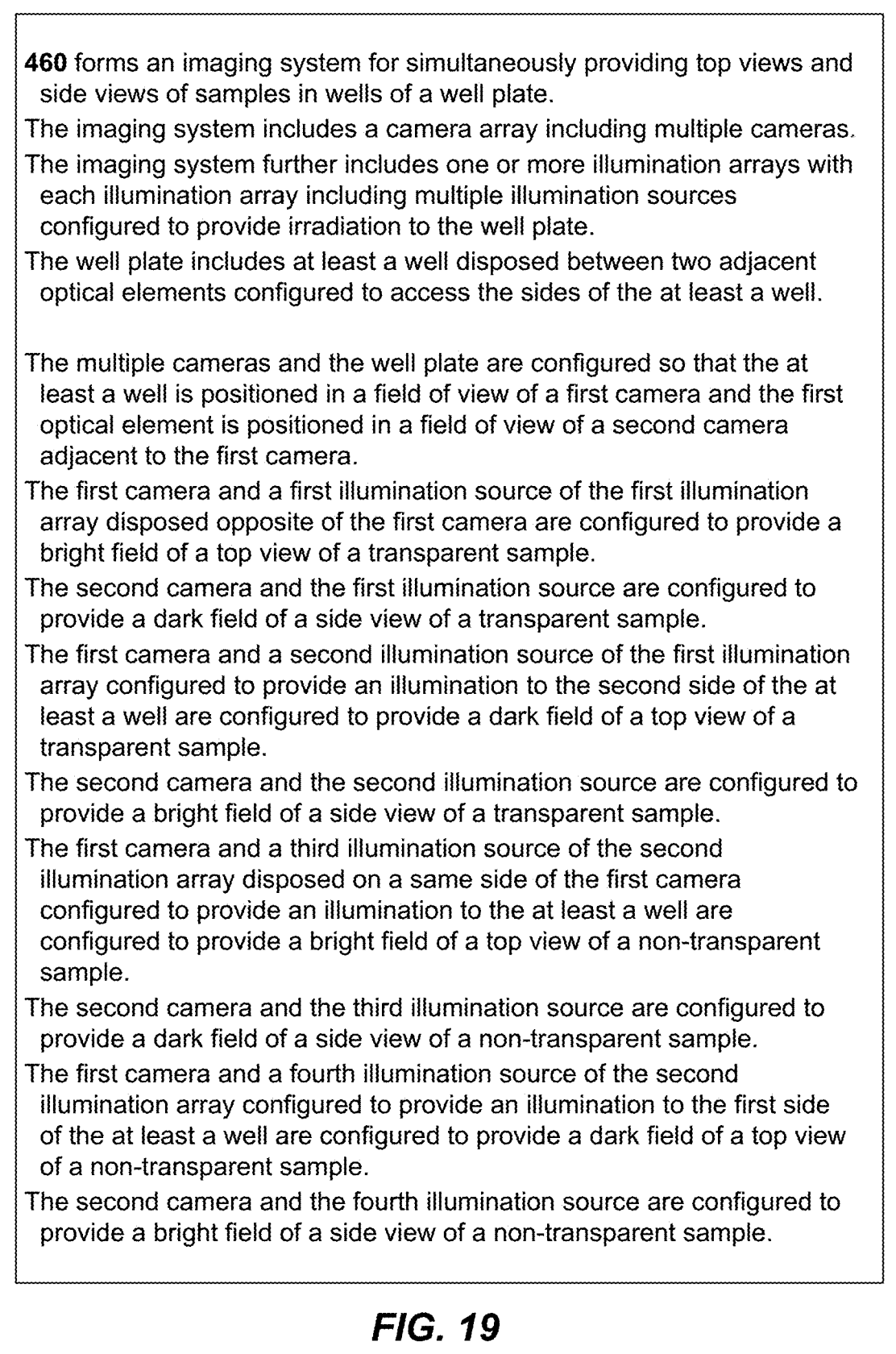

460 forms an imaging system for simultaneously providing top views and side views of samples in wells of a well plate.

The imaging system includes a camera array including multiple cameras.

The imaging system further includes one or more illumination arrays with each illumination array including multiple illumination sources configured to provide irradiation to the well plate.

The well plate includes at least a well disposed between two adjacent optical elements configured to access the sides of the at least a well.

The multiple cameras and the well plate are configured so that the at least a well is positioned in a field of view of a first camera and the first optical element is positioned in a field of view of a second camera adjacent to the first camera.

The first camera and a first illumination source of the first illumination array disposed opposite of the first camera are configured to provide a bright field of a top view of a transparent sample.

The second camera and the first illumination source are configured to provide a dark field of a side view of a transparent sample.

The first camera and a second illumination source of the first illumination array configured to provide an illumination to the second side of the at least a well are configured to provide a dark field of a top view of a transparent sample.

The second camera and the second illumination source are configured to provide a bright field of a side view of a transparent sample.

The first camera and a third illumination source of the second illumination array disposed on a same side of the first camera configured to provide an illumination to the at least a well are configured to provide a bright field of a top view of a non-transparent sample.

The second camera and the third illumination source are configured to provide a dark field of a side view of a non-transparent sample.

The first camera and a fourth illumination source of the second illumination array configured to provide an illumination to the first side of the at least a well are configured to provide a dark field of a top view of a non-transparent sample.

The second camera and the fourth illumination source are configured to provide a bright field of a side view of a non-transparent sample.

*FIG. 19*

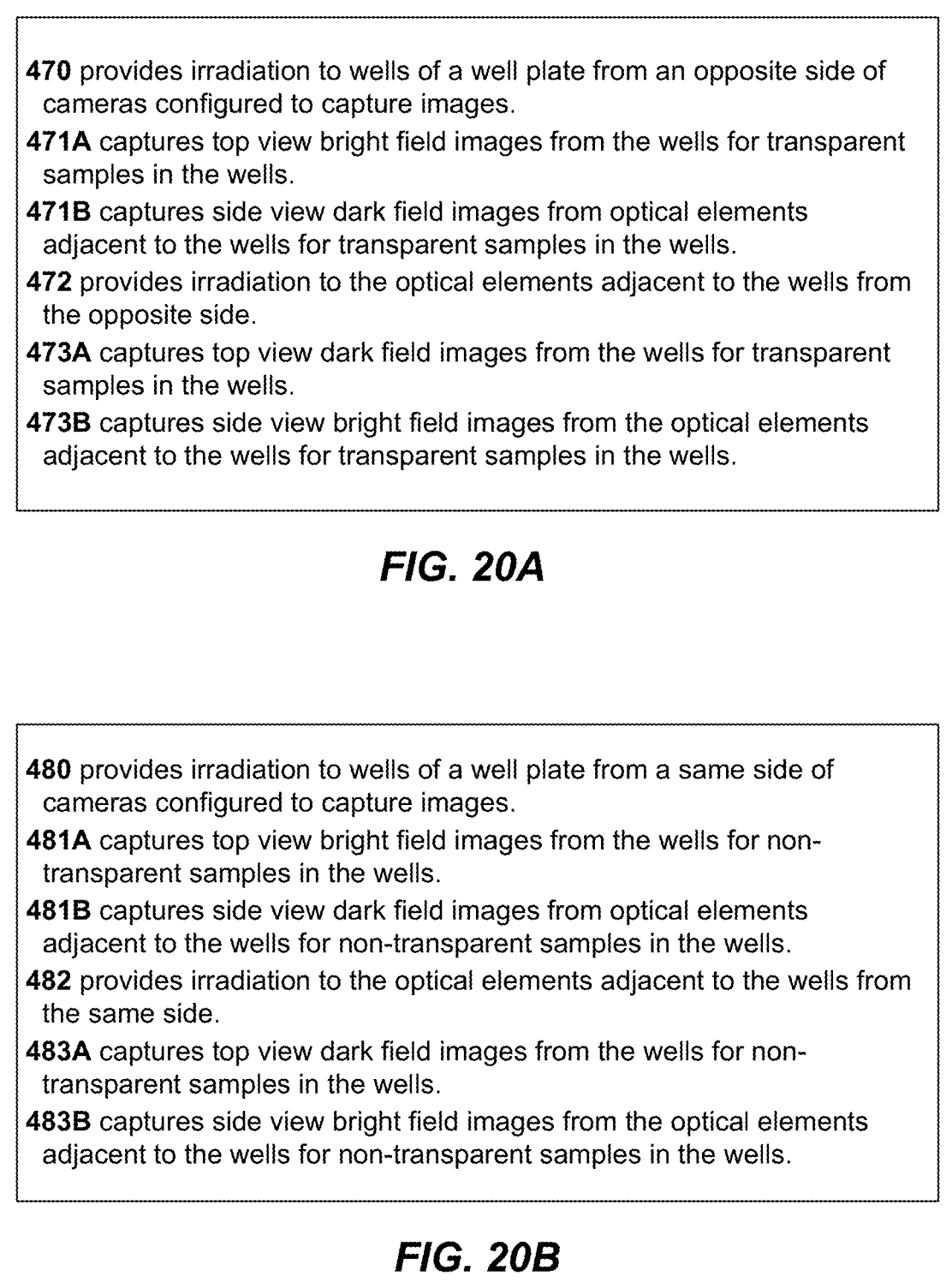

470 provides irradiation to wells of a well plate from an opposite side of cameras configured to capture images.

471A captures top view bright field images from the wells for transparent samples in the wells.

471B captures side view dark field images from optical elements adjacent to the wells for transparent samples in the wells.

472 provides irradiation to the optical elements adjacent to the wells from the opposite side.

473A captures top view dark field images from the wells for transparent samples in the wells.

473B captures side view bright field images from the optical elements adjacent to the wells for transparent samples in the wells.

FIG. 20A

480 provides irradiation to wells of a well plate from a same side of cameras configured to capture images.

481A captures top view bright field images from the wells for non-transparent samples in the wells.

481B captures side view dark field images from optical elements adjacent to the wells for non-transparent samples in the wells.

482 provides irradiation to the optical elements adjacent to the wells from the same side.

483A captures top view dark field images from the wells for non-transparent samples in the wells.

483B captures side view bright field images from the optical elements adjacent to the wells for non-transparent samples in the wells.

FIG. 20B

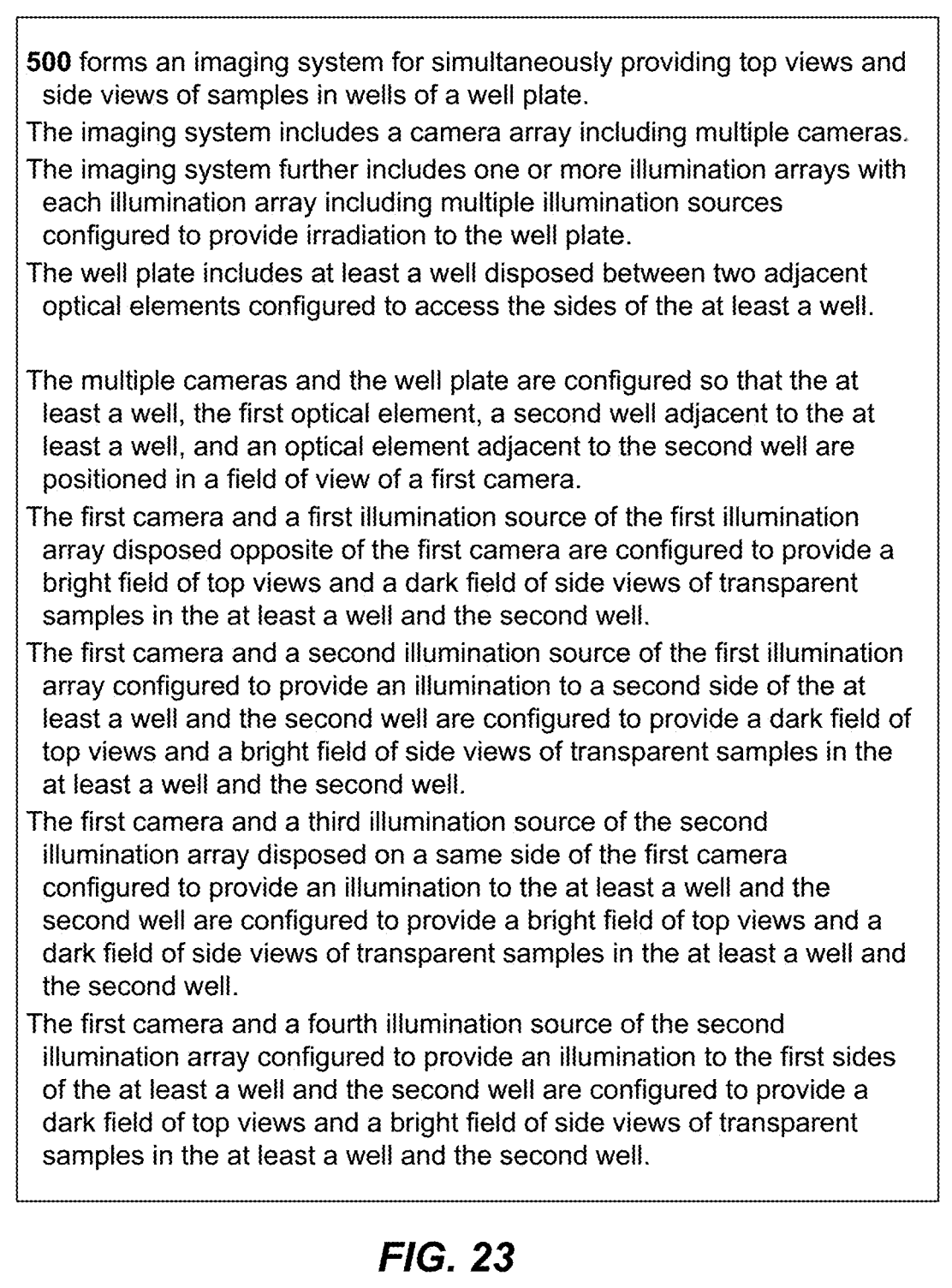

500 forms an imaging system for simultaneously providing top views and side views of samples in wells of a well plate.

The imaging system includes a camera array including multiple cameras.

The imaging system further includes one or more illumination arrays with each illumination array including multiple illumination sources configured to provide irradiation to the well plate.

The well plate includes at least a well disposed between two adjacent optical elements configured to access the sides of the at least a well.

The multiple cameras and the well plate are configured so that the at least a well, the first optical element, a second well adjacent to the at least a well, and an optical element adjacent to the second well are positioned in a field of view of a first camera.

The first camera and a first illumination source of the first illumination array disposed opposite of the first camera are configured to provide a bright field of top views and a dark field of side views of transparent samples in the at least a well and the second well.

The first camera and a second illumination source of the first illumination array configured to provide an illumination to a second side of the at least a well and the second well are configured to provide a dark field of top views and a bright field of side views of transparent samples in the at least a well and the second well.

The first camera and a third illumination source of the second illumination array disposed on a same side of the first camera configured to provide an illumination to the at least a well and the second well are configured to provide a bright field of top views and a dark field of side views of transparent samples in the at least a well and the second well.

The first camera and a fourth illumination source of the second illumination array configured to provide an illumination to the first sides of the at least a well and the second well are configured to provide a dark field of top views and a bright field of side views of transparent samples in the at least a well and the second well.

*FIG. 23*

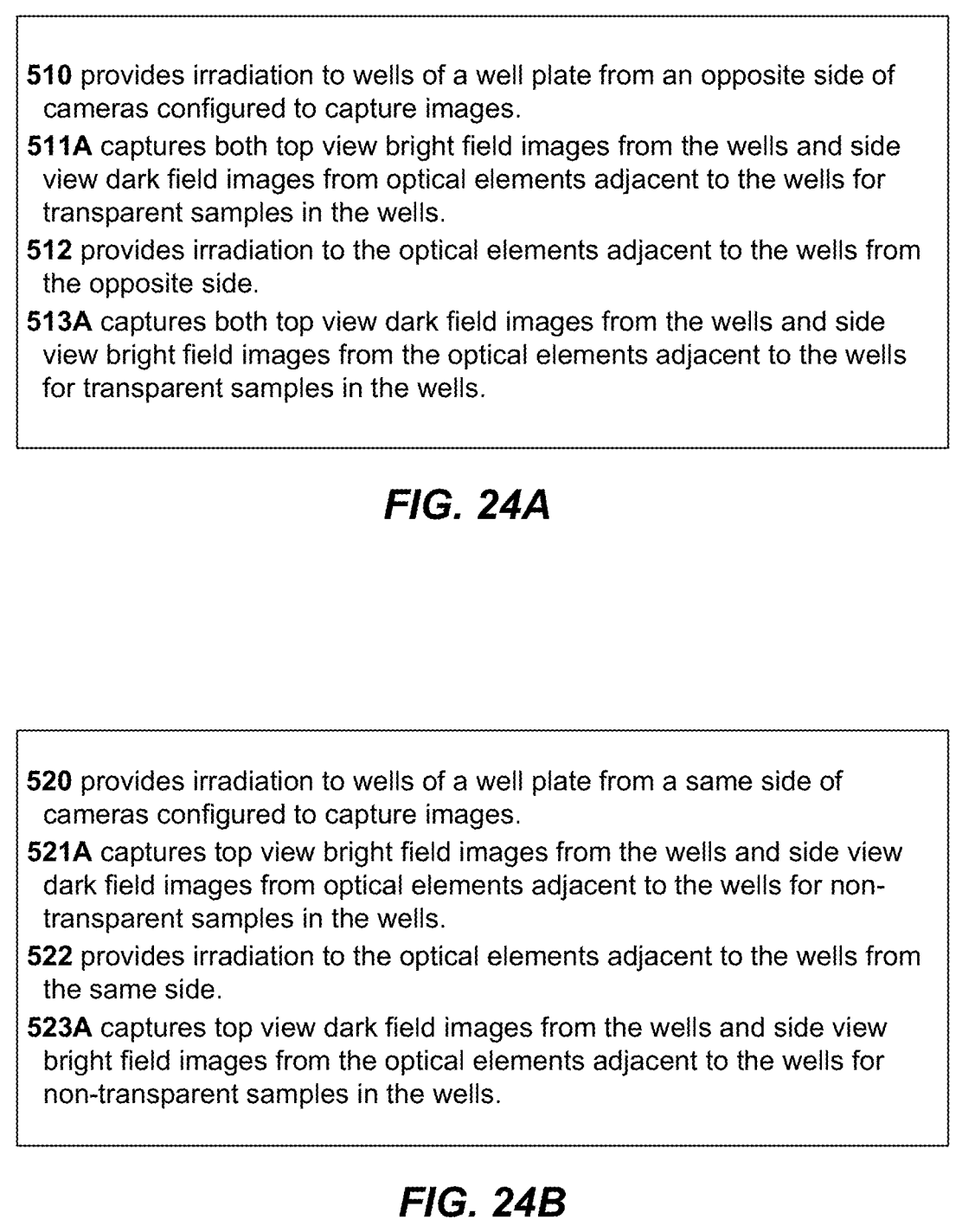

510 provides irradiation to wells of a well plate from an opposite side of cameras configured to capture images.

511A captures both top view bright field images from the wells and side view dark field images from optical elements adjacent to the wells for transparent samples in the wells.

512 provides irradiation to the optical elements adjacent to the wells from the opposite side.

513A captures both top view dark field images from the wells and side view bright field images from the optical elements adjacent to the wells for transparent samples in the wells.

*FIG. 24A*

520 provides irradiation to wells of a well plate from a same side of cameras configured to capture images.

521A captures top view bright field images from the wells and side view dark field images from optical elements adjacent to the wells for non-transparent samples in the wells.

522 provides irradiation to the optical elements adjacent to the wells from the same side.

523A captures top view dark field images from the wells and side view bright field images from the optical elements adjacent to the wells for non-transparent samples in the wells.

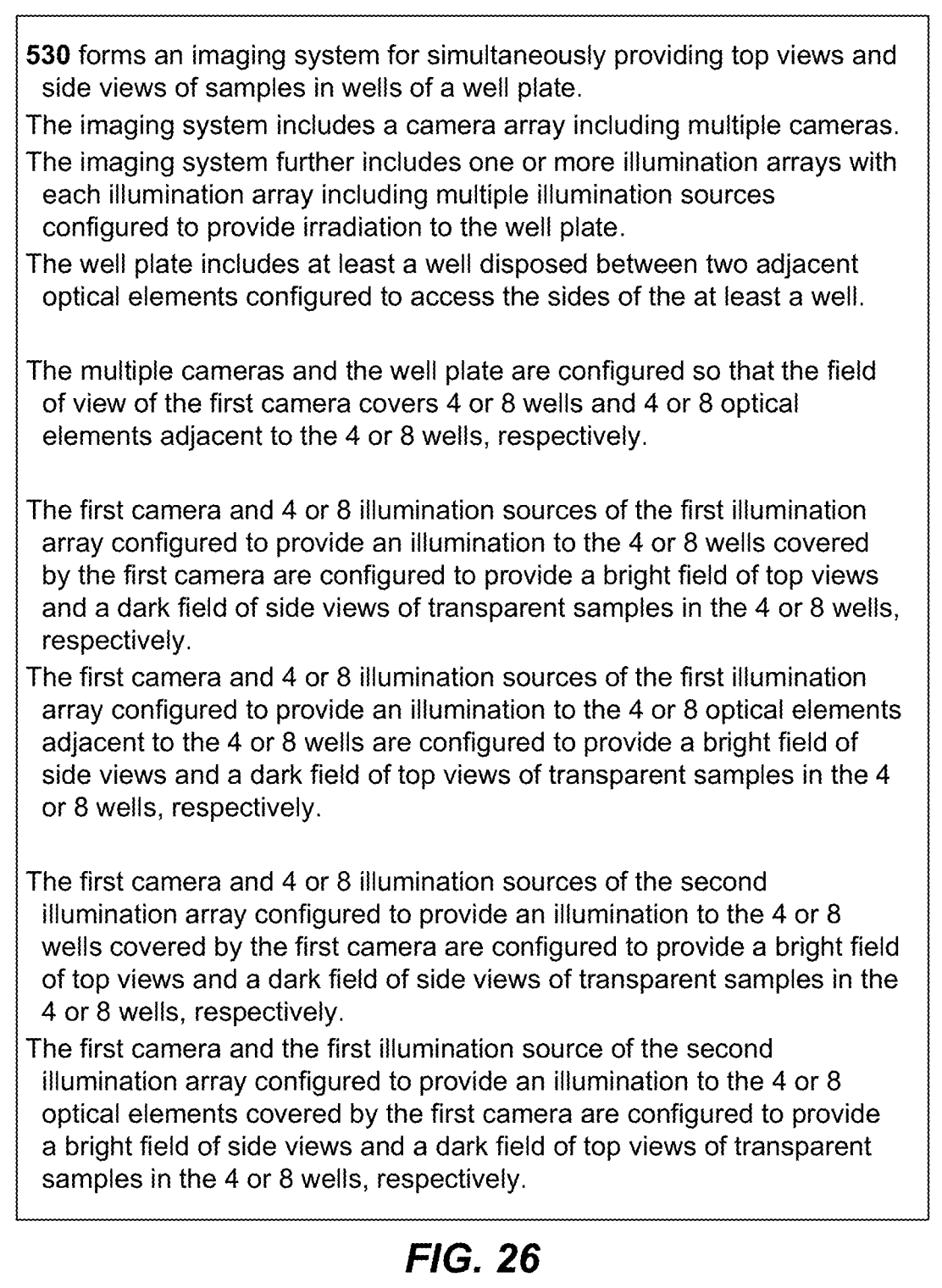

530 forms an imaging system for simultaneously providing top views and side views of samples in wells of a well plate.

The imaging system includes a camera array including multiple cameras.

The imaging system further includes one or more illumination arrays with each illumination array including multiple illumination sources configured to provide irradiation to the well plate.

The well plate includes at least a well disposed between two adjacent optical elements configured to access the sides of the at least a well.

The multiple cameras and the well plate are configured so that the field of view of the first camera covers 4 or 8 wells and 4 or 8 optical elements adjacent to the 4 or 8 wells, respectively.

The first camera and 4 or 8 illumination sources of the first illumination array configured to provide an illumination to the 4 or 8 wells covered by the first camera are configured to provide a bright field of top views and a dark field of side views of transparent samples in the 4 or 8 wells, respectively.

The first camera and 4 or 8 illumination sources of the first illumination array configured to provide an illumination to the 4 or 8 optical elements adjacent to the 4 or 8 wells are configured to provide a bright field of side views and a dark field of top views of transparent samples in the 4 or 8 wells, respectively.

The first camera and 4 or 8 illumination sources of the second illumination array configured to provide an illumination to the 4 or 8 wells covered by the first camera are configured to provide a bright field of top views and a dark field of side views of transparent samples in the 4 or 8 wells, respectively.

The first camera and the first illumination source of the second illumination array configured to provide an illumination to the 4 or 8 optical elements covered by the first camera are configured to provide a bright field of side views and a dark field of top views of transparent samples in the 4 or 8 wells, respectively.

*FIG. 26*

Camera array
110&1

Well
121

Top
mirror
122A

Mirror portion
next to well

Bottom
mirror
122B

Well plate
120&1

Camera
110

Well plate
120&1

Camera array
110&1

Camera array
110&1

Second camera
110-2

First camera
110-1

Extra
camera
110X

Camera field
110A

Well
121

Top
mirror
122A

Sample
124

Well plate
120&1

Combination of top
and bottom mirrors

Bottom
mirror
122B

Camera array
110&2

Well
121

Well plate
120&1

Top
mirror
122A

Mirror portion
next to well

Bottom
mirror
122B

Camera
110

Well plate
120&1

Camera    Well
110-1*    121-1

Mirror portions
next to wells
122-1

Well
121-2

Camera array
110&2

Camera field
110A*

Camera array
110&2

Camera
110

Extra
camera
110X

Camera field
110A*

Well
121

Sample    Well plate
124    120&1

Mirror
122

Distance
151

Distance with gap
151*

Well
121

Gap
150A*

Well plate
120&3

Gap
150A

Mirror
122

Camera array
110&3

Distance with gap
152*

Distance
152

Gap
150B

Gap
150B*

Camera
110

Camera array
110&4

Camera array
110&3

Gap
150B

Second camera
110-2

(a)

First camera
110-1

Extra camera
110X

Camera
110-2*

Camera
110-1*

Extra
camera
110X

(a)

Gap
150B

Camera field
110A

Camera field
110A*

Camera group
110$2

Camera group
110$1

(b)

Well plate
120&3

Gap
150A

Gap
150A

(b)

Camera array
110&5

Well
121

Well plate
120&5

Mirror
122

FIG. 30B Camera
110

Well plate
120&5

Camera array
110&5

Camera array
110&5

Second camera
110-2

First camera
110-1

Camera group
110$1

Camera field
110A

Sample
124

Extra well
121X

Camera group
110$2

Mirror
122

Well
121

Well plate
120&5

Camera array
110&6

Well
121

Well plate
120&5

Mirror
122

*FIG. 31B* Camera
110

Well plate
120&5

Mirror portions
next to wells
122-1

Well
121-1

Camera
110-1*

Well
121-2

Camera array
110&6

Camera field
110A*

Camera array
110&5

Camera
110-1*

Camera field
110A*

Extra well
121X

Well plate
120&5

Mirror
122

Well
121

Mirror
122

Well plate
120&7

Gap
150A

Gap
150A*

Well
121

Distance
151

Distance with gap
151*

Camera array
110&8

Camera array
110&7

Distance
152

Gap
150B*

Gap
150B

Camera
110

(a)          (a)

Distance
with gap
152*

Camera array
110&7     Gap
150B

Camera
110

Camera array
110&8     Gap
150B

Camera
110

Camera field
110A

Well
121

Mirror
122

Camera field
110A*

(b)          (b)

Gap
150A     FIG. 32B

Well plate
120&7

Gap
150A     FIG. 32C

Figure 36:
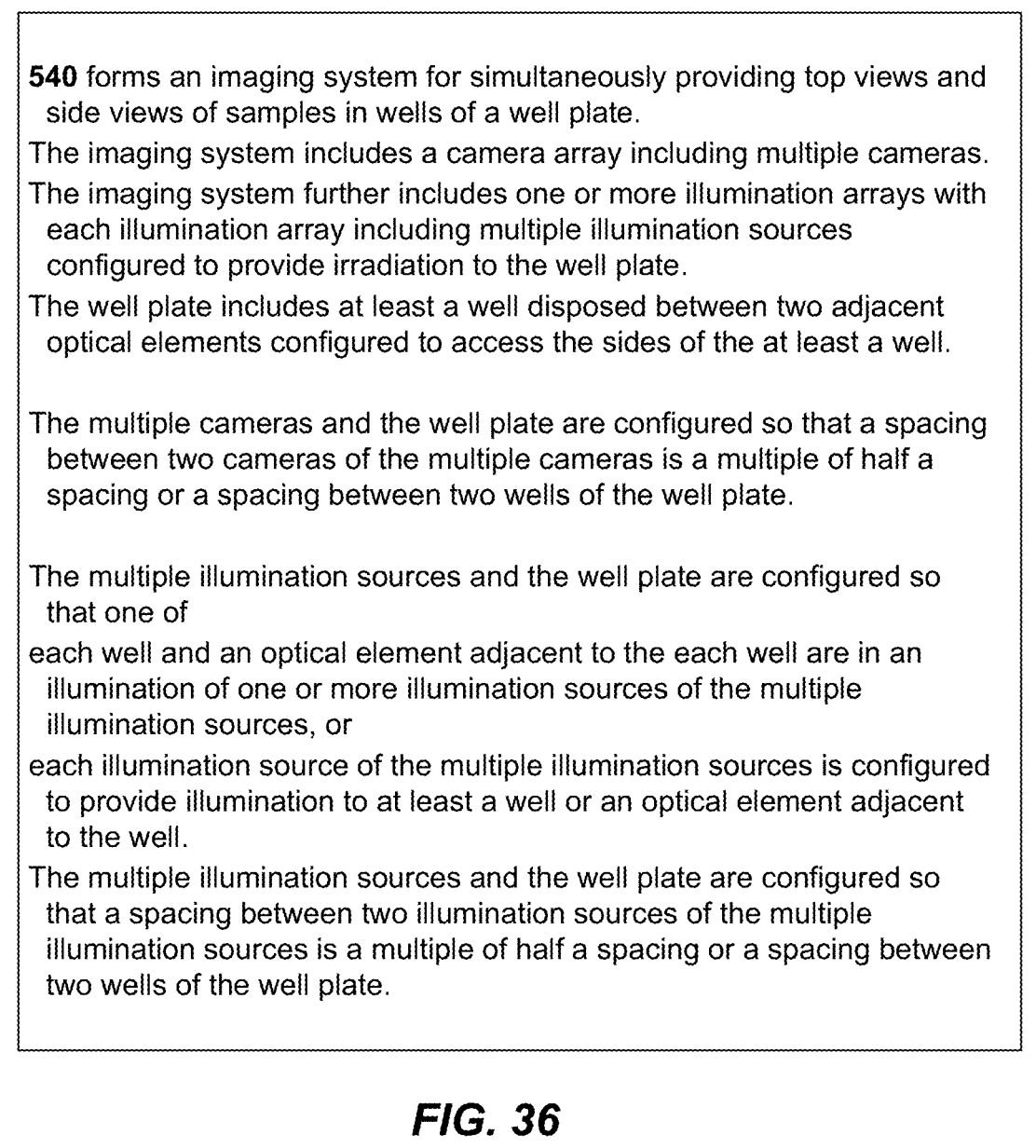

540 forms an imaging system for simultaneously providing top views and side views of samples in wells of a well plate.

The imaging system includes a camera array including multiple cameras.

The imaging system further includes one or more illumination arrays with each illumination array including multiple illumination sources configured to provide irradiation to the well plate.

The well plate includes at least a well disposed between two adjacent optical elements configured to access the sides of the at least a well.

The multiple cameras and the well plate are configured so that a spacing between two cameras of the multiple cameras is a multiple of half a spacing or a spacing between two wells of the well plate.

The multiple illumination sources and the well plate are configured so that one of each well and an optical element adjacent to the each well are in an illumination of one or more illumination sources of the multiple illumination sources, or each illumination source of the multiple illumination sources is configured to provide illumination to at least a well or an optical element adjacent to the well.

The multiple illumination sources and the well plate are configured so that a spacing between two illumination sources of the multiple illumination sources is a multiple of half a spacing or a spacing between two wells of the well plate.

*(a)*   Excitation 130A   *(b)*

Emission filter 133

Sample 124

*(c)*   *(d)*

*(a)*   *(b)*   *(c)*   *(d)*

Filter 133

Excitation 130B   Excitation 130B

Prism 123*

*(a)*   FIG. 38C   *(b)*

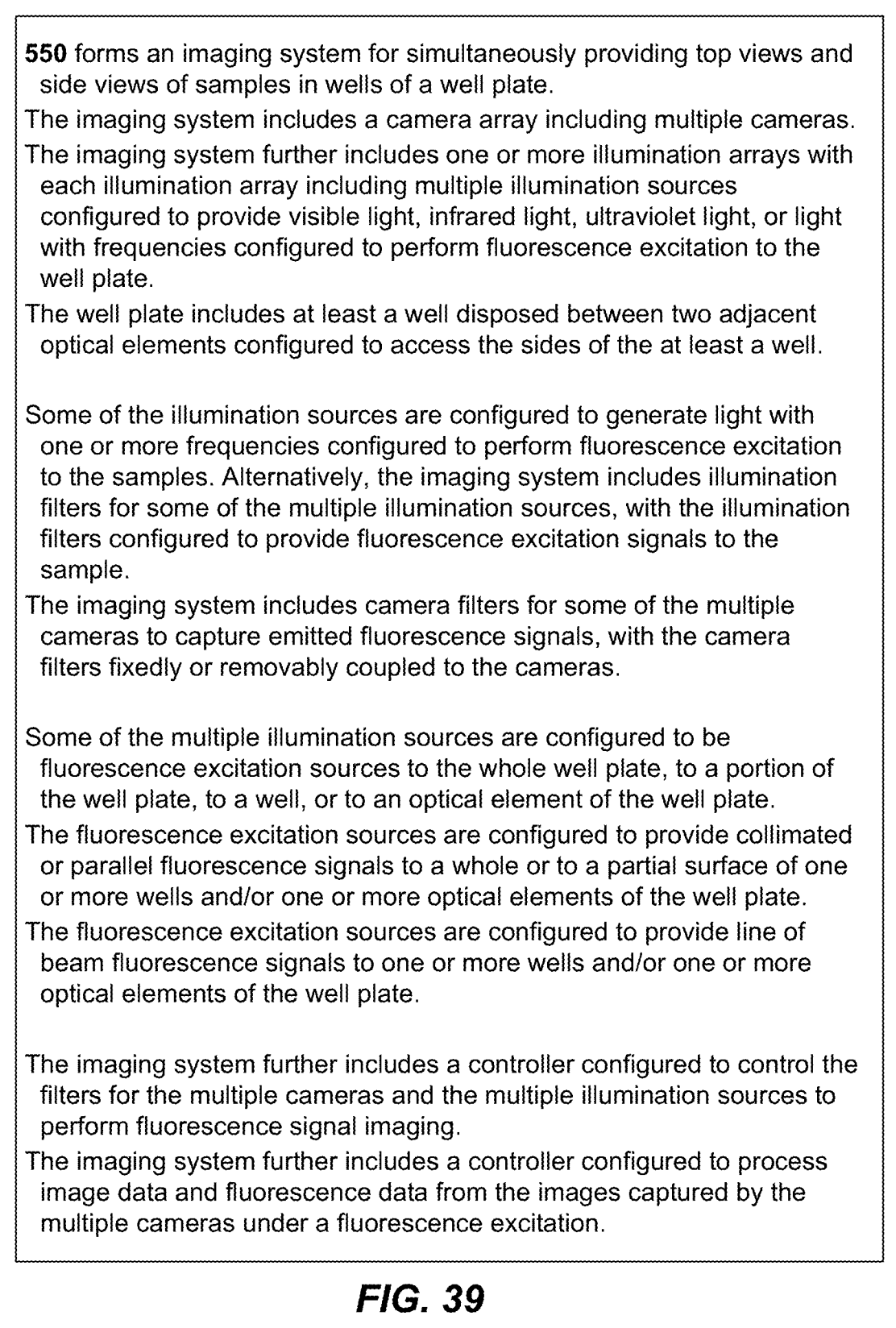

550 forms an imaging system for simultaneously providing top views and side views of samples in wells of a well plate.

The imaging system includes a camera array including multiple cameras.

The imaging system further includes one or more illumination arrays with each illumination array including multiple illumination sources configured to provide visible light, infrared light, ultraviolet light, or light with frequencies configured to perform fluorescence excitation to the well plate.

The well plate includes at least a well disposed between two adjacent optical elements configured to access the sides of the at least a well.

Some of the illumination sources are configured to generate light with one or more frequencies configured to perform fluorescence excitation to the samples. Alternatively, the imaging system includes illumination filters for some of the multiple illumination sources, with the illumination filters configured to provide fluorescence excitation signals to the sample.

The imaging system includes camera filters for some of the multiple cameras to capture emitted fluorescence signals, with the camera filters fixedly or removably coupled to the cameras.

Some of the multiple illumination sources are configured to be fluorescence excitation sources to the whole well plate, to a portion of the well plate, to a well, or to an optical element of the well plate.

The fluorescence excitation sources are configured to provide collimated or parallel fluorescence signals to a whole or to a partial surface of one or more wells and/or one or more optical elements of the well plate.

The fluorescence excitation sources are configured to provide line of beam fluorescence signals to one or more wells and/or one or more optical elements of the well plate.

The imaging system further includes a controller configured to control the filters for the multiple cameras and the multiple illumination sources to perform fluorescence signal imaging.

The imaging system further includes a controller configured to process image data and fluorescence data from the images captured by the multiple cameras under a fluorescence excitation.

*FIG. 39*

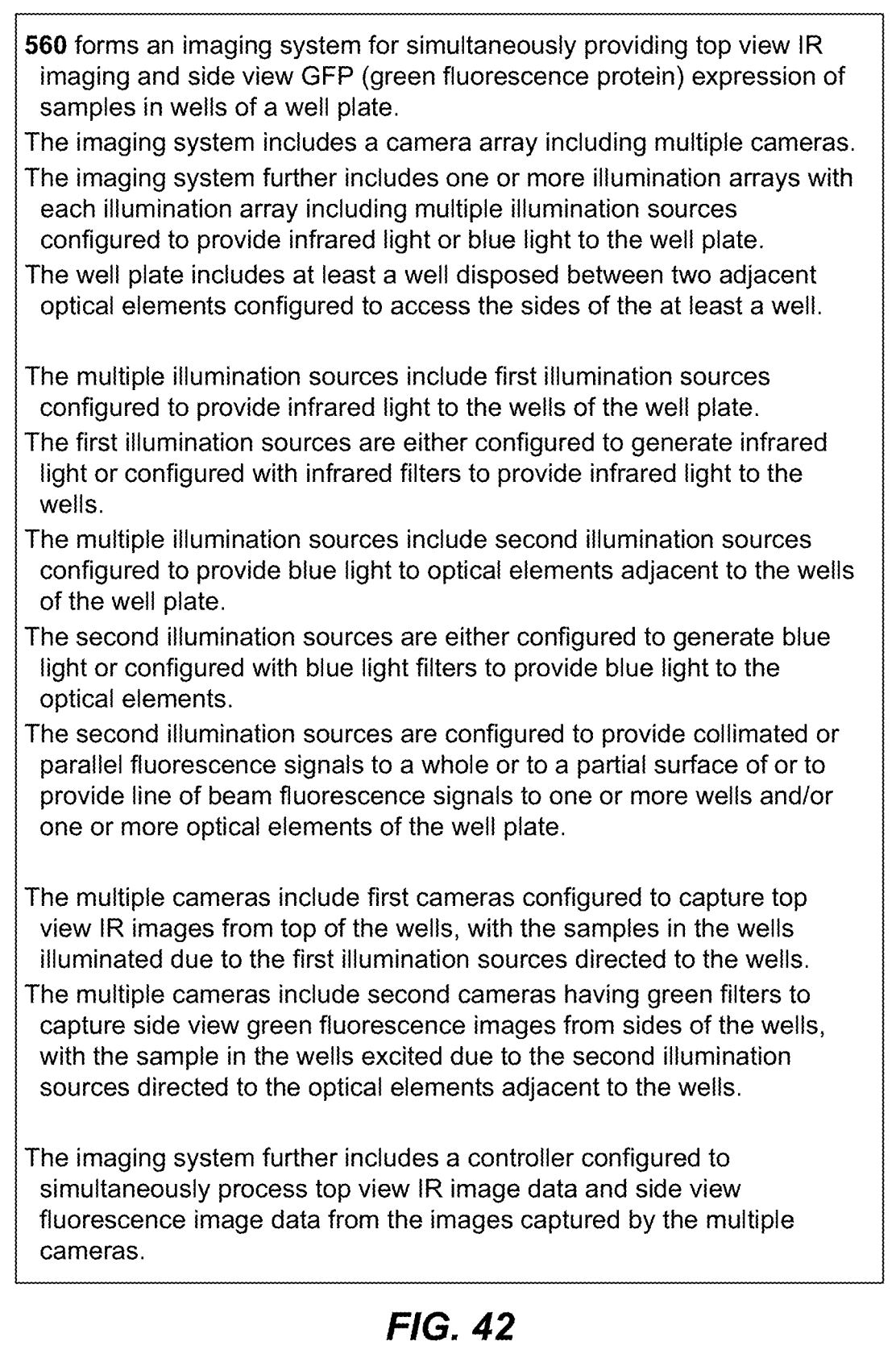

560 forms an imaging system for simultaneously providing top view IR imaging and side view GFP (green fluorescence protein) expression of samples in wells of a well plate.

The imaging system includes a camera array including multiple cameras.

The imaging system further includes one or more illumination arrays with each illumination array including multiple illumination sources configured to provide infrared light or blue light to the well plate.

The well plate includes at least a well disposed between two adjacent optical elements configured to access the sides of the at least a well.

The multiple illumination sources include first illumination sources configured to provide infrared light to the wells of the well plate.

The first illumination sources are either configured to generate infrared light or configured with infrared filters to provide infrared light to the wells.

The multiple illumination sources include second illumination sources configured to provide blue light to optical elements adjacent to the wells of the well plate.

The second illumination sources are either configured to generate blue light or configured with blue light filters to provide blue light to the optical elements.

The second illumination sources are configured to provide collimated or parallel fluorescence signals to a whole or to a partial surface of or to provide line of beam fluorescence signals to one or more wells and/or one or more optical elements of the well plate.

The multiple cameras include first cameras configured to capture top view IR images from top of the wells, with the samples in the wells illuminated due to the first illumination sources directed to the wells.

The multiple cameras include second cameras having green filters to capture side view green fluorescence images from sides of the wells, with the sample in the wells excited due to the second illumination sources directed to the optical elements adjacent to the wells.

The imaging system further includes a controller configured to simultaneously process top view IR image data and side view fluorescence image data from the images captured by the multiple cameras.

*FIG. 42*

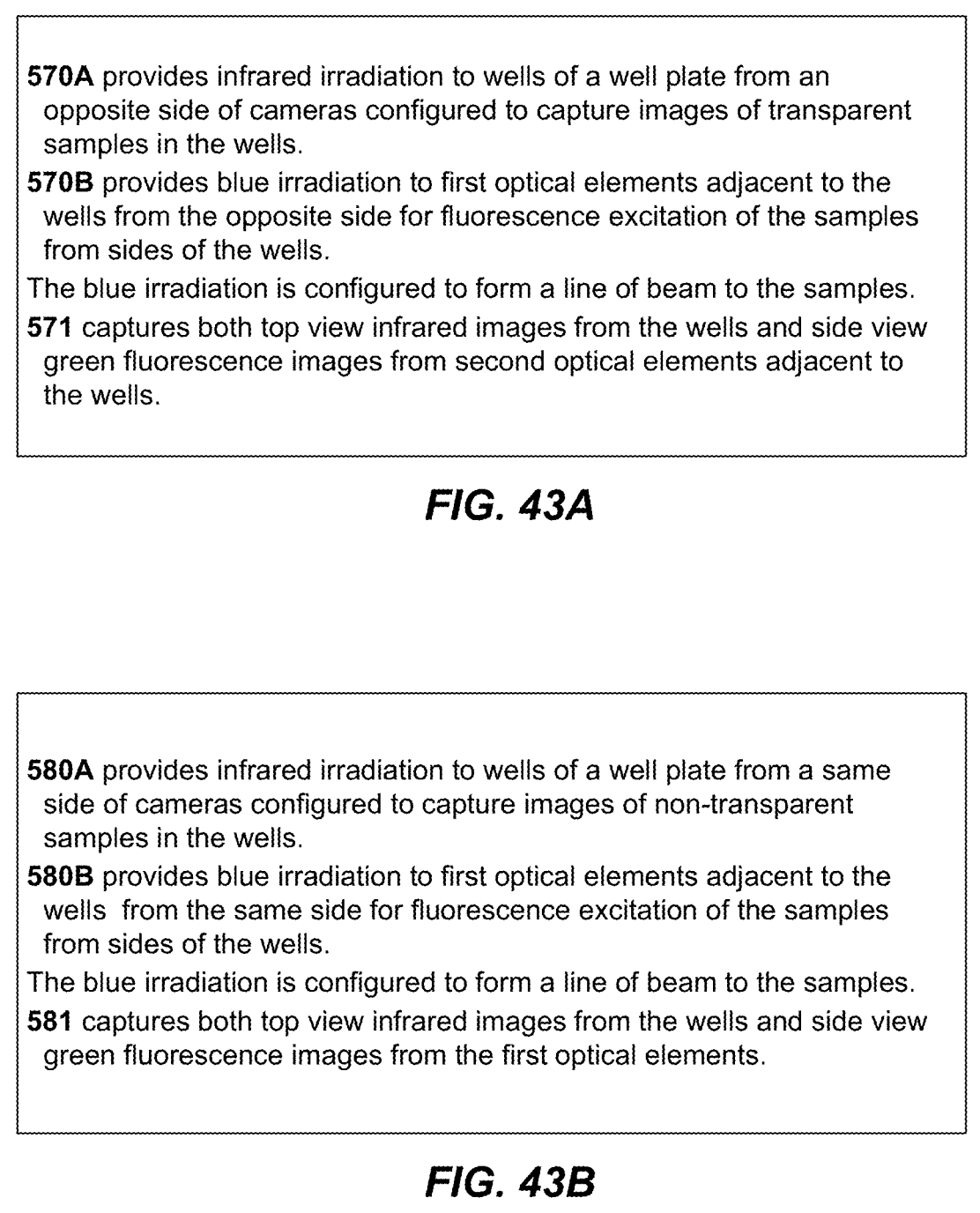

570A provides infrared irradiation to wells of a well plate from an opposite side of cameras configured to capture images of transparent samples in the wells.

570B provides blue irradiation to first optical elements adjacent to the wells from the opposite side for fluorescence excitation of the samples from sides of the wells.

The blue irradiation is configured to form a line of beam to the samples.

571 captures both top view infrared images from the wells and side view green fluorescence images from second optical elements adjacent to the wells.

*FIG. 43A*

580A provides infrared irradiation to wells of a well plate from a same side of cameras configured to capture images of non-transparent samples in the wells.

580B provides blue irradiation to first optical elements adjacent to the wells from the same side for fluorescence excitation of the samples from sides of the wells.

The blue irradiation is configured to form a line of beam to the samples.

581 captures both top view infrared images from the wells and side view green fluorescence images from the first optical elements.

*FIG. 43B*

Light source 111

Camera 110

Well plate 120

Light source 112

Installed camera filter set 133    Camera filter 133    Illumination filter 131    Installed illumination filter set 131

Light source 111

Camera 110

Well plate 120

Light source 112

Illumination filter 132

Installed illumination filter set 132**

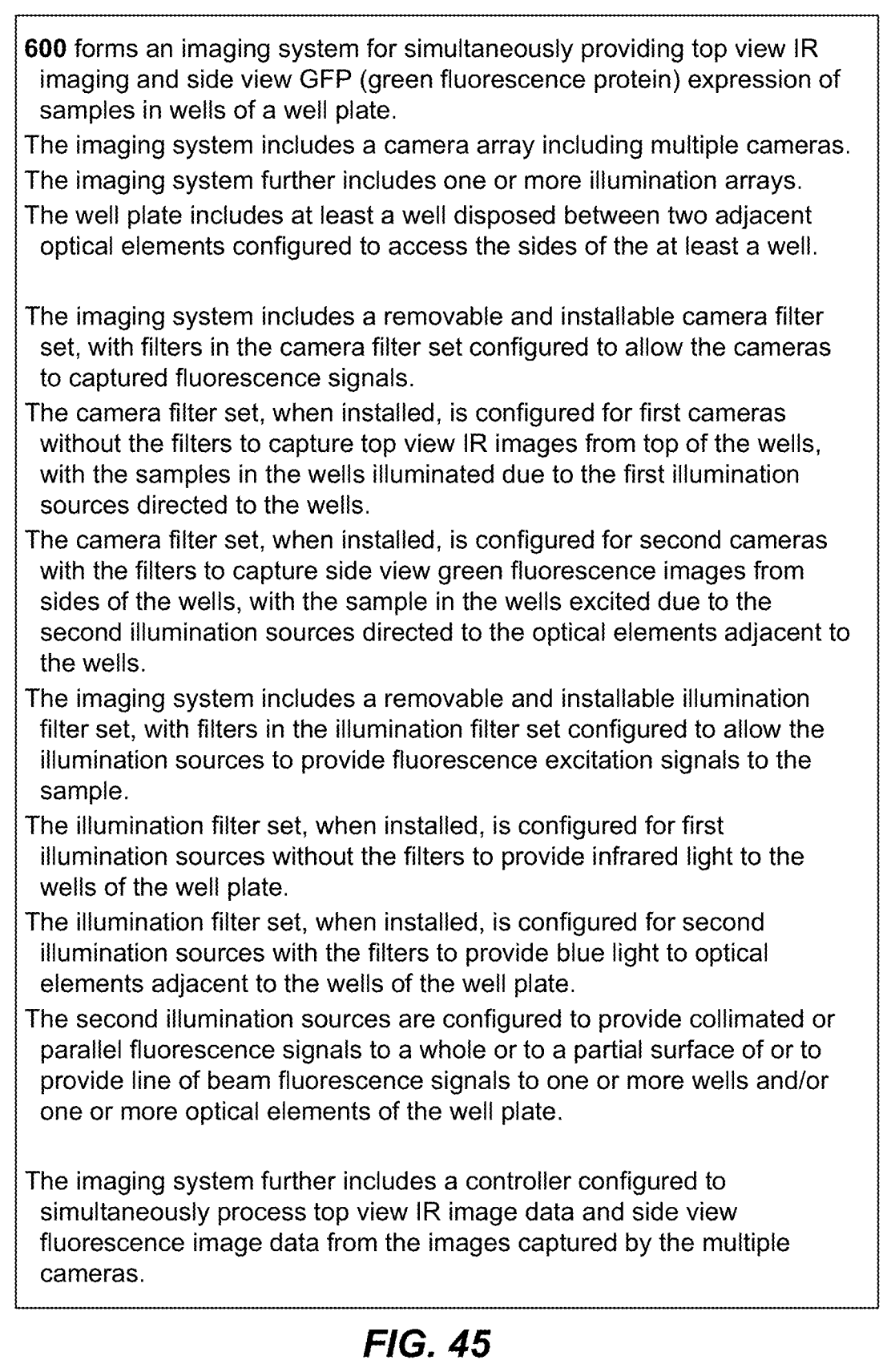

600 forms an imaging system for simultaneously providing top view IR imaging and side view GFP (green fluorescence protein) expression of samples in wells of a well plate.

The imaging system includes a camera array including multiple cameras.

The imaging system further includes one or more illumination arrays.

The well plate includes at least a well disposed between two adjacent optical elements configured to access the sides of the at least a well.

The imaging system includes a removable and installable camera filter set, with filters in the camera filter set configured to allow the cameras to captured fluorescence signals.

The camera filter set, when installed, is configured for first cameras without the filters to capture top view IR images from top of the wells, with the samples in the wells illuminated due to the first illumination sources directed to the wells.

The camera filter set, when installed, is configured for second cameras with the filters to capture side view green fluorescence images from sides of the wells, with the sample in the wells excited due to the second illumination sources directed to the optical elements adjacent to the wells.

The imaging system includes a removable and installable illumination filter set, with filters in the illumination filter set configured to allow the illumination sources to provide fluorescence excitation signals to the sample.

The illumination filter set, when installed, is configured for first illumination sources without the filters to provide infrared light to the wells of the well plate.

The illumination filter set, when installed, is configured for second illumination sources with the filters to provide blue light to optical elements adjacent to the wells of the well plate.

The second illumination sources are configured to provide collimated or parallel fluorescence signals to a whole or to a partial surface of or to provide line of beam fluorescence signals to one or more wells and/or one or more optical elements of the well plate.

The imaging system further includes a controller configured to simultaneously process top view IR image data and side view fluorescence image data from the images captured by the multiple cameras.

*FIG. 45*

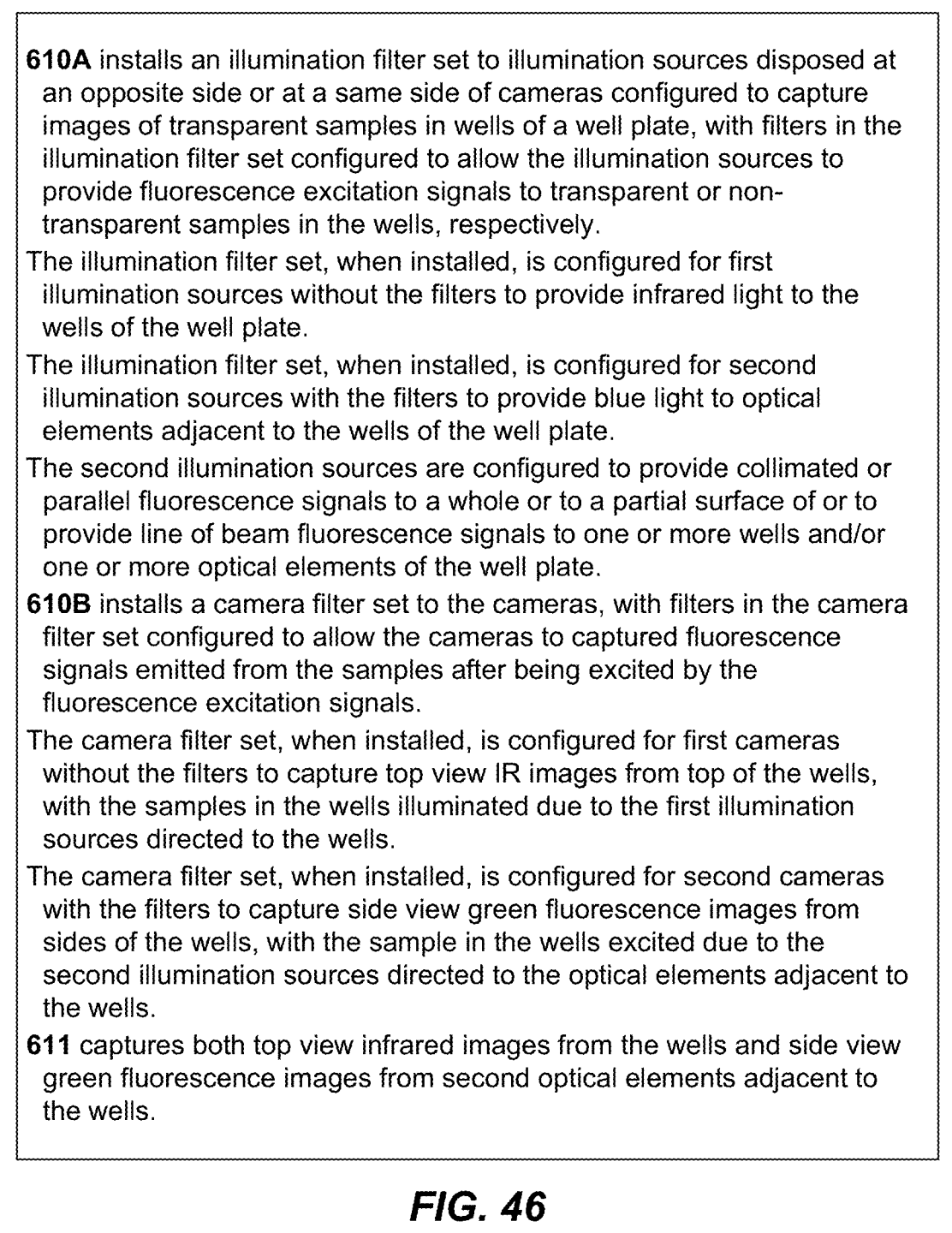

610A installs an illumination filter set to illumination sources disposed at an opposite side or at a same side of cameras configured to capture images of transparent samples in wells of a well plate, with filters in the illumination filter set configured to allow the illumination sources to provide fluorescence excitation signals to transparent or non-transparent samples in the wells, respectively.

The illumination filter set, when installed, is configured for first illumination sources without the filters to provide infrared light to the wells of the well plate.

The illumination filter set, when installed, is configured for second illumination sources with the filters to provide blue light to optical elements adjacent to the wells of the well plate.

The second illumination sources are configured to provide collimated or parallel fluorescence signals to a whole or to a partial surface of or to provide line of beam fluorescence signals to one or more wells and/or one or more optical elements of the well plate.

610B installs a camera filter set to the cameras, with filters in the camera filter set configured to allow the cameras to captured fluorescence signals emitted from the samples after being excited by the fluorescence excitation signals.

The camera filter set, when installed, is configured for first cameras without the filters to capture top view IR images from top of the wells, with the samples in the wells illuminated due to the first illumination sources directed to the wells.

The camera filter set, when installed, is configured for second cameras with the filters to capture side view green fluorescence images from sides of the wells, with the sample in the wells excited due to the second illumination sources directed to the optical elements adjacent to the wells.

611 captures both top view infrared images from the wells and side view green fluorescence images from second optical elements adjacent to the wells.

*FIG. 46*

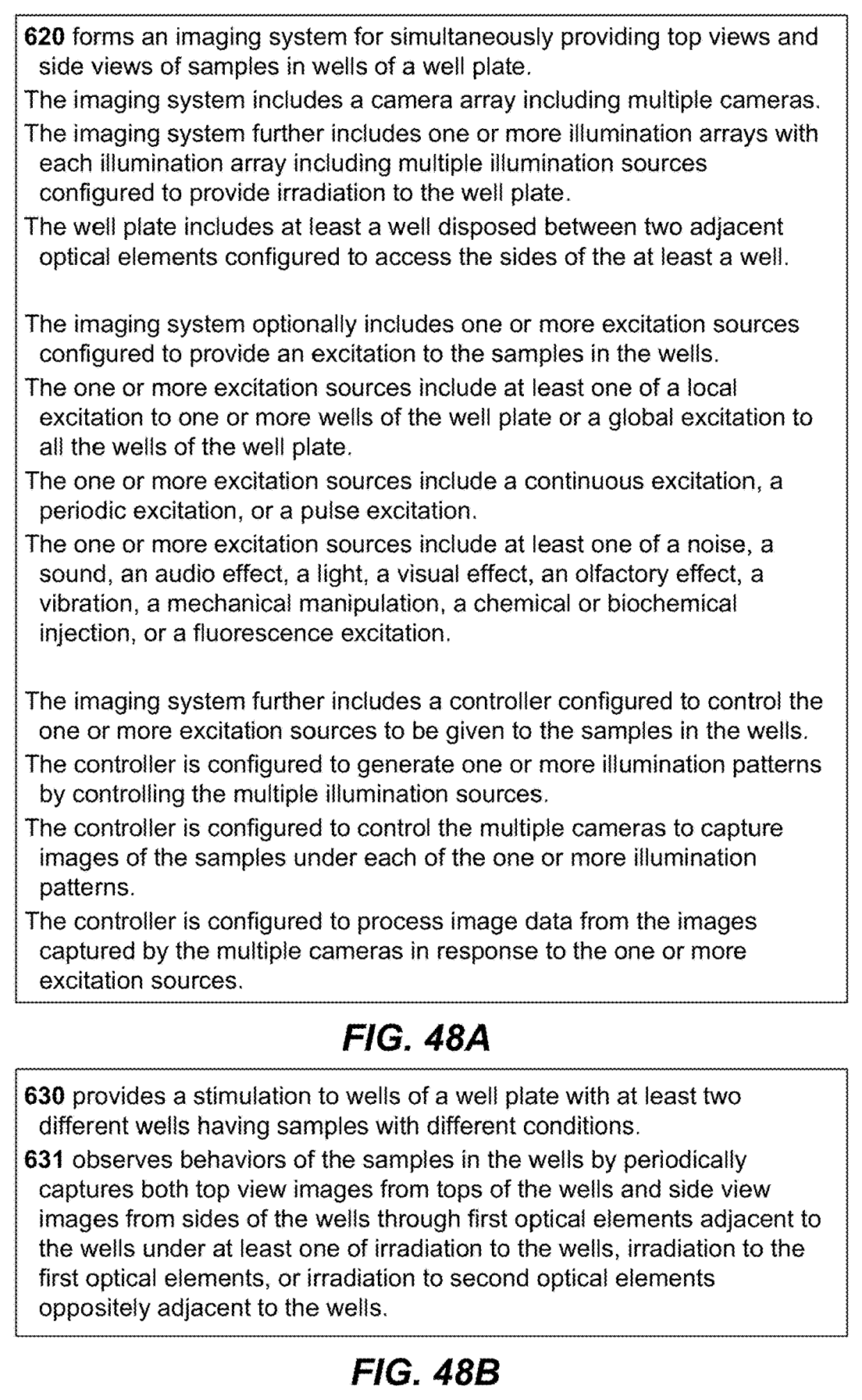

620 forms an imaging system for simultaneously providing top views and side views of samples in wells of a well plate.

The imaging system includes a camera array including multiple cameras.

The imaging system further includes one or more illumination arrays with each illumination array including multiple illumination sources configured to provide irradiation to the well plate.

The well plate includes at least a well disposed between two adjacent optical elements configured to access the sides of the at least a well.

The imaging system optionally includes one or more excitation sources configured to provide an excitation to the samples in the wells.

The one or more excitation sources include at least one of a local excitation to one or more wells of the well plate or a global excitation to all the wells of the well plate.

The one or more excitation sources include a continuous excitation, a periodic excitation, or a pulse excitation.

The one or more excitation sources include at least one of a noise, a sound, an audio effect, a light, a visual effect, an olfactory effect, a vibration, a mechanical manipulation, a chemical or biochemical injection, or a fluorescence excitation.

The imaging system further includes a controller configured to control the one or more excitation sources to be given to the samples in the wells.

The controller is configured to generate one or more illumination patterns by controlling the multiple illumination sources.

The controller is configured to control the multiple cameras to capture images of the samples under each of the one or more illumination patterns.

The controller is configured to process image data from the images captured by the multiple cameras in response to the one or more excitation sources.

*FIG. 48A*

630 provides a stimulation to wells of a well plate with at least two different wells having samples with different conditions.

631 observes behaviors of the samples in the wells by periodically captures both top view images from tops of the wells and side view images from sides of the wells through first optical elements adjacent to the wells under at least one of irradiation to the wells, irradiation to the first optical elements, or irradiation to second optical elements oppositely adjacent to the wells.

*FIG. 48B*

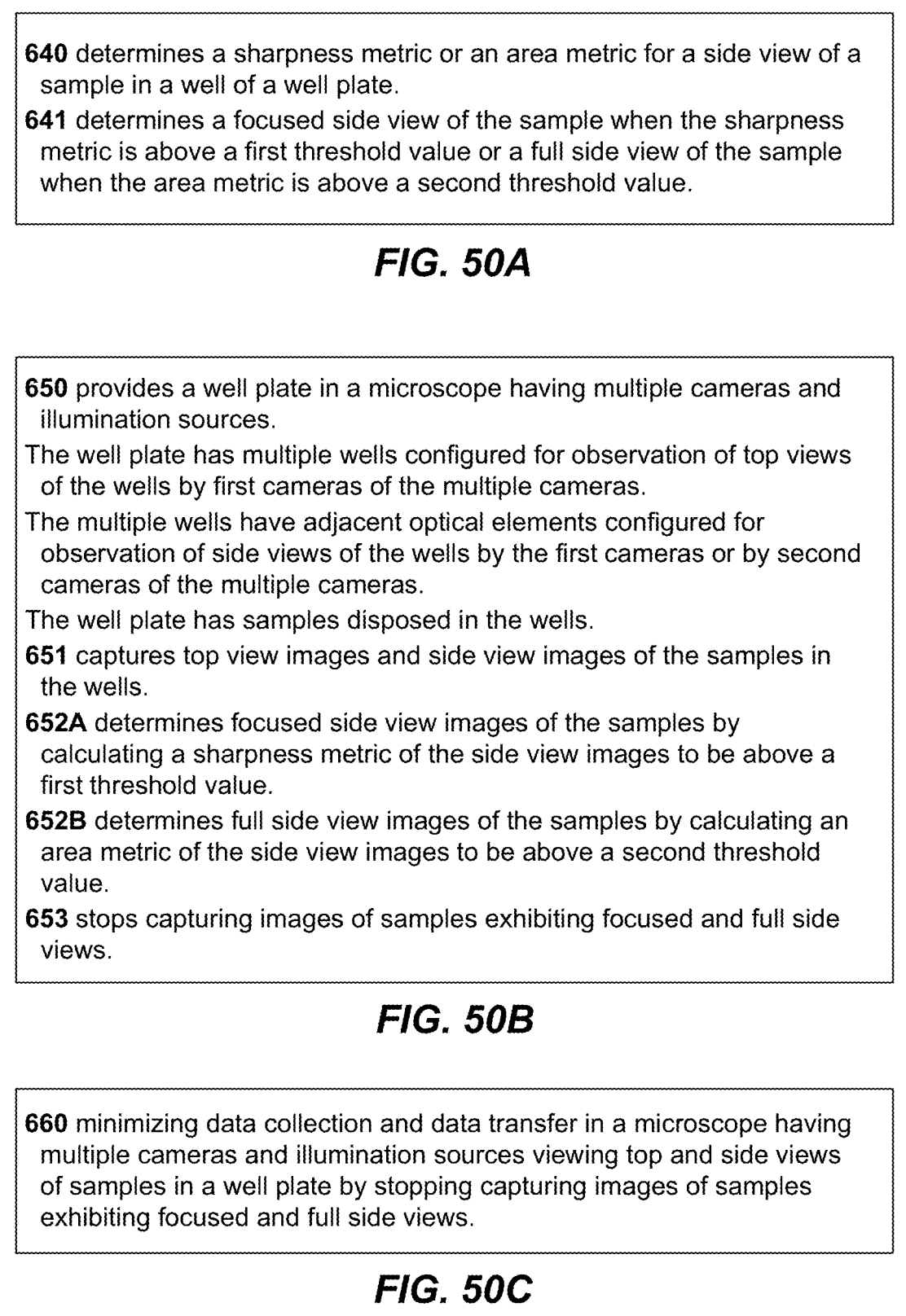

640 determines a sharpness metric or an area metric for a side view of a sample in a well of a well plate.

641 determines a focused side view of the sample when the sharpness metric is above a first threshold value or a full side view of the sample when the area metric is above a second threshold value.

*FIG. 50A*

650 provides a well plate in a microscope having multiple cameras and illumination sources.

The well plate has multiple wells configured for observation of top views of the wells by first cameras of the multiple cameras.

The multiple wells have adjacent optical elements configured for observation of side views of the wells by the first cameras or by second cameras of the multiple cameras.

The well plate has samples disposed in the wells.

651 captures top view images and side view images of the samples in the wells.

652A determines focused side view images of the samples by calculating a sharpness metric of the side view images to be above a first threshold value.

652B determines full side view images of the samples by calculating an area metric of the side view images to be above a second threshold value.

653 stops capturing images of samples exhibiting focused and full side views.

*FIG. 50B*

660 minimizing data collection and data transfer in a microscope having multiple cameras and illumination sources viewing top and side views of samples in a well plate by stopping capturing images of samples exhibiting focused and full side views.

*FIG. 50C*

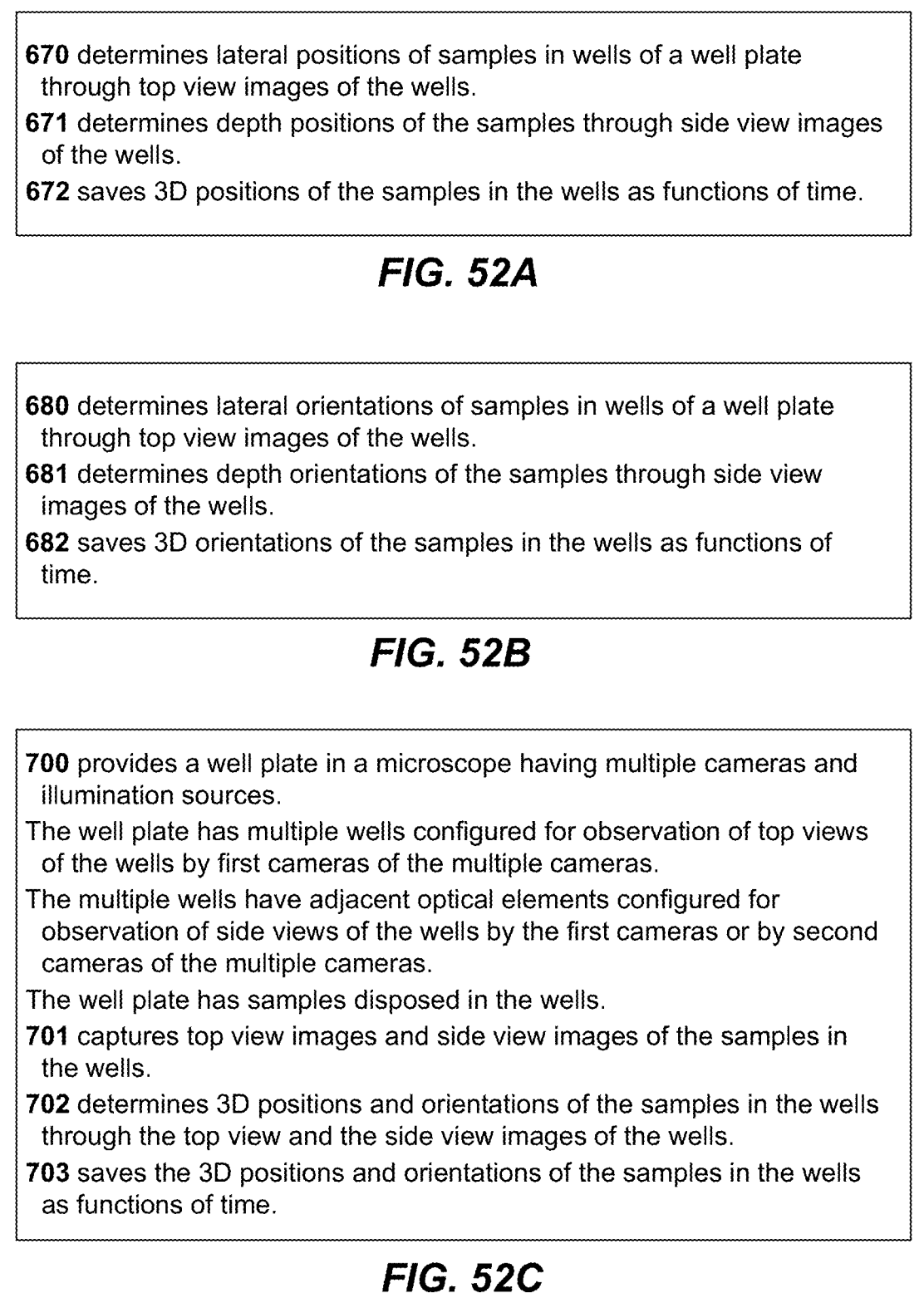

670 determines lateral positions of samples in wells of a well plate through top view images of the wells.

671 determines depth positions of the samples through side view images of the wells.

672 saves 3D positions of the samples in the wells as functions of time.

FIG. 52A

680 determines lateral orientations of samples in wells of a well plate through top view images of the wells.

681 determines depth orientations of the samples through side view images of the wells.

682 saves 3D orientations of the samples in the wells as functions of time.

FIG. 52B

700 provides a well plate in a microscope having multiple cameras and illumination sources.

The well plate has multiple wells configured for observation of top views of the wells by first cameras of the multiple cameras.

The multiple wells have adjacent optical elements configured for observation of side views of the wells by the first cameras or by second cameras of the multiple cameras.

The well plate has samples disposed in the wells.

701 captures top view images and side view images of the samples in the wells.

702 determines 3D positions and orientations of the samples in the wells through the top view and the side view images of the wells.

703 saves the 3D positions and orientations of the samples in the wells as functions of time.

FIG. 52C

IMAGING SYSTEMS WITH PERISCOPE WELL PLATES

The present patent application claims priority from U.S. Provisional Patent Applicant Ser. No. 63/451,485, filed on Mar. 10, 2023, entitled "Periscope wellplate", of the same inventors, hereby incorporated by reference in its entirety.

This invention relates primarily to life sciences and biological research tools. More particularly, the present invention relates to high throughput imaging systems multi well plates and computational microscopes for life science research in live cell imaging, drug discovery and genetic research, and digital pathology studies.

BACKGROUND OF THE INVENTION

The life sciences and biological research sectors utilize microscopes to image cell tissue for pathology and other reasons. In drug discovery they image vast quantities of materials with cell cultures or organisms using multi well plates (microplates or cell culture well plates) that have each well imaged in a sequential manner. This is a slow "step and repeat" process. These well plates commonly contain 96 wells but they can contain fewer wells or more. Some common size well plates have 1536 wells or 384 wells. Well plates can be approximately 5 inches by 3.3 inches in size. The science requires vast number of experiments and that requires imaging vast numbers of wells where each well can contain a cell culture and a separate reagent or mixture of reagents. Consequently, some companies acquire large numbers of high throughput machines in order to generate the required data needed to draw effective conclusions.

While a generic microscope can be used to perform inspection of any device or product, the drug discovery industry, and the digital pathology industry operate at enormous throughput and scale. As time through the laboratory or the fabrication pipeline dictates the manufacturing costs and lead time for new product designs and for new drugs, it is imperative to reduce the time and cost associated for all inspection steps. This has led to highly automated and specialized inspection machines for each type of process. In the biological sector there are specialized machines for pathology slide reading, well plate imaging and other imaging tasks that are highly automated.

For biological and high throughput imaging requirements, the resolution may be 0.5 micrometers to several micrometers. Well plates often must be imaged at a resolution sufficient to observe individual cells, which is less than 5 micrometers. But, well plates are 8 cm×12 cm in size. From these examples, it is clear that billions of resolvable spots (i.e., computed by dividing the total required imaging area by the required resolution) are required to fully observe these large specimens and objects at high resolution.

Well plates are one of the fundamental tools of biological research in large part because they allow researchers to quickly evaluate large numbers of samples. A variety of small model organisms are imaged and studied while they are located in a well in a wellplate; typically with a liquid medium such as water in the well. Recently, organoids (a cluster of growing cells) have also been imaged in well plates. A common model organism is the Zebrafish (*Regio danio*). Zebrafish are partially transparent in the juvenile stage. They are easy to breed and robust to raise. A variety of transgenic lines have been developed and significant research has been accumulated on their behavior and growth. They are vertebrates. Humans and Zebra fish share 70 percent of the same genes. Approximately 84 percent of human genes known to be associated with human disease have a counterpart in zebra fish. Zebrafish have similar major organs and tissues to humans. The Zebrafish genome has also been fully sequenced to a very high quality. They are far less expensive to use in experiments than rats. These benefits have been recognized and they are being widely adopted for drug discovery, behavioral and toxicity studies. The specification sometimes uses the term "sample", "zebra fish" or "fish", it should be understood that this is a general term describing any model organism, organoids, cell groups or cells that are inserted in wells in the wellplate.

A very commonly used wellplate has 96 wells. This well plate has a published specification for its dimensions as an SLAS/ANSI standard. This 96 well standard has wells with diameters of 7 mm. The wells may have a variety of shapes; typically circular in cross section with many different shapes to the bottom of the well. Numerous medical device and consumable companies offer well plates for sale and in addition to the well shape the well plates can be made of a variety of materials. For example, a well plate may be made from a polymer with low fluorescence characteristics to minimize auto-fluorescence in a fluorescence imaging experiment.

A common method of obtaining side images of Zebrafish is to fix the zebra fish in a retaining gel. Frequently the zebra fish is either anaesthetized or terminated in order to do this process. In some cases the zebra fish can remain alive through and after the fixing process. The zebra fish embryos can be mounted for imaging by using an agarose gel to restrain the embryo's which are anaesthetized to prevent twitching and motion. Mounting methods are extremely labor intensive and can require skilled operators to get decent specimen mounting and useful images. For mounting a zebra fish it can take an expert 5 to 10 minutes. For an apprentice it can take 10 to 30 minutes. This does not include preparation time to organize supplies and have prepared materials ready for use in the mounting process. The longer the duration of the mounting process, the greater the stress that the zebra fish endures. This stress can affect the experimental results.

SUMMARY OF THE EMBODIMENTS

In some embodiments, the present invention discloses an imaging system and method using the imaging system for a high throughput top or bottom and side view imaging of samples in wells of a well plate. The imaging system includes multiple cameras configured to capture images of the samples and multiple illumination sources, configured to provide multiple illumination patterns to the well plate. The well plate includes multiple well, with each well adjacent to two optical elements, such as angled mirrors or prisms, in two opposite sides of the well. The mirrors are configured to direct the light from top and bottom areas of the well to the sides of the wells. For example, a right mirror can have a bottom angled mirror surface, which can be configured to direct the light from a bottom area of the well to a right side of the well. A left mirror can have a top angled mirror surface, which can be configured to direct the light from a top area of the well to a left side of the well. The left or right mirrors thus can allow illuminating or imaging the sides, e.g., left or right sides, with illumination sources or cameras disposed above or below the well, respectively.

The wells and the mirrors in a well plate can be configured to allow effective imaging of the samples in top or bottom views. For example, the well lateral dimensions are configured to be large enough to avoid image distortion when captured from above or below the wells, for example, by a liquid surface curving due to meniscus effects. The well lateral dimensions are also configured to be large enough to avoid undue stresses on the live and un-anesthetized samples, such as zebra fish, in the wells, for example, by providing enough room for the fish to move freely.

The wells and the mirrors in a well plate can be configured to allow effective imaging of the samples in side views. For example, a mirror can be configured to allow viewing of only a portion of the side of the well, the whole side of the well, or larger than the side of the well. Multiple mirrors disposed adjacent to one side of multiple adjacent wells can be consolidated to an elongated mirror for ease of fabrication.

The wells and the mirrors in a well plate can be configured to allow a low cost operation, for example, by being configured for a reuse of the mirrors. For example, the set of mirrors, e.g., the mirror for the wells in a well plate, can be assembled in a mirror base plate, with the mirror base plate configured to accept an assembling of the wells, such as the mirror base plate having recesses or openings to allow the wells to be placed in the recesses or openings. The wells can be individual wells, or can be preassembled as a row, a column, or an array of wells. In addition, well supports or restrictors can be used to position the wells at a desired depth location with respect to the mirrors.

The multiple cameras of the imaging system can be disposed on a top or bottom side of the well plate, and is configured for imaging the top or bottom view, respectively, and the side view of the wells in a well plate. Alternatively, the multiple cameras can be disposed at a side of the well plate.

For example, a camera disposed at a top or a bottom area of the well can be configured to image the top view or the bottom view of the well, respectively. A camera disposed at a top or a bottom area of a mirror adjacent to the well (with the mirror having a top or bottom reflective surface, respectively) can be configured to image a side view of the well (with the side view facing the mirror), due to the light redirection property of the mirror reflective surface.

A first camera can have a field of view limited to a top or bottom view of a well, and is configured to capture top or bottom view images of the sample in the well. A second camera can have a field of view limited to a side view of a well, e.g., to a top or a bottom area of a mirror adjacent to the well (with the mirror having a top or bottom reflective surface, respectively), and is configured to capture facing-the-mirror side view images of the sample in the well. With this configuration, a group of first and second cameras is configured to simultaneously capture top or bottom view and side view of a well.

A camera can have a field of view covering a top or bottom view together with a side view of a well. The camera is configured to capture top or bottom view images and side view images of the sample in the well. With this configuration, each camera is configured to simultaneously capture top or bottom view and side view of a well.

A camera can have a field of view covering top or bottom views together with side views of multiple wells. With a roughly square field of view, a camera can be configured to cover 2 top or bottom views together with 2 side views of 2 immediately adjacent wells. Alternatively, a roughly-square-field-of-view camera can be configured to cover 8 top or bottom views together with 8 side views of 2 rows or columns of 4 immediately adjacent wells. In general, larger field of view can provide higher throughput, at a lower resolution.

The multiple illumination sources of the imaging system can be disposed on a top or bottom side of the well plate, and is configured for illuminating the top or bottom area, respectively, and the side area of the wells in a well plate. Alternatively, the multiple illumination sources can be disposed at a side of the well plate.

For example, an illumination source disposed at a top or a bottom area of the well can be configured to illuminate the top view or the bottom view of the well, respectively. An illumination source disposed at a top or a bottom area of a mirror adjacent to the well (with the mirror having a top or bottom reflective surface, respectively) can be configured to illuminate a side view of the well (with the side view facing the mirror), due to the light redirection property of the mirror reflective surface.

A first illumination source can have a field of illumination limited to a top or bottom area of a well, for example, through optical elements such as a collimators or lens, e.g., the first illumination source is configured to illuminate the top or bottom area of the well. A second illumination source can have a field of illumination limited to a side area of a well, e.g., the second illumination source is configured to illuminate the top or bottom area of a mirror adjacent to the well (with the mirror having a top or bottom reflective surface to the side area, respectively). With this configuration, a group of first and second illumination sources is configured to sequentially illuminate top or bottom view and side view of a well.

Alternatively or additionally, an illumination source can be configured to illuminate top or bottom areas of multiple wells and/or side areas of multiple wells. For example, an illumination source can be in the form of a display, such as an LCD display, an OLED display, a plasma display, or a cathode ray display. A controller can be coupled to the display to turn on multiple areas of the display, such as areas corresponded to top or bottom areas of multiple wells in the well plate, or areas corresponded to side areas of multiple wells (e.g., areas corresponded to top or bottom areas of mirrors adjacent to the multiple wells) in the well plate.

The cameras and illumination sources of the imaging system can be configured to match with the view areas of the wells in the well plate, e.g., with the top or bottom areas of the wells and with the top and bottom areas of the mirrors adjacent to the wells. To obtain an optimal throughput for the imaging system, there can be a match between the cameras and illumination sources of the imaging system, and the wells and mirrors of the well plate.

For a well plate smaller or equal to a camera array of the imaging system, the matching configuration is configured so that each well and/or each mirror adjacent to the well is under the field of view of at least a camera and under the field of illumination of at least an illumination source. In other words, top or bottom area of each well and/or top or bottom area of each mirror adjacent to the well is under the field of view of at least a camera and under the field of illumination of at least an illumination source. For example, each well (or the top or bottom area of each well) is under the field of view of a first camera and under the field of illumination of a first illumination source. Each mirror adjacent to a well (or the top or bottom area of each mirror adjacent to a well) is under the field of view of a second camera and under the field of illumination of a second illumination source. Alternatively, each one or more wells and each one or more mirrors adjacent to the one or more wells are under the field of view of a camera and under the field of illumination of an illumination source. This matching configuration is to ensure that each well of a well plate can have top view and side view images captureable by at least a camera.

For a well plate larger or equal to a camera array of the imaging system, the matching configuration is configured so that each camera is configured to be able to capture images from a well and/or from a mirror adjacent to the well. And each illumination source is configured to be able to illuminate a well and/or a mirror adjacent to the well. In other words, each camera is configured to be able to capture top or bottom view images of a well and/or side view images of the well. And each illumination source is configured to be able to illuminate a top or bottom area of a well and/or a side area of the well.

For example, each camera can be a first camera having a field of view covering a well (or the top or bottom area of the well). Each camera can be a second camera having a field of view covering a mirror adjacent to a well (or the top or bottom area of a mirror adjacent to a well). Alternatively, each camera can be a first camera having a field of view configured to capture top or bottom view images of a well. Each camera can be a second camera having a field of view configured to capture side view images of a well. Alternatively, each camera can have a field of view covering one or more wells (or the top or bottom areas of the wells) and one or more mirrors adjacent to the one or more wells (or the top or bottom area of the one or more mirrors adjacent to the one or more wells).

Each illumination source can be a first illumination source having a field of illumination covering a well (or the top or bottom area of the well). Each illumination source can be a second illumination source having a field of illumination covering a mirror adjacent to a well (or the top or bottom area of a mirror adjacent to a well). Alternatively, each illumination source can be a first illumination source having a field of illumination configured to illuminate a top or bottom area of a well together with a side area of the well. Alternatively, each illumination source can have a field of illumination covering one or more wells (or the top or bottom areas of the wells) and one or more mirrors adjacent to the one or more wells (or the top or bottom area of the one or more mirrors adjacent to the one or more wells). This matching configuration is to ensure that each camera can be configured to be able to capture top or bottom view and side view images of at least a well of a well plate.

For regular spacing arrays of cameras and illumination sources of an imaging system, and wells and mirrors of a well plate, the matching condition can be achieved by a matching of spacings between adjacent cameras, spacings between adjacent illumination sources, spacings between adjacent wells, and spacings between adjacent mirrors adjacent to the wells.

For example, for a camera array with groups of two cameras with a first camera and a second cameras of the two cameras configured to capture top view images and side view images of a well, respectively, the spacing between two groups of cameras is a multiple of the spacing between two adjacent wells.

For a camera array with each camera configured to capture 2 top view images and 2 side view images of 2 adjacent wells, the spacing between two cameras is a multiple of the spacing between two adjacent wells in one direction and a multiple of twice the spacing between two adjacent wells in another direction.

For a camera array with each camera configured to capture 8 top view images and 8 side view images of 2 rows or columns of 4 adjacent wells, the spacing between two cameras is a multiple of twice the spacing between two adjacent wells in one direction and a multiple of fourth times the spacing between two adjacent wells in another direction.

For irregular spacing arrays of cameras and illumination sources of an imaging system, and wells and mirrors of a well plate, such as there are gaps between regular subarrays of cameras, illumination sources, wells and mirrors. The matching condition can be achieved by a matching of spacings in subarrays and a matching of gaps between subarrays.

Fluorescence

In some embodiments, the imaging system is configured for multi-channel fluorescence, with correlation between the channels. For example, fluorescence filters can be added to some cameras to allow a first channel of side view fluorescence imaging, together with a second channel of top (or bottom) view non-fluorescence imaging (e.g., visual imaging using visible light, infrared light, or ultraviolet light). Data from the two channel imaging can be correlated, for example, to extract localized fluorescence information.

The imaging system can be configured for fluorescence excitation, by having some illumination sources configured to provide the fluorescence excitation signals, such as by configuring the illumination sources themselves to emit the fluorescence excitation signals or by adding excitation filters to the illumination sources. The illumination sources can be collimated to a well, such as to a top (or bottom) area of the well, or to a side of the well. Alternatively, the illumination sources can be collimated to a planar sheet of light, which can localize the fluorescence excitation signals to avoid exciting fluorescence from the background to increase a signal to noise ratio.

The imaging system can also be configured for fluorescence imaging, by having some cameras configured to capture the fluorescence emission signals, such as by adding emission filters to the cameras.

The imaging system can include a retrofit kit to convert an imaging system to a multi-channel fluorescence imaging system. The retrofit kit can include an array of fluorescence excitation filters for the illumination sources configured to provide illumination to side areas of the wells for side view fluorescence, or for the illumination sources providing illumination to top (or bottom) areas of the wells for top (or bottom) view fluorescence. The array of fluorescence emission filters can be configured for the cameras to capture side view images for side view fluorescence, or to capture top (or bottom) view images for top (or bottom) view fluorescence.

The retrofit kid can include a change is a controller, with the controller configured to perform fluorescence imaging, in addition to light imaging. The controller is also configured to perform correlation between the fluorescence imaging and the light imaging.

In some embodiments, the imaging system is configured for multi-channel fluorescence with high throughput. For example, the imaging system can include blue light illumination sources or blue excitation filters for white light sources, and green emission filters for cameras to capture green protein fluorescence in the samples. The imaging system can include infrared light illumination sources and infrared cameras to infrared visual images of the samples.

Since the infrared, blue, and green light have no overlap wavelengths, all illumination sources, e.g., the infrared illumination sources and the blue light illumination sources, can be turned at a same time, and all cameras, e.g., the infrared cameras and the green filtered cameras, can operate at a same time to capture top (or bottom) view images and side view images of the samples in the wells of the well plate. The infrared cameras can capture visual light information of the sample, and the green filtered cameras can capture green protein fluorescence information. A controller can analyze the captured images and can correlate the fluorescence and non-fluorescence information.

Stimulus

In some embodiments, the imaging system is configured with a global or local stimulus source configured for all wells or some wells of a well plate. The stimulus source can include a light or a sound source. The stimulus source can be used in stimulus response assays, in which the responses to an external stimulus of the samples in different wells are recorded and analyzed, for example, to understand how the different drug doses affect response times of the samples, or how the different genetic mutations affect the response profile of the samples.

Controller

In some embodiments, the imaging system can include one or more controllers configured for controlling the illumination sources, the cameras, the optional filters, the optional movements of the cameras and the stage supporting the well plate. The one or more controllers can also be configured to perform the high throughput imaging of samples in wells of a well plate, fluorescence imaging, and the analyzing of image data and fluorescence data.

The one or more controllers can also be configured to optimize side view image capturing, for example, by stopping the data collection and transfer of a camera after the camera captures a focused side view image with the sample fully to the side, e.g., a fully-to-the-side focused side view image of the sample, or a focus full side view image of the sample.

The one or more controllers can also be configured to track 3D positions and/or 3D orientations of the samples in the wells of the well plate through the top (or bottom) view and side view images.

BRIEF DESCRIPTION OF THE DRAWINGS

FIGS. 4A-4C illustrate other configurations of well plates for side view observation according to some embodiments.

FIGS. 5A-5B illustrate examples of operations modes of a multiple camera imaging system according to some embodiments.

FIGS. 6A-6B illustrate flow charts for forming and operating a multiple camera imaging system according to some embodiments.

FIGS. 7A-7B illustrate a schematic of multiple cameras assembled on a PCB board according to some embodiments.

FIG. 11 illustrates a flow chart for forming illustration sources in a multiple camera imaging system according to some embodiments.

FIG. 14 illustrates a flow chart for forming a well plate for a multiple camera imaging system according to some embodiments.

FIG. 16 illustrates a flow chart for forming a multiple camera imaging system with different fields of view for the cameras according to some embodiments.

FIG. 19 illustrates a flow chart for forming a multiple camera imaging system for imaging bright field and dark field for transparent and non-transparent samples according to some embodiments.

FIGS. 20A-20B illustrate flow chart for imaging bright field and dark field for transparent and non-transparent samples according to some embodiments.

FIG. 23 illustrates a flow chart for forming a multiple camera imaging system for imaging bright field and dark field for transparent and non-transparent samples according to some embodiments.

FIGS. 24A-24B illustrate flow chart for imaging bright field and dark field for transparent and non-transparent samples according to some embodiments.

FIGS. 25A-25C illustrate configurations for imaging bright field and dark field of transparent and non-transparent samples according to some embodiments.

FIG. 26 illustrates a flow chart for forming a multiple camera imaging system for imaging bright field and dark field for transparent and non-transparent samples according to some embodiments.

FIGS. 30A-30D illustrate a matching configuration for a camera configured to view a top view or a side view of a well according to some embodiments.

FIGS. 31A-31D illustrate a matching configuration for a camera field of view of 2 top views and 2 side views of 2 wells according to some embodiments.

FIGS. 32A-32C illustrate a matching configuration of irregular spacing of cameras and wells according to some embodiments.

9

Figures 33A, 33B:
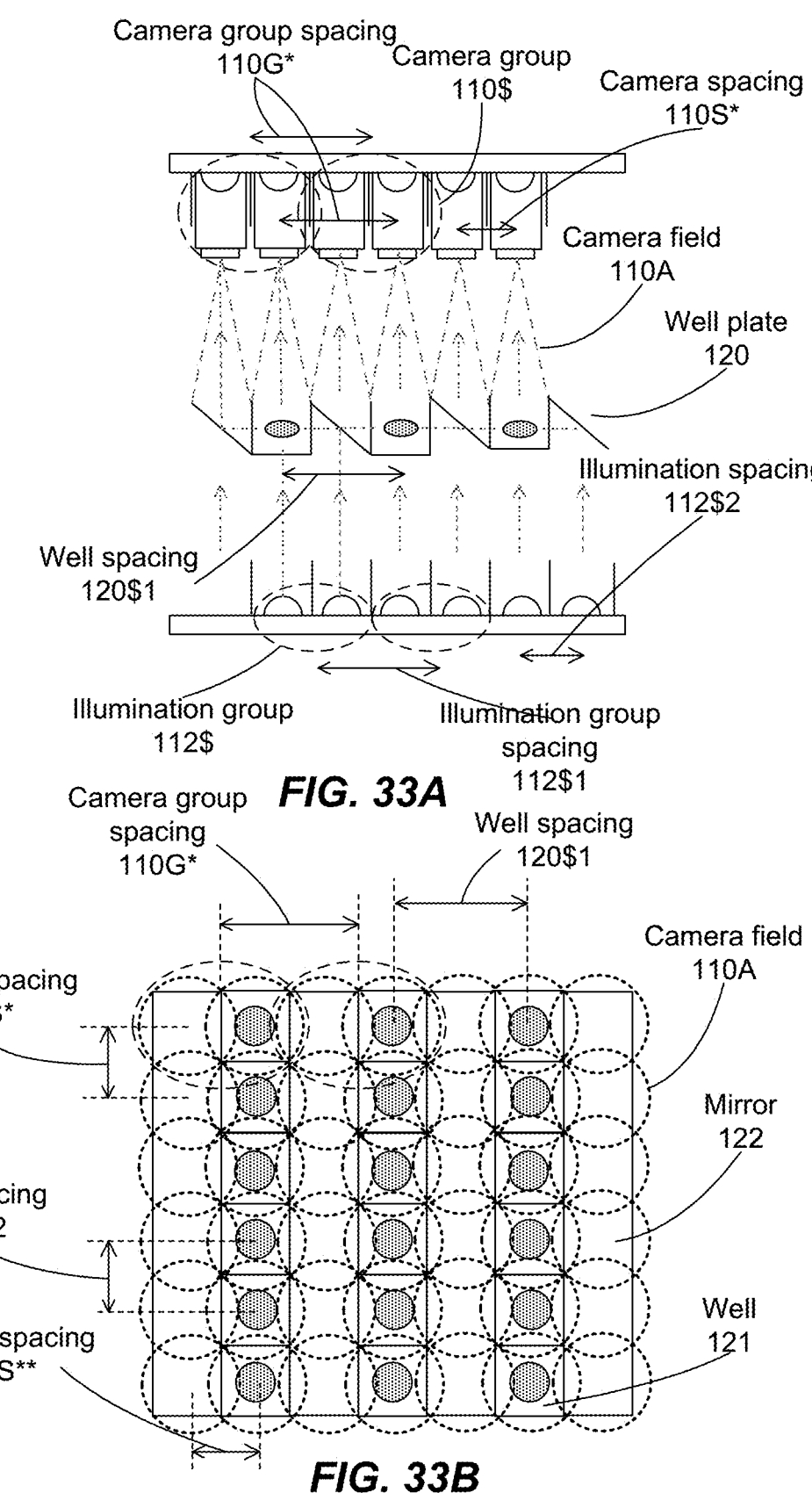

FIGS. 33A-33B illustrate a matching configuration for a camera field of view of a top view or a side view of a well according to some embodiments.

Figures 34A, 34B:
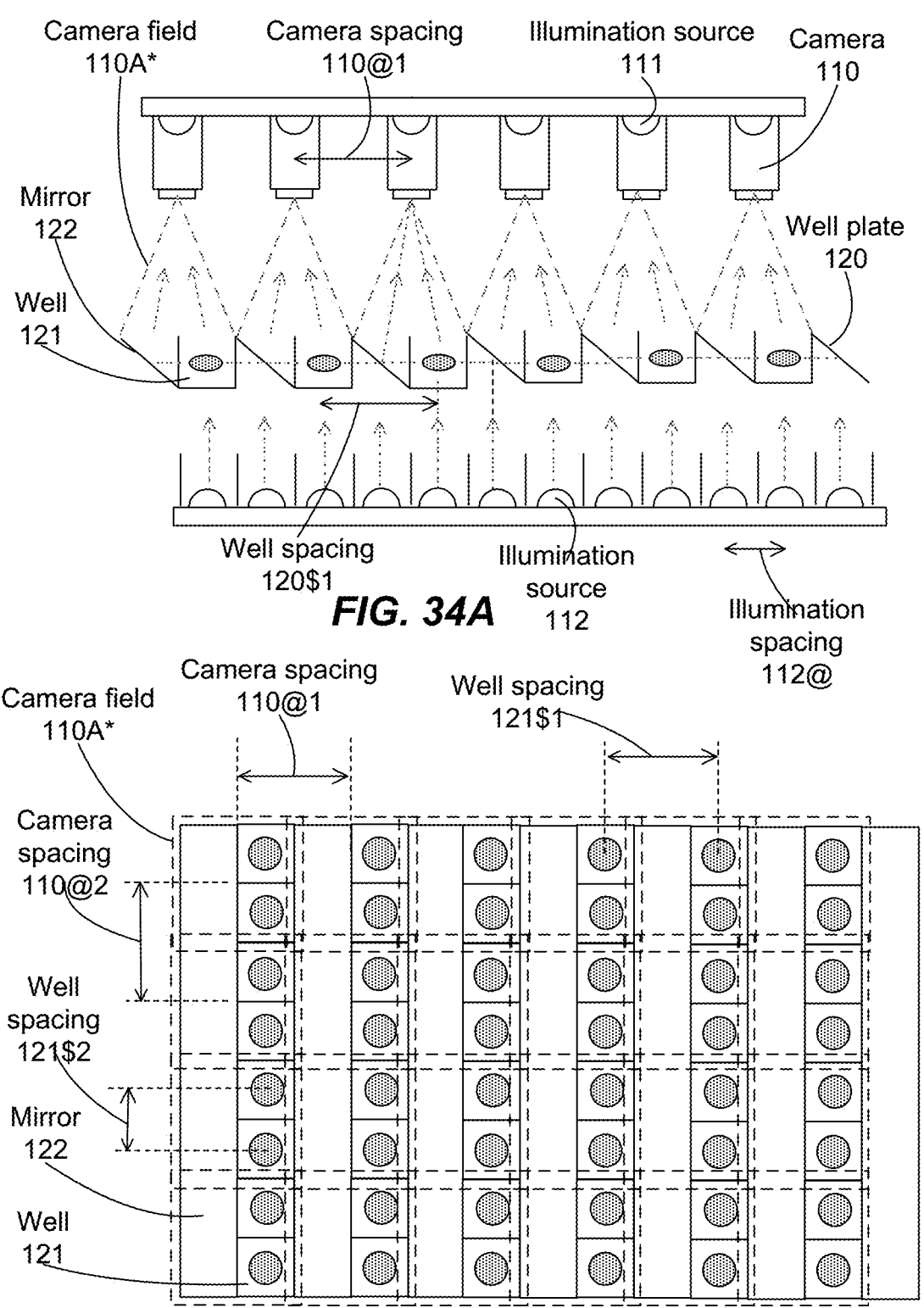

FIGS. 34A-34B illustrate a matching configuration for a camera field of view of 2 top views and 2 side views of 2 wells according to some embodiments.

Figures 35A, 35B:
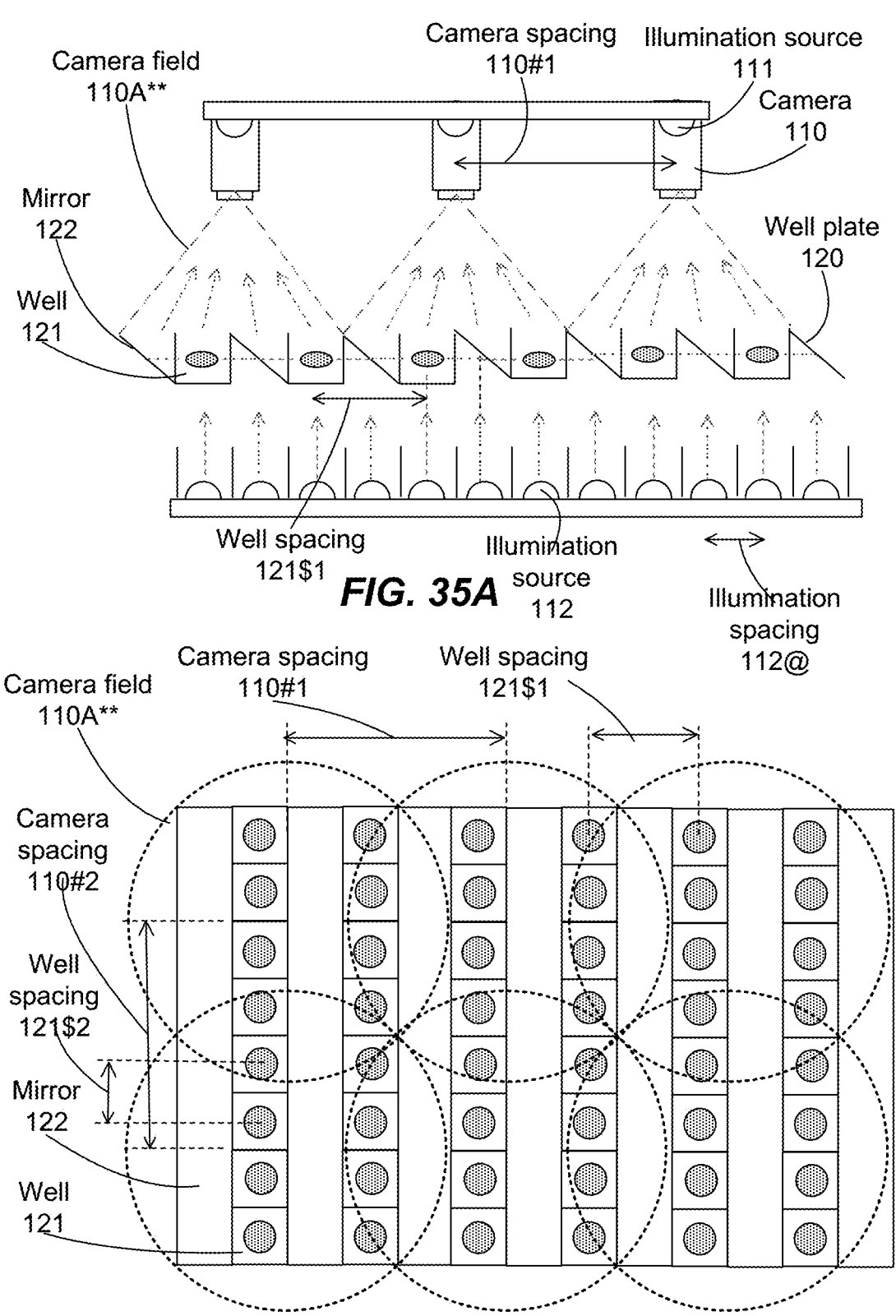

FIGS. 35A-35B illustrate a matching configuration for a camera field of view of 8 top views and 8 side views of 8 wells according to some embodiments.

FIG. 36 illustrates a flow chart for matching configuration of a camera array with a well array according to some embodiments.

Figures 37A, 37B:
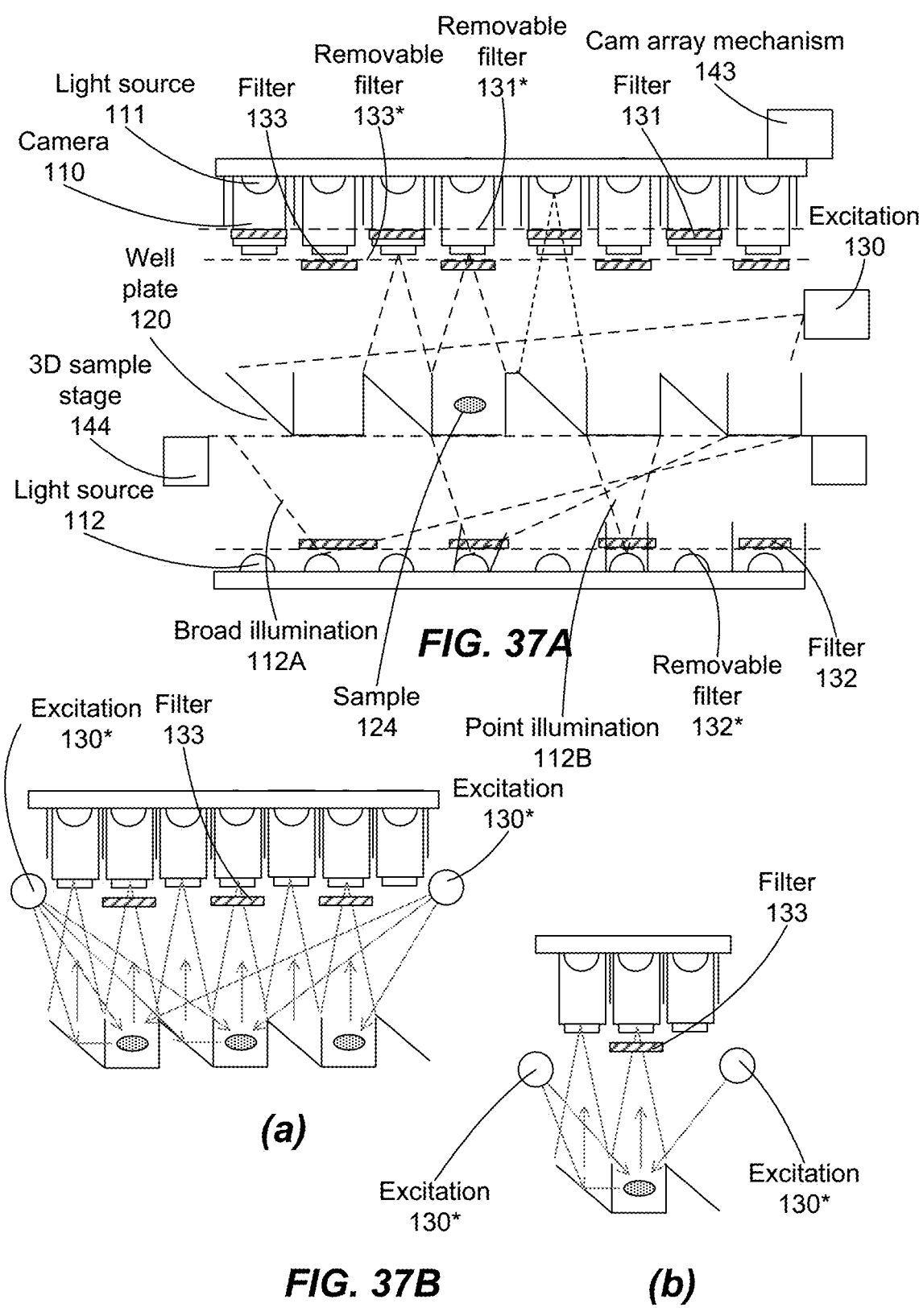

FIGS. 37A-37B illustrate schematics for a multiple camera imaging system with an external excitation mechanism, including a fluorescence configuration according to some embodiments.

Figures 38A, 38B:
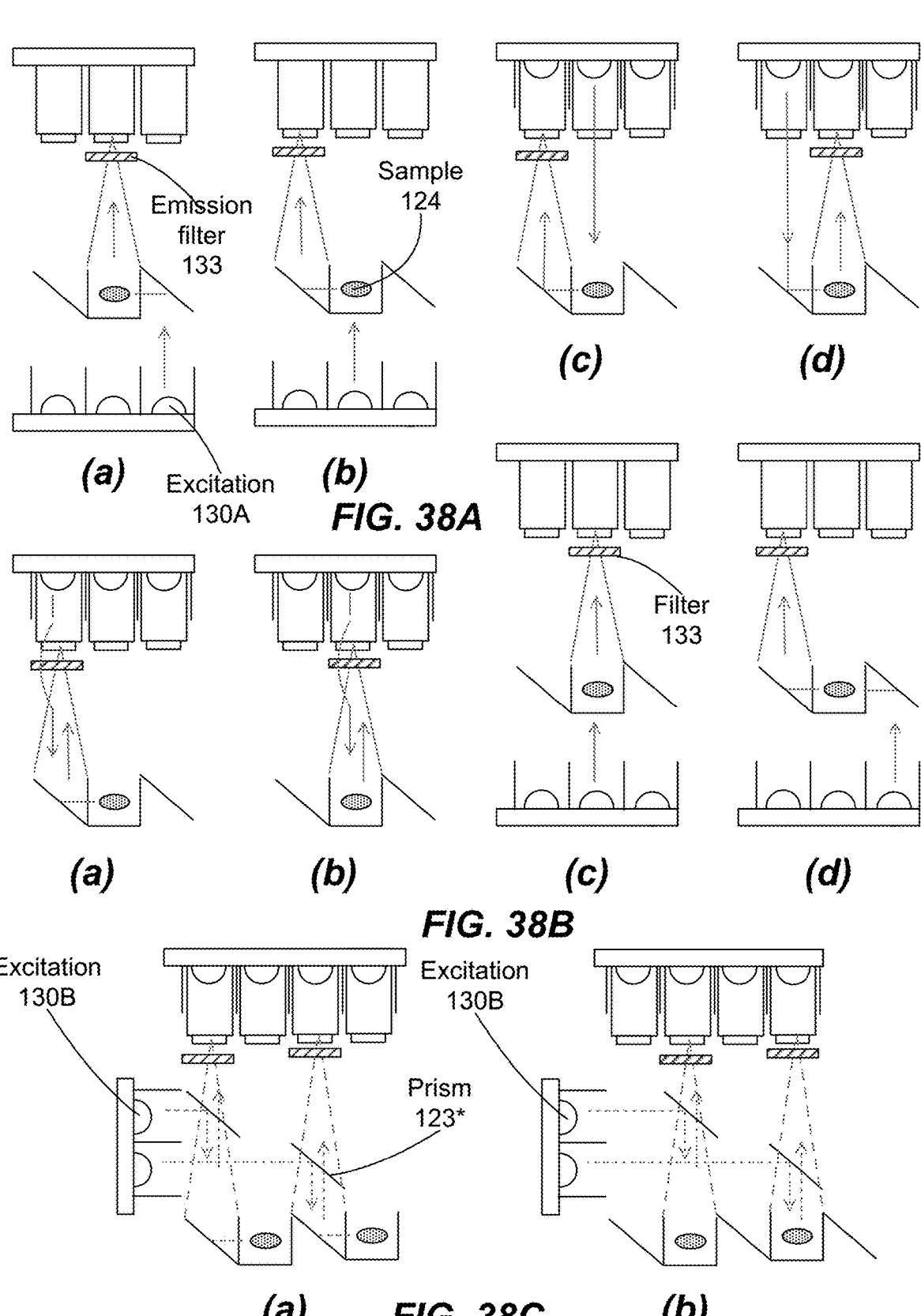

FIGS. 38A-38C illustrate schematics for a multiple camera imaging system with a fluorescence configuration for individual wells according to some embodiments.

FIG. 39 illustrates a flow chart for a multiple camera imaging system with a fluorescence configuration according to some embodiments.

Figures 40A, 40B:
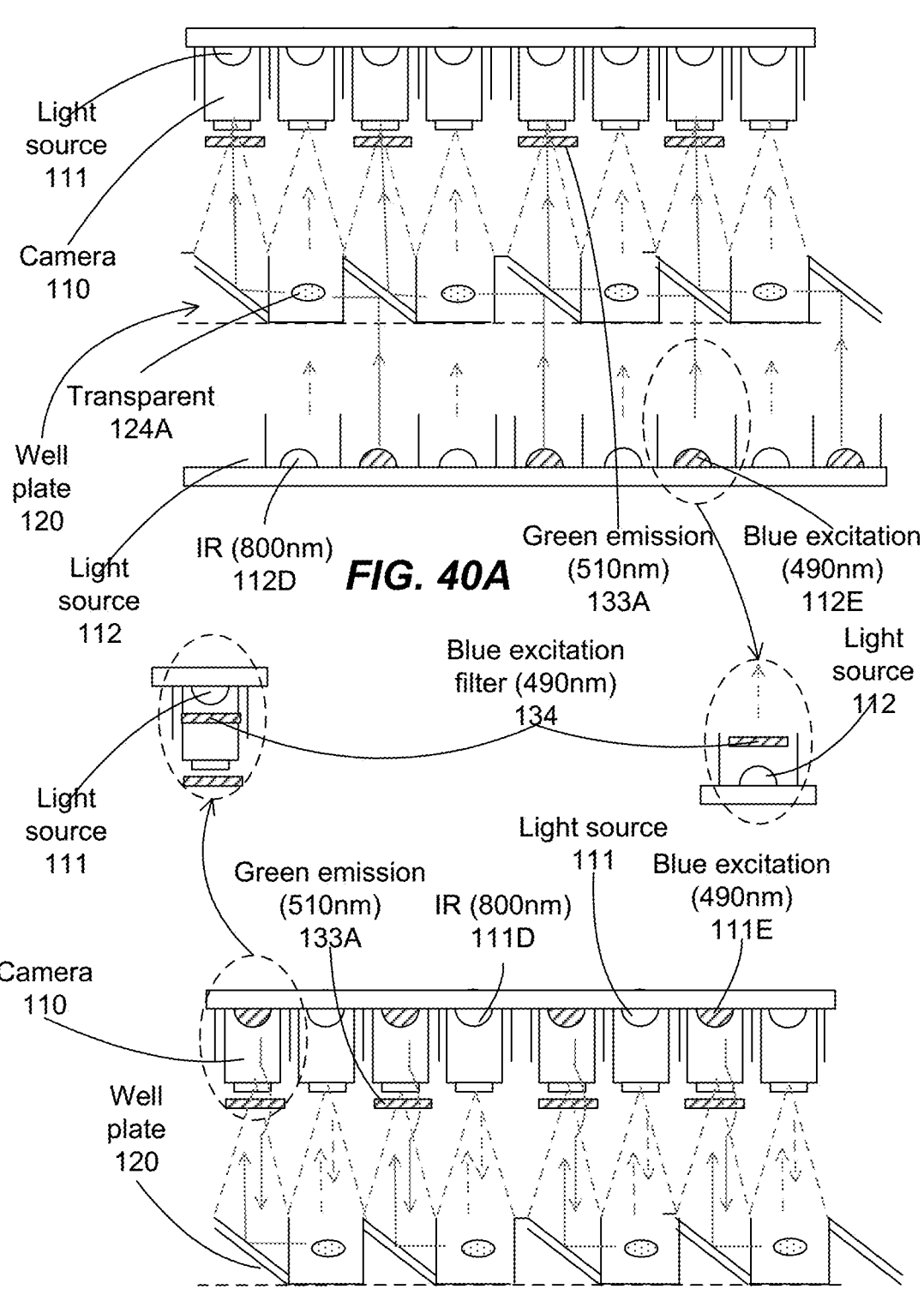

FIGS. 40A-40B illustrate a schematic of a multiple camera imaging system configured for GFP imaging according to some embodiments.

Figure 41A:
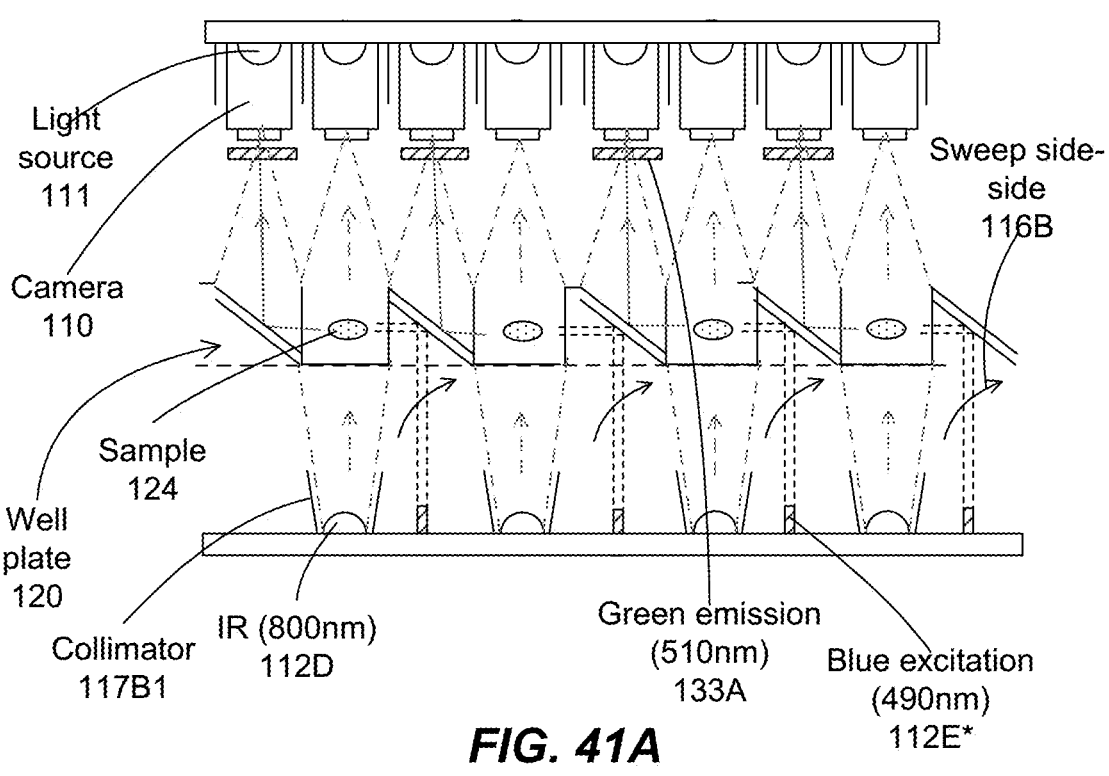
Figure 41B:
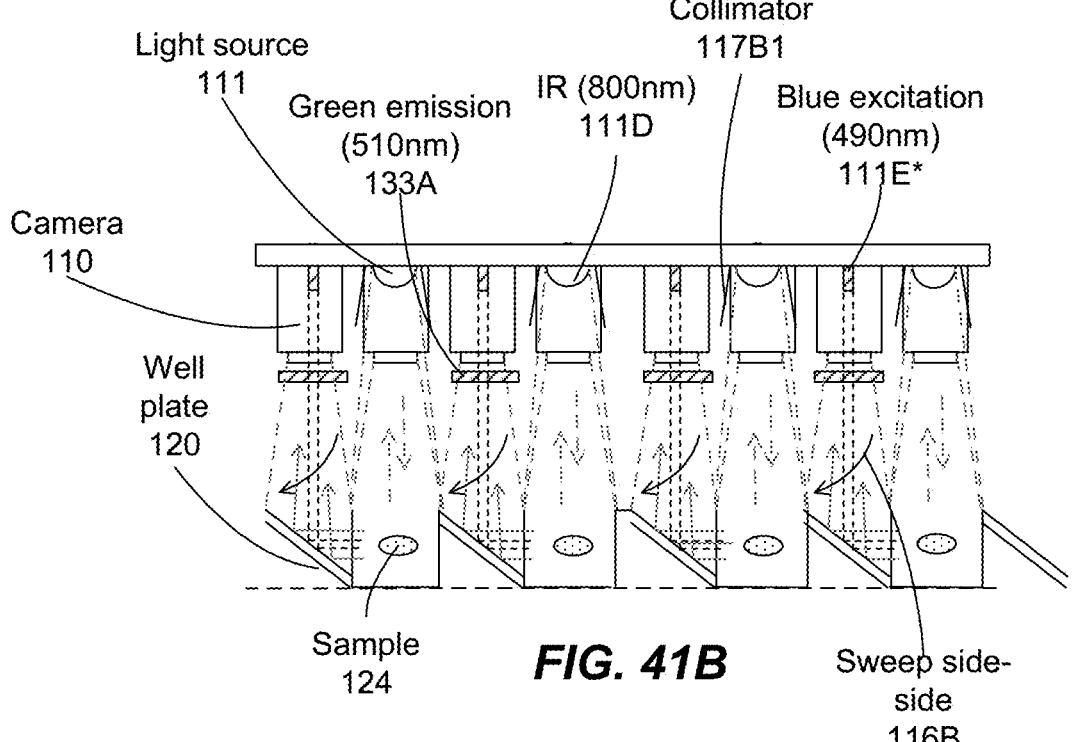

FIGS. 41A-41B illustrate a schematic of a multiple camera imaging system configured for GFP imaging with planar beam excitation according to some embodiments.

FIG. 42 illustrates a flow chart for a multiple camera imaging system configured for GFP imaging with line beam excitation according to some embodiments.

FIGS. 43A-43B illustrate flow charts for operating a multiple camera imaging system configured for GFP imaging with line beam excitation according to some embodiments.

Figure 44A:
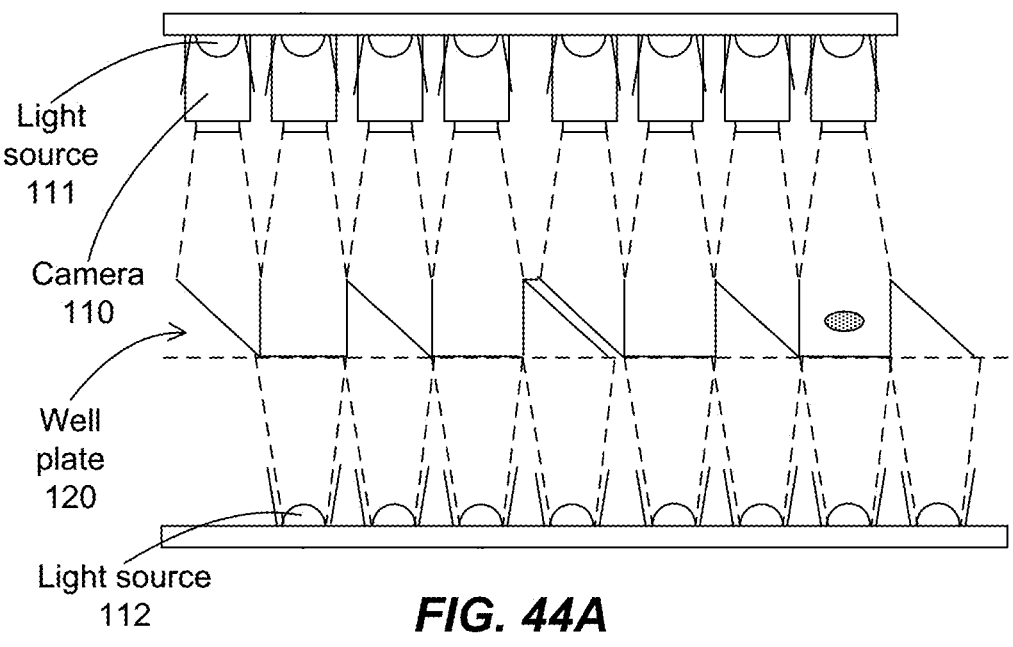
Figure 44B:
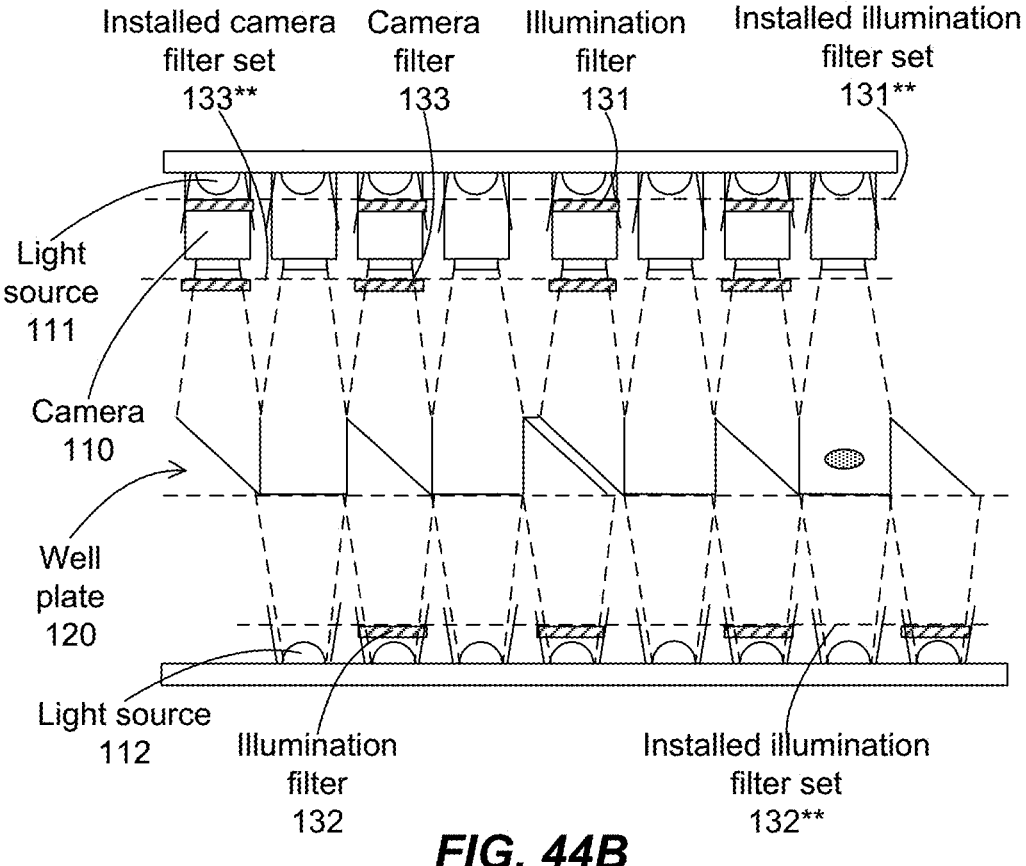

FIGS. 44A-44B illustrate a configuration of a multiple camera imaging system with optional fluorescence ability according to some embodiments.

FIG. 45 illustrates a flow chart for a multiple camera imaging system with optional fluorescence ability according to some embodiments.

FIG. 46 illustrates a flow chart for operating a multiple camera imaging system with optional fluorescence ability according to some embodiments.

FIGS. 47A-47D illustrate schematics for a multiple camera imaging system with an external excitation mechanism according to some embodiments.

FIGS. 48A-48B illustrate flow charts for a multiple camera imaging system with an external excitation mechanism according to some embodiments.

Figure 49A:
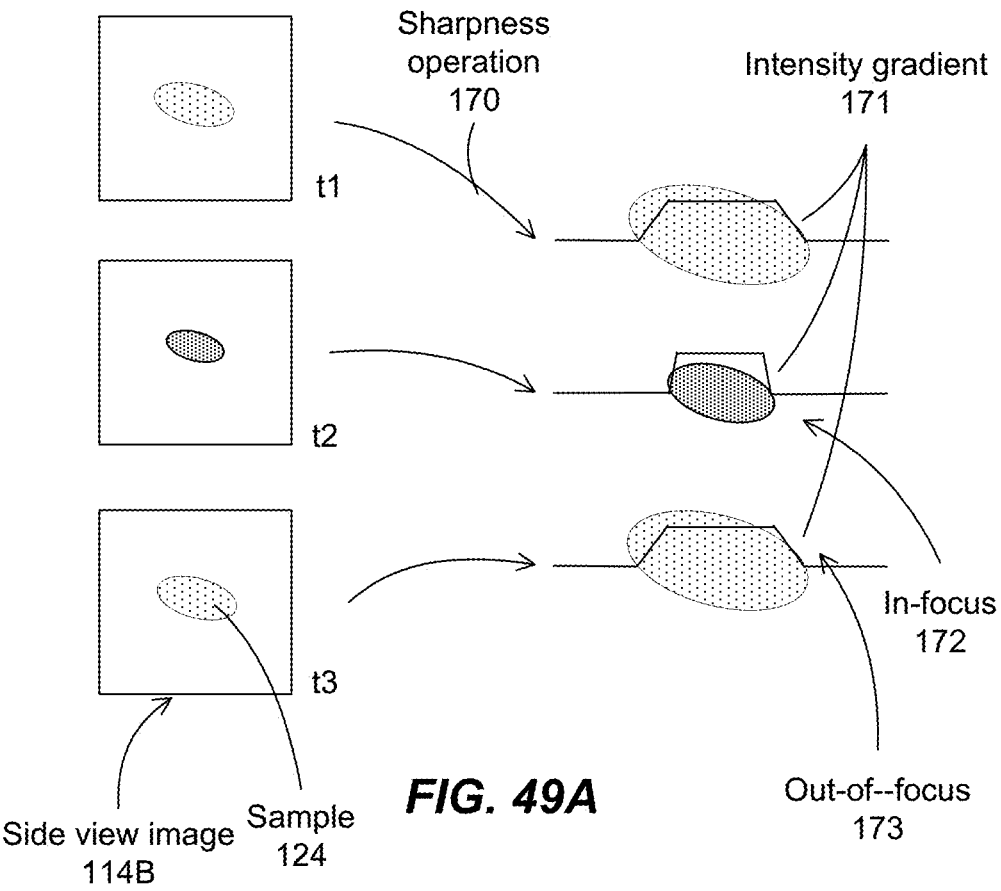
Figure 49B:
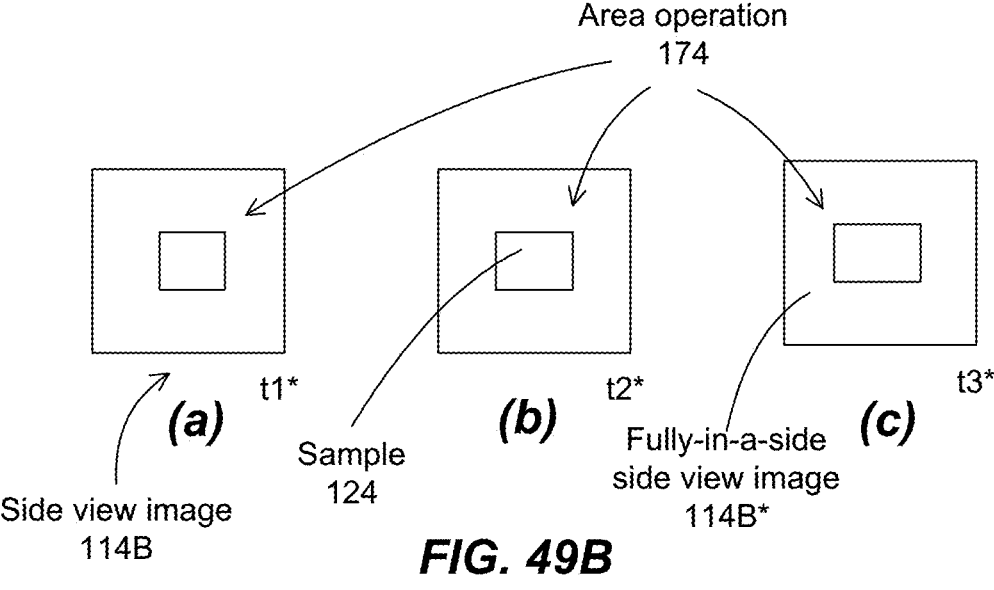

FIGS. 49A-49B illustrate a configuration for imaging a side view of a sample in a well of a well plate according to some embodiments.

FIGS. 50A-50C illustrate flow charts for minimizing data collection and transfer in a multiple camera imaging system according to some embodiments.

Figures 51A, 51B:
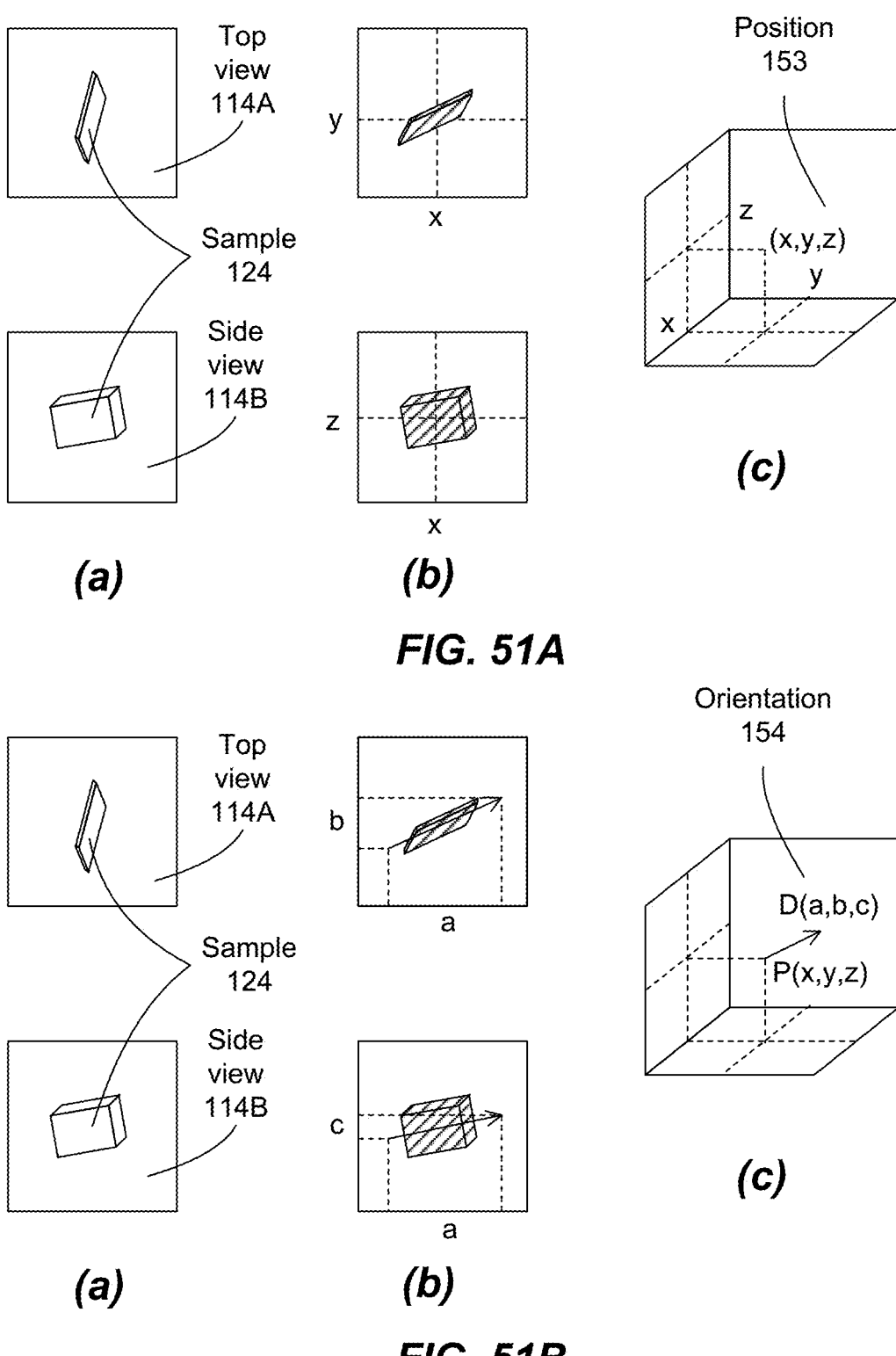

FIGS. 51A-51B illustrate a configuration for tracking positions and orientations of samples in a well plate according to some embodiments.

FIGS. 52A-52C illustrate flow charts for tracking positions and orientations of samples in a well plate using a multiple camera imaging system according to some embodiments.

DETAILED DESCRIPTION OF THE EMBODIMENTS

In some embodiments, the present invention discloses an imaging system, such as a microscope, which is configured to image and record samples from top and side view simultaneously for multiple wells in a well plate. A combination of pitches of wells and pitches of cameras, together with appropriate software enable simultaneous viewing of the wells in the well plate. The concurrent imaging to top and side views of multiple wells can provide high throughput experimentation with model organisms, such as 3 dimensional tracking of the organisms during an assay. With a coupled lens array, the throughput can further increase by the analysis software.

The high throughput experimentation can assist in behavioral assays with fast turn around for multiple repeated assays with a stimulus applied globally, e.g., a vibrational stimulus can be applied to all wells in the well plate. For example, in a drug screening evaluation with a temporal component, e.g., the drug can quickly affect the samples, a drug can be applied to the wells, and the organisms in the wells are observed quickly and simultaneously, including vertical response of the organisms through the side views.

In some embodiments, samples in wells of a well plate can be imaged through the imaging system, with visible spectrum light used to analyze morphological or behavioral changes in the samples, either immediately, over time, or after a period of development time. A fluorescent assay could also be run by projecting light from the top or bottom of optical elements to periscope onto the samples.

In the case of mobile samples, video can be utilized to ensure proper alignment of the samples. For example, the samples can be allowed to move around in the wells, and video can be taken over a specified time period. An experimenter or an algorithm can review the frames of the video and select those frames where the sample was in the correct orientation, such as showing a side to the optical elements to be viewed as a side view of the wells. The side view configurations can eliminate the need to mechanically fix the samples to observe the side view.

Because the top and side of the sample are imaged simultaneously, the information from the top and side views can be combines to generate a 3d representation of the motions of the samples, for example, for behavior analyses.

The simultaneous viewing of top and side views of multiple wells can be used for toxicology, drug discovery, gene therapy, and any high-throughput analysis that requires side-view imaging. Examples can include tracking samples in XYZ with the top view providing XY coordinates and the side view providing YZ coordinates. The examples can include seeing the posture of samples, such as of zebra fish, for example, when the zebra fish go up to the surface to inflate their swim bladder. The examples can include seeing the lateral view of samples, such as of zebra fish or other organisms, without having to manually orient them, e.g., no anesthesia on the samples. The examples can include seeing samples, such as fruit flies, walking around and their Z motion, including head bobbing, proboscis extension. The examples can include seeing the lateral view of samples, such as a plant growing in side view, including seed to seedling and root system developing using clear agarose as the soil medium. The examples can include seeing burrowing of samples, such as *C. elegans* and/or fruit fly larvae, again in a clear agarose medium with XYZ movement. Other examples can include any organism suitable for use in microwell assays, such as organisms in early stages of development, including cells or groups of cells, cell suspensions, organospheres or organoids.

In some embodiments, a well plate is described that can hold 24 live, un-anesthetized zebra fish. Each of the fish can be imaged multiples of times over many days from the side without any additional handling or manipulation of the fish. This is a significant improvement in reducing stress on the fish. And a significant increase in useful data and productivity for a researcher. While a wellplate is described with 24 wells, there is nothing limiting the wellplate design to hold fewer or more wells than 24.

By enabling simultaneous top and side view imaging in a periscope format, the imaging system can enable researchers to run a wide range of assays at rates impossible with conventional methods without disturbing their sample. Because of the configuration of the mirrors in the wellplate, a researcher has control over the illumination modality applied to both the top and the side of the sample, allowing high image fidelity from both top and side perspectives as well as opening up new possibilities in lighting modalities.

Multi-Camera Imaging System

In some embodiments, the present invention discloses a multi-camera imaging system, which includes a camera subsystem and an image analysis subsystem. The multi-camera imaging system can be used for automated imaging and analyzing samples in life sciences and industrial applications, such as high throughput tools for automated pathology, live cell imaging, multi-well culture plate imaging, freely moving in vivo organism imaging, etc. The multi-camera imaging system can have lower costs, higher throughput, reduced size, footprint and weight, and can operate with different and/or multiple wavelengths as in multispectral and/or hyperspectral imaging.

The multi-camera imaging system can address microscope fundamental optic constraints of having smaller field of view to increase the imaging resolution. For example, when a person enlarges the image to see finer details, then the view area or the field of view becomes smaller. The multi-camera imaging system can be highly advantageous over scanning microscopes, in which the camera or the sample is moved from locations to locations, and the individual captured images are combined, e.g., stitched, into a composite image.

The multi-camera imaging system can have parallel image data acquisition, e.g., cameras, across an array of multiple separate image sensors and associated lenses, which can allow the image acquisition of a large sample, limited by the number of cameras in the camera array. The cameras can be micro cameras having small form factors assembled on a camera board, with data transfer cable coupled to a nearby computer system. With the small size and short transfer cable, fast data acquisition for large sample can be achieved.

Figures 1A, 1B:
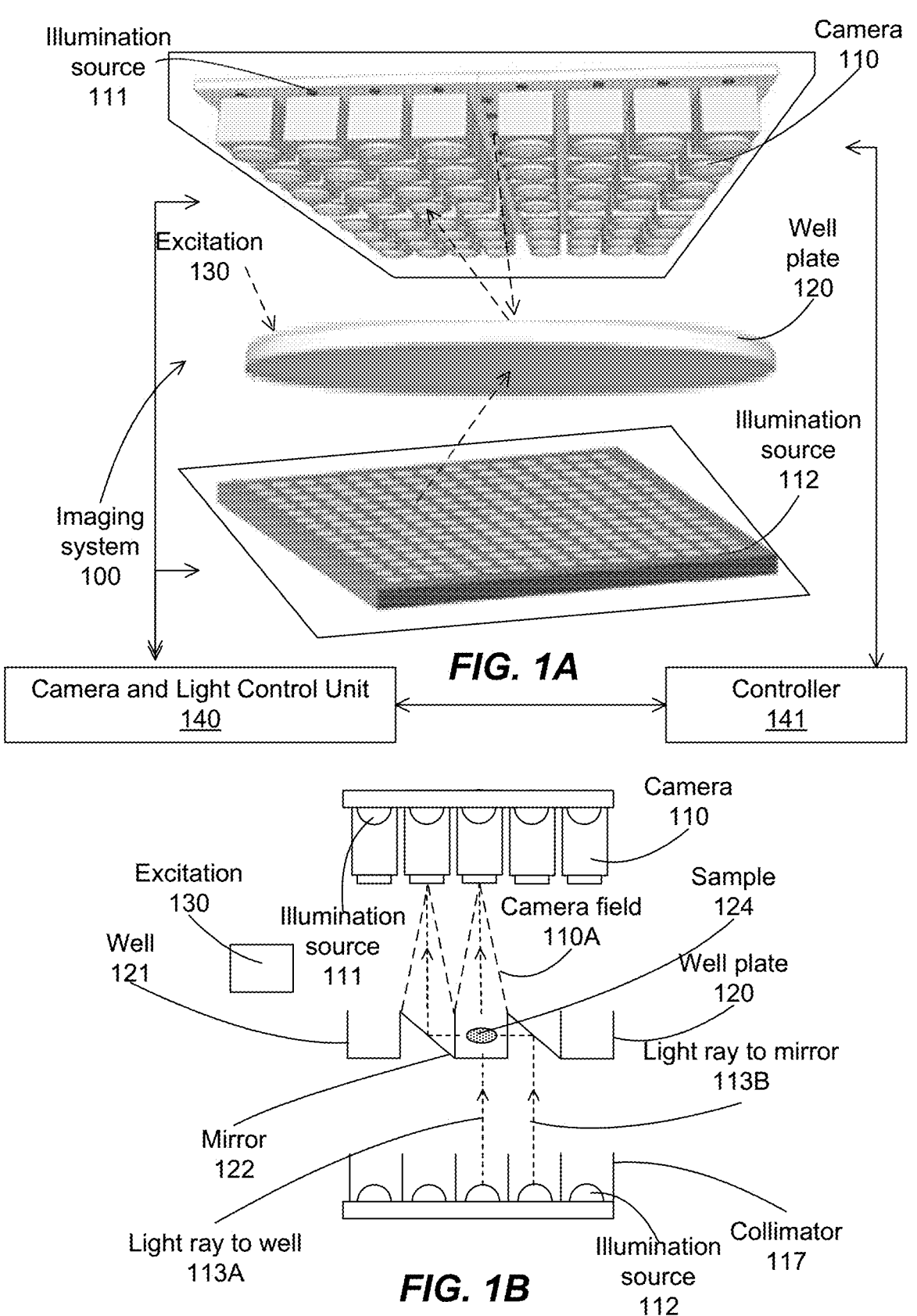
FIGS. 1A-1B illustrate a schematic of a multiple camera imaging system configured for a well plate according to some embodiments.

FIGS. 1A-1B illustrate a schematic of a multiple camera imaging system configured for a well plate according to some embodiments. FIG. 1A shows a perspective view of the imaging system. In general, the imaging system can be viewed as an integration of multiple individual microscopes tiled together in an array to image a large sample. Each individual microscope can be configured into a micro camera package, e.g., a camera having a small form factor with minimum components, such as without a cover or extra peripheral elements. The integration of the micro camera packages can form a tightly packed array of micro-cameras with high resolution (1-10 μm) over a large area (hundreds of square centimeters). The images or video can be taken from the individual micro cameras, such as individual images of a well 121, an optical element such as a mirror 122, or multiple wells and optical elements for a well plate 120. The imaging system can offer size, weight, complexity, and cost advantages with respect to standard microscopes. The imaging system may not require any moving parts, and its micro-cameras fit within a compact space without requiring a rigid support structure and can thus operate within a small, confined space.

The imaging system 100 can include multiple cameras 110, which can form a camera array, and one or more illumination sources disposed above 111 and below 112 for microscopic imaging. The light sources can be visible light sources, infrared light sources, ultraviolet light sources, fluorescent light sources, or polarized light sources, such as light emitting diodes (LEDs) or lasers with appropriate wavelengths and filters. The illumination system can be placed below or above the sample, to provide transmissive or reflective light to the sample before reaching the cameras.

The imaging system can use multiple micro-cameras 110 to capture light from multiple sample areas, with each micro camera capturing light from a sample area onto a digital image sensor, such as a charged coupled device (CCD), complementary metal-oxide semiconductor (CMOS) pixel array, or single-photon avalanche diode (SPAD) array.

The cameras and the light sources can be configured with or without filters, such as fluorescent filters or polarized filters. The filters for the cameras can change the characteristics of the captured light, so that the images captured by the cameras can have the specific property of the filters. For example, a fluorescent filter can allow the cameras to capture fluorescent signal emitted from the sample. The filters for the light sources can change the characteristics of the emitted light, so that the sample can have the specific light property provided by the filters. For example, a fluorescent filter can allow the light sources to emit fluorescent excitation energy to the sample, causing the organisms in the sample to respond and emit fluorescent signals.

The illumination system can provide the sample with different illumination configurations, which can allow the micro cameras to capture images of the sample with light incident upon the sample at different angles, spatial patterns, and wavelengths. The illumination angle and wavelength are important degrees of freedom that impacts specimen feature appearance. For example, by changing the incident illumination sources, a standard image can be converted from a bright field image into a dark field image, where the intensity relationship between the specimen and background is completely reversed. The illumination system thus can be controlled to provide optimum illumination patterns to the sample.

Alternatively, by providing the sample with different illumination light angles, spatial patterns, and wavelengths, both intensity and phase information of the imaged optical field can be recorded, which can allow the reconstruction of an image, for example, with more information or higher resolution, such as a measure of sample depth, spectral (e.g., color) properties, or the optical phase at the sample plane.

In some embodiments, the imaging system can include one or more excitation sources 130, which can be configured to provide excitation energy to the sample, e.g., to disturb the organisms in the sample. The excitation sources can be local, e.g., the excitation energy is confined to one or more areas of the sample. The excitation sources can be global, e.g., the excitation energy is provided to the whole sample, e.g., to all areas of the sample. The excitation energy can be provided continuously, or in separate pulses. The pulses can be periodic, or can include burst of energy pulses. The excitation sources can include an acoustic signal, a radiation signal, a radiation pattern, a vibration signal, an injector that can inject a stimulant such as a chemical or a radiation excitation component, an olfactory signal, or a manipulator for generate a mechanical disturbance or stimulant to the sample. The excitation sources can be separate excitation sources, or can be incorporated into the light sources, for example, by the filters, such as fluorescent excitation filter.

The imaging system 100 can include controllers 140 and 141 for controlling the cameras 110, the illumination sources 111 and 112, the excitation sources 130, and for processing the images. For example, the controllers can include a central processing unit or processor, which can couple to camera and light controllers for controlling the cameras units, such as to tell the cameras when to capture images, and for controlling the illumination sources, such as to tell the illumination sources when to be activated and what illumination sources to be activated. The central processing unit can be coupled with the camera units to obtain the image data captured by the camera units. The data can be stored in memory, can be processed by the central processing unit to be stored in a post processing dataset, and can be displayed on a display or to send to a final storage. The controllers can optionally include a pre-processing unit or pre-processor, e.g., another processing unit or another processor, in addition to the central processing unit, for processing the image data from the cameras before sending to the central processing unit.

FIG. 1B shows a cross section view of the imaging system configured to observe multiple wells in a multi-well plate. Since the wells are discretely separated, the cameras can be configured to have non-overlapped field of view covering the top or side surface areas of one or more wells. For example, a camera can be positioned above a well 121 with a field of view 110A for capturing a top view of the well, e.g., of the sample 124 in the well 121. A camera can be positioned above a mirror 122 for capturing a side view of the well due to the reflection of the light path at the mirror.

The illumination sources can include a top illumination array having multiple top illumination sources 111, and/or a bottom illumination array having multiple bottom illumination sources 112. The illumination sources can be configured to provide irradiation, such as visible light, infrared light, ultraviolet light, light with a limited spectrum such as blue light for fluorescence. The irradiation can be provided to the whole well plate 120, to a number of wells and mirrors, to a single well or a single mirror, or to an area, such as a line of beam, to a well or mirror.

As shown, collimators 117 are used to collimate the light ray 113A from the illumination sources to a single well or to collimate the light ray 113B to a single mirror.

Figures 2A, 2B:
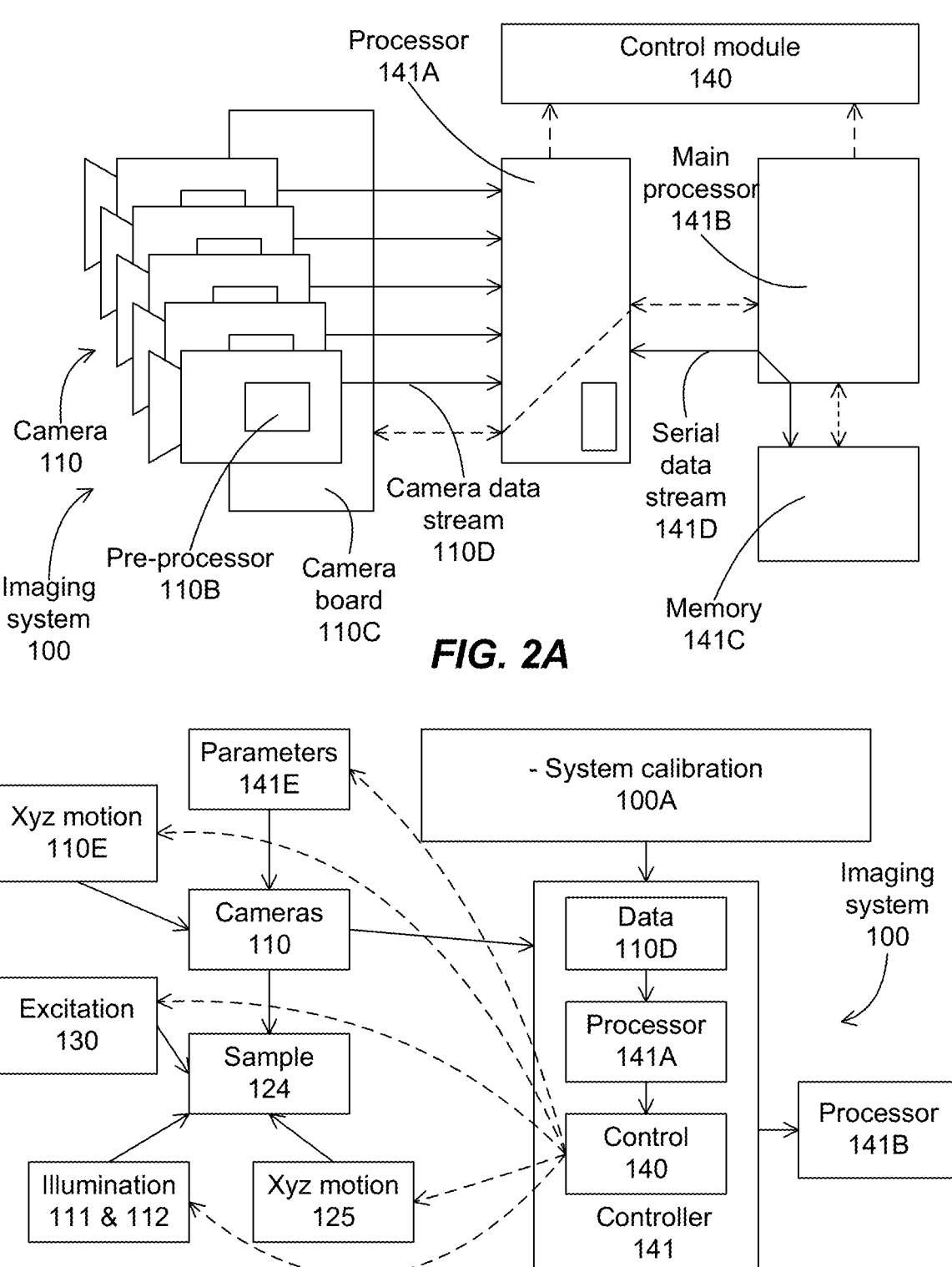
FIGS. 2A-2B illustrate block diagrams of a multiple camera imaging system according to some embodiments.

FIGS. 2A-2B illustrate block diagrams of a multiple camera imaging system according to some embodiments. An imaging system can be used to capture images or record video of samples distributed in wells of a well plate at high resolution. The video can created by combining multiple images captured in sequence from one or more microcameras within the array.

FIG. 2A shows a schematic of an imaging system 100, having multiple cameras 110 arranged in a camera array. The camera array can have a common clock generator to reduce timing variations between cameras. The cameras can have optional preprocess modules 110B, which can be configured to preprocess the image data when reading from the image sensors of the cameras. The preprocess modules can perform simple or complex image processing, such as a quick detection of frame to frame variation or an object detection. The original or preprocessed image data can be sent, in multiple parallel data streams 110D, to another optional process module 141A, which is configured to organize the image data.

The process module 141A can be an FPGA based module (e.g., a module containing a processing chipset, such as an FPGA, or other chipset of an ASIC, an ASSP, or a SOC), which can be configured to receive image data from the multiple camera units, e.g., through data streams 110D. The FPGA based module can include a shallow buffer, for example, to store incoming data from the data streams. The FPGA based module can be configured to send sensor configuration data to the camera array, for example, to provide image parameters to the image sensors of the camera units. The sensor configuration can be received from a computational unit having a processor 141B and a memory 141C. For example, the processor can send configuration and settings to the FPGA based module, with the configuration and settings including setting information for the FPGA based module and the configurations for the image sensors. The FPGA based module can communicate with the computational unit using direct memory access (DMA) to pass data directly to the memory, through a high speed link such as PCIe. The FPGA based module can communicate with a control module, which can be configured to control lighting, motion, and sample handling for the microscope system. The computational unit can also communicate directly to the control module. The computational unit can communicate with a storage or network devices (not shown). The system can include peripheral devices, such as stages, illumination units, or other equipment involved in the apparatus necessary to ensure adequate imaging conditions.

FIG. 2B shows a block diagram of an imaging system 100, such as a microscope system, modified for organism detection and tracking. The imaging system can include a camera array having multiple cameras 110 and illumination arrays 111 and 112 having multiple illumination sources, which are controlled by one or more controllers, such as a camera controller, an illumination controller, and a system controller.

An imaging system can include an array of cameras 110 focused on samples 124 distributed in wells of a well plate under the illumination of arrays of light sources 111 and 112. Image parameters 141E to the camera array 110 can be inputted to the camera array, for example, to control focus mechanisms for focusing or for changing magnification of the individual cameras. An optional motion mechanism, e.g., a movable camera stage 110E, can be used to adjust the positions of the camera array, such as tipping, tilting, translating the camera array, or for changing the fields of view of the cameras. For example, the moving mechanism 110E can be coupled to the camera array to move the camera array relative to the sample, such as toward or away from the sample. Another optional motion mechanism, e.g., a movable sample holder 125, can be used to adjust the positions of the well plate, such as tipping, tilting, translating, or curving the well plate. The movable sample holder can also be used for advancing the sample or the sample holder in discrete steps for capturing scanning image data of the sample. For example, the moving mechanism 125 can be coupled to a sample support to move the sample relative to the cameras, such as toward or away from the cameras. For example, the specimen can also be placed on a 3D motorized stage, whose position can be controlled via software on the computer to bring the specimen into appropriate focus and lateral position. An excitation module 130 can be used to provide excitation to the organisms, e.g., the samples, in well plate.

A data processing system 141 can be used to control the elements of the imaging system. The data processing system 141 can be configured to receive inputs 100A, such as data related to features of interest to be detected and analyzed on the sample. The data processing system can be configured to receive data from the camera array, and to transfer the data to a data processing processor 141A or 141B for processing. The data processing system can be configured to transfer the data to a second data processing processor 141B for analysis. The data processing system can include a controller 140 to control the camera array, the illumination source, and the sample holder to provide suitable conditions for image captures, such as providing variably illuminated radiation patterns to the sample, repositioning the cameras, the camera array, the samples, or the sample holder for focusing or scanning operations.

In some embodiments, the data processing system is a desktop computer. This desktop computer can be attached to a monitor for visual analysis of recorded video and/or statistics. The desktop computer can also be networked to transmit recorded video data and/or statistics and is also used to control the image and video acquisition parameters of the instrument (exposure time, frame rate, number of micro-cameras to record video from, etc.) via electronic signal.

The imaging system 100, such as a camera array microscope, based on a set of more than one compact, high-resolution imaging system, can efficiently acquire image data from across a large sample by recording optical information from different sample areas in parallel. When necessary, physically scanning the samples with respect to the array and acquiring a sequence of image snapshots can acquire additional image data.

The imaging system can be used to obtain image and video data from the samples. The data can be analyzed to detect organisms for tracking. In addition, the data can be analyzed to classify the organisms, e.g., using the features on the organisms to classify the organisms into different organism categories or organism identification.

In some embodiments, the system can include a main processor, such as a central processing unit of a desktop computer, which is coupled to the cameras to receive the image data from the image sensors of the cameras. The processor can include a control module, e.g., a controller, for controlling the elements of the system, such as controlling the camera, the light source, or the excitation source parameters. In some embodiments, the system can include a controller for controlling the elements. The controller can include a main processor, such as a central processing unit of a desktop computer or a data processing system.

A parallel to serial data conversion device can be disposed between the main processor and the cameras, for converting the multiple parallel image data streams from the cameras to a serial data image stream to the memory of the processor. The parallel to serial data conversion device can be an FPGA, or any other electronic device configured to perform the parallel to serial conversion.

In operation, after each of the cameras acquires an image, the image data from each camera are sent, in parallel to the FPGA. The FPGA then sequentially outputs the image data into a serial data stream to the processor to be processed, or to the memory of the processor. The parallel to serial conversion, e.g., in the FPGA, can be performed sequentially on each image or on portions of each image. For example, image data from camera 1 is sent first to the processor, followed by the image data from camera 2, and so on. Alternatively, a portion of the image data from camera 1 is sent, followed by a portion of the image data from camera 2, and so on.

An object detection algorithm, and subsequently, an object tracking and analyzing algorithm can be applied on the image data stored in the memory, including an edge detection algorithm, a projection algorithm, a centroid-finding algorithm, a neural network such as a convolutional neural network, or an inpainting algorithm. For example, the object detection is first performed to find the objects of interest, e.g., after removing the objects not suitable. The image data then can be cropped out to form bounding boxes, e.g., regions of interest. The bounding boxes can be centered upon each object of interest, and correlate specific objects as a function of time for tracking. Data from the bounding boxes are saved to the memory after processing.

Using the main processor, advanced processing algorithms on a GPU or CPU can be run, with the advanced algorithms not fast enough or flexible enough to be run on the FPGA. Advantages of the configuration include the ability to reduce saved data for subsequent per-organism analysis. This is especially relevant for multiple camera system, which typically streams 50-100 camera frames (10 million pixels each) at 10 frames per second for 5-10 gigabytes of data per second.

Configurations for a Well Plate for Use with a Multiple Camera Imaging System

In some embodiments, the present invention discloses a multi-camera imaging system for imaging top views and side views of wells in a well plate. The multiple cameras in the imaging system and the multiple wells in the well plate are coupled, e.g., either all the wells are in the fields of view of some of the cameras or all the cameras are configured to view some of the wells. The coupling of the cameras and the wells can enable high throughput imaging for both top and side views of the wells in the well plate. The high throughput imaging can be used for simultaneously long term observation of multiple samples without disturbing the samples. The high throughput imaging can be used for short term assays of short life samples.

The well plate can include wells and optical elements, with the optical elements configured to change the path of the light rays, for example, in a periscope mechanism, to allow light sources or cameras on top or bottom of the wells to reach or come from the sides of the wells. The side view observation can enable drug-discovery assays, small molecule library screening, and early stage toxicology screening applications. Among the model organisms, the zebra fish can provide low cost, rapid vivo analysis and complex vertebrate biology. The zebra fish can be transparent in a vertebrate embryo or larva amenable to large-scale screening, with closer to humans evolutionarily than other organisms.

Many features of the zebra fish can be found laterally on the animal, e.g., best viewed from the side. This can be complicated for zebra fish, since the zebra fish are typically either dead or anesthetized when manipulated with probes to be examined.

Other organisms can include any animal, fish, amphibian that have a developmental stage suitable for microwell analysis. For example, the organism can be in early stages of development, such as fertilized eggs or larvae, or can be an adult organism. Suitable organisms include zebra fish (*Danio rerio*), *Drosophila melanogaster, Xenopus laevis,* fugu (pufferfish), medaka, *Giant rerio,* and *Paedocypris.*

A well plate can include multiple wells, which can be configured for live biological organisms placed in the wells. The well plate can include optical elements configured to provide top view, bottom view, and side view images of such organisms. The well plate can be formed from an optical material including plastic, glass, quartz, or fused silica.

Suitable plastics include acrylic, polystyrene, polycarbonate (standard or optical quality) Zeonor, Zeonex and TOPAS COC (Ticona). The bottom surface of the array and the surface of the optics can be polished to an optical quality.

Optical elements, such as mirrors or prisms, can be located adjacent to a well. A camera can be placed at the well or at the optical elements to capture images of the sample, which can be a top view image or a side view image, respectively. Multiple cameras can be used to acquire images for the wells in the well plate. The optical elements can include a right angle turning optic such as a right angle prism or 45 degree turning mirror. The optical elements can be individually configured for each well, or can be configured for multiple wells, such as a continuous optical element running along a row of wells.

There can be two optical elements for a well, for example, for illuminating at either side and for image capturing at one side. For example, a left mirror can be configured for left side viewing of a well from a camera positioned above the left mirror, e.g., the left mirror is configured to reflect light from the left side of the well to the camera positioned above the left mirror. The left mirror can also be configured reflect light from an illumination source above the left mirror to the left side of the well. A right mirror can be configured reflect light from an illumination source below the right mirror to the right side of the well. As such, each well can have two adjacent mirrors with the left mirror facing up and the right mirror facing down. Further, the left mirror of a right well and the right mirror of a left well can be stacked together, e.g., a double mirror with two reflected mirror surfaces. The optical elements can be installed in the well plate, or can be an integral part of the well plate.

A well plate can have an array of rectangular wells with rounded edges. The wells can have dimensions large enough to avoid distortion, such as from a meniscus effect. The wells can have dimensions large enough for the free movements of the organisms. The optical elements can occupy a same dimension as the well, for example, to allow a regular array of cameras to images top views and side views of the wells.

Standard well plate dimension can be preserved, such as typical center-to-center spacing of wells and external well plate dimensions.

The well plate can be configured to diffuse radiation directed to a top or bottom of a well or to optical elements adjacent to the well to provide uniform illumination of a well. The radiation can illuminate the whole top, bottom, or side surface of the well. The radiation can illuminate a portion of the top, bottom, or side surface of the well. The radiation can illuminate a band or a line beam on the top, bottom, or side surface of the well. For example, a small band of light can provide a focus fluorescence excitation signal to the organism to provide a clear emitted fluorescence signal.

The well plate can be formed by precision injection molding techniques or an injection mold tool design. The optical elements can be formed and positioned in the well plate to enable side viewing of the well.

Figures 3A, 3B, 3C, 3D:
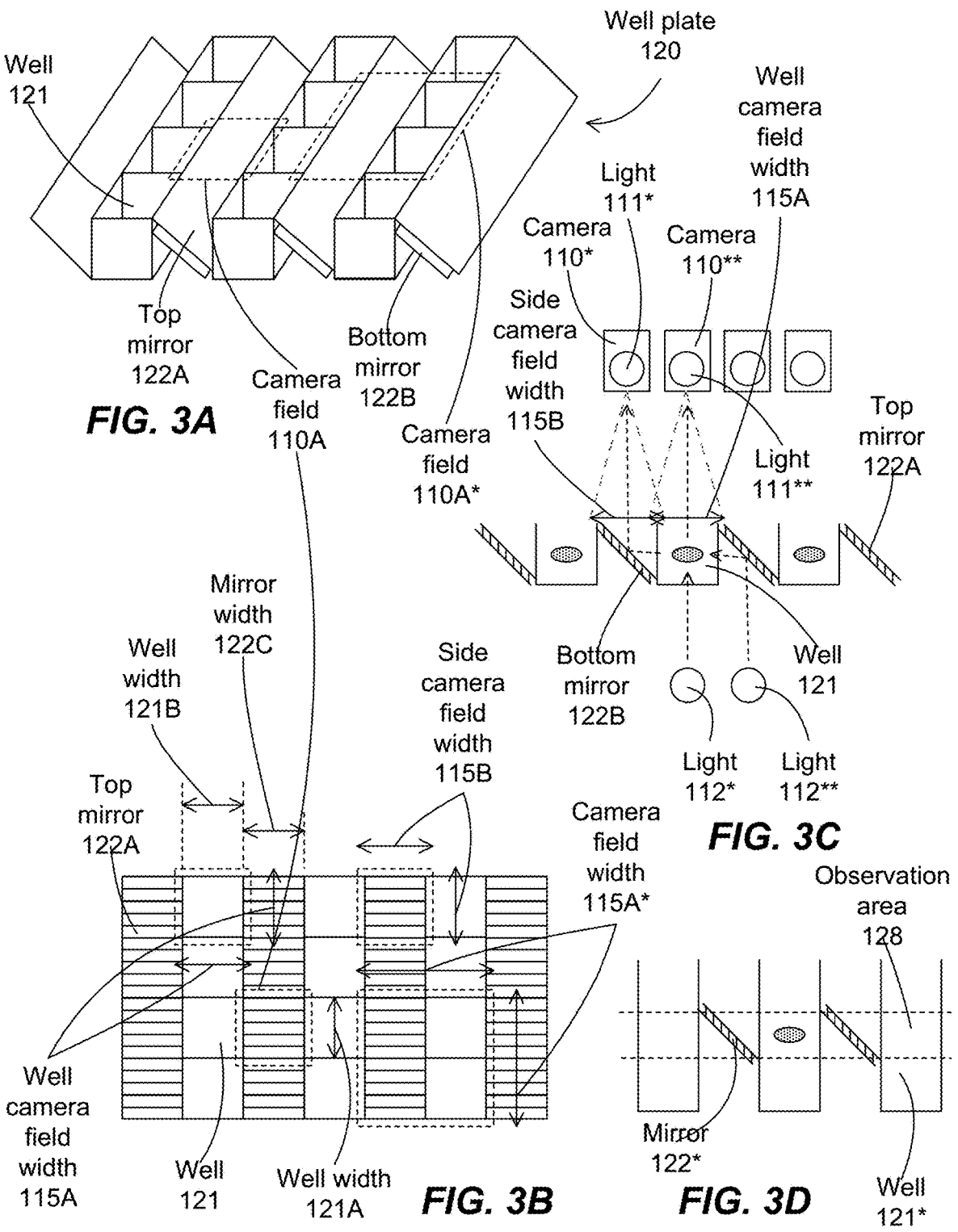
FIGS. 3A-3D illustrate a well plate for side view observation with mirrors according to some embodiments.

FIGS. 3A-3D illustrate a well plate for side view observation with mirrors according to some embodiments. FIG. 3A shows a perspective view of the well plate. FIG. 3B shows a top view of the well plate. FIG. 3C shows a cross section of a well plate relative to a camera array and an illumination array. FIG. 3D shows a cross section of another configuration of a well plate. In a well plate, each well can also be imaged from a side or from above either simultaneously or at a separate time.

The wellplate 120 can be a 2 dimensional array of wells 121 in a transparent plate. The wellplate can have any number of wells associated with mirrors. Typical well plates will have from 12 to 1536 wells in a single plate The mirror is typically at about 45 degrees with respect to the imaging axis, but can be at any angle that allows the light for illuminating or imaging the sample to reach the well from the side.

Each well 121 can have a top mirror surface 122A and a bottom mirror surface 122B disposed in regions adjacent to the well. The function of a top left mirror is to allow capturing images from a left side of a well, in addition for light rays to travel between a left side surface of the well and a top location of the well plate. For example, a top mirror 122A at left of a well 121 can be configured for obtaining a left side image of the well from a camera 110* above the well plate. In addition, light from an illumination source 111* above the well plate can reach the left side surface of the well 121 through the top left mirror 122A.

The function of a bottom right mirror is to allow for light ray to travel between a right side surface of the well 121 and a bottom location of the well plate. A bottom mirror 122B at right of a well can be configured for light from an illumination source below the plate to reach the right side surface of the well. For example, light from an illumination source 112** below the well plate can travel through the bottom right mirror 122B to reach the right side surface of the well to pass through the well 121 to reach the top left mirror 122A to reach the camera 110* (as a bright field for non-transparent samples). Alternatively, the light from the illumination source 112 can travel through the bottom right mirror 122B to reach the right side surface of the well to illuminate the sample and reach the camera 110 (as a dark field for transparent or non-transparent samples), A well can be positioned between a left top mirror and a right bottom mirror. The left and right orientations are described as examples. In reality, any orientations can be used, e.g., a top mirror adjacent a well, and a bottom mirror disposed at an opposite side and also adjacent to the well.

The wells and the mirrors can be assembled as an assembly, e.g., a well plate. The left top mirror of a right well can be positioned on top of a right bottom mirror of a left well. Thus, the mirror assembly between two adjacent wells can include a top mirror on a bottom mirror, or a double sided mirror having a top reflective side and a bottom reflective side.

The left and right positions are relative, and can be reverse, such as the left mirror can be positioned at a right side. Alternatively, the left and right positions can be configured as front and back.

A camera 110** positioned above a well 121 can be configured to image a top view of the well. Light 112* below the well plate at a bottom of the well 121 can illuminate the well from a bottom side to allow image capturing by the top camera 110 (as a bright field for transparent samples). Light 111 above the well plate at a top of the well 121 near the camera 110 can illuminate the well from a top side to allow image capturing by the top camera 110 (as a bright field for non-transparent samples).

Each well can have individual mirrors on a left side and on the right side, e.g., in a row of 4 wells, there can be 4 individual mirrors, one for each well, positioned on the left side, and 4 individual mirrors positioned on the right side. Alternatively, for ease of fabrication, the mirrors can be consolidated, for example, an elongated left mirror and an elongated right mirror for a row of well, as shown.

A camera array disposed above the well plate can be configured so that the individual cameras can have different fields of view, e.g., the viewing areas of the cameras. For example, a camera can be configured to view one well or one individual mirror, e.g., a mirror portion associated with a well, e.g., the camera can have a field of view 110A positioned on a well or on an individual mirror for the well. The field of view 110A can be adequate for a well, e.g., the field of view 110A for a well can have a camera field width 115A equal or large than a well width 121A and/or 121B. The field of view 110A can be adequate for an individual mirror, e.g., the field of view 110A for an individual mirror can have a camera field width 115B equal or large than a mirror portion width 122C. As such, a group of 2 cameras is needed, with one camera in the group for imaging a top view and one camera in the group for imaging a side view. For example, as shown in FIG. 3C, camera 110* can be used to view the side of the well with a camera field width 115B. Camera 110** can be used to view the top of the well with a camera field width 115A.

Alternatively, a camera can be configured to view multiple wells and/or multiple individual mirrors. For example, the camera can have a field of view 110A* covering two adjacent wells and two individual mirrors left adjacent to the two wells. The field of view 110A* can be adequate for the two wells/two mirrors, e.g., the field of view 110A* for 2 wells/2 mirrors can have a camera field width 115A* equal or large than the width of 2 wells/2 mirrors. As such, a camera can be used for imaging top views and side views of 2 wells (see FIG. 4A(b)).

Different configurations for the well plate can be used. For example, the mirrors can have different sizes as compared to the size of the wells. The mirrors can be configured to allow a full view of the entire well from the side, e.g., to provide light or to view the whole left or right side of a well. Alternatively, the mirrors can be made smaller to offer a view of a limited area of the side of the well, e.g., to provide light or to view only a portion of the left or right side of a well. For example, as shown in FIG. 3D, a mirror assembly 122* can be configured to have an observation area 128 at a middle portion of a deep well 121*. Other configurations can be used, such as curve mirrors, or mirrors positioned at an angle different from the 45 degrees from the perpendicular direction with the plane of the well plate. Alternatively, the mirrors can be made larger to potentially extend the view outside of the well.

The wells or the well plate can be injection molded with a transparent material. The mirrors can be done as a second shot injection mold, or with a reflective coating, or both. Alternatively, the mirrors can be dropped in the well plate and glued. The mirrors can be placed in the mold of a well plate, and polymer or plastic can be injected over the mirrors to hold the mirrors in place. The mirrors can be snapped in, e.g., the mirrors can be snapped into a wellplate that contains only an array of clear wells. Alternatively, the mirrors can be configured as a mirror base plate with slots for the rows of wells. The wells, such as individual wells, individual rows of wells, or an assembly of multiple rows of wells, can be assembled on the mirror base plate. In this assembly of wells on a mirror base plate, the wells can be discarded after being used, with the mirror base plate reused with other wells, since the mirror base plate does not come into contact with the samples.

The well plate and the camera array of an imaging system can be configured to allow top and side viewing of all wells in the well plate (e.g., the camera array is equal or larger than the well plate), or to allow using all cameras in the camera array for viewing (e.g., the well plate is equal or larger than the camera array). For example, the spacing between the cameras in the camera array can be configured to match the spacing between two wells or between a well and an individual mirror of the well plate.

The wellplate can be an array of 48 wells arranged in 6 columns of 8 rows of wells. A mirrored plate assembly is arranged on either side of each row of wells. The mirrored plate can be set at a 45 degree angle in order to transmit light between a top or bottom side of the well plate to a side area of the wells.

The mirrored plate assembly can include two mirrored plates on top of each other, with reflective sides of the two mirrored plates facing away from each other. For example, one mirrored plate, e.g., the bottom mirrored plate, directs light into the first sides of the wells, e.g., the right sides, from below the wellplate. Another mirrored plate, e.g., the top mirrored plate, directs light into the second sides of the wells, e.g., the left sides, from the top of the well plate. Alternatively, the mirrored plate assembly can include a mirrored plate with top and bottom reflective sides.

The wells can be spaced 9 mm apart on center to match 96 wellplate standards, with columns spaced 18 mm apart to accommodate mirrored plates. The plates would be mirrored on both sides in order to allow one mirror to reflect light to the wells on either side. The wells can be square with radiused corners and drafted to allow for injection molding of the wellplate.

In some embodiments, the 48-well wellplate can be placed under a 24 lens micro camera array microscope such that the viewing area of each camera covers two wells and the mirrored area adjacent to those wells. In this way all 48 wells of the well plate can be viewable from the top and side simultaneously. A sample would be loaded into each well and would be illuminated via the mirrors, such that the sample would be backlit when viewed from the side. Experiments can be run on all 48 samples, taking video or still frames of the samples according to need without mechanically disturbing the sample. A series of plates can be used to increase throughput and to provide a higher sample size for the study.

Figure 4A:
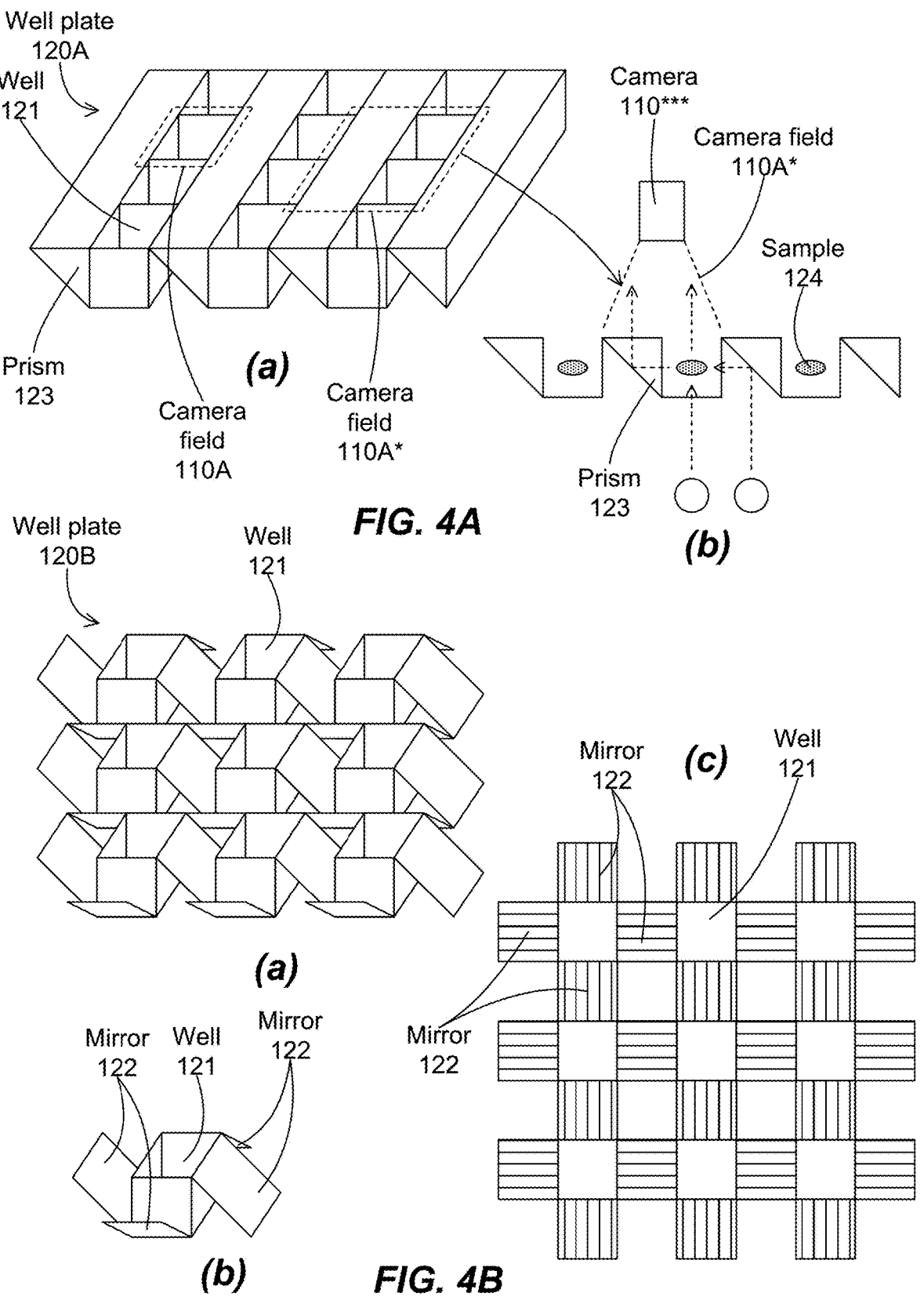
Figure 4C:
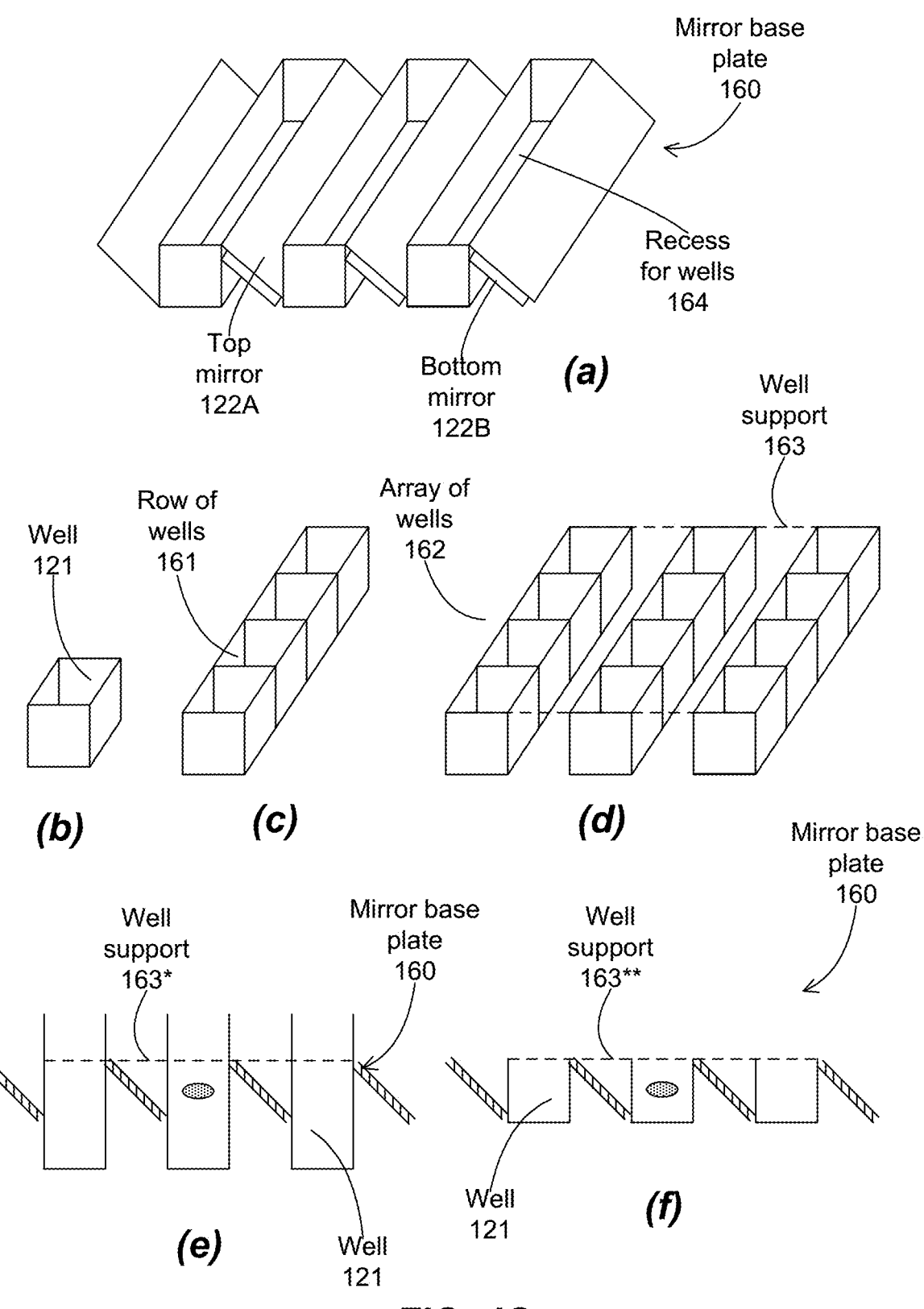

FIGS. 4A-4C illustrate other configurations of well plates for side view observation according to some embodiments. FIGS. 4A(a) and 4A(b) show a well plate using prisms as the optical elements instead of mirrors. FIGS. 4B(a)-4B(c) show a well plate a set of 4 mirrors surrounding each well. FIGS. 4C(a)-4C(f) show an assembly of wells and mirror base plate to form a reusable well plate.

In FIGS. 4A(a) and 4A(b), a well plate 120A can include a 2 dimensional array of wells 121 arranged in rows with a prism 123 disposed between the rows of wells. The prisms 123 can function as a double sided mirror, e.g., having a top reflective side and a bottom reflective side.

Similar to the mirrored well plate, the cameras can be configured to have a camera field 110A for individual well or individual portions of prisms, or to have a camera field 110A* for two wells and two portions of prisms. Light paths can be similar to the mirrored well plate. For example, as shown in FIG. 4A(b), camera 110*** can be used to view the side and the top of the well with a camera field 110A*.

In Figs. FIGS. 4B(a)-4B(c), a well plate 120B can include a 2 dimensional array of wells 121 arranged in individual wells with 4 mirrors 122 disposed around each well, such as a left mirror, a right mirror, a front mirror, and a back mirror. With 4 mirrors, the cameras can be able to view two side views of the wells, instead of just one side view.

FIG. 4C (a) shows a mirror base plate 160, including sets of mirror assemblies, with each mirror assembly having a top mirror 122A and a bottom mirror 122B. The mirror base plate 160 can include recesses 164 for wells, e.g., locations for drop in the wells.

The wells to be used with the mirror base plate can include individual wells 121 (FIG. 4C(b)). Multiple individual wells can be placed or assembled in the mirror base plate.

The wells to be used with the mirror base plate can include individual rows of wells 161 (FIG. 4C(c)). Each row of wells can include a number of wells, which matches with the recess length in the mirror base plate. Multiple rows of wells can be placed or assembled in the mirror base plate.

The wells to be used with the mirror base plate can include an array of wells 162 (FIG. 4C(c)). Multiple rows of wells can be connected together, for example, by well support 163. The well support can be transparent, or can be positioned at locations away from the light rays or the camera field of view. An array of wells can be placed or assembled in the mirror base plate.

The assembled well plate of a mirror base plate and multiple wells can provide a cost effective way for reusing the mirror portions of the well plate. After the experiment, the wells can be disassembled from the assembled well plate, and then discarded. New wells can be assembled in the mirror base plate to form a new assembled well plate. The mirror base plate thus can be reused, while the wells are removed and discarded.

FIGS. 4C(e) and 4C(f) show difference configurations for an assembled well plate. In FIG. 4c(e), the wells can be assembled to be side-viewed at a middle portion, due to the well support 163* stopping the wells from being inserted too deeply into the mirror base plate. In FIG. 4c(f), the wells can be assembled to be side-viewed at a full size, due to the well support 163** positioned at a top of the wells and the well depth having a same size as the mirrors. Other configurations can be used, such as an assembled well plate configured for side view at a top portion of the wells, or at a bottom portion of the wells.

In some embodiments, the side view of a sample is important, for example, for organism, such as the zebra fish. The side-view of the zebra fish reveals its heart, gut, swim bladder, and many other important organs that are hard to see from the top side. As such, the side views of the zebra fish are important to assess how the morphology or function of their body changes over time for tested drugs or chemicals.

But, same with any fish, zebra fish do not like to lie on their side. To avoid immobilizing the fish, such as by anesthetizing, putting in some gel, or paralyzing the fish before putting the fish on its side under a microscope to see its side morphology, the periscope well plate, e.g., the well plate with optical elements disposed adjacent to the wells, can enable side viewing of the samples using a multiple camera imaging system.

Using the side mirror well plate, the fish does not need to be immobilized or paralyzed, to allow studies such as how drugs impact the fish's movement, swimming, or hunting behavior. With the side mirror well plate, the side of the fish can be viewed the fish is freely moving. Further, the side mirror well plate can offer long term observations without affecting the fish, for example, multiple times a day for side view observations.

Figure 5A:
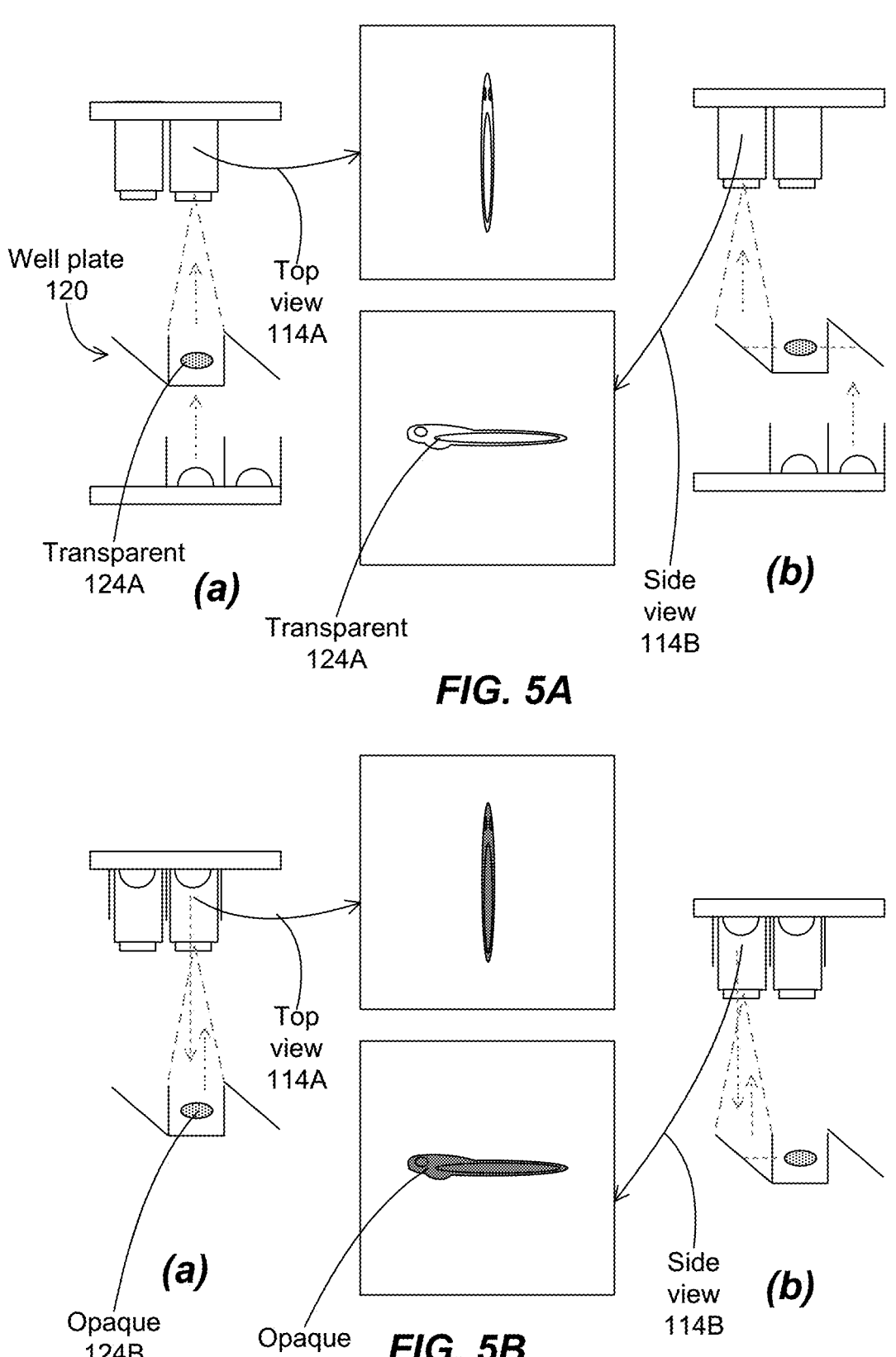

FIGS. 5A-5B illustrate examples of operations modes of a multiple camera imaging system according to some embodiments. FIGS. 5A(a) and 5A(b) show a configuration for viewing top and side views of a well for transparent samples using opposite illumination light sources. FIGS. 5B(a) and 5B(b) show a configuration for viewing top and side views of a well for non-transparent samples using illumination light sources positioned at a same size as the cameras.

In FIGS. 5A, a mirror well plate 120, which can be a well plate with optical elements, such as mirrors, which are configured for redirecting the light to enable side view of samples in the wells of the well plate, can be used for top and side views of the samples. For transparent samples 124A, such as the zebra fish, light from a bottom side of the well plate can be provided to the bottom side of a well. A camera from a multiple camera imaging system can be positioned above the well for capturing a top view image 114A of the transparent sample in the well.

Light from the bottom side of the well plate, from another light source, can be provided to the bottom side of a right mirror, for example, adjacent to the well. Another camera in the multiple camera imaging system can be positioned above the top side of a left mirror, also adjacent to the well at an opposite side. The camera can capture a side view image 114B of the transparent sample in the well.

In FIGS. 5B, a mirror well plate 120 can be used for top and side views of non-transparent samples. For non-transparent samples 124B, light from a top side of the well plate can be provided to the top side of a well. The camera positioned above the well can capture a top view image 114A of the non-transparent sample in the well.

Light from the top side of the well plate, from another light source, can be provided to the top side of a left mirror, for example, which is adjacent to the well. The camera positioned above the top side of the left mirror can capture a side view image 114B of the non-transparent sample in the well.

FIGS. 6A-6B illustrate flow charts for forming and operating a multiple camera imaging system according to some embodiments. In FIG. 6A, operation 400 shows the formation of an imaging system configured for simultaneously capturing top views and side views of samples in wells of a well plate. The well plate can have optical elements, such as mirrors, disposed adjacent the wells for redirecting the light. The mirrors can allow the cameras of the imaging system, which position above the well plate, to capture side views of the samples in the wells of the well plate.

The imaging system includes a camera array including multiple cameras.

The imaging system further includes one or more illumination arrays with each illumination array including multiple illumination sources configured to provide irradiation to the well plate. For example, an illumination array can be a top illumination array, e.g., an illumination array positioned at a same side as the multiple cameras. Another illumination array can be a bottom illumination array, e.g., an illumination array positioned at an opposite side of the multiple cameras. Other illumination arrays can be added, such as a side illumination array. The imaging system thus can have a top illumination array, a bottom illumination array, a side illumination array, or any combination thereof.

The well plate includes multiple wells, with at least a well disposed between two adjacent optical elements, such as mirrors. Generally, the well plate can have an array of wells, such as multiple rows of wells. Each row of wells can be positioned between two elongated optical elements, with each elongated optical element adjacent to each well of the row of wells.

A First Camera Field of View

The multiple cameras and the well plate are configured so that the at least a well is positioned in a field of view of a first camera of the multiple cameras. For example, the first camera can be configured for viewing only the top or bottom view of the at least a well, e.g., the field of view of the first camera is equal or slightly larger than the top or bottom surface area of the well.

Alternatively, the first camera can be configured for viewing the top or bottom view and the side view of the well, e.g., for covering the well and the adjacent optical element, with the optical element redirect the light for viewing the side surface of the well.

Alternatively, the first camera can be configured for viewing the top or bottom view and the side view of 2 wells, e.g., for covering 2 wells next to each other and the optical elements adjacent to the 2 wells, with the optical elements redirect the light for viewing the side surfaces of the 2 wells. In this configuration, the first camera is configured to view an array of 2 wells by a well and an optical element.

Alternatively, the first camera can be configured for viewing 2 wells (e.g., left and right wells), separated by an adjacent optical element (e.g., a middle optical element), the optical element adjacent to one well (e.g., a left optical element adjacent to the left well), and the optical element between the 2 wells (e.g., the middle optical element between the left and right wells). The optical element adjacent to one well (the left optical element) redirects the light for viewing the side surface of the one well (the left well), and the optical element between the 2 wells (the middle optical element) redirects the light for viewing the side surface of the well (the right well) not viewed through the optical element adjacent to one well. In this configuration, the first camera is configured to view an array of 1 optical element (or 1 well) by an optical element, a well, another optical element, and another well.

Alternatively, the first camera can be configured for viewing 4 wells and associated optical elements. In a configuration of this 4 well viewing, the first camera is configured to view an array of 4 wells by an optical element and a well. In another configuration of this 4 well viewing, the first camera is configured to view an array of 2 optical elements (or 2 wells) by an optical element, a well, another optical element, and another well. In yet another configuration of this 4 well viewing, the first camera is configured to view an array of 1 optical element (or 1 well) by an first optical element, a first well, a second optical element, a second well, a third optical element, a third well, a fourth optical element, and a fourth well.

Alternatively, the first camera can be configured for viewing 8 wells and associated optical elements in different configurations.

A Second Camera Field of View

A first optical element of the two adjacent optical elements for the at least a well is positioned in a field of view of a second camera of the multiple cameras or in the field of view of the first camera. The first optical element is thus configured for viewing a first side of the at least a well by the second camera or by the first camera.

For example, when the first camera is configured for viewing only the at least a well, the first optical element can be configured for viewing the side of the at least a well by a second camera of the multiple cameras.

Alternatively, when the first camera is configured for viewing the well and the adjacent optical element, then the first optical element is already configured for viewing the side of the at least a well by the first camera of the multiple cameras.

Similarly, when the first camera is configured for viewing 2 wells, 4 wells, or 8 wells, together with the adjacent optical elements, then the first optical element is already configured for viewing the side of the at least a well by the first camera of the multiple cameras.

Matching Imaging System and Well Plate

The multiple camera imaging system can be configured to provide a high throughput simultaneous imaging of top or bottom views and side views of samples in wells in a well plate. The high throughput can be achieved using a matching of spacings of cameras and illumination sources in the multiple camera imaging system with spacings of wells and optical elements in a well plate.

Matching Cameras and Wells

For well plate equal to or smaller than the imaging system, top or bottom view and side view of each well of a well plate are imaged by one or more cameras of the imaging system. The imaging system and the well plate can be configured so that top or bottom view and side view of each well of a well plate are in the field of view of one or more cameras of the imaging system. This configuration can ensure than there is no wasting of well, e.g., there is no well without a camera to capture images.

The top or bottom view of each well can be in the field of view of a first camera, e.g., the first camera can be positioned above the well to capture the top view. Alternatively, the first camera can be positioned below the well to capture the bottom view. The field of view of the first camera can be large enough for only the well, e.g., the top or bottom view of only one well is imaged by the first camera. Alternatively, the field of view of the first camera can be large enough for multiple wells, e.g., the top or bottom view of multiple wells is imaged by the first camera.

The side view of each well can be in the field of view of a second camera for the second camera to image the side view. The second camera can be positioned above the optical element adjacent to the well to image the side view, with the optical element adjacent to the well configured to redirect light between the second camera above the optical element and the side view of the well. Alternatively, the second camera can be positioned below the optical element adjacent to the well to image the side view, with the optical element adjacent to the well configured to redirect light between the second camera below the optical element and the side view of the well. The field of view of the second camera can be large enough for only the optical element adjacent to the well, e.g., the side view of only one well is imaged by the second camera.

Alternatively, the side view of each well can be in the field of view of the first camera, e.g., the first camera can be configured to image the top or bottom view and the side view of the well. The first camera can be positioned above the well and the optical element adjacent to the well to image the top view and the side view, with the optical element adjacent to the well configured to redirect light between the first camera above the optical element and the side view of the well. Alternatively, the first camera can be positioned below the well and the optical element adjacent to the well to image the bottom view and the side view, with the optical element adjacent to the well configured to redirect light between the first camera below the optical element and the side view of the well.

Alternatively, the first camera can be configured to image the top or bottom view and the side view of multiple wells, such as 2 wells or 4 wells or 8 wells.

For well plate equal to or larger than the imaging system, each camera of the imaging system is configured to capture at least a top or bottom view or a side view of a well of the well plate. The imaging system and the well plate can be configured so that the field of view of each camera covers at least the top or bottom view or the side view of a well of a well plate. This configuration can ensure than there is no wasting of camera, e.g., there is no camera without a well to capture images.

A first camera can be configured to capture a top or bottom view of a well in the well plate. The first camera can be configured to capture only the top or bottom view of a well. Alternatively, the first camera can be configured to capture the top or bottom view of a well, together with the side view of the well. Alternatively, the first camera can be configured to capture the top or bottom view of multiple wells, together with the side view of the wells.

A second camera can be configured to capture a side view of a well in the well plate. The second camera can be configured to capture only the side view of a well. Alternatively, there can be no configuration for a second camera. The first camera can be configured to function as the both first and second cameras, e.g., the first camera can be configured to capture the top or bottom view of one or more well, together with the side view of the one or more wells.

Matching Camera Spacing and Well Spacing

The high throughput of the multiple camera imaging system can also be achieved using a matching of spacings of the cameras with spacings of wells and optical elements in a well plate. The imaging system and the well plate can be configured so that a spacing between two cameras of the multiple cameras is a multiple of half a spacing or a spacing between two wells of the well plate.

For example, a first camera can be configured for imaging a top or bottom view of a well and a second camera can be configured for imaging a side view of the well. In this case, the spacing between the first and second cameras is half a spacing between two adjacent wells. In other words, a distance between any two cameras is a multiple of the half spacing between two adjacent wells.

Alternatively, a first camera can be configured for imaging a top or bottom view and a side view of a well. In this case, each camera is configured to image a well, or the spacing between two adjacent cameras is equal to a spacing between two adjacent wells. In other words, a distance between any two cameras is a multiple of the spacing between two adjacent wells.

Matching of Illumination Sources and Wells

The high throughput of the multiple camera imaging system can also be achieved using a matching of the illumination sources of the imaging system with the wells and optical elements in a well plate.

For well plate equal to or smaller than the imaging system, top or bottom view and side view of each well of a well plate are illuminated by one or more illumination sources of the imaging system. The imaging system and the well plate can be configured so that top or bottom view and side view of each well of a well plate are in the illumination area of one or more illumination sources of the imaging system. The illumination arrays and the well plate can be configured so that each well and an optical element adjacent to the each well are in an illumination of one or more illumination sources of the illumination arrays. This configuration can ensure than there is no wasting of well, e.g., there is no well without an illumination source to illuminate the well.

For well plate equal to or larger than the imaging system, then each illumination source of the imaging system is configured to illuminate at least a top or bottom view or a side view of a well of the well plate. The imaging system and the well plate can be configured so that the illumination area of each illumination source covers at least the top or bottom view or the side view of a well of a well plate. The illumination arrays and the well plate can be configured so that each illumination source of the illumination arrays is configured to provide illumination to at least a well or an optical element adjacent to the well. This configuration can ensure than there is no wasting of illumination source, e.g., there is no illumination source without a well to illuminate.

The high throughput of the multiple camera imaging system can also be achieved using a matching of spacings of the illumination sources with spacings of wells and optical elements in a well plate. The imaging system and the well plate can be configured so that a spacing between two illumination sources of the multiple cameras is a multiple of half a spacing between two wells of the well plate.

For example, a first illumination source can be configured for illuminating a top or bottom view of a well and a second illumination source can be configured for illuminating a side view of the well. In this case, the spacing between the first and second illumination sources is half a spacing between two adjacent wells. In other words, a distance between any two illumination sources is a multiple of the half spacing between two adjacent wells.

The imaging system further includes a controller configured to process image data from the images captured by the multiple cameras.

The imaging system optionally includes camera filters for some of the multiple cameras and illumination filters for some of the multiple illumination sources, with the camera filters configured to allow the cameras to captured fluorescence signals and the illumination filters configured to provide fluorescence excitation signals to the sample.

FIG. 6B shows an operation of the imaging system with the well plate.

Operation 410 provides irradiation to wells of a well plate.

Operation 411 captures top view images from the wells and side view images from optical elements adjacent to the wells.

Operation 412 provides irradiation to the optical elements adjacent to the wells.

Operation 413 captures top view images from the wells and side view images from optical elements adjacent to the wells.

Configurations for a Multiple Camera Subassembly for a Multiple Camera Imaging System In some embodiments, the cameras can include micro-camera packages, which can include multiple camera sensors and optical components assembled on a board, such as on a Printed Circuit Board (PCB). The micro camera can be capable of focusing onto the surface of the item or sample independently, to enable detection of in-focus image information across non-planar, curved surfaces without requiring any sample or imaging system motion subsystems, such as without requiring a sample stage or imaging system stage.

The multiple camera imaging system with the micro camera array can be capable of acquiring gigapixels of high-resolution image data per second, such as less than 20 micrometer resolution, and down to 0.5 micrometer resolution, and capturing this image data over a large field of view (10's of centimeters in diameter), without requiring movement of the object or the camera.

The micro-camera array can include multiple digital image sensors, each with an associated imaging lens system. Each micro-camera can form and capture an image of a portion of the sample. The set of all micro-cameras forms the camera subsystem of the multiple camera imaging system.

The image created by the micro-camera array does not have to be contiguous or obtained from a single imaged plane. In fact, for objects with a known thickness profile, or for well plates with samples staying at different depths, it may be advantageous to align the lenses to different planes of focus. The lenses and sensors may also be positioned at different angles to focus in on the object at the desired angle.

The individual micro cameras can be independently focused. For example, each micro-camera within the array can utilize a refocusing element on the image sensor plane, which can move the image sensor by a small amount (<3 mm) to bring different image planes into focus. In addition, a refocusable lens element can be used to provide a similar functionality. And further, multiple acquisitions of the sample can be taken, each with slightly different imaging parameters, such as different illumination settings. Example samples that will require such refocusing include biological specimens in well plates located at various heights, or curved surfaces that require inspection, or volumes of liquid containing the specimens of interest.

After the acquisition of the images by the cameras, the acquired image data can be processed on-line or off-line. In an on-line configuration, the inspection subsystem would analyze the acquired images and extract relevant features while discarding extraneous information and thereby reducing the amount of necessary storage space. In an off-line configuration, the raw data would be stored on a server for detailed analysis at a later time.

FIGS. 7A-7B illustrate a schematic of multiple cameras assembled on a PCB board according to some embodiments. In some embodiments, the present invention discloses methods and systems to capture microscopy images from multiple image sensors and relay them to one or more central processing units with high frame rates. The method involves preprocessing the image data from the image sensors to reduce the sizes of the captured images, before sending to a central processing station for analysis. Using multiple image sensors and an image reduction process, large image frames of over 20 megapixels and up to 1 gigapixel and high frame rates of 30 or more to up to hundreds or thousands of frames per second can be obtained.

In some embodiments, the methods can offer a system, such as microscope system, with the ability to select desired final image pixel count and desired frame rate for a large frame captured by multiple cameras. The microscope system can also include fast data transfer, which includes parallel data transfer from the cameras, organizing data into data packets having the size of a partial image frame, selecting data transfer interfaces for matching bandwidths, and direct memory access for sending image data directly to the memory of the central processing station.

FIG. 7A shows a schematic of a multiple camera imaging system, including multiple cameras 110 coupled to a parallel to serial device 110D, such as an FPGA, which is coupled to a processor 141A (or controller, which are used interchangeably in the specification). The FPGA is configured to converting parallel image data streams 110D from the cameras 110 to a serial data image stream 141D to the processor 141A.

In some embodiments, the cameras can include micro-camera packages, which can include multiple camera sensors and optical components assembled on a board 110C, such as on a Printed Circuit Board (PCB). The outputs from the camera board are coupled to an intermediate device before reaching the processor 141A. The intermediate device can include multiple camera pre-processors coupled to a parallel to serial conversion component.

In operation, the processor can process the image data from the cameras in sequence, e.g., one after the other. The detected objects can be subjected to an across camera analysis to merge objects and to remove duplicated objects across the cameras. The objects can be analyzed, such as motion tracking and object analysis.

The image data from the cameras 110 are sent in parallel to the FPGA 110D, which performs a parallel to serial conversion. The serial data stream is then sent to the processor, e.g., to a memory of the processor, for analysis, including extracting and analyzing side view data of samples, for example, in response to an excitation, such as an effect of a developed drug, or a noise or light.

FIG. 7B shows a flow chart for forming an imaging system configured for simultaneously providing top or bottom views and side views of samples in wells of a well plate.

Operation 420 forms an imaging system. The imaging system includes a camera array including multiple cameras configured to capture images of the samples. The camera array includes the multiple cameras disposed on a PCB board.

The imaging system further includes one or more illumination arrays with each illumination array including multiple illumination sources configured to provide irradiation to the well plate.

The imaging system further includes a controller configured to control the multiple illumination sources for illuminating the samples.

The controller is configured to control the multiple cameras on the PCB board to capture images of the sample under illumination provided by the one or more illumination arrays. The controller is configured to process image data from the images captured by the multiple cameras Configurations for Camera and Illumination Source Subassemblies for a Multiple Camera Imaging System In some embodiments, the present invention discloses a multiple camera imaging system, e.g., an imaging system having multiple cameras arranged in an array such as on a PCB board. The imaging system, when using with a well plate offering side view images, can provide simultaneously top view and side view of the samples in wells of the well plate.

In the specification, the terms "top view" and "side view" can be used to show two faces of a well, which are not restricted to top and side faces, since the top view implies that the cameras are located at a top of the well plate. Other two faces of the well can be included, such as the two faces can be a bottom view and a side view, which implies that the cameras are located at a bottom of the well plate. Thus, the term "top view and side view" implies the views two faces of the well, which can be "bottom view and side view".

Thus, the term "top view and side view" can be used interchangeably with the term "bottom view and side view", or the term "top or bottom view and side view", to reflect the idea of viewing two faces of a well. The cameras can be positioned on top of the well plate, or can be positioned at a bottom side of the well plate. The cameras can also be positioned at a side of the well plate, or at any orientation with respect to the well plate.

Figures 8A, 8B:
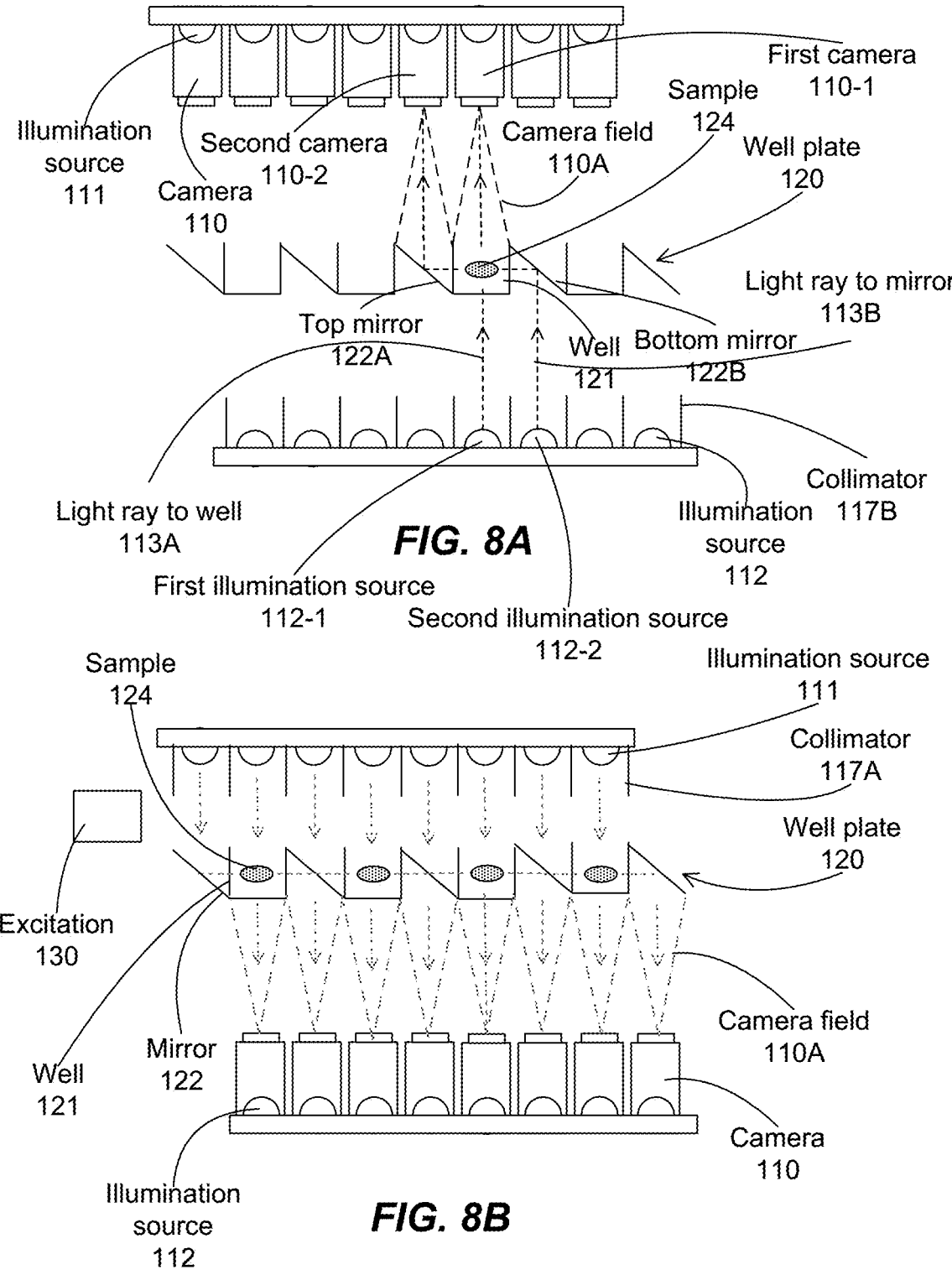
FIGS. 8A-8B illustrate relative positions of cameras and illumination sources according to some embodiments.

FIGS. 8A-8B illustrate relative positions of cameras and illumination sources according to some embodiments. FIG. 8A shows an imaging system with the cameras 110 positioned above the well plate 120. The well plate 120 can include multiple wells, with each well 121 disposed between a top optical element such as a top mirror 122A and a bottom optical element such as a bottom mirror 122B. The top and bottom mirrors are configured to provide light to two opposite sides of the well, from the top side and the bottom side, respectively. For example, the top mirror 122A is configured to provide optical paths between a top side, e.g., a top camera or a top illumination source, and a left side of the well. The bottom mirror 122B is configured to provide optical paths between a bottom side, e.g., a bottom illumination source, and a right side of the well. The left or right side of the well is relative, and could be the right or left side if the well plate is rotated 180 degrees.

As shown, a first camera 110-1 is positioned above a well 121 and configured to view a top of the well, e.g., to have a field of view 110A limited to the top surface of the well to capture top view images of the well or of the sample 124 in the well. A second camera 110-2 is positioned above a top mirror 122A adjacent to the well and configured to view a side of the well, e.g., to have a field of view limited to the top surface of the mirror to capture side view images of the well or of the sample in the well.

The imaging system can include top and bottom illumination arrays. The top illumination array includes illumination sources 111 disposed at a same side as the cameras 110, e.g., above the well plate. The bottom illumination array includes illumination sources 112 disposed at an opposite side of the cameras 110 with respect to the well plate, e.g., below the well plate.

In some embodiments, the illumination sources can be restricted, e.g., to have a limited illumination area. For example, a first illumination source 112-1 disposed under a well 121 can be limited to illuminate the bottom side of the well. A second illumination source 112-2 disposed under a bottom mirror 122B can be limited to illuminate the bottom side of the mirror. Collimators 117A and 117B can be used to limit the illumination areas. Other configurations for the illumination areas can be used, such as an illumination source without any restriction, and can be used to illuminate the whole well plate. Alternatively, an illumination source can be limited to a line of beam or a thin sheet of beam. The thin sheet of light beam can be useful for fluorescence excitation. For example, if the light sheet is thin, the light sheet only excites fluorescence within some particular planes, and not elsewhere. This limited excitation can help to minimize background fluorescence created in out-of-focus planes.

As shown, the first illumination source 112-1 can provide light ray 113A to a bottom of well 121. For transparent samples, the first camera 110-1 can capture bright field top view images of the sample 124, while the second camera 110-2 can capture dark field side view images of the sample 124 at a same time.

The second illumination source 112-2 can provide light ray 113B to a bottom mirror 122B, which redirects the light ray to a side of the well, e.g., the right side as shown. For transparent samples, the first camera 110-1 can capture dark field top view images of the sample 124, while the second camera 110-2 can capture bright field side view images of the sample at a same time.

FIG. 8B shows an alternate configuration of an imaging system with the cameras 110 positioned below the well plate 120. A camera 110 is positioned below a well plate 120 and configured to view a bottom of the well, e.g., to have a field of view 110A limited to the bottom surface of the well to capture bottom view images of the well or of the sample in the well. An adjacent camera is positioned below a bottom mirror adjacent to the well and configured to view a side of the well, e.g., to have a field of view limited to the bottom surface of the mirror to capture side view images of the well or of the sample in the well.

The imaging system can include top and bottom illumination arrays. The top illumination array includes illumination sources 111 disposed at an opposite side of the cameras with respect to the well plate, e.g., above the well plate. The bottom illumination array includes illumination sources 112 disposed at a same side as the cameras with respect to the well plate, e.g., below the well plate. An optional excitation source 130 can be used to provide excitation to the samples in the wells.

In the specification, imaging a top view of a well is considered as having a camera above the well. The specification is not so limited, since top and bottom are relative. Thus, imaging a top view of a well can also be considered as imaging a bottom view of the well with a camera below the well. Thus, a top view of a well or a top area of the well can also be considered as a bottom view of a well or a bottom area of the well.

FIGS. 9A-9F illustrate illumination sources at an opposite side or at a same side of cameras according to some embodiments. Regardless of the orientation of the cameras relative to the well plate, the imaging system can include one or more illumination arrays for illuminating the samples in the well plate. The illumination arrays can include a top illumination array having illumination sources above the well plate. The illumination arrays can include a bottom illumination array having illumination sources below the well plate. The illumination arrays can include top and bottom illumination arrays having illumination sources above and below the well plate. The illumination arrays can include other illumination arrays oriented at different orientations relative to the well plate, such as a side illumination array having illumination sources at a side of the well plate.

Figures 9A, 9B, 9C, 9D, 9E, 9F:
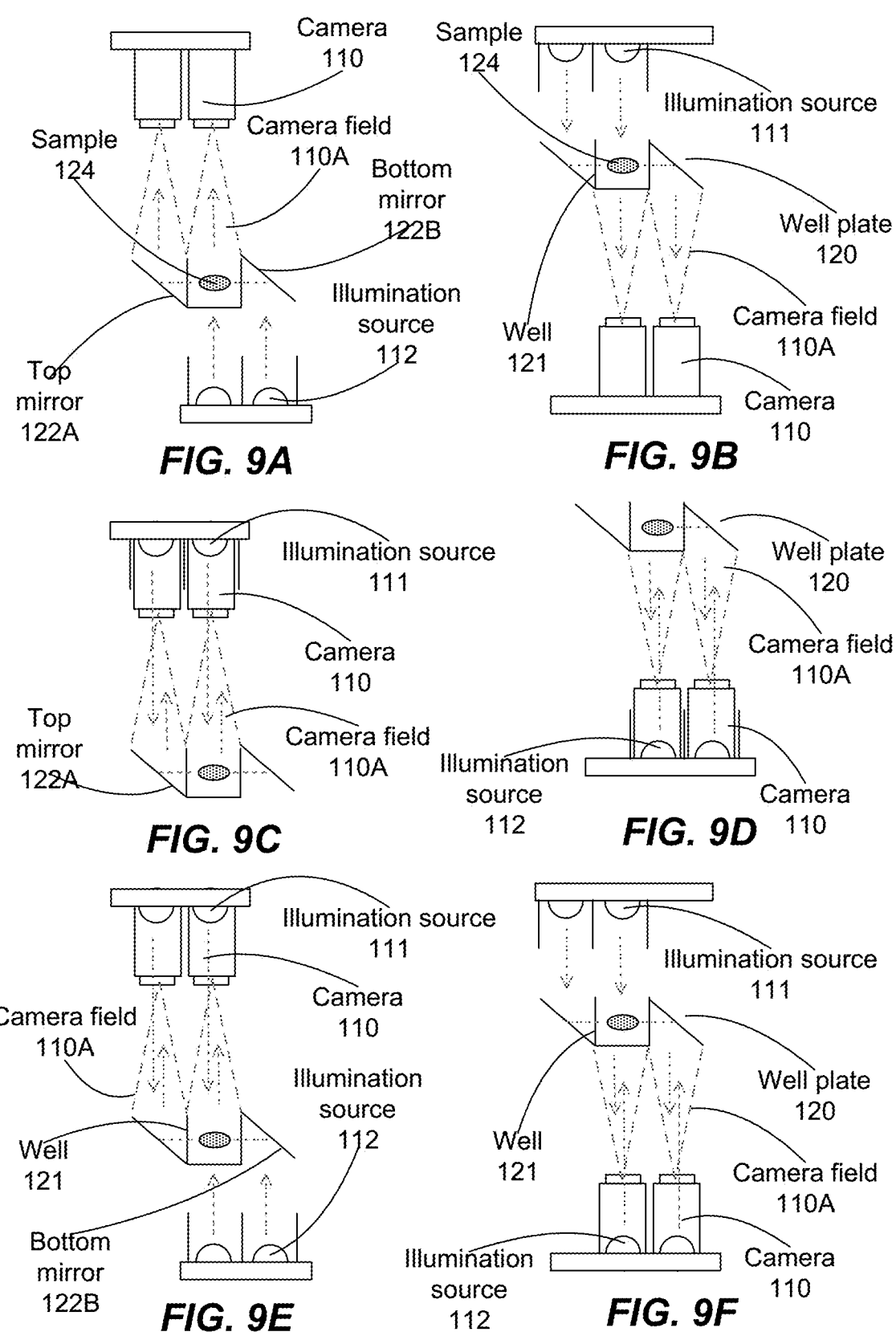
FIGS. 9A-9F illustrate illumination sources at an opposite side or at a same side of cameras according to some embodiments.

FIG. 9A shows a portion of an imaging system, with two top cameras 110 and two illumination sources 112 in a bottom illumination array, configured to provide top and side view for a well plate 120 having a well 121 disposed between a top mirror 122A (at left) and a bottom mirror 122B (at right). The cameras are configured to have a field of view 110A limited to the well for top view images of a sample 124 or to a top mirror for side view images of the sample. The illumination sources are configured to illuminate the bottom of the well and the bottom of the bottom mirror. With the illumination sources disposed in opposite side of the cameras with respect to the sample, the cameras are configured for transparent samples.

FIG. 9B shows a portion of another imaging system, with two bottom cameras 110 and two illumination sources 111 in a top illumination array, configured to provide bottom and side view for a well plate 120 having a well 121 disposed between a top mirror (at left) and a bottom mirror (at right). The cameras are configured to have a field of view 110A limited to the well for bottom view images of a sample 124 or to a bottom mirror for side view images of the sample. The illumination sources are configured to illuminate the top of the well and the top of the top mirror. With the illumination sources disposed in opposite side of the cameras with respect to the sample, the cameras are configured for transparent samples.

FIG. 9C shows a portion of another imaging system, with two top cameras 110 and two illumination sources 111 in a top illumination array, configured to provide top and side view for a well plate 120 having a well 121 disposed between a top mirror (at left) and a bottom mirror (at right). The cameras are configured to have a field of view 110A limited to the well for top view images of a sample 124 or to a top mirror for side view images of the sample. The illumination sources are configured to illuminate the top of the well and the top of the top mirror. With the illumination sources disposed in a same side as the cameras with respect to the sample, the cameras are configured for non-transparent samples.

FIG. 9D shows a portion of another imaging system, with two bottom cameras 110 and two illumination sources 112 in a bottom illumination array, configured to provide bottom and side view for a well plate 120 having a well 121 disposed between a top mirror (at left) and a bottom mirror (at right). The cameras are configured to have a field of view 110A limited to the well for bottom view images of a sample 124 or to a bottom mirror for side view images of the sample. The illumination sources are configured to illuminate the bottom of the well and the bottom of the bottom mirror. With the illumination sources disposed in a same side as the cameras with respect to the sample, the cameras are configured for non-transparent samples.

FIG. 9E shows a portion of another imaging system, with two top cameras 110, two top illumination sources 111 in atop illumination array, and two bottom illumination sources 112 in a bottom illumination array, configured to provide top and side view for a well plate 120 having a well 121 disposed between a top mirror (at left) and a bottom mirror (at right). The cameras are configured to have a field of view 110A limited to the well for top view images of a sample or to a top mirror for side view images of the sample. The top illumination sources 111 are configured to illuminate the top of the well and the top of the top mirror. The bottom illumination sources 112 are configured to illuminate the bottom of the well and the bottom of the bottom mirror. With the illumination sources disposed in both sides of the cameras with respect to the sample, the cameras are configured for transparent and non-transparent samples, based on the illumination patterns using the top or bottom illumination sources.

FIG. 9F shows a portion of another imaging system, with two bottom cameras 110, two top illumination sources 111 in atop illumination array, and two bottom illumination sources 112 in a bottom illumination array, configured to provide bottom and side view for a well plate 120 having a well 121 disposed between a top mirror (at left) and a bottom mirror (at right). The cameras are configured to have a field of view 110A limited to the well for bottom view images of a sample or to a bottom mirror for side view images of the sample. The top illumination sources 111 are configured to illuminate the top of the well and the top of the top mirror. The bottom illumination sources 112 are configured to illuminate the bottom of the well and the bottom of the bottom mirror. With the illumination sources disposed in both sides of the cameras with respect to the sample, the cameras are configured for transparent and non-transparent samples, based on the illumination patterns using the top or bottom illumination sources.

FIGS. 10A-10E illustrate illumination sources for irradiation covering of broad, narrow, or lines of beam according to some embodiments. The illumination sources in the imaging system are configured to illuminate the samples in wells of a well plate. The illumination sources can also be configured to provide excitation to the samples, for example, fluorescence excitation. Thus, the illumination sources can be configured to provide a broad coverage of the whole well plate, a portion of the well plate, a well or a mirror, or a line or plane of light beam to a well or to a mirror, depending on the applications.

Figures 10A, 10B, 10C, 10D, 10E:
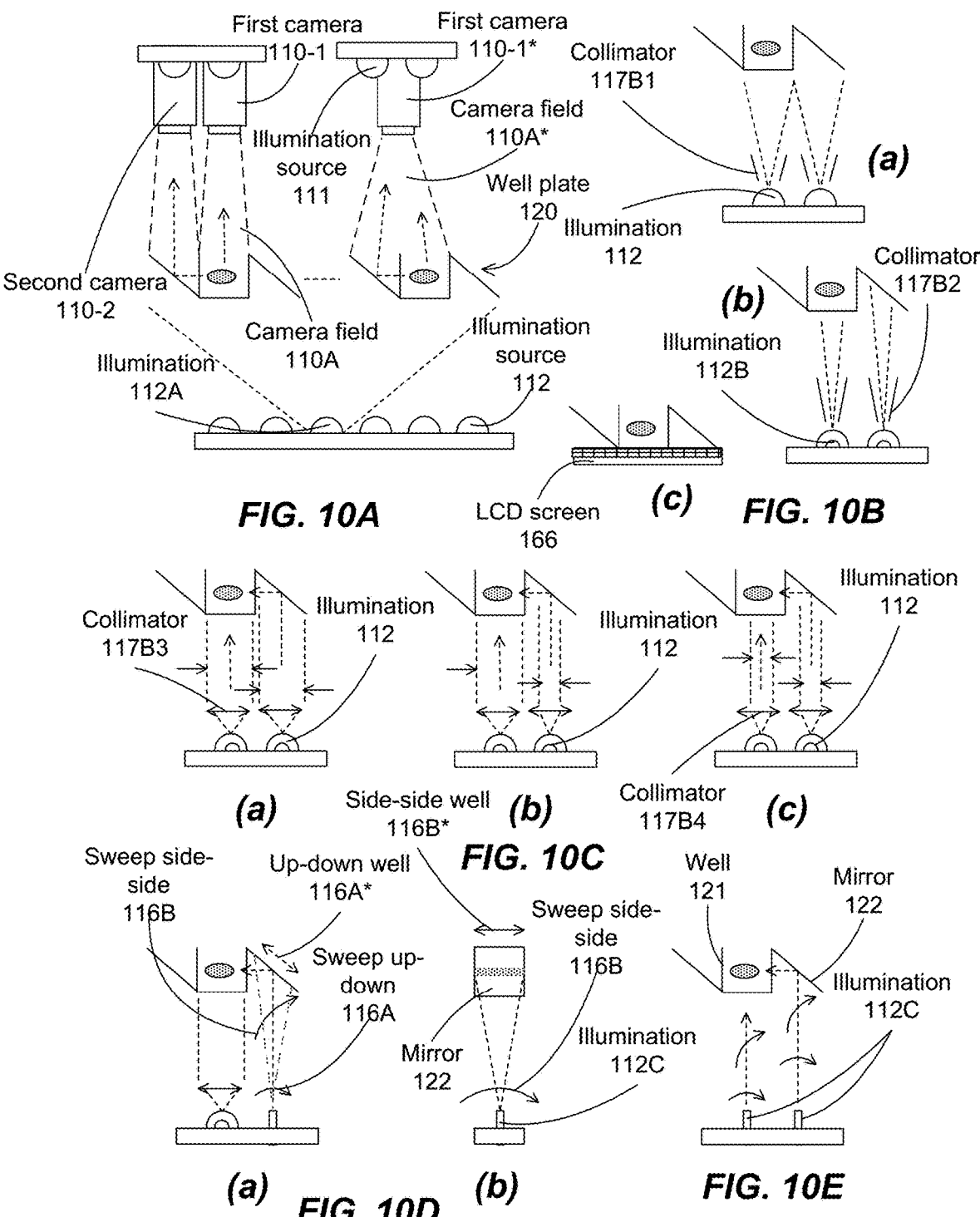
FIGS. 10A-10E illustrate illumination sources for irradiation covering of broad, narrow, or lines of beam according to some embodiments.

FIG. 10A shows a configuration of an imaging system having a camera array. There are two configurations for the cameras. A first camera configuration includes a first camera 110-1 positioned above a well and configured to view a top of the well, e.g., to have a field of view 110A limited to the top surface of the well to capture top view images of the well or of the sample in the well. A second camera 110-2 is positioned above a top mirror adjacent to the well and configured to view a side of the well, e.g., to have a field of view limited to the top surface of the mirror to capture side view images of the well or of the sample in the well.

A second camera configuration includes a first camera 110-1* positioned above a well and a top mirror adjacent to the well. The first camera 110-1* is configured to view atop of the well and a side of the well, e.g., to have a field of view 110A* covering the top surface of the well and the top surface of the mirror, to capture top view images of the well together with the side view images of the well. In general, the cameras of a camera array of an imaging system can be configured in the first camera configuration or in the second camera configuration.

The imaging system also has illumination sources 111 in a top illumination array and illumination sources 112 in a bottom illumination array, with the illumination sources configured to provide illumination to top side, bottom side, and sides of wells in a well plate 120.

The illumination sources are configured to illuminate the top of the well and the top of the top mirror (by illumination sources 111) and the bottom of the well and the bottom of the bottom mirror (by illumination 112). With the illumination sources disposed in both sides of the sample, the cameras are configured for transparent and non-transparent samples.

As shown, the illumination sources can include a global illumination source 112A, which can be configured to illuminate the whole well plate, e.g., multiple wells and bottom mirrors of the well plate.

FIGS. 10B(a)-10B(c) show configurations of an imaging system having different configurations of illumination sources. The illumination sources 112 in a bottom illumination array can be provided with collimators 117B1, to limit the illumination to the bottom area of the well or the bottom mirror (FIG. 10B(a)). The illumination sources 112B in a bottom illumination array can be a narrow illumination source, which is provided with collimators 117B2 to limit the illumination to a portion of the bottom area of the well or to a portion of the bottom mirror (FIG. 10B(b)).

FIG. 10B(c) shows a configuration of the illumination array being a monitor display, such as a LCD display, a plasma display, or an OLED display. The well plate can be placed directly on the display, or can have a space between the well plate and the display. The display can be controlled by a controller to generate an illumination pattern suitable for illuminating the well plate, such as illuminating all the wells, or illuminating all the bottom mirrors.

For example, all or some of the wells of the well plate can be illuminated, for example, from a bottom of the well plate, by the bottom illumination array having multiple bottom illumination sources or a display. All or some cameras of the camera array can by turned on, for example, by the controller, to capture bright field top view images from the top of the wells and to capture dark field side view images from the sides of the wells through the top mirrors adjacent to the wells. Then, all or some of the bottom mirrors of the well plate can be illuminated, for example, from a bottom of the well plate, by the bottom illumination array having multiple bottom illumination sources or a display. All or some cameras of the camera array can by turned on, for example, by the controller, to capture dark field top view images from the top of the wells and to capture bright field side view images from the sides of the wells through the top mirrors adjacent to the wells.

FIG. 10C(a)-10C(c) show different configurations of the illumination sources. In FIG. 10C(a), illumination sources 112 can be point sources, which are coupled with collimators 117B3, which can be concave lenses, to provide parallel light beams to whole areas of the bottom of the well and the bottom of the bottom mirror. In FIG. 10C(b), illumination sources 112 can be point sources, which are coupled with concave lens collimators to provide parallel light beams to a whole area of the bottom of the well and to a portion of an area of the bottom of the bottom mirror. In FIG. 10C(c), illumination sources 112 can be point sources, which are coupled with concave lens collimators to provide parallel light beams to portions of areas of the bottom of the well and the bottom of the bottom mirror.

FIGS. 10D(a) and 10D(b) show a configuration in which some illumination source are point source, and some illumination sources are coherent light sources 112C such as laser beams. An illumination source 112 can be a point source, which are coupled with concave lens collimators to provide parallel light beams to a whole area of the bottom of the well. An illumination source 112C can be a coherent light source, which can sweep up-and-down 116A to form a line up-down 116A* of a well, and side-to-side 116B to form a line side-side 116B* of a well. The combination of the sweep up-down and side-side can generate a sheet of light with a thickness for the side of the well. The sheet of line can be used for fluorescence excitation of a sample in the well with less fluorescence background.

FIG. 10E shows a configuration in which the illumination sources are coherent light sources 112C such as laser beams. The coherent light sources can sweep up-and-down and side-to-side to the bottom of a well and to the bottom of a bottom mirror.

Other configurations can be used. For example, a collimated point source can be used instead of a coherent light source such as a laser.

FIG. 11 illustrates a flow chart for forming illustration sources in a multiple camera imaging system according to some embodiments. Operation 430 forms an imaging system for simultaneously providing top or bottom views and side views of samples in wells of a well plate.

The imaging system includes a camera array including multiple cameras. The camera array is disposed above or below the well plate. The imaging system further includes one or more illumination arrays with each illumination array including multiple illumination sources.

The one or more illumination arrays include a first illumination array disposed on an opposite side of the camera array with respect to the well plate and configured for transparent or semitransparent samples.

The one or more illumination arrays include a second illumination array disposed on a same side as the camera array with respect to the well plate and configured for non-transparent samples.

At least an illumination source is configured to provide irradiation to multiple wells and optical elements of the well plate.

At least an illumination source is configured to provide collimated irradiation to a whole surface of one or more wells and/or one or more optical elements of the well plate.

At least an illumination source is configured to provide collimated irradiation to a partial surface of one or more wells and/or one or more optical elements of the well plate.

At least an illumination source is configured to provide parallel irradiation to a whole surface or a partial surface of one or more wells and/or one or more optical elements of the well plate.

At least an illumination source is configured to provide line of beam irradiation to one or more wells and/or one or more optical elements of the well plate.

The line of beam can be responsive to a determination of locations of the samples in the wells.

The imaging system further includes a controller configured to control the multiple cameras and the multiple illumination sources and to process image data from the images captured by the multiple cameras.

The controller is configured to control the multiple illumination sources for illuminate the samples.

The controller is configured to control the multiple cameras to capture images of the sample under illumination by the multiple illumination sources.

Configurations for a Well Plate for Use with a Multiple Camera Imaging System

In some embodiments, the well plate can include multiple wells with each well having two adjacent optical elements, with a first optical element having a top reflective surface configured to provide light path between a top area of the first optical element and a first side area of the well, and with a second optical element having a bottom reflective surface configured to provide light path between a bottom area of the second optical element and a second side area of the well.

The well plate can include multiple wells with each well having a first optical element adjacent to a first side of the well and a second optical element adjacent to a second side of the well. The first optical element is configured to have a top reflective surface configured to provide light path between an area above the well plate or above the first optical element and the first side area of the well. The second optical element is configured to have a bottom reflective surface configured to provide light path between an area below the well plate or below the second optical element and a second side area of the well.

In some embodiments, the first and second optical elements of two adjacent wells in a well plate can be combined or disposed on top of each other. For example, a prism can be disposed between two adjacent wells and can be configured to provide both top and bottom reflective surfaces. Alternatively, two mirrors can be placed on top of each other with the reflective surfaces facing outward to provide a top reflective surface for the top mirror and a bottom reflective surface for the bottom mirror. Alternatively, a mirror with two reflective surfaces can be used.

Figures 12A, 12B, 12C, 12D:
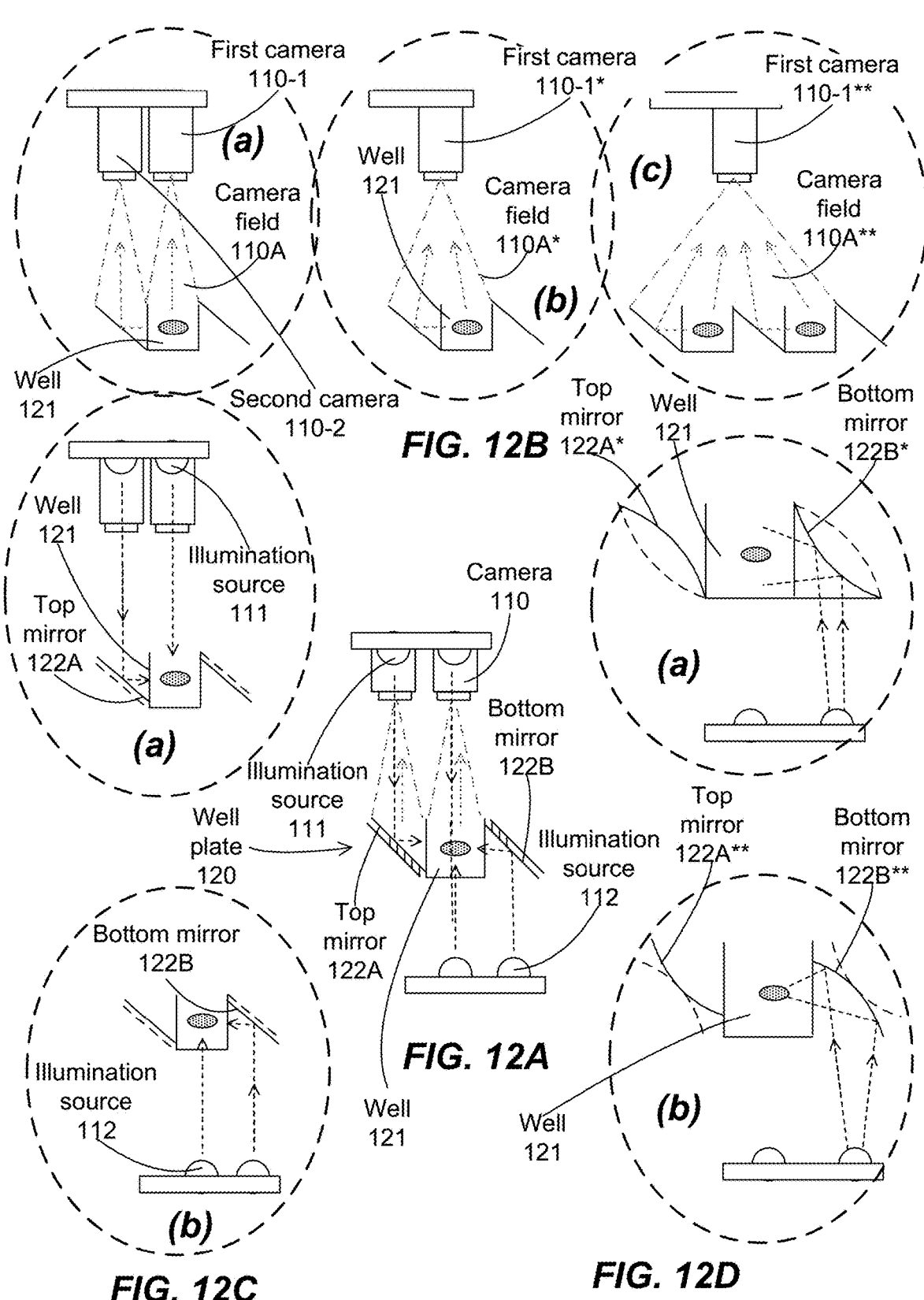
FIGS. 12A-12D illustrate camera fields of view and mirror configurations for well plates for a multiple camera imaging system according to some embodiments.

FIGS. 12A-12D illustrate camera fields of view and mirror configurations for well plates for a multiple camera imaging system according to some embodiments. FIG. 12A shows a portion of an imaging system, with two top cameras 110, and two illumination sources 111 in a top illumination array, and two illumination sources 112 in a bottom illumination array. The imaging system is configured to provide top and side view for wells 121 in a well plate 120. The well 121 is disposed between a top mirror 122A (at left) and a bottom mirror 122B (at right), e.g., the top mirror is configured to provide a top reflective surface and the bottom mirror is configured to provide a bottom reflective surface.

A bottom mirror for an adjacent well (not show, to the left of the well 121) is shown, placed under the top mirror 122A. Atop mirror for another adjacent well (not show, to the right of the well 121) is shown, placed on top of the bottom mirror 122B. Thus, the top and bottom mirrors for two adjacent wells are combined on top of each other to form a mirror assembly having a top reflective surface and a bottom reflective surface.

The two cameras as shown are configured to have a field of view limited to the well for top view images of a sample for a camera (the right camera) or to a top mirror for side view images of the sample for another camera (the left camera). The top illumination sources 111 are configured to illuminate the top of the well and the top of the top mirror. The bottom illumination sources 112 are configured to illuminate the bottom of the well and the bottom of the bottom mirror.

FIGS. 12B(a)-12B(c) show different camera configurations. In FIG. 12B(a), two cameras 110-1 and 110-2 as shown are configured to have a field of view 110A limited to the well for top view images of a sample for a camera (camera 110-1) or to atop mirror for side view images of the sample for another camera (camera 110-2). In FIG. 12B(b), a camera 110-1\* as shown is configured to have a field of view 110A\* covering the well and the top mirror, for top view images and also for side view images of the sample. In FIG. 12B(c), a camera **110-1\*\* as shown is configured to have a field of view 110A\*\*** covering two wells and two top mirrors, for top view images and for side view images of the two wells.

FIGS. 12C(a) and 12C(b) show configurations for top and bottom illumination, respectively. In FIG. 12C(a), a top illumination source disposed above the well 121 can provide illumination to the top of the well. Top view images of the well and side view images of the well can be captured by the two adjacent cameras. Another top illumination source disposed above the top mirror 122A can provide illumination to the side of the well. Top view images of the well and side view images of the well can be captured by the two adjacent cameras. The configuration can be used for top and side view imaging of non-transparent samples, in the case of cameras having field of view 110A.

In FIG. 12C(b), a bottom illumination source disposed below the well 121 can provide illumination to the bottom of the well. Bottom view images of the well and side view images of the well can be captured by two adjacent cameras. Another bottom illumination source disposed below the bottom mirror 122B can provide illumination to the side of the well. Bottom view images of the well and side view images of the well can be captured by two adjacent cameras. The configuration can be used for top and side view imaging of transparent samples, in the case of cameras having field of view 110A.

FIGS. 12D(a) and 12D(b) show configurations for concave and convex curve mirrors, respectively. In FIG. 12D(a), the well 121 is disposed between a top convex mirror 122A\* (at left) and a bottom convex mirror 122B\* (at right), e.g., the top convex mirror is configured to provide a top convex reflective surface and the bottom convex mirror is configured to provide a bottom convex reflective surface. A bottom convex mirror (in dashed line) for an adjacent well (not show, to the left of the well 121) is shown, placed under the top convex mirror 122A\*. A top convex mirror (in dashed line) for another adjacent well (not show, to the right of the well 121) is shown, placed on top of the bottom convex mirror 122B\*. Thus, the top and bottom convex mirrors for two adjacent wells are combined on top of each other to form a convex mirror assembly having a top convex reflective surface and a bottom convex reflective surface. The convex reflective surfaces are configured to enlarge a light beam, such as to illuminate a large surface area of the well from a point illumination source.

In FIG. 12D(b), the well 121 is disposed between a top concave mirror **122A\*\* (at left) and a bottom concave mirror 122B\*\* (at right), e.g., the top concave mirror is configured to provide a top concave reflective surface and the bottom concave mirror is configured to provide a bottom concave reflective surface. A bottom concave mirror (in dashed line) for an adjacent well (not show, to the left of the well 121) is shown, placed under the top concave mirror 122A\*\*. A top concave mirror (in dashed line) for another adjacent well (not show, to the right of the well 121) is shown, placed on top of the bottom concave mirror 122B\*\***. Thus, the top and bottom concave mirrors for two adjacent wells are combined on top of each other to form a concave mirror assembly having a top concave reflective surface and a bottom concave reflective surface. The concave reflective surfaces are configured to focus a light beam, such as to illuminate a small surface area of the well from an illumination source.

Figures 13A, 13B:
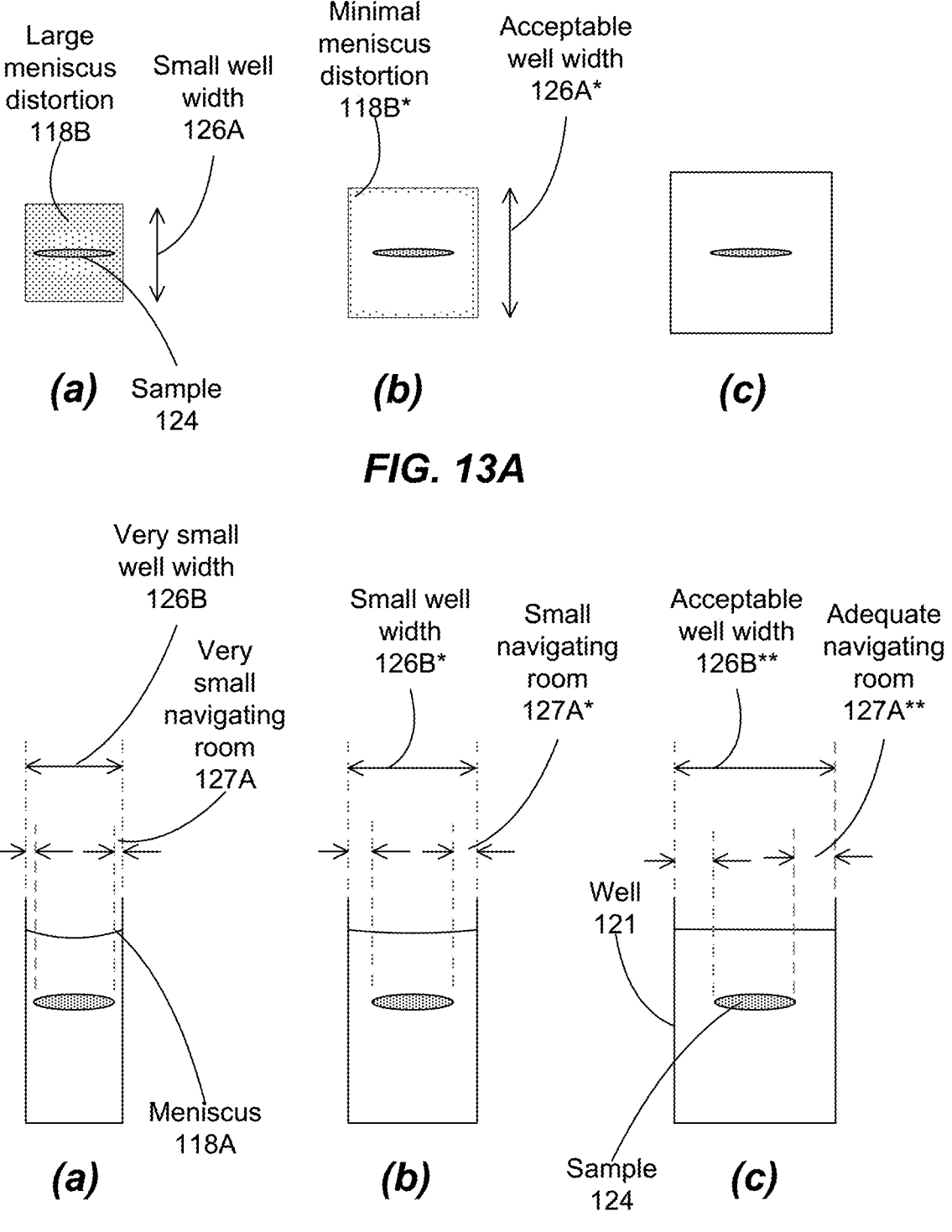
FIGS. 13A-13B illustrate size considerations for wells in a well plate according to some embodiments.

FIGS. 13A-13B illustrate size considerations for wells in a well plate according to some embodiments. The wells in a well plate can be optimized for better top view imaging, for example, by preventing distortion caused by meniscus surface or by prevent stresses on the organisms by providing a large enough well area.

FIGS. 13A(a)-13A(c) show an optimization process for a well size or a well dimension in a well plate to prevent distortion by meniscus effect, e.g., the curve in the upper surface of a liquid close to the surface of the well, which is produced by surface tension.

In FIG. 13A(a), the well dimension 126A is small, so that the meniscus surface 118B can be large, e.g., such as extended to reach the organism or sample. Thus, the top view images of the sample can be distorted due to the curve meniscus surface.

In FIG. 13A(b), the well dimension 126A\* is larger, so that the meniscus surface 118B\* can be small, e.g., such as being confined to a small area near the sides of the well, and does not reach the organism or sample. Thus, the top view images of the sample can be clear without distortion.

In FIG. 13A(c), the well dimension * is even larger, without any meniscus distortion. Thus, the well size or dimension is configured so that the meniscus distortion does not reach the sample, or there is a gap between the sample and the meniscus-affected area of the well. For example, a size of the well can be large enough so that a dimension of the well not affected by the meniscus surface is larger than a largest dimension of the organism. The effect of the meniscus can be determined by an angle of the meniscus surface to be larger than a predetermined value, such as 20 degrees, 25 degrees, 30 degrees, 35 degrees, 40 degrees, or 45 degrees. For example, the middle portion of the well having a meniscus liquid surface angle less than the predetermined value should be larger than a dimension or size of the organism.

FIGS. 13B(a)-13B(c) show an optimization process for a well size or a well dimension in a well plate to prevent stresses on the sample or organism due to not able to freely moving. An advantage of the imaging system with top and side view imaging using a well plate is the ability for a long term observation of samples or organisms without disturbing the samples. For example, the well plate can enable the observation of side view of zebra fish, which can move freely in the wells during the long term assaying process. Thus, the dimensions of the wells in the well plate should be large enough to allow the zebra fish to move freely, such as turning around, or swimming up and down in the wells.

In FIG. 13B(a), the well can have a very small width 126B, such as less than 20% larger than the zebra fish, e.g., the well width is less than 1.2 times the length of the zebra fish. Thus, the zebra fish can have a very small navigating room 127A, which can prevent the zebra fish from freely moving around.

In FIG. 13B(b), the well can have a small width 126B*, such as less than 40% or less than 50% larger than the zebra fish, e.g., the well width is less than 1.4 or less than 1.5 times the length of the zebra fish. Thus, the zebra fish can have a small navigating room 127A*, which can cause some difficulty to the zebra fish when moving around.

In FIG. 13B(c), the well can have an adequate width 126B, such as greater than 50%, greater than 60%, or greater than 70% of the zebra fish, e.g., the well width is greater than 1.5, greater than 1.6, or greater than 1.7 times the length of the zebra fish. Thus, the zebra fish can have an adequate navigating room 127A, which can allow the zebra fish to freely move around.

As such, a dimension of the well of a well plate can be greater than a predetermined size, such as greater than 1.5, greater than 1.55, greater than 1.6, greater than 1.65, or greater than 1.7 times the length of the sample or the greatest dimension of the sample.

FIG. 14 illustrates a flow chart for forming a well plate for a multiple camera imaging system according to some embodiments. Operation 440 forms an imaging system for simultaneously providing top or bottom views and side views of samples in wells of a well plate.

The imaging system includes a camera array including multiple cameras. The imaging system further includes one or more illumination arrays with each illumination array including multiple illumination sources configured to provide irradiation to the well plate.

The well plate includes at least a well disposed between two adjacent optical elements, which are configured to provide light to sides of the well. A first optical element of the two adjacent optical elements is configured to view of a first side of the at least a well by a first camera of the multiple cameras. The first optical element is also configured to provide an illumination to the first side from a first illumination source disposed on the same side of the camera array for non-transparent samples.

The two adjacent optical elements include a second optical element configured to provide an illumination to a second side of the at least a well from a second illumination source disposed on the opposite side of the camera array for imaging transparent samples from the first side.

The illumination provided by the first or second optical element to the first or second side, respectively, is configured for a whole side of the at least a well, or for a partial side of the at least a well, or for a line of beam to the side.

The wells are configured to provide the top views of the samples with minimum distortion, such as having a dimension not affected by a meniscus effect to be larger than a largest dimension of the sample. The effect of the meniscus can be determined by an angle of the meniscus surface to be larger than a predetermined value, such as 20 degrees, 25 degrees, 30 degrees, 35 degrees, 40 degrees, or 45 degrees.

The wells are configured to allow the sample to move with minimum restraint, such as having a dimension larger than a largest dimension of the sample by a predetermined factor, such as greater than 1.5, greater than 1.55, greater than 1.6, greater than 1.65, or greater than 1.7 times.

The imaging system further includes a controller configured to control the multiple cameras and the multiple illumination sources and to process image data from the images captured by the multiple cameras.

The controller is configured to control the multiple illumination sources for illuminate the samples.

The controller is configured to control the multiple cameras to capture images of the sample under illumination by the multiple illumination sources.

Configurations for Camera Fields of View for Wells of a Well Plate in a Multiple Camera Imaging System In some embodiments, the cameras in a multiple camera imaging system can be configured for viewing one view, such as a top (or bottom, depending on the location of the cameras relative to the well plate) view, or a side view of a well. Alternatively, the cameras can be configured for viewing multiple views, such as 2 views of a top (or bottom) view and a side view of a well. The cameras can be configured for viewing 4 views of 2 top (or bottom) views and 2 side views of 2 wells. The cameras can be configured for viewing 6 views of 3 top (or bottom) views and 3 side views of 3 wells. The cameras can be configured for viewing 8 views of 4 top (or bottom) views and 4 side views of 4 wells. Other numbers of views can be used, depending on a tradeoff between resolution and throughput. The higher the number of view, the higher the throughput of the imaging system, but with a lower resolution.

Figures 15A, 15B, 15C:
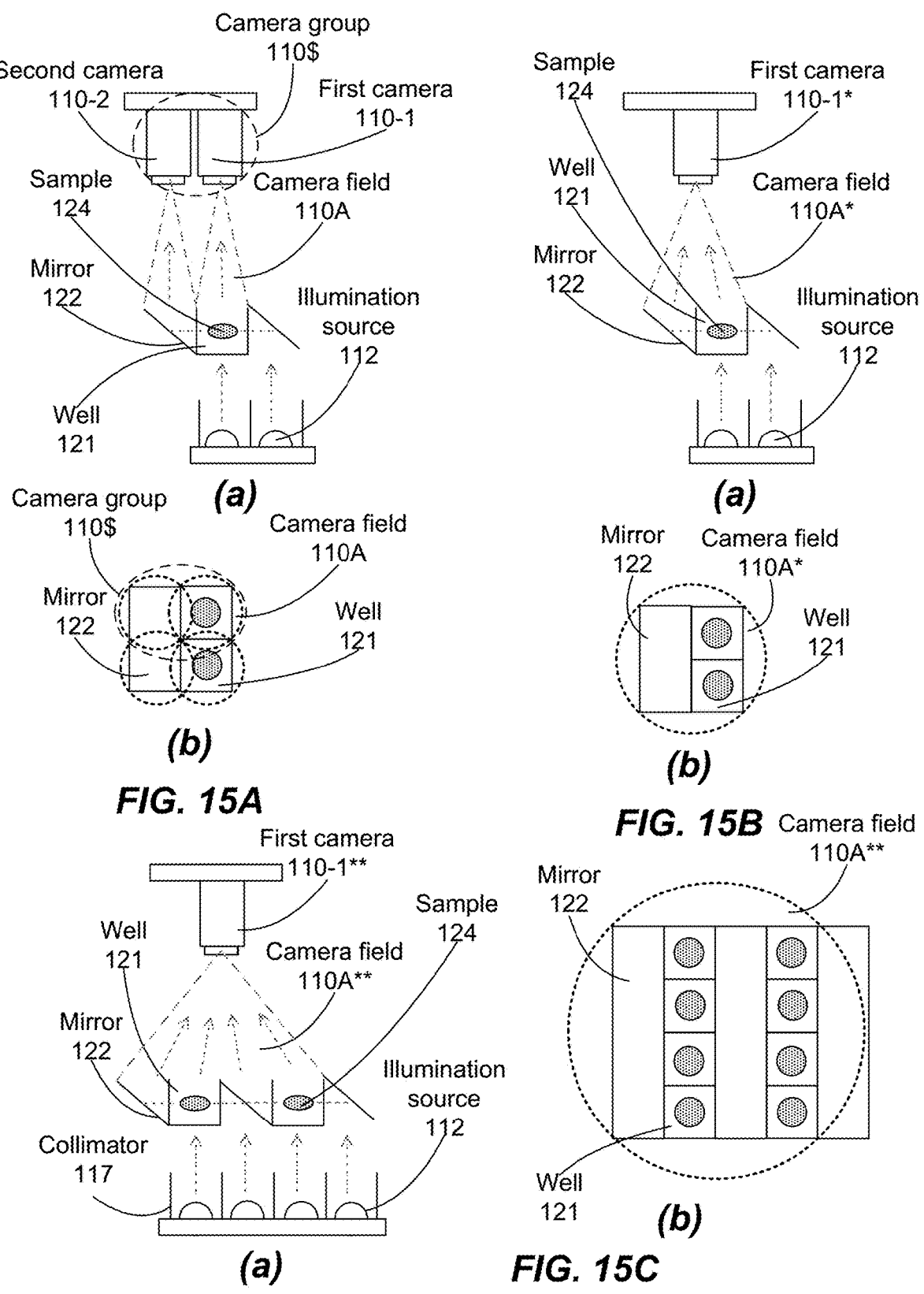
FIGS. 15A-15C illustrate fields of view for a camera viewing a well, a mirror, or multiple wells and mirrors according to some embodiments.

FIGS. 15A-15C illustrate fields of view for a camera viewing a well, a mirror, or multiple wells and mirrors according to some embodiments. FIGS. 15A(a) and 15A(b) show a configuration for each camera of a multiple camera imaging system to be configured for one view of a well, such as top view or a side view. For example, a first camera 110-1 can be configured for viewing a top view of a well 121, e.g., having a field of view 110A covering the top side of the well. A second camera 110-2 can be configured for viewing a side view of a well, through the mirror 122, e.g., having a field of view covering the top side of the mirror 122. The first and second cameras 110-1 and 110-2 can form a camera group 110$, with multiple camera groups forming the camera array of the multiple camera imaging system. The camera field 110A is shown as a circle, but can be any shape, such as a rectangle or a square, which is equal or slightly larger than the well top area or side area. The imaging system can include illumination sources 112 for illuminating the wells in the well plate, such as illuminating the bottom area of the well or the side area of the well through an adjacent optical element.

FIGS. 15B(a) and 15B(b) show a configuration for each camera of a multiple camera imaging system to be configured for 4 views of 2 wells, such as 2 top views and 2 side view of 2 wells. For example, a first camera 110-1* can be configured for viewing 2 top views of 2 wells together with 2 side views of the wells, through the mirrors. The first camera 110-1* can have a field of view 110A* covering the 2 top areas of the 2 wells and the 2 top areas of the 2 mirrors. The camera field 110A* is shown as a circle, but can be any shape, such as a rectangle or a square, which is equal or slightly larger than the top areas and side areas of 2 adjacent wells. The imaging system can include illumination sources 112 for illuminating the wells in the well plate, such as illuminating the bottom area of the wells or the side area of the wells through adjacent optical elements.

FIGS. 15C(a) and 15C(b) show a configuration for each camera of a multiple camera imaging system to be configured for 16 views of 8 wells, such as 8 top views and 8 side view of 8 wells. For example, a first camera **110-1\*\* can be configured for viewing 8 top views of 8 wells together with 8 side views of the wells, through the mirrors. The first camera 110-1\*\* can have a field of view 110A\*\* covering the 8 top areas of the 8 wells and the 8 top areas of the 8 mirrors. The camera field 110A\*\* is shown as a circle, but can be any shape, such as a rectangle or a square, which is equal or slightly larger than the top areas and side areas of 8 adjacent wells. The imaging system can include illumination sources 112 with collimator 117** for illuminating the wells in the well plate, such as illuminating the bottom area of the wells or the side area of the wells through adjacent optical elements.

FIG. 16 illustrates a flow chart for forming a multiple camera imaging system with different fields of view for the cameras according to some embodiments. Operation 450 forms an imaging system for simultaneously providing top or bottom views and side views of samples in wells of a well plate.

The imaging system includes a camera array including multiple cameras.

The imaging system further includes one or more illumination arrays with each illumination array including multiple illumination sources configured to provide irradiation to the well plate.

The well plate includes at least a well disposed between two adjacent optical elements.

A first optical element of the two adjacent optical elements is configured to view of a first side of the at least a well by a first camera of the multiple cameras.

A second optical element of the two adjacent optical elements is configured to provide an illumination to a second side of the at least a well from a second illumination source disposed on the opposite side of the camera array.

The multiple cameras and the well plate are configured so that the at least a well is positioned in a field of view of the first camera or of a second camera of the multiple cameras.

The multiple cameras and the well plate are configured so that the at least a well is positioned in a field of view of the second camera and the first optical element is positioned in a field of view of a third camera adjacent to the first camera.

The multiple cameras and the well plate are configured so that the at least a well, the first optical element, a second well adjacent to the at least a well, and an optical element adjacent to the second well are positioned in a field of view of the first camera.

The multiple cameras and the well plate are configured so that the field of view of the first camera covers 4 wells and 4 optical elements adjacent to the 4 wells.

The multiple cameras and the well plate are configured so that the field of view of the first camera covers 8 wells and 8 optical elements adjacent to the 8 wells.

Figures 17A, 17B:
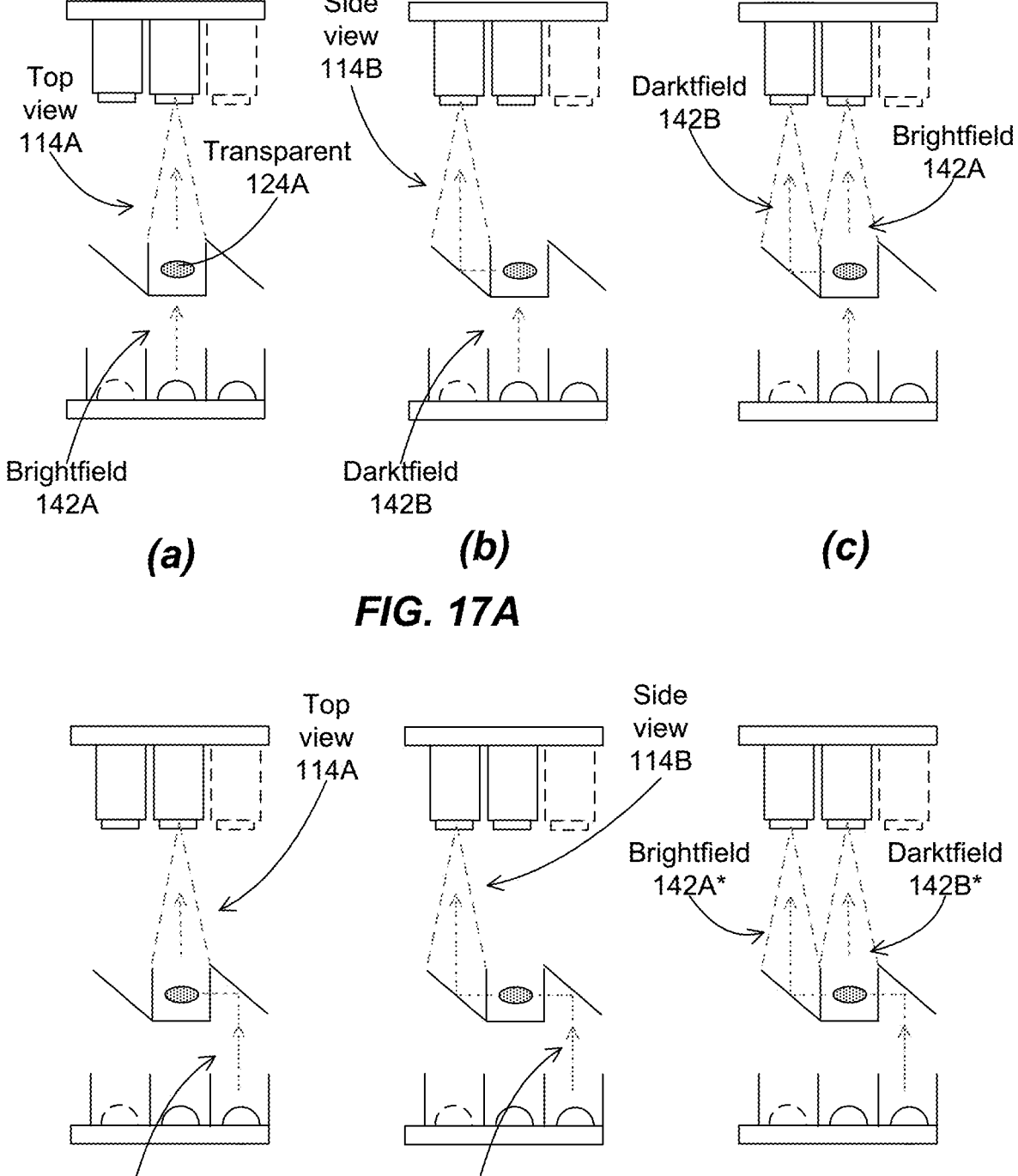
FIGS. 17A-17B illustrate configurations for imaging bright field and dark field of transparent samples according to some embodiments.

Configurations for Imaging Samples in a Multiple Camera Imaging System with a Camera Configured to Image a Top (or Bottom) View of a Well or a Side View of a Well Through a Mirror FIGS. 17A-17B illustrate configurations for imaging bright field and dark field of transparent samples according to some embodiments. FIGS. 17A(a)-17A(c) show an operation for capturing a bright field and a dark field. FIG. 17A(a) shows an operation for capturing a bright field. FIG. 17A(b) shows an operation for capturing a dark field. FIG. 17A(c) shows an operation for capturing both bright field and dark field.

FIG. 17A(a) shows a first camera configured to have a field of view limited to atop view 114A. With an illumination source configured to illuminate the bottom of the well, the first camera can capture bright field top view images 142A of a sample 124A.

FIG. 17A(b) shows a second camera configured to have a field of view limited to a side view 114B. With an illumination source configured to illuminate the bottom of the well, the second camera can capture dark field side view images 142B of the sample.

FIG. 17A(c) shows a first camera configured to have a field of view limited to a top view 114A and a second camera configured to have a field of view limited to a side view 114B. With an illumination source configured to illuminate the bottom of the well, the first camera and the second camera can capture bright field top view images 142A and dark field side view images 142B of the sample.

FIGS. 17B(a)-17B(c) show an operation for capturing a dark field and a bright field. FIG. 17B(a) shows an operation for capturing a dark field. FIG. 17B(b) shows an operation for capturing a bright field. FIG. 17B(c) shows an operation for capturing both dark field and bright field.

FIG. 17B(a) shows a first camera configured to have a field of view limited to a top view 114A. With an illumination source configured to illuminate the side of the well, the first camera can capture dark field top view images 142B\* of a sample.

FIG. 17B(b) shows a second camera configured to have a field of view limited to a side view 114B. With an illumination source configured to illuminate the side of the well, the second camera can capture bright field side view images 142A\* of the sample.

FIG. 17B(c) shows a first camera configured to have a field of view limited to a top view 114A and a second camera configured to have a field of view limited to a side view 114B. With an illumination source configured to illuminate the side of the well, the first camera and the second camera can capture dark field top view images 142B\* and bright field side view images 142A\* of the sample.

Figures 18A, 18B:
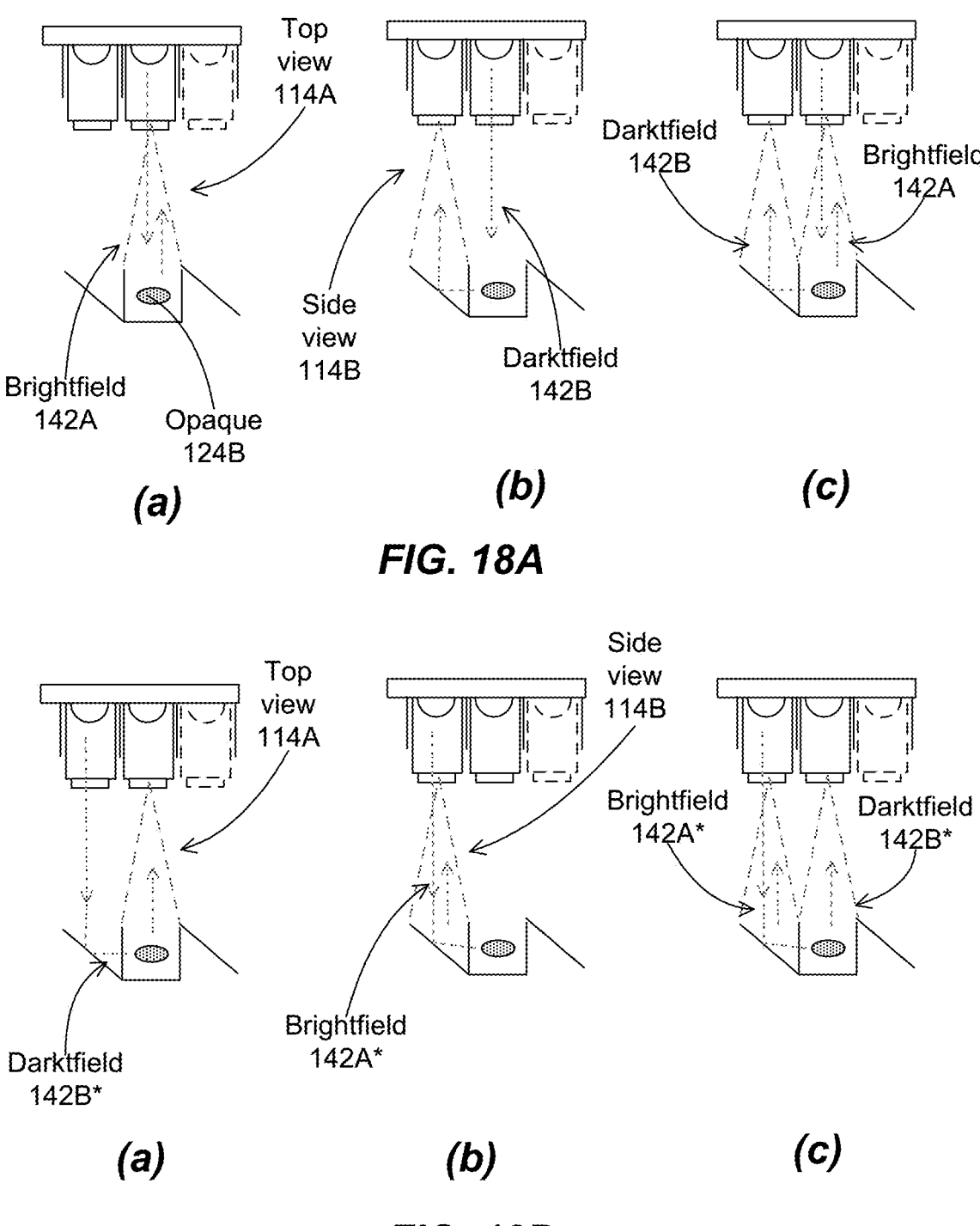
FIGS. 18A-18B illustrate configurations for imaging bright field and dark field of non-transparent samples according to some embodiments.

FIGS. 18A-18B illustrate configurations for imaging bright field and dark field of non-transparent samples according to some embodiments. FIGS. 18A-18B illustrate configurations for imaging bright field and dark field of non-transparent samples according to some embodiments. FIGS. 18A(a)-18A(c) show an operation for capturing a bright field and a dark field. FIG. 18A(a) shows an operation for capturing a bright field. FIG. 18A(b) shows an operation for capturing a dark field. FIG. 18A(c) shows an operation for capturing both bright field and dark field.

FIG. 18A(a) shows a first camera configured to have a field of view limited to a top view 114A. With an illumination source configured to illuminate the top of the well, the first camera can capture bright field top view images 142A of a sample 124A.

FIG. 18A(b) shows a second camera configured to have a field of view limited to a side view 114B. With an illumination source configured to illuminate the top of the well, the second camera can capture dark field side view images 142B of the sample.

FIG. 18A(c) shows a first camera configured to have a field of view limited to a top view 114A and a second camera configured to have a field of view limited to a side view 114B. With an illumination source configured to illuminate the top of the well, the first camera and the second camera can capture bright field top view images 142A and dark field side view images 142B of the sample.

FIGS. 18B(a)-18B(c) show an operation for capturing a dark field and a bright field. FIG. 18B(a) shows an operation for capturing a dark field. FIG. 18B(b) shows an operation for capturing a bright field. FIG. 18B(c) shows an operation for capturing both dark field and bright field.

FIG. 18B(a) shows a first camera configured to have a field of view limited to a top view 114A. With an illumination source configured to illuminate the side of the well, the first camera can capture dark field top view images 142B* of a sample.

FIG. 18B(b) shows a second camera configured to have a field of view limited to a side view 114B. With an illumination source configured to illuminate the side of the well, the second camera can capture bright field side view images 142A* of the sample.

FIG. 18B(c) shows a first camera configured to have a field of view limited to a top view 114A and a second camera configured to have a field of view limited to a side view 114B. With an illumination source configured to illuminate the side of the well, the first camera and the second camera can capture dark field top view images 142B* and bright field side view images 142A* of the sample.

FIG. 19 illustrates a flow chart for forming a multiple camera imaging system for imaging bright field and dark field for transparent and non-transparent samples according to some embodiments. Operation 460 forms an imaging system for simultaneously providing top views and side views of samples in wells of a well plate.

The imaging system includes a camera array including multiple cameras.

The imaging system further includes one or more illumination arrays with each illumination array including multiple illumination sources configured to provide irradiation to the well plate.

The well plate includes at least a well disposed between two adjacent optical elements configured to access the sides of the at least a well.

The multiple cameras and the well plate are configured so that the at least a well is positioned in a field of view of a first camera and the first optical element is positioned in a field of view of a second camera adjacent to the first camera.

The first camera and a first illumination source of the first illumination array disposed opposite of the first camera are configured to provide a bright field of a top view of a transparent sample.

The second camera and the first illumination source are configured to provide a dark field of a side view of a transparent sample.

The first camera and a second illumination source of the first illumination array configured to provide an illumination to the second side of the at least a well are configured to provide a dark field of a top view of a transparent sample.

The second camera and the second illumination source are configured to provide a bright field of a side view of a transparent sample.

The first camera and a third illumination source of the second illumination array disposed on a same side of the first camera configured to provide an illumination to the at least a well are configured to provide a bright field of a top view of a non-transparent sample.

The second camera and the third illumination source are configured to provide a dark field of a side view of a non-transparent sample.

The first camera and a fourth illumination source of the second illumination array configured to provide an illumination to the first side of the at least a well are configured to provide a dark field of a top view of a non-transparent sample.

The second camera and the fourth illumination source are configured to provide a bright field of a side view of a non-transparent sample.

FIGS. 20A-20B illustrate flow chart for imaging bright field and dark field for transparent and non-transparent samples according to some embodiments. In FIG. 20A, operation 470 provides irradiation to wells of a well plate from an opposite side of cameras configured to capture images. Operation 471A captures top view bright field images from the wells for transparent samples in the wells. Operation 471B captures side view dark field images from optical elements adjacent to the wells for transparent samples in the wells.

Operation 472 provides irradiation to the optical elements adjacent to the wells from the opposite side. Operation 473A captures top view dark field images from the wells for transparent samples in the wells. Operation 473B captures side view bright field images from the optical elements adjacent to the wells for transparent samples in the wells.

In FIG. 20B, operation 480 provides irradiation to wells of a well plate from a same side of cameras configured to capture images. Operation 481A captures top view bright field images from the wells for non-transparent samples in the wells. Operation 481B captures side view dark field images from optical elements adjacent to the wells for non-transparent samples in the wells.

Operation 482 provides irradiation to the optical elements adjacent to the wells from the same side. Operation 483A captures top view dark field images from the wells for non-transparent samples in the wells. Operation 483B captures side view bright field images from the optical elements adjacent to the wells for non-transparent samples in the wells.

Figures 21A, 21B:
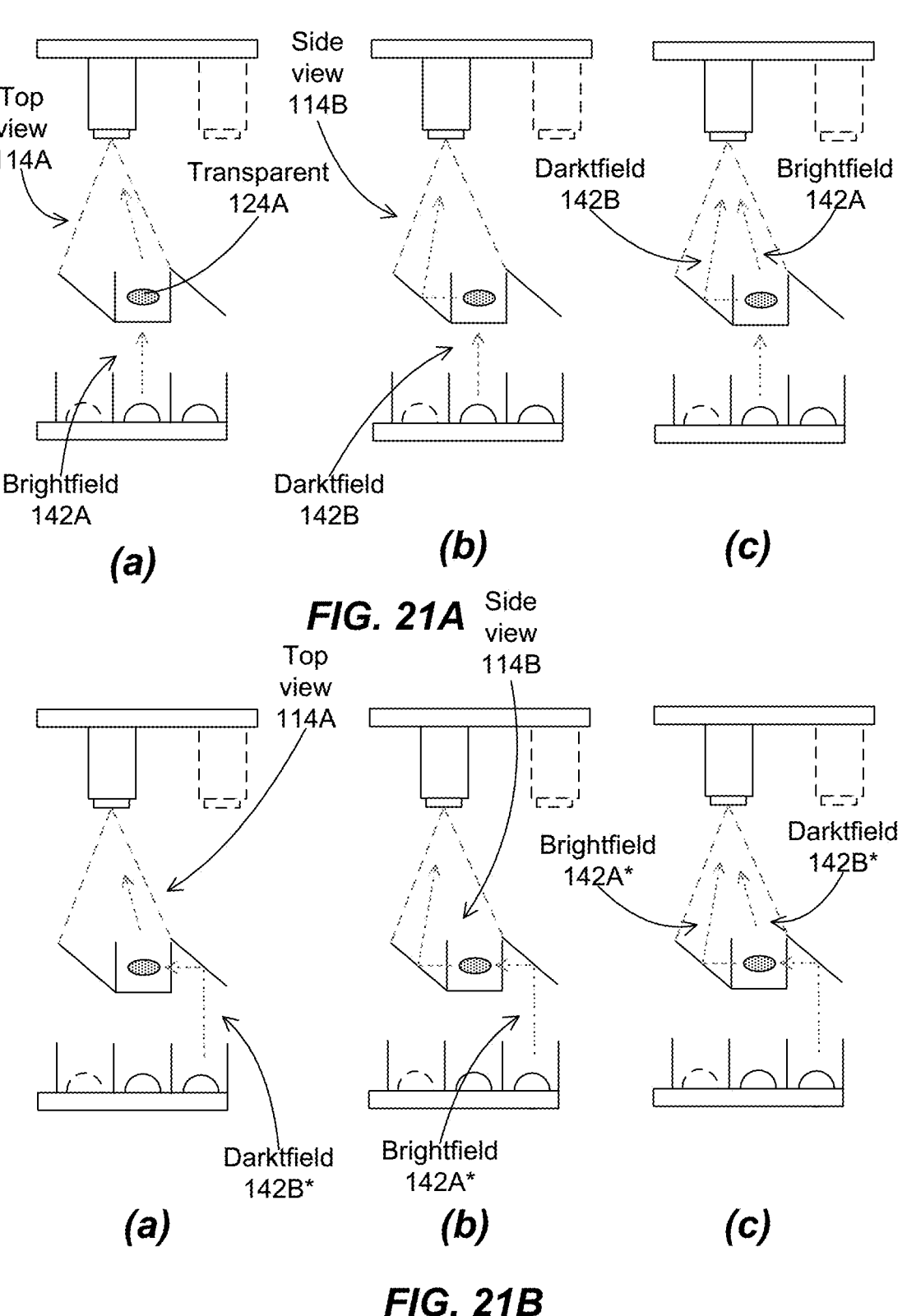
FIGS. 21A-21B illustrate configurations for imaging bright field and dark field of transparent samples according to some embodiments.

Configurations for Imaging Samples in a Multiple Camera Imaging System with a Camera Configured to Image Two Top (or Bottom) Views of 1 or 2 Wells and 1 or 2 Side Views of the 1 or 2 Wells Through Adjacent Mirrors FIGS. 21A-21B illustrate configurations for imaging bright field and dark field of transparent samples according to some embodiments. FIGS. 21A(a)-21A(c) show an operation for capturing a bright field and a dark field. FIG. 21A(a) shows an operation for capturing a bright field. FIG. 21A(b) shows an operation for capturing a dark field. FIG. 21A(c) shows an operation for capturing both bright field and dark field.

FIG. 21A(a) shows a first camera configured to have a field of view covering a top view 114A of a first well and a side view 114B of a first mirror or of two wells and two mirrors. Since this figure shows a cross section view, only the first well and the first mirror are shown. The second well and the second mirror of the two wells and the two mirrors are disposed at the locations as the first well and the first mirror. With an illumination source configured to illuminate the bottom of the first well or both the first well and the second well, the first camera can capture bright field top view images 142A of a sample 124A, which include the bright field top view of the first well or the bright field top views of the first and second wells.

FIG. 21A(b) shows the first camera also capturing dark field side view images 142B of the sample, which include the dark field side view of the first well or the dark field side views of the first and second wells.

FIG. 21A(c) shows the first camera capturing bright field top view images 142A and dark field side view images 142B of the sample, which include the bright field top view and the dark field side view of the first well or the bright field top views and the dark field side views of the first and second wells. The first camera is configured to capture the images under the illumination source configured to illuminate the bottom of the first well or the bottom of the first and second wells.

FIGS. 21B(a)-21B(c) show an operation for capturing a dark field and a bright field. FIG. 21B(a) shows an operation for capturing a dark field. FIG. 21B(b) shows an operation for capturing a bright field. FIG. 21B(c) shows an operation for capturing both dark field and bright field.

FIG. 21B(a) shows a first camera configured to have a field of view covering a top view 114A of a first well and a side view 114B of a first mirror or of two wells and two mirrors. With an illumination source configured to illuminate the side of the first well or both the first well and the second well, the first camera can capture dark field top view images 142B* of a sample 124A, which include the dark field top view of the first well or the dark field top views of the first and second wells.

FIG. 21B(b) shows the first camera also capturing bright field side view images 142A* of the sample, which include the bright field side view of the first well or the bright field side views of the first and second wells.

FIG. 21B(c) shows the first camera capturing dark field top view images 142B* and bright field side view images 142A* of the sample, which include the dark field top view and the bright field side view of the first well or the dark field top views and the bright field side views of the first and second wells. The first camera is configured to capture the images under the illumination source configured to illuminate the side of the first well or the side of the first and second wells.

Figure 22A:
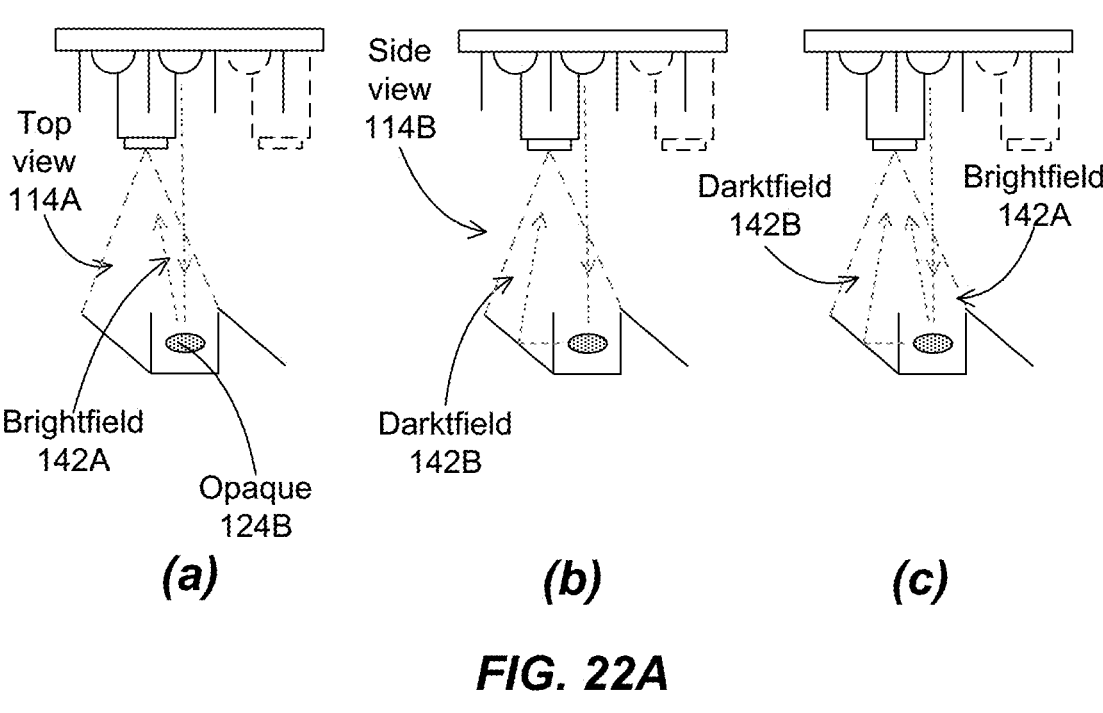
FIGS. 22A-22B illustrate configurations for imaging bright field and dark field of non-transparent samples according to some embodiments.
Figure 22B:
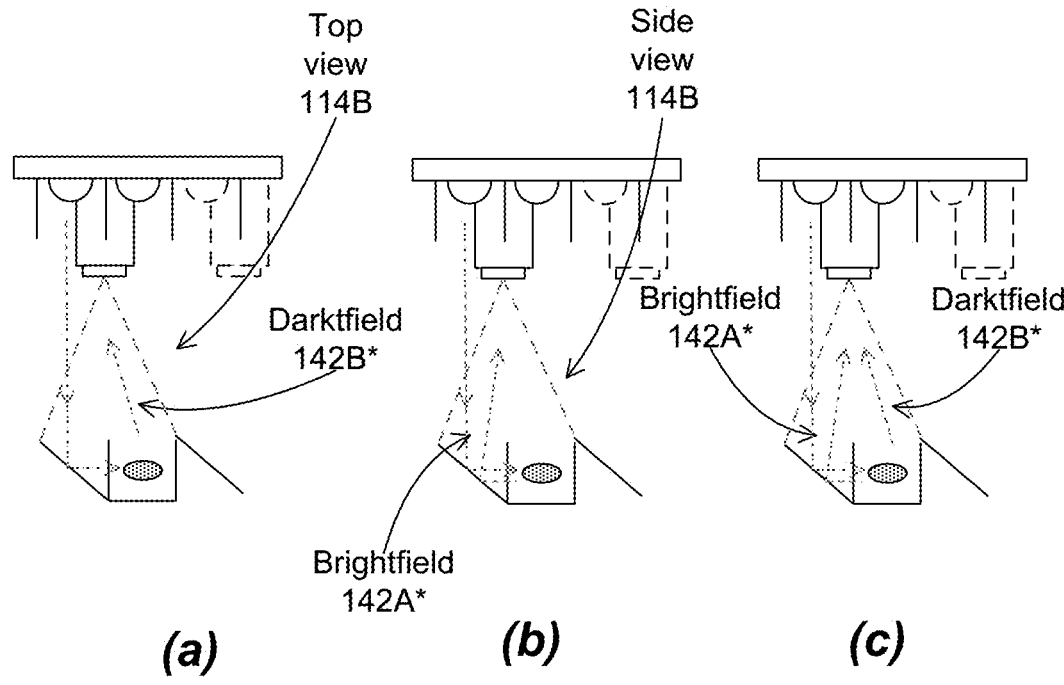

FIGS. 22A-22B illustrate configurations for imaging bright field and dark field of non-transparent samples according to some embodiments. FIGS. 22A(a)-22A(c) show an operation for capturing a bright field and a dark field. FIG. 22A(a) shows an operation for capturing a bright field. FIG. 22A(b) shows an operation for capturing a dark field. FIG. 22A(c) shows an operation for capturing both bright field and dark field.

FIG. 22A(a) shows a first camera configured to have a field of view covering a top view 114A of a first well and a side view 114B of a first mirror or of two wells and two mirrors. With an illumination source configured to illuminate the top of the first well or both the first well and the second well, the first camera can capture bright field top view images 142A of a sample 124B, which include the bright field top view of the first well or the bright field top views of the first and second wells.

FIG. 22A(b) shows the first camera also capturing dark field side view images 142B of the sample, which include the dark field side view of the first well or the dark field side views of the first and second wells.

FIG. 22A(c) shows the first camera capturing bright field top view images 142A and dark field side view images 142B of the sample, which include the bright field top view and the dark field side view of the first well or the bright field top views and the dark field side views of the first and second wells. The first camera is configured to capture the images under the illumination source configured to illuminate the top of the first well or the top of the first and second wells.

FIGS. 22B(a)-22B(c) show an operation for capturing a dark field and a bright field. FIG. 22B(a) shows an operation for capturing a dark field. FIG. 22B(b) shows an operation for capturing a bright field. FIG. 22B(c) shows an operation for capturing both dark field and bright field.

FIG. 22B(a) shows a first camera configured to have a field of view covering a top view 114A of a first well and a side view 114B of a first mirror or of two wells and two mirrors. With an illumination source configured to illuminate the side of the first well or both the first well and the second well, the first camera can capture dark field top view images 142B* of a sample, which include the dark field top view of the first well or the dark field top views of the first and second wells.

FIG. 22B(b) shows the first camera also capturing bright field side view images 142A* of the sample, which include the bright field side view of the first well or the bright field side views of the first and second wells.

FIG. 22B(c) shows the first camera capturing dark field top view images 142B* and bright field side view images 142A* of the sample, which include the dark field top view and the bright field side view of the first well or the dark field top views and the bright field side views of the first and second wells. The first camera is configured to capture the images under the illumination source configured to illuminate the side of the first well or the side of the first and second wells.

FIG. 23 illustrates a flow chart for forming a multiple camera imaging system for imaging bright field and dark field for transparent and non-transparent samples according to some embodiments. Operation 500 forms an imaging system for simultaneously providing top views and side views of samples in wells of a well plate. The imaging system includes a camera array including multiple cameras. The imaging system further includes one or more illumination arrays with each illumination array including multiple illumination sources configured to provide irradiation to the well plate. The well plate includes at least a well disposed between two adjacent optical elements configured to access the sides of the at least a well.

The multiple cameras and the well plate are configured so that the at least a well, the first optical element, a second well adjacent to the at least a well, and an optical element adjacent to the second well are positioned in a field of view of a first camera.

The first camera and a first illumination source of the first illumination array disposed opposite of the first camera are configured to provide a bright field of top views and a dark field of side views of transparent samples in the at least a well and the second well.

The first camera and a second illumination source of the first illumination array configured to provide an illumination to a second side of the at least a well and the second well are configured to provide a dark field of top views and a bright field of side views of transparent samples in the at least a well and the second well.

The first camera and a third illumination source of the second illumination array disposed on a same side of the first camera configured to provide an illumination to the at least a well and the second well are configured to provide a bright field of top views and a dark field of side views of transparent samples in the at least a well and the second well.

The first camera and a fourth illumination source of the second illumination array configured to provide an illumination to the first sides of the at least a well and the second well are configured to provide a dark field of top views and a bright field of side views of transparent samples in the at least a well and the second well.

FIGS. 24A-24B illustrate flow chart for imaging bright field and dark field for transparent and non-transparent samples according to some embodiments. In FIG. 24A, operation 510 provides irradiation to wells of a well plate from an opposite side of cameras configured to capture images. Operation 511A captures both top view bright field images from the wells and side view dark field images from optical elements adjacent to the wells for transparent samples in the wells.

Operation 512 provides irradiation to the optical elements adjacent to the wells from the opposite side. Operation 513A captures both top view dark field images from the wells and side view bright field images from the optical elements adjacent to the wells for transparent samples in the wells.

In FIG. 24B, operation 520 provides irradiation to wells of a well plate from a same side of cameras configured to capture images. Operation 521A captures top view bright field images from the wells and side view dark field images from optical elements adjacent to the wells for non-transparent samples in the wells.

Operation 522 provides irradiation to the optical elements adjacent to the wells from the same side. Operation 523A captures top view dark field images from the wells and side view bright field images from the optical elements adjacent to the wells for non-transparent samples in the wells.

Figure 25C:
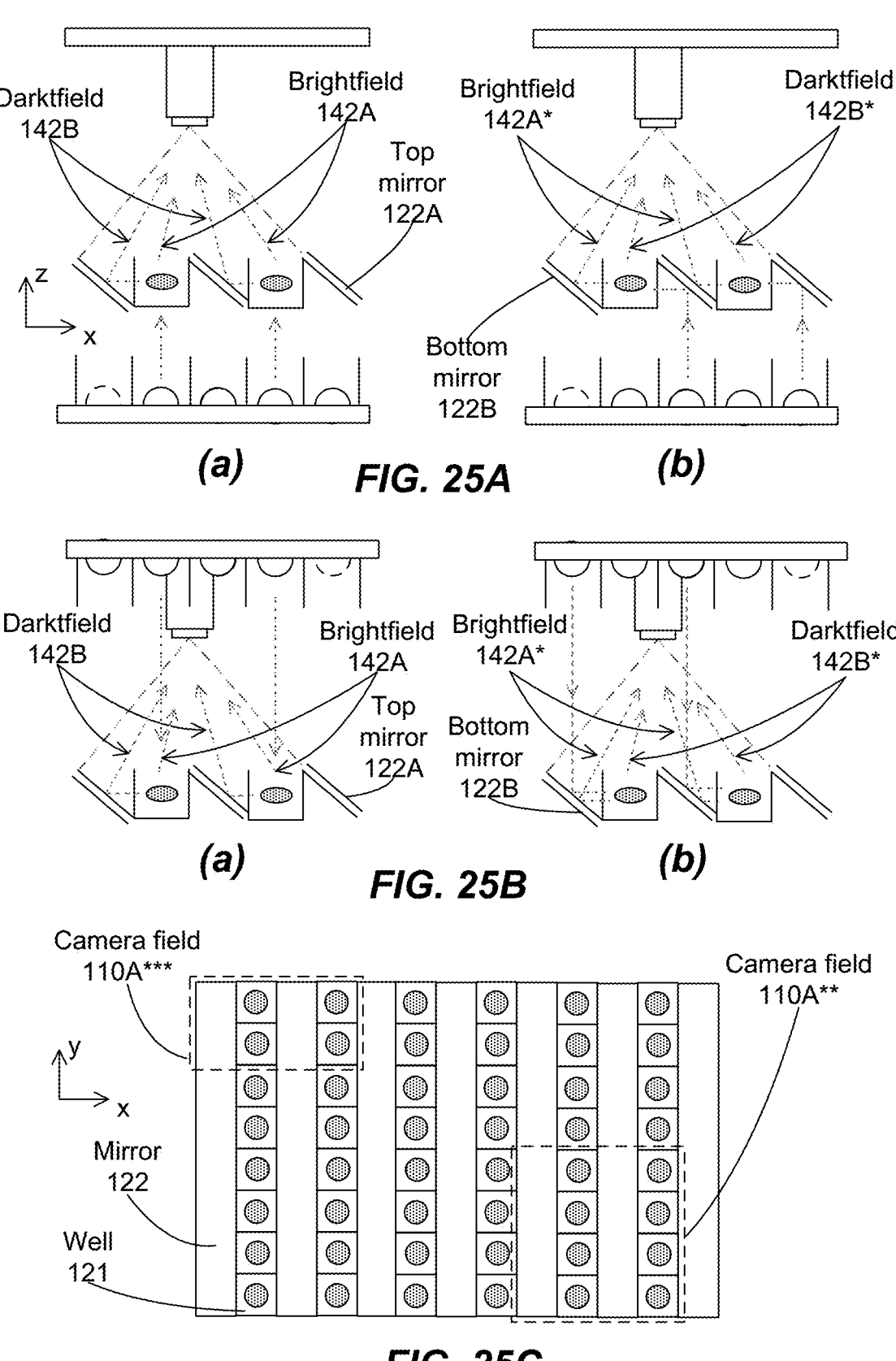

Configurations for Imaging Samples in a Multiple Camera Imaging System with a Camera Configured to Image Two Top (or Bottom) Views of 2-8 Wells and 2-8 Side Views of the 2-8 Wells Through Adjacent Mirrors FIGS. 25A-25C illustrate configurations for imaging bright field and dark field of transparent and non-transparent samples according to some embodiments. FIGS. 25A(a)-25A(b) show an operation for capturing a bright field and a dark field of a transparent sample. FIG. 25A(a) shows a first camera configured to have a field of view covering 2 top views and 2 side views of 2 wells (a first well and a second well), in a cross section view of xz plane, e.g., in the plane of the paper. The field of view can cover multiple wells and mirrors in the y direction, e.g., in the direction in or out of the paper. If there are 1, 2, 3, 5, 6, . . . wells and a same number of corresponding mirrors in the y direction, the first camera can cover 2, 4, 6, 10, 12, . . . wells with corresponding mirrors for rectangular fields of view. If there are 4 wells and 4 corresponding mirrors in the y direction, the first camera can cover 8 wells with 8 corresponding mirrors for a square field of view.

FIG. 25C shows examples of a square camera field of view **110A\*\* covering 8 well and 8 mirrors and a rectangular camera field of view 110A\*\*\* covering 4 well and 4 mirrors. The square field of view 110A\*\* has 2 wells and 2 mirrors in the x direction, and 4 wells or 4 mirrors in the y direction. The rectangular field of view 110A\*\*\*** also has 2 wells and 2 mirrors in the x direction, but with 2 wells or 2 mirrors in the y direction.

Since this figure shows a cross section xz view, only the first and second wells and the first and second mirrors are shown. With 2 illumination sources configured to illuminate the bottom of both the first and second wells, the first camera can capture the bright field 142A top views and the dark field 142B side views of the first and second wells.

FIG. 25A(b) shows the first camera capture the dark field 142B\* top views and the bright field 142A\* side views of the first and second wells using 2 illumination sources configured to illuminate the sides of both the first and second wells, e.g., illuminating the bottom mirrors.

FIGS. 25B(a)-25B(b) show an operation for capturing a bright field and a dark field of a non-transparent sample. FIG. 25B(a) shows the first camera capturing the bright field 142A top views and the dark field 142B side views of the first and second wells using 2 illumination sources configured to illuminate the top of both the first and second wells.

FIG. 25B(b) shows the first camera capture the dark field 142B\* top views and the bright field 142A\* side views of the first and second wells using 2 illumination sources configured to illuminate the sides of both the first and second wells, e.g., illuminating the top mirrors.

FIG. 26 illustrates a flow chart for forming a multiple camera imaging system for imaging bright field and dark field for transparent and non-transparent samples according to some embodiments. Operation 530 forms an imaging system for simultaneously providing top views and side views of samples in wells of a well plate. The imaging system includes a camera array including multiple cameras. The imaging system further includes one or more illumination arrays with each illumination array including multiple illumination sources configured to provide irradiation to the well plate. The well plate includes at least a well disposed between two adjacent optical elements configured to access the sides of the at least a well.

The multiple cameras and the well plate are configured so that the field of view of the first camera covers 4 or 8 wells and 4 or 8 optical elements adjacent to the 4 or 8 wells, respectively.

The first camera and 4 or 8 illumination sources of the first illumination array configured to provide an illumination to the 4 or 8 wells covered by the first camera are configured to provide a bright field of top views and a dark field of side views of transparent samples in the 4 or 8 wells, respectively.

The first camera and 4 or 8 illumination sources of the first illumination array configured to provide an illumination to the 4 or 8 optical elements adjacent to the 4 or 8 wells are configured to provide a bright field of side views and a dark field of top views of transparent samples in the 4 or 8 wells, respectively.

The first camera and 4 or 8 illumination sources of the second illumination array configured to provide an illumination to the 4 or 8 wells covered by the first camera are configured to provide a bright field of top views and a dark field of side views of non-transparent samples in the 4 or 8 wells, respectively.

The first camera and the first illumination source of the second illumination array configured to provide an illumination to the 4 or 8 optical elements covered by the first camera are configured to provide a bright field of side views and a dark field of top views of non-transparent samples in the 4 or 8 wells, respectively.

Configurations for Spacing Matching Between a Multiple Camera Imaging System and a Well Plate In some embodiments, the imaging system with a camera array and the well plate are configured for high throughput, for example, by utilizing all wells in the well plate (if the well plate is equal or smaller than the camera array) or by utilizing all cameras in the camera array (if the camera array is equal or smaller than the well plate).

With a high throughput imaging system, the time saving can be significant, such as up to 96× time savings. For example, an imaging system can be configured with 48 cameras, with each camera configured for observing top views and side views of 2 wells in a well plate. The 48 camera imaging system can simultaneously use for imaging top and side views of all 96 wells in a well plate. The simultaneously observation of all 96 wells can be 96 times faster than a single camera imaging system.

The time saving can be critical for short life organisms, such as zebra fish. For example, some assays require fish of a certain age, such as fish that are 3 days old. If the fish is 4 days old, the assay will not work.

In an assay requiring 15 minutes of observation per well, for a well plate having 96 wells. Using the 48 camera high throughput imaging system in which each camera is utilized to observe top and side views of 2 wells, the assay for all 96 fish can be completed in 15 minutes.

In contrast, using a single lens imaging system, the time required for completing the assay would be 15 minutes*96 wells=24 hours, which can cause some fish to reach the 4 days old mark, leading to potential failure of the assay.

Thus, the high throughput imaging system can be particular useful for short life organisms, by performing the experiments simultaneously to shorten the experiment time to avoid doing long assays.

Examples of long assays with the side view include looking at heartbeat over some time after administering a drug, looking at peristalsis (swallowing), looking at how the swim bladder can slowly inflate and cause the fish to rise or sink, etc. These assays can have an issue of requiring a long time, e.g., typically longer than the short life of the organisms, which can cause the biology data to lose relevance.

The high throughput imaging system can also be useful in stimulus response assays. For example, the fish can be excited by a certain stimulus (a flash of light, a tap on the plate, a speaker) and the responses of the fish in all wells of a well plate are recorded and analyzed. The stimulus response assays can be performed to understand how different doses of a certain drug can affect the response times, or how a genetic mutation affects the response profile of the fish.

In contrast, using a single lens imaging system, after applying the stimulus, all the fish in the well plate would respond to the stimulus, but only a single fish response would be imaged by the single lens imaging system. The fish then would require a rest period (for example, 0.5 hour or so) to reset to a baseline before a next stimulus, to prevent the effect of the previous stimulus on the response of the fish in the next stimulus.

Thus, the use of a single lens imaging system would be very time consuming. In addition, the fish get more habituated with each successive stimulus. The response data can be fundamentally biased because the last fish would have had 48 stimuli applied to it over the course of the experiment while the first fish would only have experienced one stimulus.

Configurations for Spacing Matching Between a Multiple Camera Imaging System and a Well Plate, with the Well Plate Smaller or Equal to the Camera Array of the Imaging System FIGS. 27A-27D illustrate a matching configuration for a camera field of view of a top view or a side view of a well according to some embodiments. The matching configuration includes the matching of the top view of each well to a first camera, and the matching of the side view of each well to a second camera.

Figures 27A, 27B, 27C, 27D:
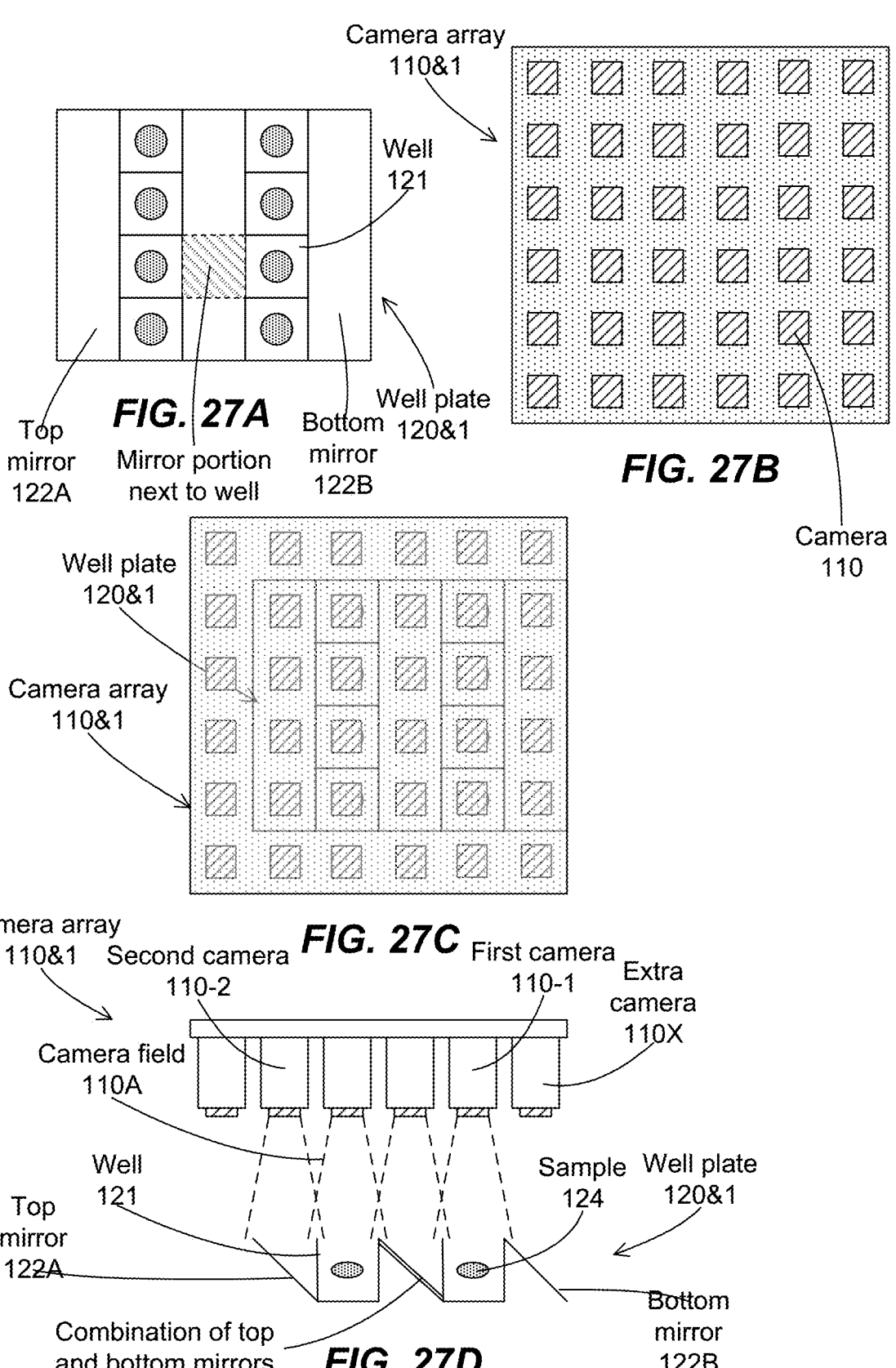
FIGS. 27A-27D illustrate a matching configuration for a camera field of view of a top view or a side view of a well according to some embodiments.

FIG. 27A shows a well plate 120&1 having 4 rows by 5 columns. Each row includes a top mirror 122A at a far left side, a left well, a combination of a bottom mirror and a top mirror between the left well and a right well, the right well, and a bottom mirror 122B at a far right side. A first column at the far left side includes a top elongated mirror 122A. A second column next to the right of the first column includes 4 left wells. A third column at the middle between the left well column and a right well column includes a combination of a top elongated mirror on a bottom elongated mirror. A fourth column next to the right of the third column includes 4 right wells 121. A fifth column at the far right side includes a bottom elongated mirror 122B.

The mirrors, e.g., the top mirrors, the bottom mirrors, and the combinations of top and bottom mirrors, are elongated mirrors, e.g., multiple mirror portions adjacent to a column of well are consolidated into an elongated mirror. Each mirror portion can provide a side view to the well adjacent to the mirror portion. Each elongated mirror can provide multiple side views to the wells in a column of wells adjacent to the elongated mirror.

FIG. 27B shows a camera array 110&1 of a multiple camera imaging system having 6 rows by 6 columns of cameras 110. As shown, the well plate is smaller than the camera array.

FIG. 27C shows a matching configuration between the camera array 110&1 and the well plate 120&1, with each well or each top mirror portion in the field of view of a camera. Since the well plate is smaller than the camera array, there can be cameras without wells or mirrors in their fields of view. If the well plate has a same size as the camera array, then there is a match between wells and cameras.

FIG. 27D shows a cross section view of the camera array disposed above the well plate. The cameras array is configured to have multiple groups 110$ of cameras, with each group of cameras include a first camera 110-1 having a field of view 110A only for a top view of a well and a second camera 110-2 having a field of view only for a side view of a well, e.g., for a top mirror portion adjacent to the well. There can be extra cameras 110X, e.g., cameras not used in imaging the well of the well plate, since the camera array is larger than the well plate.

Thus, the camera array and the well plate have a matching configuration in which top views and side views of all the wells in the well plate are imageable by at least a camera of the camera array. The matching configuration can provide an optimum usage of the imaging system for forming a high throughput imaging system.

FIGS. 28A-28D illustrate a matching configuration for a camera field of view of 2 top views and 2 side views of 2 wells according to some embodiments. The matching configuration includes the matching of top views and side views of 2 wells to a first camera of the camera array.

Figures 28A, 28B, 28C, 28D:
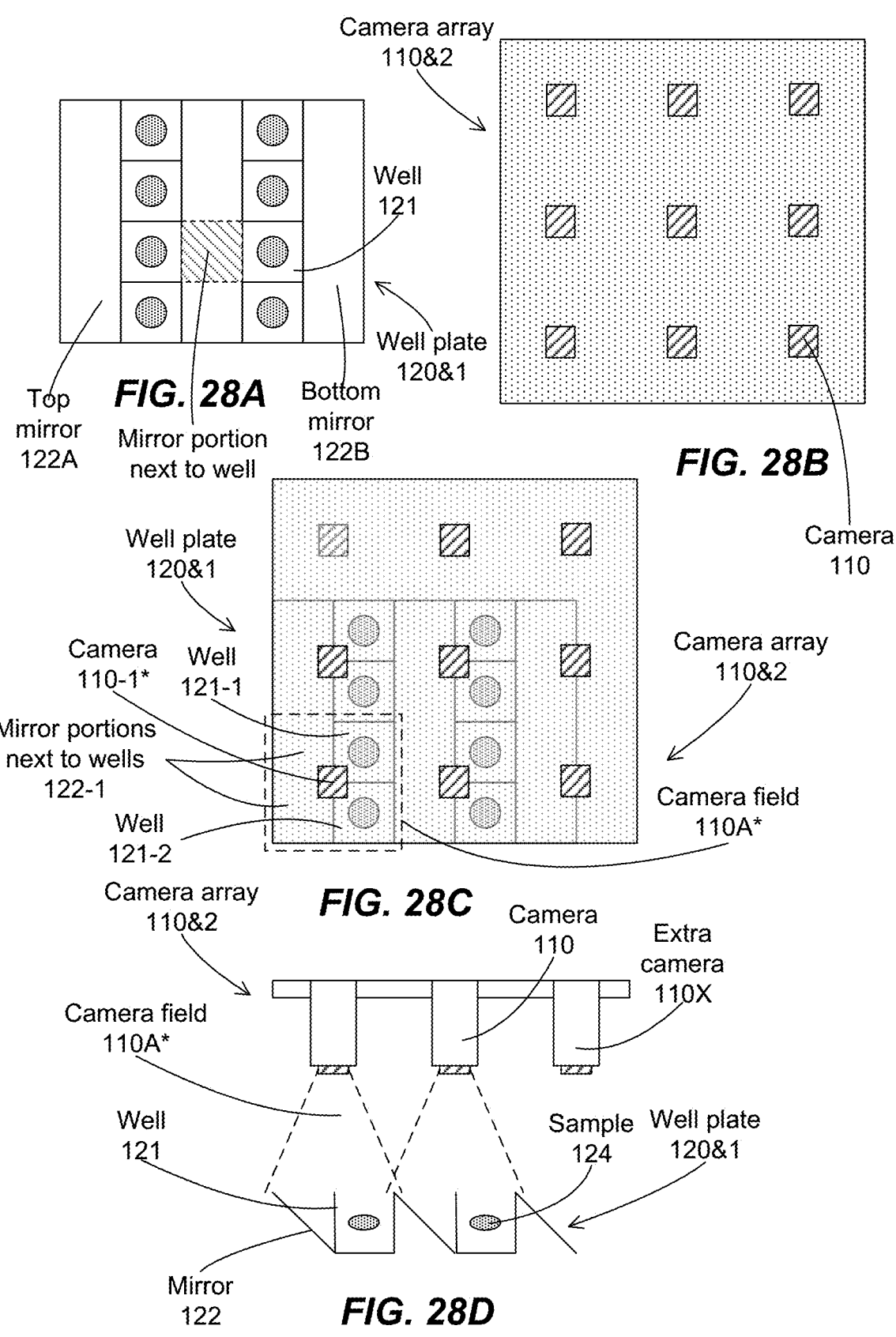
FIGS. 28A-28D illustrate a matching configuration for a camera field of view of 2 top views and 2 side views of 2 wells according to some embodiments.

FIG. 28A shows a well plate 120&1 having 4 rows by 5 columns as discussed above.

FIG. 28B shows a camera array 110&2 of a multiple camera imaging system having 3 rows by 3 columns of cameras 110. Each camera is configured to have a field of view covering 2 wells, e.g., covering top views and side views of 2 wells, or covering 2 wells and 2 adjacent mirror portions. For example, camera 110-1* has a field of view 110A*, which covers wells 121-1 and 121-2, together with mirror portions 122-1 next to the 2 wells. As shown, the well plate is smaller than the camera array.

FIG. 28C shows a matching configuration between the camera array 110&2 and the well plate 120&1, with each 2 wells 121-1 and 121-2 and top mirror portions 122-1 adjacent to the 2 wells in the field of view 110A* of a camera 110-1*. Since the well plate is smaller than the camera array, there can be cameras without wells or mirrors in their fields of view. If the well plate has a same size as the camera array, then there is a match between wells and cameras.

FIG. 28D shows a cross section view of the camera array disposed above the well plate. The cameras array is configured to have multiple cameras, with each camera 110-1* having a field of view 110A* for 2 top views and 2 side views of 2 wells, e.g., for covering 2 wells and 2 top mirror portions adjacent to the 2 wells. There can be extra cameras 110X, e.g., cameras not used in imaging the well of the well plate, since the camera array is larger than the well plate.

Thus, the camera array and the well plate have a matching configuration in which top views and side views of all the wells in the well plate are imageable by at least a camera of the camera array. The matching configuration can provide an optimum usage of the imaging system for forming a high throughput imaging system.

Figures 29A, 29B, 29C:
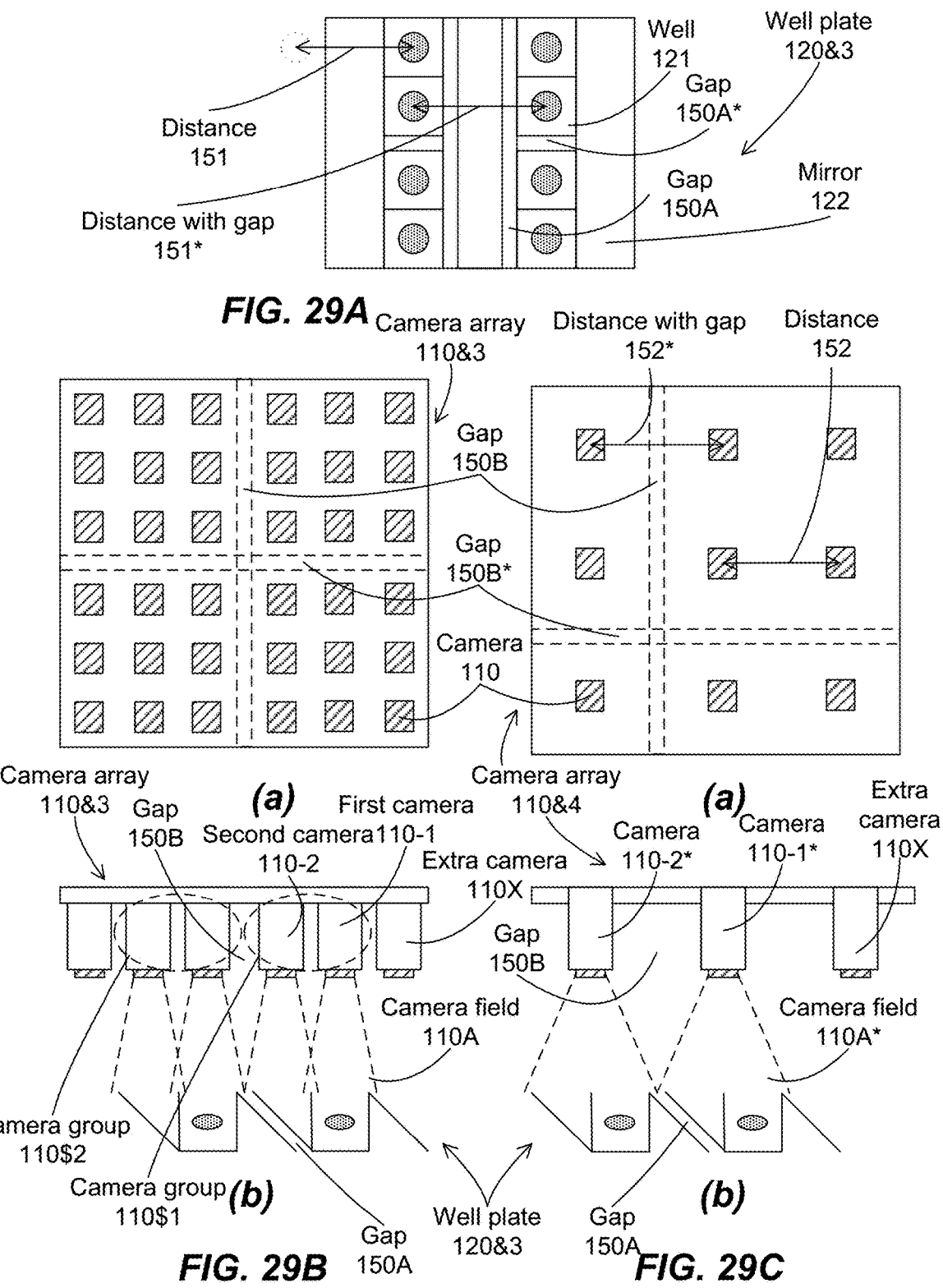
FIGS. 29A-29C illustrate a matching configuration of irregular spacing of cameras and wells according to some embodiments.

FIGS. 29A-29C illustrate a matching configuration of irregular spacing of cameras and wells according to some embodiments. The matching configuration includes the matching of irregularities of the camera array and the well plate.

FIG. 29A shows a well plate 120&3 having 4 rows by 5 columns. Each row includes a top mirror 122A at a far left side, a left well, a combination of a bottom mirror and a top mirror between the left well and a right well, the right well, and a bottom mirror 122B at a far right side. There can be a gap 150A, for example, between a bottom mirror associated with the left well and a top mirror associated with the right well. This gap 150A can lengthen a distance between two nearby wells. For example, a distance 151* between 2 wells with a gap in a row is larger than a distance 151 between 2 wells without a gap in the same row. The different between these distances 151* and 151 is the width of the gap 150A.

A first column at the far left side includes a top elongated mirror 122A. A second column next to the right of the first column includes 4 left wells. A third column at the middle between the left well column and a right well column includes a combination of a top elongated mirror on a bottom elongated mirror. A fourth column next to the right of the third column includes 4 right wells 121. A fifth column at the far right side includes a bottom elongated mirror 122B. There can be a gap 150A*, for example, between the second row and the third row. This gap 150A* can lengthen a distance between two nearby wells in a column of wells.

FIG. 29B(a) shows a camera array 110&3 of a multiple camera imaging system having 6 rows by 6 columns of cameras 110 with each camera configured to image a top view of a well or a side view of a well. The cameras are arranged to match with the wells of the well plate, such as having corresponding gaps 150B and 150B* between sections of the cameras. There is one gap 150B and one gap 150B* in the camera array, to match with the one gap 150A and 150A* in the well plate. The widths of the gaps 150A and 150A* are the same as those of the gaps 150A and 150B*.

FIG. 29B(b) shows a cross section view of the camera array 110&3 disposed above the well plate 120&3. The cameras array is configured to have multiple groups of cameras, such as group 110$1 and group 110$2, with each group of cameras, such as group 110$1 having a first camera 110-1 having a field of view 110A only for a top view of a well and a second camera 110-2 having a field of view only for a side view of a well, e.g., for a top mirror portion adjacent to the well. There can be extra cameras 110X, e.g., cameras not used in imaging the well of the well plate, since the camera array is larger than the well plate.

There can be a gap 150B between the two groups of cameras 110$1 and 110$2, with the gap 150B corresponded to the gap 150A on the well plate 120&3.

FIG. 29C(a) shows a camera array 110&4 of a multiple camera imaging system having 3 rows by 3 columns of cameras 110 with each camera configured to image 2 top views and 2 side views of 2 wells. The cameras are arranged to match with the wells of the well plate, such as having corresponding gaps 150B and 150B* between sections of the cameras. There is one gap 150B and one gap 150B* in the camera array, to match with the one gap 150A and 150A* in the well plate. The widths of the gaps 150A and 150A* are the same as those of the gaps 150A and 150B*.

For example, there can be a gap 150B, for example, between 2 columns of cameras. This gap 150B can lengthen a distance between two nearby cameras. For example, a distance 152* between 2 cameras with a gap in a horizontal direction is larger than a distance 152 between 2 cameras without a gap in the same horizontal direction. The different between these distances 152* and 152 is the width of the gap 150B.

FIG. 29C(b) shows a cross section view of the camera array 110&4 disposed above the well plate 120&3. The cameras array is configured to have multiple cameras, with each camera 110-1* having a field of view 110A* for 2 top views and 2 side views of 2 wells. There can be extra cameras 110X, e.g., cameras not used in imaging the well of the well plate, since the camera array is larger than the well plate.

There can be a gap 150B between the two adjacent cameras 110-1* and 110-2*, with the gap 150B corresponded to the gap 150A on the well plate 120&3.

Thus, the camera array and the well plate have a matching configuration, with an irregularity of wells in the well plate matched with the irregularity of cameras in the camera array. Configurations for Spacing Matching Between a Multiple Camera Imaging System and a Well Plate, with the Well Plate Larger or Equal to the Imaging System FIGS. 30A-30D illustrate a matching configuration for a camera configured to view a top view or a side view of a well according to some embodiments. The matching configuration includes the matching of each first camera to a top view of a well, and the matching of each second camera to a side view of a well.

Figures 30A, 30C, 30D:
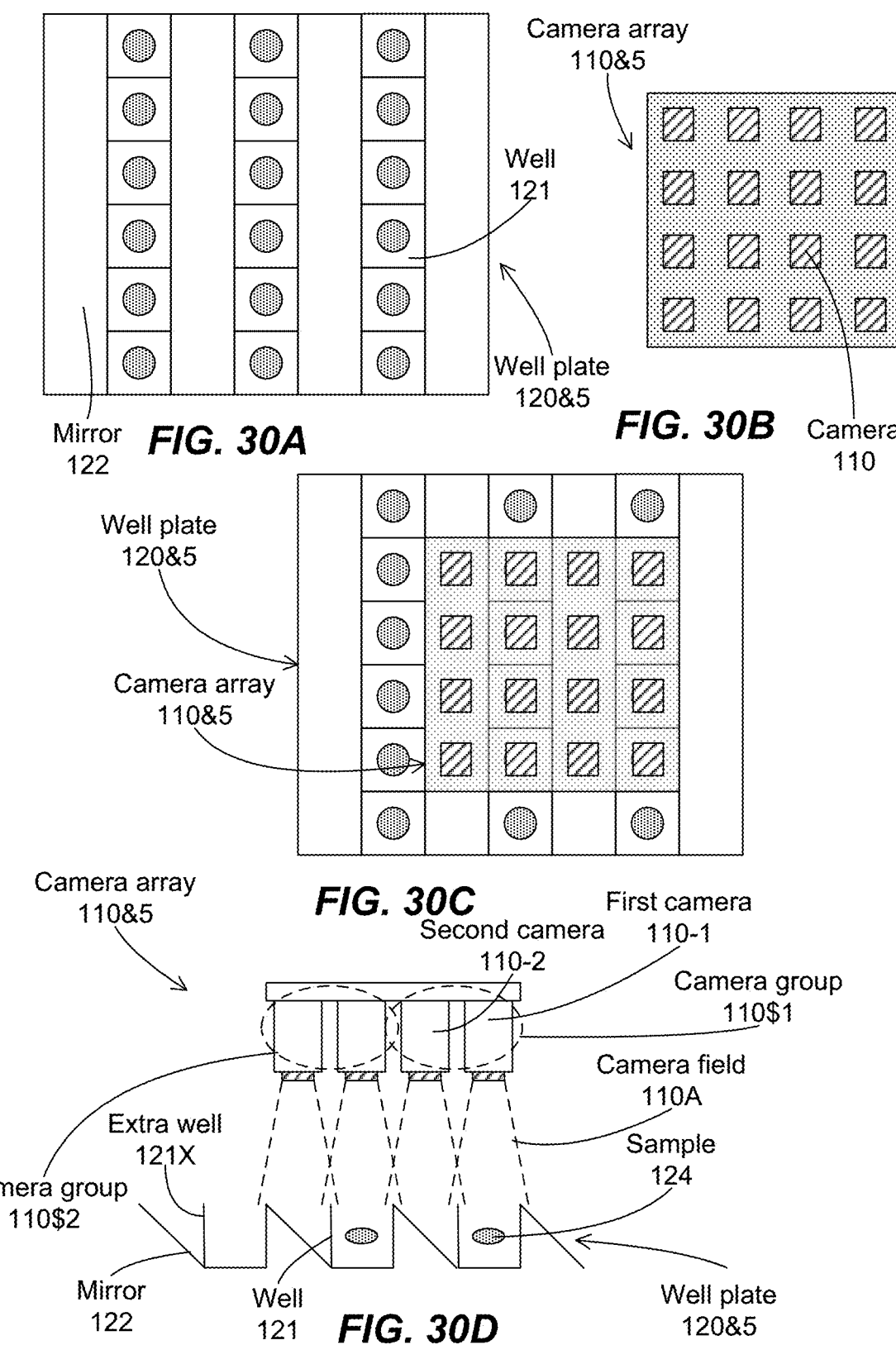

FIG. 30A shows a well plate 120&5 having 6 rows by 7 columns, with 18 wells arranged in 3 columns, a far left top elongated mirror, a far right bottom elongated mirror, and middle two combination of top and bottom elongated mirrors.

FIG. 30B shows a camera array 110&5 of a multiple camera imaging system having 4 rows by 4 columns of cameras 110. As shown, the well plate is larger than the camera array.

FIG. 30C shows a matching configuration between the camera array 110&5 and the well plate 120&5, with each camera in the camera array disposed above a well or above a mirror portion of the top elongated mirrors. Since the well plate is larger than the camera array, there can be wells or mirrors without being imageable by a camera. If the well plate has a same size as the camera array, then there is a match between wells and cameras.

FIG. 30D shows a cross section view of the camera array disposed above the well plate. The cameras array is configured to have multiple groups of cameras, such as group 110$1 and group 110$2, with each group of cameras, such as group 110$1 having a first camera 110-1 having a field of view 110A only for a top view of a well and a second camera 110-2 having a field of view only for a side view of a well, e.g., for atop mirror portion adjacent to the well. There can be extra well 121X, e.g., wells not used being imaged by a camera, since the camera array is smaller than the well plate.

Thus, the camera array and the well plate have a matching configuration in which each first camera is configured to capture a top view of a well and each second camera is configured to capture a side view of a well.

FIGS. 31A-31D illustrate a matching configuration for a camera field of view of 2 top views and 2 side views of 2 wells according to some embodiments. The matching configuration includes the matching of each camera to 2 top views and 2 side views of 2 wells.

Figures 31A, 31C, 31D:
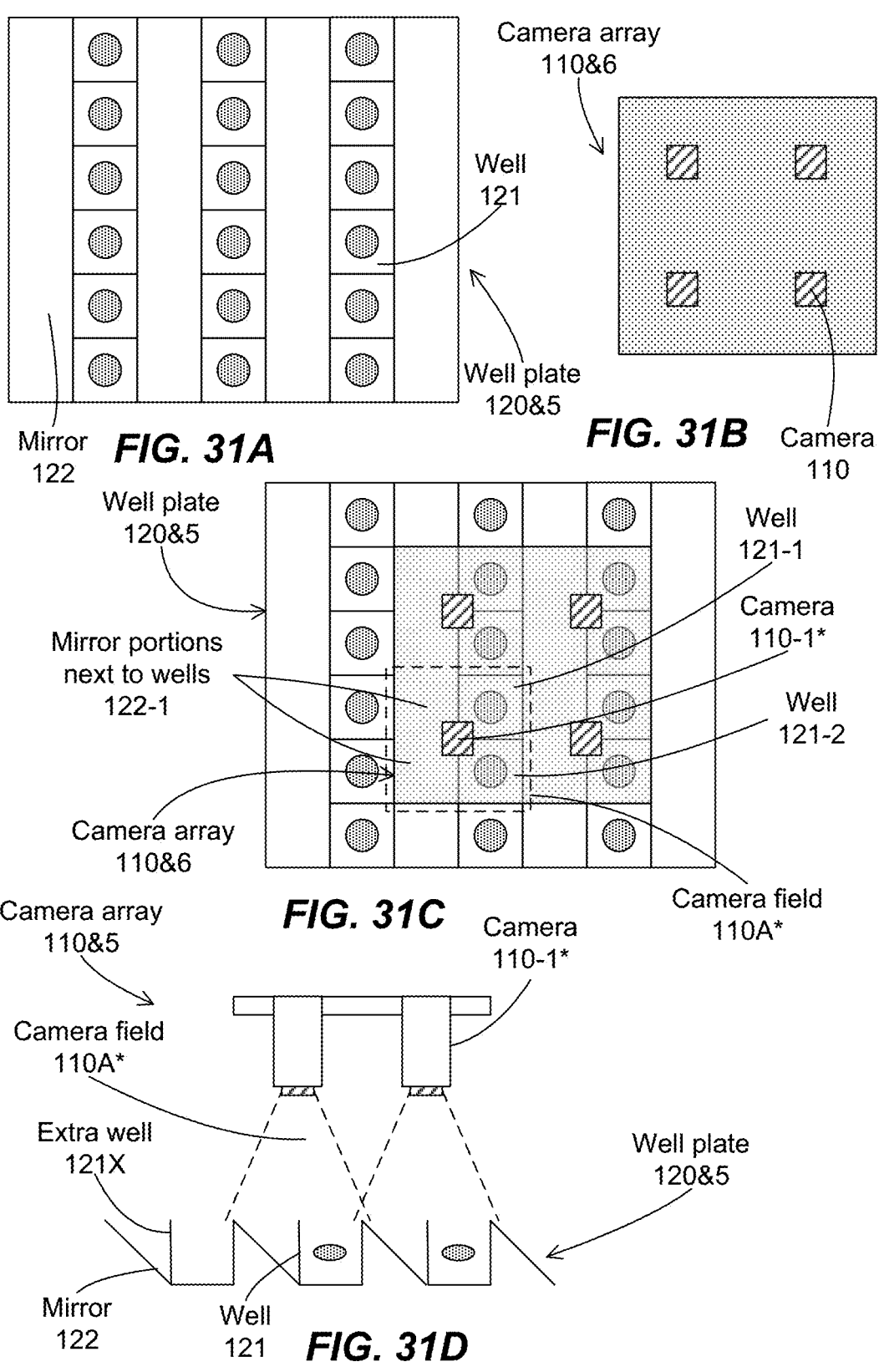

FIG. 31A shows a well plate 120&5 having 6 rows by 7 columns as discussed above.

FIG. 31B shows a camera array 110&6 of a multiple camera imaging system having 2 rows by 2 columns of cameras 110. Each camera is configured to have a field of view covering 2 wells, e.g., covering top views and side views of 2 wells, or covering 2 wells and 2 adjacent mirror portions.

FIG. 31C shows a matching configuration between the camera array 110&6 and the well plate 120&5, with each 2 wells 121-1 and 121-2 and top mirror portions 122-1 adjacent to the 2 wells in the field of view 110A\* of a camera 110-1\*. Since the well plate is larger than the camera array, there can be wells or mirrors without cameras. If the well plate has a same size as the camera array, then there is a match between wells and cameras.

FIG. 31D shows a cross section view of the camera array disposed above the well plate. The cameras array is configured to have multiple cameras, with each camera 110-1\* having a field of view 110A\* for 2 top views and 2 side views of 2 wells, e.g., for covering 2 wells and 2 top mirror portions adjacent to the 2 wells. There can be extra well 121X, e.g., wells not in field of view of any camera.

Thus, the camera array and the well plate have a matching configuration in which each camera of the camera array is configured to image 2 top views and 2 side views of 2 wells in the well plate.

Figure 32A:
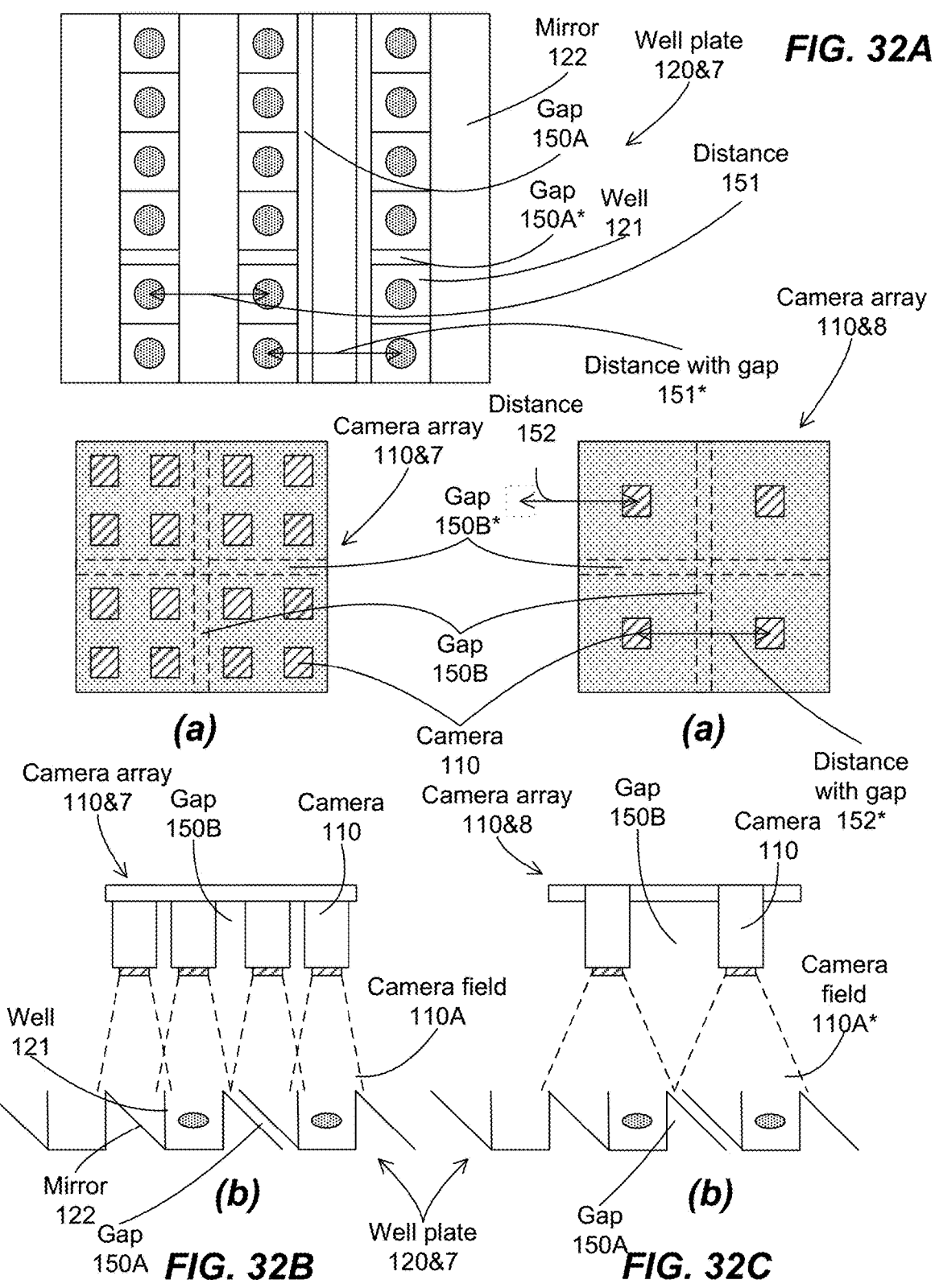

FIGS. 32A-32C illustrate a matching configuration of irregular spacing of cameras and wells according to some embodiments. The matching configuration includes the matching of irregularities of the camera array and the well plate.

FIG. 32A shows a well plate 120&7 having 6 rows by 7 columns. Each row includes a top mirror at a far left side, a left well, a combination of a bottom mirror and a top mirror between the left well and a middle well, the middle well, a combination of a bottom mirror and a top mirror between the middle well and a right well, the right well, and a bottom mirror at a far right side. There can be a gap 150A, for example, between a bottom mirror associated with the middle well and a top mirror associated with the right well. This gap 150A can lengthen a distance between two nearby wells. For example, a distance 151\* between 2 wells with a gap in a row is larger than a distance 151 between 2 wells without a gap in the same or different row. The different between these distances 151\* and 151 is the width of the gap 150A.

A first column at the far left side includes a top elongated mirror. A second column next to the right of the first column includes 6 left wells. A third column at the middle between the left well column and a middle well column includes a combination of a top elongated mirror on a bottom elongated mirror. A fourth column next to the right of the third column includes 6 right wells. A fifth column at the middle between the middle well column and a right well column includes a combination of a top elongated mirror on a bottom elongated mirror. A six column next to the right of the fifth column includes 6 right wells. A seventh column at the far right side includes a bottom elongated mirror. There can be a gap 150A\*, for example, between the second row and the third row. This gap 150A\* can lengthen a distance between two nearby wells in a column of wells.

FIG. 32B(a) shows a camera array 110&7 of a multiple camera imaging system having 4 rows by 4 columns of cameras 110 with each camera configured to image a top view of a well or a side view of a well. The cameras are arranged to match with the wells of the well plate, such as having corresponding gaps 150B and 150B\* between sections of the cameras. There is one gap 150B and one gap 150B\* in the camera array, to match with the one gap 150A and 150A\* in the well plate. The widths of the gaps 150A and 150A\* are the same as those of the gaps 150A and 150B\*.

FIG. 32B(b) shows a cross section view of the camera array 110&7 disposed above the well plate 120&7. The cameras array is configured to have multiple groups of cameras, with each group of cameras having a first camera having a field of view 110A only for a top view of a well and a second camera having a field of view only for a side view of a well. There can be extra wells 121X.

There can be a gap 150B between the two groups of cameras, with the gap 150B corresponded to the gap 150A on the well plate 120&3.

FIG. 32C(a) shows a camera array 110&8 of a multiple camera imaging system having 2 rows by 2 columns of cameras 110 with each camera configured to image 2 top views and 2 side views of 2 wells. The cameras are arranged to match with the wells of the well plate, such as having corresponding gaps 150B and 150B\* between sections of the cameras. There is one gap 150B and one gap 150B\* in the camera array, to match with the one gap 150A and 150A\* in the well plate. The widths of the gaps 150A and 150A\* are the same as those of the gaps 150A and 150B\*.

For example, there can be a gap 150B, for example, between 2 columns of cameras. This gap 150B can lengthen a distance between two nearby cameras. For example, a distance 152\* between 2 cameras with a gap in a horizontal direction is larger than a distance 152 between 2 cameras without a gap in the same horizontal direction. The different between these distances 152\* and 152 is the width of the gap 150B.

FIG. 32C(b) shows a cross section view of the camera array 110&8 disposed above the well plate 120&7. The cameras array is configured to have multiple cameras, with each camera having a field of view 110A\* for 2 top views and 2 side views of 2 wells. There can be extra wells 121X.

There can be a gap 150B between the two adjacent cameras, with the gap 150B corresponded to the gap 150A on the well plate.

Thus, the camera array and the well plate have a matching configuration, with an irregularity of wells in the well plate matched with the irregularity of cameras in the camera array.

As shown, the mirrors and the wells in a well plate have a similar dimension. Other configurations can be used, such as the mirrors can be larger or smaller than the wells. The matching between the camera array and the well plate is configured so that either a well or a mirror is under the field of view of a camera, or multiple mirrors and wells are under the field of view of a camera.

Configurations for Spacing Matching for Regular Arrays Between a Multiple Camera Imaging System and a Well Plate, with the Well Plate Smaller or Equal to the Imaging System The camera array and the well plate can be regular spacing arrays. For example, the cameras are periodically arranged with a fixed spacing between 2 cameras in the camera array. There can be different spacing for different directions, such as an x spacing and a y spacing. Similarly, the wells and the mirrors are periodically arranged with a fixed spacing between a well and a mirror, between 2 wells, or between 2 mirrors in the well plate. There can be different spacing for different directions, such as an x spacing and a y spacing.

FIGS. 33A-33B illustrate a matching configuration for a camera field of view of a top view or a side view of a well according to some embodiments. FIG. 33A shows a cross section view of the camera array disposed above the well plate. FIG. 33B shows a top view of the camera array disposed above the well plate.

The cameras array is configured to have multiple groups of cameras, such as group 110$, with each group of cameras, such as group 110$ having a first camera having a field of view 110A only for a top view of a well and a second camera having a field of view only for a side view of a well, e.g., for a top mirror portion adjacent to the well.

In one dimension, such as the x direction, there can be a camera group spacing 110G*, which is the separation between 2 groups of cameras. Since each group of cameras can image a well, e.g., a top view of a well, this separation can match the well spacing 120$1 between 2 wells in the x direction.

There can be a camera spacing 110S, which is the separation between 2 cameras in the x direction. Since a cameras can image a top view of a well, and an adjacent camera can image a side view of a well (or an adjacent mirror), this separation can match half the well spacing 120$1** between 2 wells, assuming that the mirrors having a same dimension as the wells.

In other direction, such as the y direction, there can be a camera group spacing 110S*, which is similar to the separation between 2 cameras. Since in the y direction, each camera or each group of cameras can image a well, e.g., a top view of a well, this separation can match the well spacing 120$2 between 2 wells in the y direction.

FIGS. 34A-34B illustrate a matching configuration for a camera field of view of 2 top views and 2 side views of 2 wells according to some embodiments. FIG. 34A shows a cross section view of the camera array disposed above the well plate. FIG. 34B shows a top view of the camera array disposed above the well plate.

The cameras array is configured to have each camera having a field of view 110A* for 2 top views and 2 side views of 2 wells.

In one dimension, such as the x direction, there can be a camera spacing 110@1, which is the separation between 2 cameras in the x direction. Since each camera can image a well, this separation can match the well spacing 120$1 between 2 wells in the x direction.

In other direction, such as the y direction, there can be a camera spacing 110@2, which is the separation between 2 cameras in the y direction. Since in the y direction, each camera can image 2 well, this separation can be twice the well spacing 120$2 between 2 wells in the y direction.

FIGS. 35A-35B illustrate a matching configuration for a camera field of view of 8 top views and 8 side views of 8 wells according to some embodiments. FIG. 35A shows a cross section view of the camera array disposed above the well plate. FIG. 35B shows a top view of the camera array disposed above the well plate.

The cameras array is configured to have each camera having a field of view 110A** for 8 top views and 8 side views of 8 wells.

In one dimension, such as the x direction, there can be a camera spacing 110#1, which is the separation between 2 cameras in the x direction. Since each camera can image 2 wells, this separation can be twice the well spacing 120$1 between 2 wells in the x direction.

In other direction, such as the y direction, there can be a camera spacing 110#2, which is the separation between 2 cameras in the y direction. Since in the y direction, each camera can image 4 well, this separation can be 4× the well spacing 120$2 between 2 wells in the y direction.

FIG. 36 illustrates a flow chart for matching configuration of a camera array with a well array according to some embodiments. Operation 540 forms an imaging system for simultaneously providing top or bottom views and side views of samples in wells of a well plate.

The imaging system includes a camera array including multiple cameras.

The imaging system further includes one or more illumination arrays with each illumination array including multiple illumination sources configured to provide irradiation to the well plate.

The well plate includes at least a well disposed between two adjacent optical elements configured to access the sides of the at least a well.

The camera array and the well plate are configured to have a match between cameras of the camera array and a top or bottom, or side view of wells of the well plate. Alternatively, the camera array and the well plate are configured to have a match between a top or bottom, or side view of wells of the well plate and a camera of the camera array.

The multiple cameras and the well plate are configured so that each well and an optical element adjacent to the each well are in a field of view of one or more cameras of the multiple cameras. In other words, each top view of a well (which can be viewed from a top of the well) and each side view of the well (which can be viewed from an optical element, such as a mirror, disposed adjacent to the well and configured to provide a view of the side of the well from a top area of the well plate) are in a field of view of at least a camera of the camera array. This configuration is used for a well plate smaller or equal to the camera array, e.g., there are more cameras to view the wells than the number of wells.

Alternatively, the multiple cameras and the well plate are configured so that each camera of the multiple cameras is configured to capture images from at least a well or an optical element adjacent to the well. In other words, each camera of the camera array is configured to capture top view images of a well (which can be viewed from a top of the well) and/or to capture side view images of the well (which can be viewed from an optical element, such as a mirror, disposed adjacent to the well and configured to provide a view of the side of the well from a top area of the well plate). This configuration is used for a well plate larger or equal to the camera array, e.g., there are more wells in the well plate than the number of cameras.

The wells in a well plate can have irregular separation distances, such as different distances between at least 2 groups of 2 top views of 2 adjacent wells, different distances between at least 2 groups of a top view and a side view of a well, or different distances between at least 2 groups of 2 side views of 2 adjacent wells. The cameras in a camera array are also have matching irregular separation distances, in order for each view of a well is under the field of view of at least a camera, or a camera is configured to capture at least a view of a well.

The wells in a well plate can have regular separation distances in one or two directions. For example, there is a same distance between any 2 groups of 2 top views of 2 adjacent wells, or between any 2 groups of a top view and a side view of a well, or between any 2 groups of 2 side views of 2 adjacent wells. The cameras in a camera array are also have matching regular separation distances in one or two directions, in order for each view of a well is under the field of view of at least a camera, or a camera is configured to capture at least a view of a well.

The multiple cameras and the well plate are configured so that a spacing between two cameras of the multiple cameras is a multiple of half a spacing between two wells of the well plate.

An illumination array and the well plate are also configured to have a match between illumination sources of the illumination array and a top or bottom, or side view of wells of the well plate. Alternatively, the illumination array and the well plate are configured to have a match between a top or bottom, or side view of wells of the well plate and an illumination source of the illumination array.

The multiple illumination sources and the well plate are configured so that a spacing between two illumination sources of the multiple illumination sources is a multiple of half a spacing or a spacing between two wells of the well plate.

The multiple illumination sources and the well plate are configured so that each well and an optical element adjacent to the each well are in an illumination of one or more illumination sources of the illumination array. In other words, each top view of a well (which can be viewed from a top of the well) and each side view of the well (which can be viewed from an optical element, such as a mirror, disposed adjacent to the well and configured to provide a view of the side of the well from a top area of the well plate) are in an illumination of at least an illumination source of the illumination array. This configuration is used for a well plate smaller or equal to the illumination array, e.g., there are more illumination sources to illuminate the wells than the number of wells.

Alternatively, the multiple illumination sources and the well plate are configured so that each illumination source of the multiple illumination sources is configured to illuminate at least a well or an optical element adjacent to the well. In other words, each illumination source of the illumination array is configured to illuminate a top or bottom area of a well (which can be viewed from a top or bottom of the well) and/or to illuminate a side area of the well (which can be viewed from an optical element, such as a mirror, disposed adjacent to the well and configured to provide a view of the side of the well from a top or bottom area of the well plate). This configuration is used for a well plate larger or equal to the illumination array, e.g., there are more wells in the well plate than the number of illumination sources.

The wells in a well plate can have irregular separation distances. The illumination sources in an illumination array are also have matching irregular separation distances, in order for each view of a well is under the illumination at least an illumination source, or an illumination source is configured to illuminate at least a view of a well.

The wells in a well plate can have regular separation distances in one or two directions. The illumination sources in an illumination array are also have matching regular separation distances in one or two directions, in order for each view of a well is under the illumination of at least an illumination source, or an illumination source is configured to illuminate at least a view of a well.

The multiple illumination sources and the well plate are configured so that a spacing between two illumination sources of the multiple illumination sources is a multiple of half a spacing between two wells of the well plate.

Configurations for a Multiple Camera Imaging System with Fluorescence Features

In some embodiments, the multiple camera imaging system can be configured with a fluorescence feature. A fluorescence imaging system, such as a fluorescence microscope, is an optical microscope that uses a fluorescence signal to study the properties of organic or inorganic substances. A sample, e.g., the organic or inorganic substance under observation, is illuminated with light having a wavelength spectrum. The light is absorbed by the sample, such as being absorbed by the fluorophores in the sample, causing the fluorophores to emit light of longer wavelengths. The emitted light has a color in the longer wavelength portion of the visible light spectrum. For example, a green fluorescence protein can emit a green light after being irradiated with a blue light.

In general, a light source can generate light in the visible or ultraviolet spectrum which is directed toward a sample. An optional fluorescence excitation filter can be disposed in the path of the light to filter out light having undesirable wavelengths, to allow only light within a desirable wavelength range to reach the sample.

The fluorophores in the sample, after absorbing the fluorescence excitation light, can emit fluorescence light, which can pass through an emission filter to reach a camera. The emission filter can also function to filter out undesired portion of the light, such as the reflective portion of the illumination light.

To use the fluorescence microscope, the sample must be a fluorescent sample, such as labeling the sample with fluorescent stains or a fluorescent protein.

In some embodiments, the present imaging system can provide the ability to synchronize the captured fluorescence signals through the process of multi-channel imaging. A multi-channel fluorescence system can capture simultaneously fluorescence signals (such as from a fluorescence imaging process) and non-fluorescence signals (such as an IR or visible light imaging process), and can analyze the data, including synchronizing and correlating the interaction between the fluorescence elements and also with the surrounding morphologies. The multi-channel fluorescence capability of the imaging system can be achieved by partitioning the camera array and the illumination source into multiple imaging channels, with each channel observing a related area of the sample, such as top view morphologies and side view fluorescence characteristics.

For example, the camera array and the illumination source can include multiple groups of camera units and illumination source units, respectively, with each group of camera units configured to capture multiple channels of information excited by a corresponding group of illumination source units.

Each group of camera units can have one or more types of camera units, with each type of camera unit configured to capture a channel of information. For example, a first type of camera unit can be configured to capture a fluorescence signal, such as by incorporating an emission filter having a band pass wavelength range corresponding to the first fluorescence signal, and a second type of camera unit can be configured to capture light without a filter, such as visible light, infrared light, or ultraviolet light.

Each group of illumination source units can have one or more types of illumination source units, with each type of illumination source unit configured to generate information related to the channel of information to be captured by a corresponding type of camera unit. For example, a first type of illumination source units can be configured to generate a first fluorescence excitation radiation, such as by incorporating a fluorescence excitation filter having a band pass wavelength range corresponding to the first fluorescence excitation radiation. A second type of illumination source units can be configured to generate light without a filter, such as visible light, infrared light, or ultraviolet light.

In some embodiments, a retrofit kit can be used on the imaging system to convert the imaging system to a multichannel fluorescence imaging system. The conversion can include adding filters, e.g., fluorescence excitation filters for the radiation source units and emission filters for the camera units, together with a modification of the post processing algorithm to calculate and correlate fluorescence imaging data.

When observing biological activities (such as the fluorescent neural activity of model organisms), multiple fluorophores may be necessary to accurately understand the behavior of different cell types, organelles, or other biological structures. The synchronization capability of the present system can ensure exact synchronization of the acquired data across the array of camera units, e.g., capturing several fluorescence signals across a few centimeters of the sample within microsecond accuracy to claim relevance in the interactions of these separate structures.

In some embodiments, an imaging system can include multiple cameras configured to image top views and side views of wells in a well plate. The cameras are equipped with an array of emission filters, for example, disposed in front of the lenses. The imaging system can also include an illumination array offering both trans-illumination, e.g., through a sample, and epi-illumination, e.g., reflecting from the sample. The illumination source can include LEDs, or other radiation sources, such as a single source of bright LEDs or several LEDs emitting a specific range of excitation wavelengths, or one or more lasers, or one or more laser diodes, or one or more vertical cavity surface emitting lasers. A set of fluorescence excitation filters can be placed in front of one or more of the transmission or epi-illumination light sources for more specificity of the range of optical wavelengths that reach the specimen.

In some embodiments, certain pairs of fluorophores within a specimen of interest can be illuminated with their excitation sources at the same time, and as long as their emission wavelength ranges do not overlap substantially, two emission filters can be chosen to pass only the corresponding fluorophore emission wavelengths at the detector side into the associated micro-cameras. If the field-of-view overlap of adjacent micro-cameras is selected such that each point in the sample passes through at least two micro-cameras, with a first micro-camera having an emission filter for a first type of fluorescence emission, and a second micro-camera having an emission filter for a second type of fluorescence emission, the microscope system can simultaneously detect both fluorescent emission wavelength ranges.

For example, a sample can include green fluorescent protein (GFP) and red fluorescent protein (RFP). Radiation having wavelengths less than 500 nm and centered at 545 nm can be used as fluorescence excitation radiation for GFP and RFP, respectively, when illuminating a sample tagged with both fluorescent proteins. Sets of emission filter centered at 510 nm and centered at 610 nm, which correspond to the emission spectra of GFP and RFP, respectively, can be placed over two subsets of micro-cameras.

In this configuration, the illumination source can excite the GFP and RFP in the sample, while the camera array can capture images of the fluorescence emitted from the GFP and RFP. After the images are captured, the image data can be transmitted to a processor for post-processing, such as with an accompanying algorithm to combine all of the jointly captured image data from all of the micro-cameras into one or more final composite images of the entire specimen. The final composite image can include fluorescence emission intensities from more than one fluorescence emitter type, which can provide a measure of the intensity of more than one spectral range of fluorescence emission at each location across the sample.

In some embodiments, a mode of fluorescence can include fluorescence from other fluorescence protein, such as yellow fluorescence protein or cyan fluorescence protein.

FIGS. 37A-37B illustrate schematics for a multiple camera imaging system with an external excitation mechanism, including a fluorescence configuration according to some embodiments. FIG. 37A shows a cross section view of an imaging system configured with fluorescence filters for fluorescence analysis. FIGS. 37B(a) and 37B(b) show a configuration for side view excitation sources.

The imaging system 100 can include multiple cameras 110 and one or more illumination source arrays disposed above 111 and below 112 for microscopic imaging. The cameras and the illumination sources can be configured with or without filters, such as fluorescent filters or polarized filters. For example, as shown, alternate cameras and illumination sources have filters 133, 131 and 132. The filters 133 for the cameras can change the characteristics of the captured light, so that the images captured by the cameras can have the specific property of the filters. For example, a fluorescent filter can allow the cameras to capture fluorescent signal emitted from the sample. A polarized filter, such as a circular polarized filter, can allow the cameras to capture circular-polarized light.

The filters 131 and 132 for the illumination sources can change the characteristics of the emitted light, so that the sample can have the specific light property provided by the filters. For example, a fluorescent filter can allow the illumination sources to emit fluorescent excitation energy to the sample, causing the organisms in the sample to respond and emit fluorescent signals. A polarized filter, such as a circular polarized filter, can allow the illumination sources to emit circular-polarized light.

The camera and illumination filters 133, 132, and 131 can be removable filters, e.g., the imaging system can be configured for the assembling or disassembling of the filters. For example, the camera filters 133 can be assembled on a removable camera filter set 133*, which can be installed on the camera array to filter light reaching some or all cameras of the camera array. When installed, the cameras are configured to capture filtered light, such as fluorescence light. When not installed, the cameras are configured to capture light that the cameras are designed to capture, such as visible light, infrared light, or ultraviolet light.

Similarly, the illumination filters 131 or 132 can be assembled on a removable illumination filter set 131* or 132*, respectively, which can be installed on the illumination array to filter light coming out of some or all illumination sources of the illumination array. When installed, the illumination sources are configured to provide filtered light, such as fluorescence excitation light. When not installed, the illumination sources are configured to provide light that the illumination sources are designed to generate, such as visible light, infrared light, or ultraviolet light.

The imaging system can be configured for used with a well plate 120, e.g., the cameras are disposed in matching configurations with the wells and mirrors of the well plate to image the top (or bottom) views and the side views of the wells.

The illumination sources can be configured to illuminate the wells or mirrors of a well plate 120. The illumination sources can be configured to illuminate the whole well plate, a portion of the well plate, or a single well. With the well plate configured for top (or bottom) and side views, in the specification, illuminating or imaging a well can mean illuminating or imaging a top (or bottom) area of the well, illuminating or imaging a side area of the well, or illuminating or imaging a top (or bottom) area and a side area of the well. Further, illuminating or imaging a top (or bottom) area of the well can mean the illumination source or the camera is disposed above (or below) the well, with the field of illumination of the illumination source or field of view of the camera covering the top (or bottom) area of the well. And illuminating or imaging a side area of the well can mean the illumination source or the camera is disposed above (or below) a top (or bottom) mirror portion adjacent to the well, with the field of illumination of the illumination source or field of view of the camera covering the top (or bottom) mirror portion adjacent to the well, respectively. In addition, illuminating or imaging a top (or bottom) area of a well can mean illuminating or imaging only a top (or bottom) area of a well, or illuminating or imaging a top (or bottom) area of a well together with other areas, such as a top (or bottom) mirror adjacent to the well, or a top (or bottom) area of a second well and a top (or bottom) second mirror adjacent to the second well.

For example, a broad illumination source 112A can be used to illuminate the whole well plate. As shown, the broad illumination source includes a filter. Another illumination source, shown with a filter and a collimator, can be used to illuminate a portion of the well plate, e.g., multiple wells. Another illumination source, shown with a filter, can be a point illumination source, and configured with a collimator to illuminate only a well, which can be a bottom area of the well as shown.

In some embodiments, some or all of the illumination sources can be configured to provide a thin sheet of light, e.g., a beam of light having a flat plane shape. An advantage of a thin sheet of light includes minimizing photobleaching of the sample. An advantage of a fluorescence thin sheet of light includes minimizing background fluorescence created in out-of-focus planes, since the thin sheet of excited fluorescence light is able to excite fluorescence only with some particular planes and not elsewhere.

The thin sheet of light can be formed using a set of optical elements, such as lenses. Alternatively, a rapid scanning laser beam can be used to scan across the mirror and define a plane of illumination.

The imaging system can optionally include moving mechanisms configured to move the cameras or the sample. A moving mechanism, such as a camera array mechanism 143 can be coupled to the camera array to move the camera array relative to the sample, such as toward or away from the sample. Alternatively or additionally, individual cameras can have moving mechanisms for performing focus on individual cameras. Another moving mechanism, such as a 3D sample stage mechanism 144, can be coupled to a well plate support to move the well plate relative to the cameras, such as toward or away from the cameras. The moving mechanism 143 or 144 can also be configured to move the camera array or the well plate support in a lateral direction, for example, for scanning the sample. For example, the well plate can also be placed on a 3D motorized stage, whose position can be controlled via software on the computer to bring the well plate into appropriate lateral position with a desired focus.

The imaging system can include one or more excitation sources 130, which can be configured to provide excitation energy to the well plate, e.g., to disturb the organisms in the wells of the well plate. The excitation sources can be local, e.g., the excitation energy is confined to one or more wells of the well plate. The excitation sources can be global, e.g., the excitation energy is provided to the whole well plate, e.g., to all wells of the well plate. The excitation energy can be provided continuously, or in separate pulses. The pulses can be periodic, or can include burst of energy pulses. The excitation sources can include an acoustic signal, a radiation signal, a radiation pattern, a vibration signal, an injector that can inject a stimulant such as a chemical or a radiation excitation component, an olfactory signal, or a manipulator for generate a mechanical disturbance or stimulant to the sample. The excitation sources can be separate excitation sources, or can be incorporated into the light sources, for example, by the filters, such as fluorescent excitation filter.

The imaging system can include excitation sources 130* for fluorescence excitation of objects or organisms 124 in the wells of the well plate. As shown in FIGS. 37B(a) and 37B(b), the excitation sources 130* are configured to provide a global fluorescence excitation energy to multiple wells of the well plate. Filtered cameras can be used to capture the fluorescence signals generated from the samples, for example, for the top views. Unfiltered cameras can be used to capture illuminated images of the sample, for example, for the side views.

FIGS. 38A-38C illustrate schematics for a multiple camera imaging system with a fluorescence configuration for individual wells according to some embodiments. FIGS. 38A(a)-38A(d) show florescence configurations for transmitted excitation.

FIG. 38A(a) shows a fluorescence configuration in which a fluorescence excitation source 130A is provided to a bottom (right) mirror adjacent to a well of a well plate. The fluorescence excitation light is then directed to a side (right side, as shown) of the well to excite the sample in the well. A camera with a fluorescence emission filter 133 is positioned above the well to capture top view fluorescence images of the sample.

FIG. 38A(b) shows a fluorescence configuration in which a fluorescence excitation source is provided to a bottom area of a well to excite the sample in the well. A camera with a fluorescence emission filter is positioned above a top (left) mirror adjacent to the well to capture side view (left side, as shown) fluorescence images of the sample.

FIG. 38A(c) shows a fluorescence configuration in which a fluorescence excitation source is provided to a top area of a well to excite the sample in the well. A camera with a fluorescence emission filter is positioned above a top (left) mirror adjacent to the well to capture side view (left side, as shown) fluorescence images of the sample.

FIG. 38A(d) shows a fluorescence configuration in which a fluorescence excitation source is provided to a top (left) mirror adjacent to a well of a well plate. The fluorescence excitation light is then directed to a side (left side, as shown) of the well to excite the sample in the well. A camera with a fluorescence emission filter is positioned above the well to capture top view fluorescence images of the sample.

FIGS. 38B(a)-38B(d) show florescence configurations for top illumination epi excitation. FIG. 38B(a) shows a fluorescence configuration in which a fluorescence excitation source is provided to a top (left) mirror adjacent to a well of a well plate. The fluorescence excitation light is then directed to a side (left side, as shown) of the well to excite the sample in the well. A camera with a fluorescence emission filter is positioned above top (left) mirror to capture side view (left side, as shown) fluorescence images of the sample.

FIG. 38B(b) shows a fluorescence configuration in which a fluorescence excitation source is provided to a top area of a well to excite the sample in the well. A camera with a fluorescence emission filter is positioned above the well to capture top view fluorescence images of the sample.

FIG. 38B(c) shows a fluorescence configuration in which a fluorescence excitation source is provided to a bottom area of a well to excite the sample in the well. A camera with a fluorescence emission filter is positioned above the well to capture top view fluorescence images of the sample.

FIG. 38B(d) shows a fluorescence configuration in which a fluorescence excitation source is provided to a bottom (right) mirror adjacent to a well of a well plate. The fluorescence excitation light is then directed to a side (right side, as shown) of the well to excite the sample in the well. A camera with a fluorescence emission filter is positioned above a top (left) mirror adjacent to the well to capture side view (left side, as shown) fluorescence images of the sample.

FIGS. 38C(a)-38C(b) show other florescence configurations for side illumination epi excitation. FIG. 38C(a) shows a fluorescence configuration in which a fluorescence excitation source 130B at a side of the imaging system is provided to a top (left) mirror adjacent to a well of a well plate through an optical element, such as a prism 123*. The fluorescence excitation light is then reflected from the prism to be directed to a side (left side, as shown) of the well to excite the sample in the well. A camera with a fluorescence emission filter is positioned above the top (left) mirror to capture side view (left side, as shown) fluorescence images of the sample.

FIG. 38C(b) shows a fluorescence configuration in which a fluorescence excitation source 130B at a side of the imaging system is provided to a top area of a well of a well plate through an optical element, such as a prism 123*. The fluorescence excitation light is then reflected from the prism to be directed to the top of the well to excite the sample in the well. A camera with a fluorescence emission filter is positioned above the well to capture top view fluorescence images of the sample.

FIG. 39 illustrates a flow chart for a multiple camera imaging system with a fluorescence configuration according to some embodiments. Operation 550 forms an imaging system for simultaneously providing top views and side views of samples in wells of a well plate. The imaging system includes a camera array including multiple cameras. The imaging system further includes one or more illumination arrays with each illumination array including multiple illumination sources configured to provide visible light, infrared light, ultraviolet light, or light with frequencies configured to perform fluorescence excitation to the well plate. The well plate includes at least a well disposed between two adjacent optical elements configured to access the sides of the at least a well.

Some of the illumination sources are configured to generate light with one or more frequencies configured to perform fluorescence excitation to the samples. Alternatively, the imaging system includes illumination filters for some of the multiple illumination sources, with the illumination filters configured to provide fluorescence excitation signals to the sample.

The imaging system includes camera filters for some of the multiple cameras to capture emitted fluorescence signals, with the camera filters fixedly or removably coupled to the cameras.

Some of the multiple illumination sources are configured to be fluorescence excitation sources to the whole well plate, to a portion of the well plate, to a well, or to an optical element of the well plate.

The fluorescence excitation sources are configured to provide collimated or parallel fluorescence signals to a whole or to a partial surface of one or more wells and/or one or more optical elements of the well plate.

The fluorescence excitation sources are configured to provide line of beam fluorescence signals to one or more wells and/or one or more optical elements of the well plate.

The imaging system further includes a controller configured to control the filters for the multiple cameras and the multiple illumination sources to perform fluorescence signal imaging.

The imaging system further includes a controller configured to process image data and fluorescence data from the images captured by the multiple cameras under a fluorescence excitation.

Configurations for a Multiple Camera Imaging System from Green Fluorescence Protein (GFP) Imaging In some embodiments, the imaging system is configured for multi-channel imaging, such as a first channel for fluorescence and a second channel for normal, e.g., non-fluorescence, illumination, with image correlation between channels. For example, an illumination source, e.g., for visible, infrared, or ultraviolet light, can be provided to bottom (or top) area of a well for the imaging of a top (or bottom) view of a sample in the well. A filtered illumination source, e.g., to provide a fluorescence excitation signal to the sample, can be provided to a side area of the well (such as to a right side) for the imaging of a side view of the sample (such as the left side view).

FIGS. 40A-40B illustrate a schematic of a multiple camera imaging system configured for GFP imaging according to some embodiments. FIG. 40A shows a configuration for fluorescence using transmitted illumination. FIG. 40B shows a configuration for fluorescence using reflected (or epi) illumination.

FIG. 40A shows an imaging system with through light transmission, having multiple cameras 110 configured to provide top and side views for wells in a well plate 120. A well is disposed between a top mirror (at left) and a bottom mirror (at right), e.g., the top mirror is configured to provide a top reflective surface from a top area to a (left) side of the well, and the bottom mirror is configured to provide a bottom reflective surface from a bottom area to a (right) side of the well. A bottom mirror for an adjacent well can be placed under a top mirror. Thus, the top and bottom mirrors for two adjacent wells are combined on top of each other to form a mirror assembly having a top reflective surface and a bottom reflective surface. In the specification, the term "mirror" is used to denote an optical element having a reflective surface. The term "mirror" can be used interchangeably with other optical elements having a total or partial reflective surface, such as a prism.

The cameras can be configured to have field of views limited to a well, e.g., for a first camera (the right camera of a group of two adjacent cameras) to image a top view of a sample in the well for a camera and for a second camera (the left camera) to image a side view of the sample in the well, through the reflective surface of a top mirror adjacent to the well.

The imaging system can include a bottom illumination source array 112 disposed below a well plate 120. Other illumination source arrays can be optionally included, such as a top illumination array 111 disposed above the well plate, or a side illumination array (not shown) disposed at a side of the well plate. The bottom illumination sources 112 are configured to illuminate the bottom area of the well and the bottom area of the bottom mirror for the light to be reflected to the (right) side of the well. Collimators or light restrictors can be used to limit the illumination areas of the illumination sources.

The cameras and the wells are configured to be matched, e.g., each camera is configured to capture top view or side view images of at least a well, or each well is configured for at least a camera (or two cameras as shown) to capture top view or side view images of the well. For example, if there is a gap between wells in the well plate, there is a corresponding gap between the cameras, so that there is a matching configuration between the cameras and the wells.

The cameras can be configured with and without filters, such as emission fluorescent filters. For example, as shown, alternate cameras have filters 133A. The filters 133A can be green emission filters, e.g., filters with a band pass around 510 nm. The green filters can allow the cameras to capture green fluorescent signal emitted from the sample, after being excited by a blue excitation light of 490 nm.

Alternative cameras can include infrared cameras, e.g., cameras configured to capture infrared signals, for example, from an IR illumination source 112D.

The illumination sources can be configured with and without filters, such as excitation fluorescent filters. For example, alternate illumination sources 112E can include a blue light source, e.g., without a filter. Alternatively, the illumination sources can include a visible light source 112, configured with a blue excitation filter 134, e.g., filters with a band pass around 490 nm. The blue filters can allow the illumination sources to provide the blue excitation light of 490 nm to the sample.

The illumination sources can be configured for non-fluorescence imaging, such as to provide visible light, infrared light or ultraviolet light. For example, alternate illumination sources 112D can include an infrared light source, e.g., without a filter, e.g., filters with a band pass around 800 nm. The IR filters can allow the illumination sources to provide the infrared light of 800 nm to the sample, so that top view images of the sample illuminated with IR light can be captured by an IR camera, e.g., a camera without a filter.

The imaging system thus can be configured for simultaneous imaging of green-blue fluorescence and IR imaging, such as side view imaging of green-blue fluorescence for green fluorescence protein (GFP) and top view imaging of infrared light for non-fluorescence imaging. A controller can be configured to control the illumination sources, such as to simultaneously turn on all of the illumination sources of blue and IR lights, so that top and/or side view images of the samples of all the wells can be simultaneously captured by all of the cameras.

The selection of IR light for non-fluorescence imaging can allow a simultaneous sample illumination of blue and IR light and simultaneous image capturing of green and IR images, since IR, green, and blue light are light having distinct wavelengths, e.g., simultaneous operation can be performed without cross interference.

Other configurations can be used, such as visible light and other fluorescence proteins, such as red or cyan fluorescence protein. For visible light, since there is an overlap in the wavelength spectrum, sequential operation might be needed.

Further, as shown, the cameras are disposed above the well plate. Other configurations can be used, such as the cameras disposed below or at a side of the well plate.

FIG. 40B shows a similar imaging system with reflective light transmission, having multiple cameras 110 configured to provide top and side views for wells in a well plate 120. The cameras can be configured to have field of views limited to a well or to a mirror adjacent to a well.

The imaging system can include a top illumination source array 111 disposed above the well plate 120. Other illumination source arrays can be optionally included, such as a bottom illumination array 112, or a side illumination array. The top illumination sources 111 are configured to illuminate the top area of the well and the top area of the top mirror for the light to be reflected to the (left) side of the well. Collimators or light restrictors can be used to limit the illumination areas of the illumination sources.

The cameras and the wells are configured to be matched.

The cameras can be configured with alternate cameras having filters 133A and alternate cameras being IR cameras, e.g., cameras configured to capture infrared signals, for example, from an IR illumination source 112D. The filters 133A can be green emission filters.

The illumination sources can be configured alternate between providing IR light and blue light. For example, alternate illumination sources 111E can include a blue light source or a visible light source 111 with a blue excitation filter 134. Alternate illumination sources 111D can include an infrared light source.

The imaging system thus can be configured for simultaneous imaging of green-blue fluorescence and IR imaging, such as side view imaging of green-blue fluorescence for green fluorescence protein (GFP) and top view imaging of infrared light for non-fluorescence imaging. A controller can be configured to control the illumination sources, such as to simultaneously turn on all of the illumination sources of blue and IR lights, so that top and/or side view images of the samples of all the wells can be simultaneously captured by all of the cameras.

Other configurations can be used, such as visible light and other fluorescence proteins, such as red or cyan fluorescence protein. For visible light, since there is an overlap in the wavelength spectrum, sequential operation might be needed.

Further, as shown, the cameras are disposed above the well plate. Other configurations can be used, such as cameras disposed below or at a side of the well plate.

FIGS. 41A-41B illustrate a schematic of a multiple camera imaging system configured for GFP imaging with planar beam excitation according to some embodiments. FIG. 41A shows a configuration for fluorescence using transmitted illumination. FIG. 41B shows a configuration for fluorescence using reflected (or epi) illumination.

FIG. 41A shows an imaging system with through light transmission, having multiple cameras 110 configured to provide top and side views for wells in a well plate 120. The cameras can be configured to have field of views limited to a well.

The imaging system can include a bottom illumination source array 112 disposed below a well plate 120. Some bottom illumination sources include IR light sources 112D configured to illuminate the bottom area of the well, for example, through collimators 117B1. Some bottom illumination sources include planar sheet blue light sources 112E*, configured to provide a planar sheet beam of light, for example, in a plane parallel to the well plate, and configured to intercept the sample for fluorescence excitation of the sample. The planar sheet blue light can be generated by a blue light source (or a visible light source having a blue light filter) with appropriate optic, or by a blue laser sweeping side-side 116B to form the planar light sheet. Alternate cameras are configured with green emission filters 133A. Alternative cameras can include infrared cameras.

The imaging system thus can be configured for simultaneous side view imaging of green fluorescence protein (GFP) and top view imaging of infrared light. A controller can be configured to control the illumination sources, such as to simultaneously turn on all of the illumination sources of blue and IR lights, so that top and/or side view images of the samples of all the wells can be simultaneously captured by all of the cameras. The planar sheet of blue light can be configured to improve a signal-to-noise ratio for the fluorescence signals.

FIG. 41B shows an imaging system with reflective light transmission, having multiple cameras 110 configured to provide top and side views for wells in a well plate 120. The cameras can be configured to have field of views limited to a well.

The imaging system can include a top illumination source array 111 disposed below a well plate 120. Some top illumination sources include IR light sources 111D configured to illuminate the bottom area of the well, for example, through collimators 117B1. Some top illumination sources include planar sheet blue light sources 111E*, configured to provide a planar sheet beam of light to side areas of the wells.

Alternate cameras are configured with green emission filters 133A. Alternative cameras can include infrared cameras.

FIG. 42 illustrates a flow chart for a multiple camera imaging system configured for GFP imaging with line beam excitation according to some embodiments. Operation 560 forms an imaging system for simultaneously providing top view IR imaging and side view GFP (green fluorescence protein) expression of samples in wells of a well plate. The imaging system includes a camera array including multiple cameras. The imaging system further includes one or more illumination arrays with each illumination array including multiple illumination sources configured to provide infrared light or blue light to the well plate. The well plate includes at least a well disposed between two adjacent optical elements configured to access the sides of the at least a well.

The multiple illumination sources include first illumination sources configured to provide infrared light to the wells of the well plate. The first illumination sources are either configured to generate infrared light or configured with infrared filters to provide infrared light to the wells. The multiple illumination sources include second illumination sources configured to provide blue light to optical elements adjacent to the wells of the well plate.

Alternatively, the multiple illumination sources include first illumination sources either configured to generate blue light or configured with blue light filters to provide blue light to the optical elements. The second illumination sources are configured to provide collimated or parallel fluorescence signals to a whole or to a partial surface of or to provide line of beam fluorescence signals to one or more wells and/or one or more optical elements of the well plate.

The multiple cameras include first cameras configured to capture top view IR images from top of the wells, with the samples in the wells illuminated due to the first illumination sources directed to the wells. The multiple cameras include second cameras having green filters to capture side view green fluorescence images from sides of the wells, with the sample in the wells excited due to the second illumination sources directed to the optical elements adjacent to the wells.

The imaging system further includes a controller configured to simultaneously illuminate and capture and process top view IR image data and side view fluorescence image data from the images captured by the multiple cameras.

FIGS. 43A-43B illustrate flow charts for operating a multiple camera imaging system configured for GFP imaging with line beam excitation according to some embodiments.

In FIG. 43A, operation 570A provides infrared irradiation to wells of a well plate from an opposite side of cameras configured to capture images of transparent samples in the wells. Operation 570B provides blue irradiation to first optical elements adjacent to the wells from the opposite side for fluorescence excitation of the samples from sides of the wells. The blue irradiation is configured to form a line of beam to the samples. Operation 571 captures both top view infrared images from the wells and side view green fluorescence images from second optical elements adjacent to the wells.

In FIG. 43B, operation 580A provides infrared irradiation to wells of a well plate from a same side of cameras configured to capture images of non-transparent samples in the wells. Operation 580B provides blue irradiation to first optical elements adjacent to the wells from the same side for fluorescence excitation of the samples from sides of the wells. The blue irradiation is configured to form a line of beam to the samples. Operation 581 captures both top view infrared images from the wells and side view green fluorescence images from the first optical elements.

Configurations for a Multiple Camera Imaging System with Optional Fluorescence Ability The imaging system can include a retrofit kit to turn the imaging system into a fluorescence imaging system suitable for two or more types of image captures. The retrofit kit can include a set of fluorescence excitation filters for the illumination source units and a set of corresponding emission filters for the camera units.

The set of emission filters can be configured to be placed on the lenses of the camera units, to limit the radiation captured by the camera units to the wavelength range determined by the emission filters. The set of emission filters can include one or more large plates for covering multiple camera units. Alternatively, the set of emission filter can include multiple individual covers for individual camera units.

The set of emission filters can be configured to cover a portion, such as half, of the camera units in an alternating configuration. Alternatively, the set of emission filter can be configured to cover all camera units, with a first portion, e.g., half, covered by a first type of emission filters and a second portion, e.g., the remaining half, covered by a second type of emission filters.

The set of fluorescence excitation filters can be configured for the top or bottom illumination arrays, e.g., for the illumination source units in the illumination arrays. For example, a set can be used for the bottom illumination source units, and a set can be used for the top illumination source units. Alternatively, the retrofit can only include a top set or a bottom set. The set of fluorescence excitation filters is configured to be placed on the illumination source units to limit the radiation generated by the illumination source units to the wavelength range determined by the fluorescence excitation filter. The set of fluorescence excitation filter can include one or more large plates for covering multiple illumination source units. Alternatively, the set of fluorescence excitation filter can include multiple individual covers for individual illumination source units.

The sets of fluorescence excitation filters are configured to cover a portion, such as half, of the illumination source units in an alternating configuration. Alternatively, the set of fluorescence excitation filter can be configured to cover all illumination source units, with a first portion, e.g., half, covered by a first type of fluorescence excitation filters and a second portion, e.g., the remaining half, covered by a second type of fluorescence excitation filters.

In some embodiments, the top set of fluorescence excitation filters can be integrated with the set of emission filters, to provide filters for the camera units and the top illumination source units near the camera units.

FIG. 44A shows an imaging system including camera units 110 disposed above a well plate 120. The imaging system can include top illumination source units 111 and bottom illumination source units 112. The imaging system can be configured for top view and side view images of samples in the wells of the well plate.

FIG. 44B shows the same imaging system, with a retrofit kit assembled on some of the cameras, and on some of the top and bottom illumination sources. The retrofit kit can include one or two sets of fluorescence excitation filters for the top or bottom illumination sources and a set of corresponding emission filters for the cameras.

The set 133 of emission filters can be placed on the cameras to form filtered cameras, e.g., cameras capable of capturing fluorescence signals passing through the emission filters. The sets 131 and 132** of fluorescence excitation filters can be placed on the top and bottom illumination sources 111 and 112, respectively, to form filtered illumination sources, e.g., illumination sources capable of generating radiation having the wavelength range determined by the fluorescence excitation filters.

After being retrofitted with the sets of filters, the controller can be modified. For example, the controller can be modified to form illumination patterns with each pattern including radiation from two different illumination sources. Further, the controller can be modified to calculate and correlating fluorescence and non-fluorescence properties.

FIGS. 44A-44B illustrate a configuration of a multiple camera imaging system with optional fluorescence ability according to some embodiments.

Operation 600 forms an imaging system for simultaneously providing top view IR imaging and side view GFP (green fluorescence protein) expression of samples in wells of a well plate.

The imaging system includes a camera array including multiple cameras.

The imaging system further includes one or more illumination arrays.

The well plate includes at least a well disposed between two adjacent optical elements configured to access the sides of the at least a well.

The imaging system includes a removable and installable camera filter set, with filters in the camera filter set configured to allow the cameras to captured fluorescence signals.

The camera filter set, when installed, is configured for first cameras without the filters to capture top view IR images from top of the wells, with the samples in the wells illuminated due to the first illumination sources directed to the wells.

The camera filter set, when installed, is configured for second cameras with the filters to capture side view green fluorescence images from sides of the wells, with the sample in the wells excited due to the second illumination sources directed to the optical elements adjacent to the wells.

The imaging system includes a removable and installable illumination filter set, with filters in the illumination filter set configured to allow the illumination sources to provide fluorescence excitation signals to the sample.

The illumination filter set, when installed, is configured for first illumination sources without the filters to provide infrared light to the wells of the well plate.

The illumination filter set, when installed, is configured for second illumination sources with the filters to provide blue light to optical elements adjacent to the wells of the well plate.

The second illumination sources are configured to provide collimated or parallel fluorescence signals to a whole or to a partial surface of or to provide line of beam fluorescence signals to one or more wells and/or one or more optical elements of the well plate.

The imaging system further includes a controller configured to simultaneously process top view IR image data and side view fluorescence image data from the images captured by the multiple cameras.

FIG. 45 illustrates a flow chart for a multiple camera imaging system with optional fluorescence ability according to some embodiments. Operation 600 forms an imaging system for simultaneously providing top view IR imaging and side view GFP (green fluorescence protein) expression of samples in wells of a well plate.

The imaging system includes a camera array including multiple cameras. The imaging system further includes one or more illumination arrays. The well plate includes at least a well disposed between two adjacent optical elements configured to access the sides of the at least a well.

The imaging system includes a removable and installable camera filter set, with filters in the camera filter set configured to allow the cameras to captured fluorescence signals.

The camera filter set, when installed, is configured for first cameras without the filters to capture top view IR images from top of the wells, with the samples in the wells illuminated due to the first illumination sources directed to the wells.

The camera filter set, when installed, is configured for second cameras with the filters to capture side view green fluorescence images from sides of the wells, with the sample in the wells excited due to the second illumination sources directed to the optical elements adjacent to the wells.

The imaging system includes a removable and installable illumination filter set, with filters in the illumination filter set configured to allow the illumination sources to provide fluorescence excitation signals to the sample.

The illumination filter set, when installed, is configured for first illumination sources without the filters to provide infrared light to the wells of the well plate.

The illumination filter set, when installed, is configured for second illumination sources with the filters to provide blue light to optical elements adjacent to the wells of the well plate.

The second illumination sources are configured to provide collimated or parallel fluorescence signals to a whole or to a partial surface of or to provide line of beam fluorescence signals to one or more wells and/or one or more optical elements of the well plate.

The imaging system further includes a controller configured to simultaneously process top view IR image data and side view fluorescence image data from the images captured by the multiple cameras.

FIG. 46 illustrates a flow chart for operating a multiple camera imaging system with optional fluorescence ability according to some embodiments.

Operation 610A installs an illumination filter set to illumination sources disposed at an opposite side or at a same side of cameras configured to capture images of transparent samples in wells of a well plate, with filters in the illumination filter set configured to allow the illumination sources to provide fluorescence excitation signals to transparent or non-transparent samples in the wells, respectively.

The illumination filter set, when installed, is configured for first illumination sources without the filters to provide infrared light to the wells of the well plate.

The illumination filter set, when installed, is configured for second illumination sources with the filters to provide blue light to optical elements adjacent to the wells of the well plate.

The second illumination sources are configured to provide collimated or parallel fluorescence signals to a whole or to a partial surface of or to provide line of beam fluorescence signals to one or more wells and/or one or more optical elements of the well plate.

Operation 610B installs a camera filter set to the cameras, with filters in the camera filter set configured to allow the cameras to captured fluorescence signals emitted from the samples after being excited by the fluorescence excitation signals.

The camera filter set, when installed, is configured for first cameras without the filters to capture top view IR images from top of the wells, with the samples in the wells illuminated due to the first illumination sources directed to the wells.

The camera filter set, when installed, is configured for second cameras with the filters to capture side view green fluorescence images from sides of the wells, with the sample in the wells excited due to the second illumination sources directed to the optical elements adjacent to the wells.

Operation 611 captures both top view infrared images from the wells and side view green fluorescence images from second optical elements adjacent to the wells.

Configurations for a Multiple Camera Imaging System with External Excitation

An imaging system can be configured with one or more external excitation sources, for example, to perform stimulus response assays on wells of a well plate. For example, different doses of a drug can be provided to zebra fish in different wells of a well plate. Alternatively, zebra fish with different genetic mutations can be distributed to different wells of a well plate.

A stimulus can be applied to the well plate, e.g., to all the wells of the well plate. The stimulus can include a light stimulus or a sound stimulus. The responses of the fish in different wells are recorded and analyzed, for example, to understand how the different drug doses affect response times of the fish, or how the different genetic mutations affect the response profile of the fish.

With the imaging system having a match configuration between the cameras of a camera array, the illumination sources of the illumination arrays, and the wells of the well plate, the stimulus response assays can be performed quickly, e.g., the responses of multiple different conditions in different wells can be recorded simultaneously to achieve very high throughput response assays.

Figures 47A, 47B, 47C, 47D:
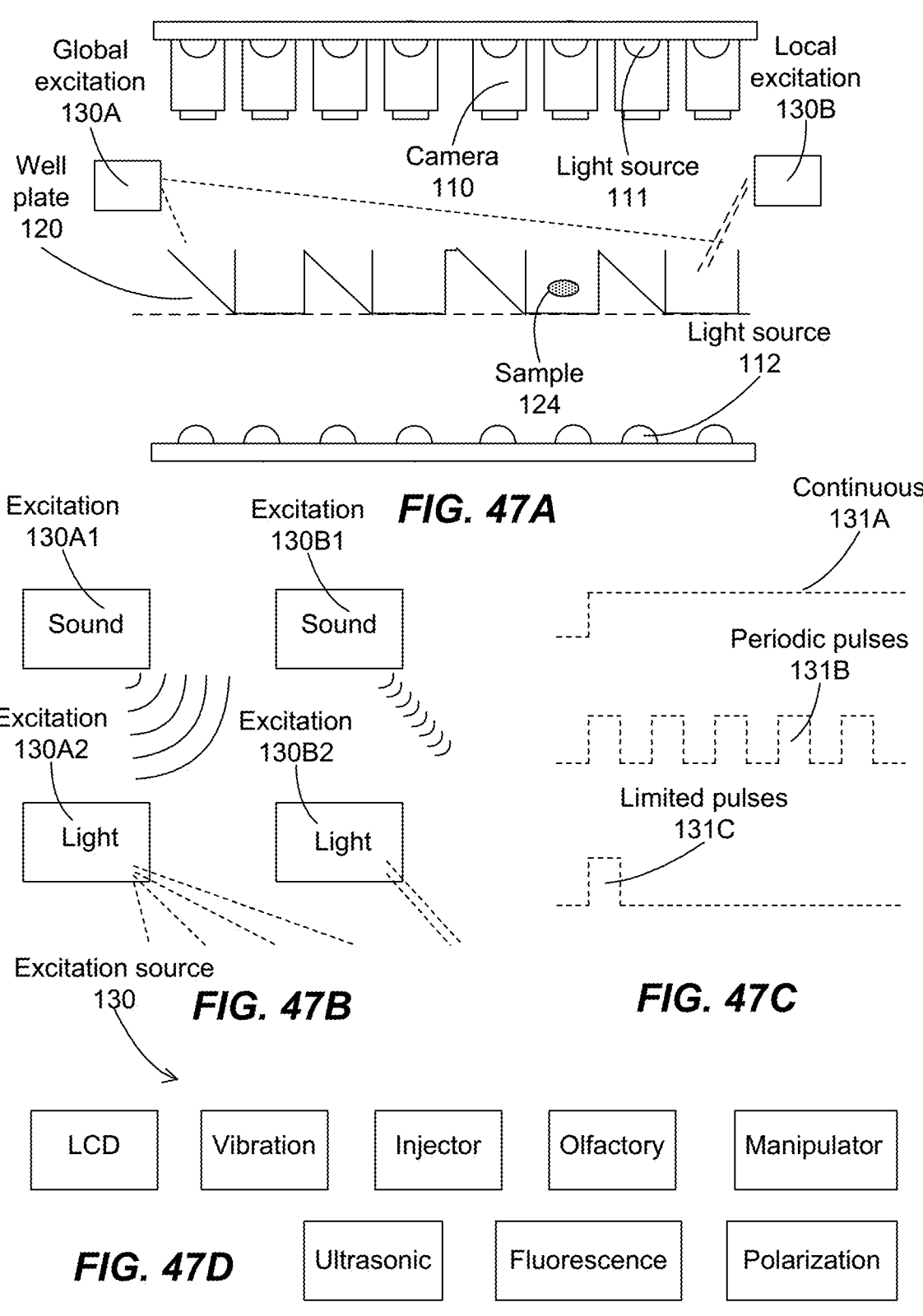

FIGS. 47A-47D illustrate schematics for a multiple camera imaging system with an external excitation mechanism according to some embodiments. FIG. 47A shows an imaging system including multiple cameras 110 and one or more illumination source arrays disposed above 111 and below 112 for microscopic imaging. The cameras and the illumination sources can be configured with or without filters, such as fluorescent filters.

The imaging system can be configured for used with a well plate 120, e.g., the cameras are disposed in matching configurations with the wells and mirrors of the well plate to image the top (or bottom) views and the side views of the wells.

The imaging system can include one or more excitation sources 130A or 130B, which can be configured to provide a stimulus to samples 124 in wells of the well plate. The excitation sources can be global excitation sources 130A. In the global excitation process, the stimulus provided by the excitation source 130A can reach the whole well plate, e.g., all samples and/or some depth of the samples in the wells.

The excitation sources can be local excitation sources 130B. In the local excitation process, the stimulus provided by the excitation source 130B can reach one or more samples, e.g., one or more wells of the well plate.

Other configurations can be used, such as one global excitation source, one local excitation source, or multiple global or local excitation sources. The excitation sources can be disposed above, below, or at a side of the sample.

FIG. 47B shows examples of sound and light excitation sources. An excitation source 130A1, such as a speaker, can emit an acoustic signal, such as a sound, to all areas of the sample, e.g., functioning as a global sound excitation source. An excitation source 130A2 can emit a focus sound to an area of the sample, e.g., functioning as a local sound excitation source.

An excitation source 130B1, such as an LED, can emit a radiation signal, such as a visible, infrared, or ultraviolet light, to all areas of the sample, e.g., functioning as a global radiation excitation source. An excitation source 130B2 can emit a focus radiation to an area of the sample, e.g., functioning as a local radiation excitation source.

FIG. 47C shows configurations for the excitation energy provided by the excitation sources. The excitation energy 131A can be continuous, e.g., the excitation source, once started, continuously provides excitation energy to the sample. The excitation energy can be constant or can be varied, such as a periodic excitation energy, a gradually increased excitation energy, or a gradually decreased excitation energy.

The excitation energy 131B can be periodically pulsed, e.g., the excitation source provides periodic pulses of excitation energy to the sample. The excitation energy can be constant or can be varied, such as changing pitches, duty cycles, on times, off times, a gradually increased excitation energy, or a gradually decreased excitation energy.

The excitation energy 131C can be one or more pulses, e.g., the excitation source provides one or more pulses of excitation energy to the sample. The excitation energy can be constant or can be varied, such as changing pitches, duty cycles, on times, off times, a gradually increased excitation energy, or a gradually decreased excitation energy.

FIG. 47D shows configurations for the excitation energy provided by the excitation sources. One or more excitation sources can be used, such as at a same time, or at different times to provide excitation energy to the sample. The excitation sources 130A or 130B can include a noise, e.g., a sound or an acoustic signal, a light flash, e.g., a burst or one or more pulses of radiation signal, a vibration of the sample holder, or a picture on an LCD screen projected to the sample surface. Other excitation sources can be used, such as an LCD, a vibration source, an injector source, an olfactory source, a manipulator source, an ultrasonic source, a fluorescent source, or a polarization source.

In addition, the excitation sources can include injectors or micro-injectors to inject various model organisms with certain biochemical material, or to insert specific chemicals, toxins or other biochemical material into the specimen arena. The excitation sources can include manipulators or micro-manipulators, which can be used to manipulate, stimulate, perturb or otherwise change the model organisms or their surrounding area. The excitation sources can include equipment such as voice coils or LCD screens, which can be used to stimulate the visual, auditory, olfactory or other sensory systems of the model organisms within the specimen plane.

The excitation sources can be placed surrounding the specimen or sample holder to manipulate the specimen, the sample, the medium, or the organisms in the sample. The excitation sources can be electronically controlled by a controller or a processor, such as a desktop computer.

FIGS. 48A-48B illustrate flow charts for a multiple camera imaging system with an external excitation mechanism according to some embodiments. In FIG. 48A, operation 620 forms an imaging system for simultaneously providing top views and side views of samples in wells of a well plate. The imaging system includes a camera array including multiple cameras. The imaging system further includes one or more illumination arrays with each illumination array including multiple illumination sources configured to provide irradiation to the well plate. The well plate includes at least a well disposed between two adjacent optical elements configured to access the sides of the at least a well.

The imaging system optionally includes one or more excitation sources configured to provide an excitation to the samples in the wells.

The one or more excitation sources include at least one of a local excitation to one or more wells of the well plate or a global excitation to all the wells of the well plate.

The one or more excitation sources include a continuous excitation, a periodic excitation, or a pulse excitation.

The one or more excitation sources include at least one of a noise, a sound, an audio effect, a light, a visual effect, an olfactory effect, a vibration, a mechanical manipulation, a chemical or biochemical injection, or a fluorescence excitation.

The imaging system further includes a controller configured to control the one or more excitation sources to be given to the samples in the wells.

The controller is configured to generate one or more illumination patterns by controlling the multiple illumination sources.

The controller is configured to control the multiple cameras to capture images of the samples under each of the one or more illumination patterns.

The controller is configured to process image data from the images captured by the multiple cameras in response to the one or more excitation sources.

In FIG. 48B, operation 630 provides a stimulation to wells of a well plate with at least two different wells having samples with different conditions.

Operation 631 observes behaviors of the samples in the wells by periodically captures both top view images from tops of the wells and side view images from sides of the wells through first optical elements adjacent to the wells under at least one of irradiation to the wells, irradiation to the first optical elements, or irradiation to second optical elements oppositely adjacent to the wells.

Configurations for Minimizing Data Collection and Transfer in a Multiple Camera Imaging System In some embodiments, the imaging system can include a controller configured to produce focused full side view images of samples in wells of a well plate with minimum data capture and transfer. For example, the controller can include an algorithm or a software application configured to determine when a side view image of a well represents a focused fully-in-the-side side view image.

An objective of the imaging system is to capture side view images of the samples to determine characteristics of the samples, for example, in response to a drug application in an assay. Image data can be captured for a time period, and saved to a database. Then the data can be post processed to obtain side view images of the samples in different wells, to obtain full and focused side view images of the samples. The post processing operation can require a high data capture and transfer, especially for an imaging system having multiple cameras. In addition, the selected time period might not be long enough, e.g., there might not be focused full side view images of samples in certain wells, since the samples are freely moving in the wells and might not present a full side view to the cameras during the time period.

The controller can determine when the samples are in focus and are presenting a full side view to the cameras configured to capture the side view images of the samples. After determining that an image of a sample in a well is obtained that is focused with a full side view, the camera can stop capturing images of the sample in that well. After a threshold number of wells have produced focused full side view images, the assay can stop. Alternatively, a threshold time can be imposed, so that after the threshold time, the assay can stop.

The image focusing process can be determined from a sharpness operation, which can calculate intensity gradients across the captured images. For intensity gradients greater than a sharpness threshold value, which signifies that the edges are sharp, the images are in focus.

The process to determine that a sample is fully presented on its side to the camera, e.g., to provide a full side view image of the sample, can include an area operation, which can calculate areas of the captured images. For area values greater than an area threshold value, which signifies that the sample is fully presented on its side, the images are full side view images.

FIGS. 49A-49B illustrate a configuration for imaging a side view of a sample in a well of a well plate according to some embodiments. The image system can capture sequential images or videos of side views of many samples, e.g., zebra fish, in many wells of a well plate using many cameras, such as one fish per camera, since the cameras of the system are matched with the wells of the well plate. An algorithm can examine each image of the image sequence or each video frame of the video of each fish. The algorithm can compute a focus metric, such as via examining the average square of the spatial Laplacian of the image for calculating an intensity gradient, and an area metric, such as via examining the area inside the sharp gradient to assure the fish is fully to the side, and not tilted. If the focus metric and area metric are above a certain threshold for a camera, such as camera n, then that frame will be saved and video will no longer be captured from camera n. Videos for other cameras will be captured for a certain time T until a total of N wells will each has yielded a focused and fully-to-the-side side view image. The number N of wells having focused images can be predetermined, and can be less than the total number of wells in the well plate, since some wells may not provide a focused full side view image, as a fish might have died or might not move for a very long time. The algorithm can effectively guarantee to provide at least some focused full side view images for every experiment, which can be a big benefit.

In FIG. 49A, multiple side view images 114B of a sample in a well can be captured and processed with time, e.g., a first side view image of a well is captured at time t1, followed by a second side view image at time t2, and a third side view image at time t3. Each of the images can be identifying whether or not to be an in-focus image of the sample using a sharpness metric. For example, each image can be subjected to a sharpness operation 170, which can calculate intensity gradients 171 across the image. The intensity gradient calculation can include calculating an average square of the spatial Laplacian of the image. For an intensity gradient greater than a gradient threshold value, which signifies that the edges are sharp, the image is in focus 172. For an intensity gradient smaller than the gradient threshold value, which signifies that the edges are blurred, the image is out-of-focus 173. For example, the side view image taken at time t2 is in focus, while the images taken at times t1 and t3 are out-of-focus.

In FIG. 49B, multiple side view images 114B of a sample in a well can be captured and processed with time, e.g., a first side view image of a well is captured at time t1*, followed by a second side view image at time t2*, and a third side view image at time t3*. Each of the images can be identifying whether or not to be an image having a maximum area of the sample using an area metric. For example, each image can be subjected to an area operation 174, which can include an intensity gradient operation to identify an outline of the sample in the image. The area of the sample inside the sample outline then can be calculated. For a calculated area greater than an area threshold value, which signifies that the sample is fully in a side, the image is fully-in-a-side side view image 114B*. For a calculated area smaller than an area threshold value, the sample is tilted and not fully in a side. For example, the side view image taken at time t3* is fully in a side, while the images taken at times t1* and t2* are tilted.

If the area of the image is maximum at the in focus image, e.g., both the intensity gradient greater than the gradient threshold value and the calculated area greater than an area threshold value, a focused fully-in-the-side side view image of the sample is taken, and the monitoring and recording of the well containing the sample can stop to reduce the data collection and transferring.

FIGS. 50A-50C illustrate flow charts for minimizing data collection and transfer in a multiple camera imaging system according to some embodiments. In FIG. 50A, operation 640 determines a sharpness metric or an area metric for a side view of a sample in a well of a well plate. Operation 641 determines a focused side view of the sample when the sharpness metric is above a first threshold value or a full side view of the sample when the area metric is above a second threshold value.

In FIG. 50B, operation 650 provides a well plate in a microscope having multiple cameras and illumination sources. The well plate has multiple wells configured for observation of top views of the wells by first cameras of the multiple cameras. The multiple wells have adjacent optical elements configured for observation of side views of the wells by the first cameras or by second cameras of the multiple cameras. The well plate has samples disposed in the wells.

Operation 651 captures top view images and side view images of the samples in the wells.

Operation 652A determines focused side view images of the samples by calculating a sharpness metric of the side view images to be above a first threshold value. Operation 652B determines full side view images of the samples by calculating an area metric of the side view images to be above a second threshold value.

Operation 653 stops capturing images of samples exhibiting focused and full side views.

In FIG. 50C, operation 660 minimizing data collection and data transfer in a microscope having multiple cameras and illumination sources viewing top and side views of samples in a well plate by stopping capturing images of samples exhibiting focused and full side views.

Configurations for Tracking Positions and Orientations of Samples in a Well Plate Using a Multiple Camera Imaging System In some embodiments, the imaging system can include a controller configured to produce 3D location of each sample in each well of a well plate over time. Since the imaging system can produce top view and side view images of samples in each well of a well plate, 3D tracking of the sample can be performed by combining a lateral xy position measured from the top view image and a depth xz position measured from the side view image. If the 3D tracking is performed right after the images are captured, the 3D tracking operation can reduce the overall data streaming from the multiple cameras to the computer memory. Highly reduction of data streaming can be achieved for an imaging system having multiple cameras matching multiple wells in a well plate, by reducing the large image data from the multiple cameras.

FIGS. 51A-51B illustrate a configuration for tracking positions and orientations of samples in a well plate according to some embodiments. FIGS. 51A(a)-51A(c) show a process for 3D tracking of a sample position using top view and side view images. In FIG. 51A(a), top view 114A and side view 114B images of a sample 124 in a well can be captured at a time t and processed. In FIG. 51A(b), the lateral xy location and the depth xz location of the sample can be determined from the top view image 114A and the side view image 114B, respectively, for example, by determining an outline of the sample using an intensity gradient calculation on the image, and a center of mass calculation on the sample outline.

In FIG. 51A(c), by combining the xy and xz locations, position 153 of the sample can be determined, e.g., to produce an xyz coordinate of the sample at time t. The position 153 of the sample can be collected and transferred to a computer memory. Using the positions of the sample at other times, a 3D tracking of the sample positions can be performed.

FIGS. 51B(a)-51B(c) show a process for 3D tracking of a sample orientation using top view and side view images. In FIG. 51B(a), top view 114A and side view 114B images of a sample 124 in a well can be captured at a time t and processed. In FIG. 51B(b), the lateral xy orientation and the depth xz orientation of the sample can be determined from the top view image 114A and the side view image 114B, respectively, for example, by determining an outline of the sample using an intensity gradient calculation on the image, and a straight line fitting calculation on the sample outline.

In FIG. 51B(c), by combining the xy and xz orientations, orientation 154 of the sample can be determined, e.g., to produce an xyz coordinate of the sample orientation at time t. The position 153 and orientation 154 of the sample can be collected and transferred to a computer memory. Using the positions and orientations of the sample at other times, a 3D tracking of the sample positions and orientations can be performed.

FIGS. 52A-52C illustrate flow charts for tracking positions and orientations of samples in a well plate using a multiple camera imaging system according to some embodiments.

In FIG. 52A, operation 670 determines lateral positions of samples in wells of a well plate through top view images of the wells. Operation 671 determines depth positions of the samples through side view images of the wells. Operation 672 saves 3D positions of the samples in the wells as functions of time.

In FIG. 52B, operation 680 determines lateral orientations of samples in wells of a well plate through top view images of the wells. Operation 681 determines depth orientations of the samples through side view images of the wells. Operation 682 saves 3D orientations of the samples in the wells as functions of time.

In FIG. 52C, operation 700 provides a well plate in a microscope having multiple cameras and illumination sources. The well plate has multiple wells configured for observation of top views of the wells by first cameras of the multiple cameras. The multiple wells have adjacent optical elements configured for observation of side views of the wells by the first cameras or by second cameras of the multiple cameras. The well plate has samples disposed in the wells.

Operation 701 captures top view images and side view images of the samples in the wells. Operation 702 determines 3D positions and orientations of the samples in the wells through the top view and the side view images of the wells.

Operation 703 saves the 3D positions and orientations of the samples in the wells as functions of time.

For convenience, "top", "bottom", "above", "below" and similar descriptors are used merely as points of reference in the description, and while corresponding to the general orientation of the illustrated system during operation, are not to be construed to limit the orientation of the system during operation or otherwise.

As employed herein, the statement that two or more parts are "coupled" together shall mean that the parts are joined together either directly or joined through one or more intermediate parts.

When a term such as "about", "approximately", or "substantial" is applied to a particular value, e.g. "about perpendicular" or "substantially parallel", the value, according to the present specification, is interpreted as having less than 20%, less than 10%, less than 5%, or less than 2%, of the value.

As used herein, the term "about" refers to a +/−10% variation from the nominal value. It is to be understood that such a variation is always included in a given value provided herein, whether or not it is specifically referred to.

What is claimed is:

1. An imaging system comprising
multiple cameras;
multiple illumination sources;
a controller,
    wherein the controller is configured to control the multiple illumination sources to generate one or more illumination patterns to a well plate,
    wherein the controller is configured to control the multiple cameras to capture images of samples in wells of the well plate under an illumination pattern of the one or more illumination patterns,
    wherein the controller is configured to stop data collection from a third camera when an image captured by the third camera is in focus and shows a fully side view of a sample,
wherein the well plate comprises multiple wells, wherein at least one well of the multiple wells is disposed between two adjacent optical elements, wherein a first optical element of the two adjacent optical elements is configured to reflect light from a first side of the well plate to a first side of the at least one well, with the multiple cameras disposed at the first side of the at least one well, wherein a second optical element of the two adjacent optical elements is configured to reflect light from second side opposite the first side of the well plate to a second side of the at least one well,
wherein the multiple cameras and the well plate are configured so that the at least one well is positioned in a field of view of a first camera of the camera array,
wherein the multiple cameras and the well plate are also configured so that the first optical element is positioned in the field of view of the first camera or in a field of view of a second camera of the multiple cameras,
wherein the multiple cameras and the multiple wells are configured so that one of
each well and an optical element adjacent to the each well are in a field of view of one or more cameras of the multiple cameras, or
each camera of the multiple cameras is configured to capture images from at least one well or from an optical element adjacent to the at least one well.

2. An imaging system as in claim 1,
wherein the multiple cameras are disposed above the well plate,
wherein the multiple illumination sources are disposed below the well plate,
wherein the first optical element comprises a first mirror configured to reflect light from the first camera or the second camera,
wherein the second optical element comprises a second mirror configured to reflect light from an illumination source of the multiple illumination sources.

3. An imaging system as in claim 1,
wherein the at least one well is positioned in a field of view of a first camera of the camera array,
wherein the first optical element is positioned in the field of view of the first camera.

4. An imaging system as in claim 1,
wherein the at least one is positioned in a field of view of a first camera of the camera array,
wherein the first optical element is positioned in the field of view of the second camera adjacent to the first camera.

5. An imaging system as in claim 1,
wherein the field of view of the first camera covers the at least one and a second well adjacent to the at least one,
wherein the field of view of the first camera also covers the first optical element adjacent to the at least one and another optical element adjacent to the second well.

6. An imaging system as in claim 1,
wherein the at least one is positioned in a field of illumination of a first illumination source of the multiple illumination sources,
wherein the first or second optical element is positioned in the field of illumination of a second illumination source of the multiple illumination sources.

7. An imaging system as in claim 1,
wherein the multiple illumination sources comprise a display configured to illuminate one or more wells or one or more optical elements adjacent to the one or more wells.

8. An imaging system as in claim 1,
wherein the multiple illumination sources and the multiple wells are configured so that one of
each well and an optical element adjacent to the each well are in a field of illumination of one or more illumination sources of the multiple illumination sources, or
each illumination source of the multiple illumination sources is configured to illuminate at least one or an optical element adjacent to the at least one.

9. An imaging system as in claim 1,
wherein the multiple cameras and the multiple wells are configured so that a spacing between two cameras of the multiple cameras is a multiple of half a spacing or a multiple of a spacing between two wells of the well plate.

10. An imaging system as in claim 1,
wherein the multiple cameras and the multiple wells are configured so that a gap between two camera subarrays of the multiple cameras is matched with a gap between two well subarrays of the multiple wells.

11. An imaging system as in claim 1,
wherein the at least one comprises a lateral dimension large enough to avoid imaging distortion due to meniscus effects,
wherein the at least one comprises the lateral dimension large enough to avoid undue stresses on a live organism disposed in the at least one.

12. An imaging system as in claim 1,
wherein the optical elements comprise mirrors,
wherein the well plate comprises a mirror base plate assembled with the multiple wells,
wherein the mirror base plate is reusable with second multiple wells.

13. An imaging system as in claim 1,
wherein more than one illumination source of the multiple illumination sources comprise excitation filters configured to provide fluorescence excitation signals,
wherein more than one camera of the multiple cameras comprise emission filters configured to capture fluorescence signals from the samples in response to the fluorescence excitation signals.

14. An imaging system as in claim 1, further comprising
a set of excitation filters configured to be assembled to more than one illumination source of the multiple illumination sources to provide fluorescence excitation signals,
a set of emission filters configured to be assembled to more than one camera of the multiple cameras to capture fluorescence signals from the samples in response to the fluorescence excitation signals.

15. An imaging system as in claim 1,
wherein a plurality of first illumination sources of the multiple illumination sources are configured to provide blue light,
wherein a plurality of first cameras of the multiple cameras comprise green emission filters configured to capture green fluorescence signals from the samples in response to the fluorescence excitation signals,
wherein a plurality of second illumination sources of the multiple illumination sources are configured to provide infrared light,
wherein a plurality of second cameras of the multiple cameras are configured to capture infrared images of the samples in response to the infrared light.

16. An imaging system as in claim 1,
wherein an illumination source of the multiple illumination sources is configured to provide a planar sheet of light to the well plate.

17. An imaging system as in claim 1,
wherein an illumination source of the multiple illumination sources comprises a laser light source configured to sweep side to side to form a planar sheet of light.

18. An imaging system comprising
multiple cameras;
multiple illumination sources;
a controller,
    wherein the controller is configured to control the multiple illumination sources to generate one or more illumination patterns to a well plate,
    wherein the controller is configured to control the multiple cameras to capture images of samples in wells of the well plate under an illumination pattern of the one or more illumination patterns,
wherein the well plate comprises multiple wells, wherein at least one well of the multiple wells is disposed between two adjacent optical elements, wherein a first optical element of the two adjacent optical elements is configured to reflect light from a first side of the well plate to a first side of the at least one well, with the multiple cameras disposed at the first side, wherein a second optical element of the two adjacent optical elements is configured to reflect light from second side opposite the first side of the well plate to a second side of the at least one well,
wherein the multiple cameras and the well plate are configured so that the at least one well is positioned in a field of view of a first camera of the camera array,
wherein the multiple cameras and the well plate are also configured so that the first optical element is positioned in the field of view of the first camera or in a field of view of a second camera of the multiple cameras,
wherein the controller is configured to stop data collection from a third camera when an image captured by the third camera is in focus and shows a fully side view of a sample.

* * * * *